US007774326B2

(12) United States Patent
Arrouye et al.

(10) Patent No.: US 7,774,326 B2
(45) Date of Patent: Aug. 10, 2010

(54) METHODS AND SYSTEMS FOR MANAGING DATA

(75) Inventors: Yan Arrouye, Mountain View, CA (US); Dominic Giampaolo, Mountain View, CA (US); Bas Ording, San Francisco, CA (US); Gregory Christie, San Jose, CA (US); Stephen Olivier Lemay, San Francisco, CA (US); Marcel van Os, San Francisco, CA (US); Imran Chaudhri, San Francisco, CA (US); Kevin Tiene, Cupertino, CA (US); Pavel Cisler, Los Gatos, CA (US)

(73) Assignee: Apple Inc., Cupertino, CA (US)

( * ) Notice: Subject to any disclaimer, the term of this patent is extended or adjusted under 35 U.S.C. 154(b) by 1121 days.

(21) Appl. No.: 11/112,305

(22) Filed: Apr. 22, 2005

(65) Prior Publication Data

US 2007/0005581 A1 Jan. 4, 2007

Related U.S. Application Data

(63) Continuation-in-part of application No. 10/877,584, filed on Jun. 25, 2004.

(60) Provisional application No. 60/643,087, filed on Jan. 7, 2005.

(51) Int. Cl.
*G06F 17/30* (2006.01)

(52) U.S. Cl. ........................ 707/705; 707/804; 707/805

(58) Field of Classification Search ..................... 707/3, 707/4, 100, 102, 201, 204, 200, 104.1, 705, 707/706, 707, 708, 709, 710, 740, 804, 805, 707/821; 715/700, 739, 744, 751, 804, 273
See application file for complete search history.

(56) References Cited

U.S. PATENT DOCUMENTS

| | | | |
|---|---|---|---|
| 4,270,182 | A | 5/1981 | Asija |
| 4,704,703 | A | 11/1987 | Fenwick |
| 4,736,308 | A | 4/1988 | Heckel |

(Continued)

FOREIGN PATENT DOCUMENTS

WO WO 01/46870 A1 6/2001

(Continued)

OTHER PUBLICATIONS

PCT Chapter I International Preliminary Report On Patentability (IPRP Chapter I) PCT/US2005/022535 mailed Dec. 28, 2006. (15 Pages).

(Continued)

*Primary Examiner*—Greta L Robinson
(74) *Attorney, Agent, or Firm*—Blakely, Sokoloff, Taylor & Zafman LLP

(57) ABSTRACT

Methods and systems for processing data, including metadata and an index database. In one exemplary method, a first folder, representing a first search query, is stored, and a second folder, representing a second search query wherein the second folder has a predetermined hierarchical relationship to the first folder, is stored, and the search queries are used to search one or both of an index database and a metadata database. In the metadata database, the type of metadata for one file type differs from the type of metadata for another file type.

9 Claims, 90 Drawing Sheets

U.S. PATENT DOCUMENTS 4,939,507 A 7/1990 Beard et al.
4,985,863 A 1/1991 Fujisawa et al.
5,008,853 A 4/1991 Bly et al.
5,072,412 A 12/1991 Henderson, Jr. et al.
5,161,223 A 11/1992 Abraham
5,228,123 A 7/1993 Heckel
5,241,671 A 8/1993 Reed et al.
5,319,745 A 6/1994 Vinsonneau et al.
5,355,497 A 10/1994 Cohen-Levy
5,392,428 A 2/1995 Robins
5,437,029 A 7/1995 Sinha
5,504,852 A 4/1996 Thompson-Rohrlich
5,544,360 A 8/1996 Lewak et al.
5,557,793 A 9/1996 Koerber
5,592,608 A 1/1997 Weber et al.
5,623,681 A 4/1997 Rivette et al.
5,644,657 A 7/1997 Capps et al.
5,659,735 A 8/1997 Parrish et al.
5,710,844 A 1/1998 Capps et al.
5,761,655 A 6/1998 Hoffman
5,761,678 A 6/1998 Bendert et al.
5,828,376 A 10/1998 Solimene et al.
5,832,500 A 11/1998 Burrows
5,845,301 A 12/1998 Rivette et al.
5,890,147 A 3/1999 Peltonen et al.
5,913,215 A 6/1999 Rubinstein et al.
5,966,710 A 10/1999 Burrows
5,983,248 A 11/1999 DeRose et al.
6,012,053 A 1/2000 Pant et al.
6,023,721 A 2/2000 Cummings
6,026,404 A 2/2000 Adunuthula et al.
6,055,543 A 4/2000 Christensen et al.
6,061,692 A 5/2000 Thomas et al.
6,067,541 A 5/2000 Raju et al.
6,091,411 A 7/2000 Straub et al.
6,115,717 A 9/2000 Mehrota et al.
6,119,118 A 9/2000 Kain, III et al.
6,185,574 B1 2/2001 Howard et al.
6,202,060 B1 3/2001 Tran
6,239,802 B1 5/2001 Lahey et al.
6,301,586 B1 10/2001 Yang et al.
6,353,823 B1 3/2002 Kumar
6,363,386 B1 3/2002 Soderberg et al.
6,370,562 B2 4/2002 Page et al.
6,374,260 B1 4/2002 Hoffert et al.
6,385,600 B1 5/2002 McGuinness et al.
6,389,412 B1 5/2002 Light
6,389,467 B1 5/2002 Eyal
6,401,097 B1 6/2002 McCotter et al.
6,408,301 B1 6/2002 Patton et al.
6,434,548 B1 8/2002 Emens et al.
6,449,627 B1 9/2002 Baer et al.
6,466,237 B1 10/2002 Miyao et al.
6,473,794 B1 10/2002 Guheen et al.
6,480,835 B1 11/2002 Light
6,564,225 B1 5/2003 Brogliatti et al.
6,567,805 B1 5/2003 Johnson et al.
6,633,864 B1 10/2003 Christensen et al.
6,633,867 B1 10/2003 Kraft et al.
6,636,856 B2 10/2003 Pasquali
6,647,383 B1 * 11/2003 August et al. .................. 707/3
6,665,657 B1 12/2003 Dibachi
6,668,377 B1 12/2003 Dunn
6,681,227 B1 1/2004 Kojima et al.
6,687,712 B2 2/2004 Mito et al.
6,691,125 B1 2/2004 Engle et al.
6,704,739 B2 3/2004 Craft et al.
6,721,747 B2 4/2004 Lipkin
6,732,088 B1 5/2004 Glance
6,741,996 B1 5/2004 Brechner et al.
6,760,721 B1 7/2004 Chasen et al.
6,766,315 B1 7/2004 Bratsos et al.
6,785,688 B2 8/2004 Abajian et al.
6,804,674 B2 10/2004 Hsiao et al.
6,847,959 B1 1/2005 Arrouye et al.
6,850,257 B1 2/2005 Colleran et al.
6,862,713 B1 3/2005 Kraft et al.
6,895,430 B1 5/2005 Schneider
6,947,959 B1 9/2005 Gill
7,039,635 B1 5/2006 Morgan et al.
7,039,637 B2 5/2006 Murray et al.
7,137,099 B2 11/2006 Knight et al.
7,155,504 B1 12/2006 Fujieda
7,162,466 B2 1/2007 Kaasten et al.
7,188,100 B2 3/2007 De Bellis et al.
7,188,317 B1 3/2007 Hazel
7,266,546 B2 * 9/2007 Son .............................. 707/3
7,302,435 B2 11/2007 Kohut et al.
7,337,448 B1 2/2008 Dalia et al.
2001/0054042 A1 12/2001 Watkins et al.
2002/0004709 A1 1/2002 Peter et al.
2002/0040442 A1 4/2002 Ishidera
2002/0049738 A1 4/2002 Epstein
2002/0049749 A1 4/2002 Helgeson et al.
2002/0069218 A1 6/2002 Sull et al.
2002/0075312 A1 6/2002 Amadio et al.
2002/0135612 A1 9/2002 Royer et al.
2002/0152267 A1 10/2002 Lennon
2002/0169771 A1 11/2002 Melmon et al.
2002/0184195 A1 12/2002 Qian
2002/0184196 A1 12/2002 Lehmeier et al.
2002/0188603 A1 12/2002 Baird et al.
2002/0188616 A1 12/2002 Chinnici et al.
2003/0005464 A1 1/2003 Gropper et al.
2003/0009484 A1 1/2003 Hamanaka et al.
2003/0018622 A1 1/2003 Chau
2003/0028545 A1 2/2003 Wang et al.
2003/0033296 A1 2/2003 Rothmuller et al.
2003/0046292 A1 3/2003 Subramanian et al.
2003/0069880 A1 4/2003 Harrison et al.
2003/0069882 A1 4/2003 Niewswand et al.
2003/0069902 A1 4/2003 Narang et al.
2003/0084087 A1 5/2003 Berry
2003/0088567 A1 5/2003 Rosenfelt et al.
2003/0088573 A1 5/2003 Stickler
2003/0097361 A1 5/2003 Huang et al.
2003/0100999 A1 5/2003 Markowitz
2003/0117907 A1 6/2003 Kang
2003/0122873 A1 7/2003 Dieberger et al.
2003/0122874 A1 7/2003 Dieberger et al.
2003/0135828 A1 7/2003 Dockter et al.
2003/0135840 A1 7/2003 Szabo et al.
2003/0140035 A1 7/2003 Burrows
2003/0140051 A1 7/2003 Fujiwara et al.
2003/0142953 A1 * 7/2003 Terada et al. .................. 386/46
2003/0144990 A1 7/2003 Benelisha et al.
2003/0158855 A1 8/2003 Farnham et al.
2003/0195877 A1 10/2003 Ford et al.
2003/0196094 A1 10/2003 Hillis et al.
2003/0200218 A1 10/2003 Tijare et al.
2003/0200234 A1 10/2003 Koppich et al.
2004/0078358 A1 4/2004 Hughes et al.
2004/0078382 A1 4/2004 Mercer et al.
2004/0111728 A1 6/2004 Schwalm
2004/0117374 A1 6/2004 Hung et al.
2004/0126038 A1 7/2004 Aublant et al.
2004/0133544 A1 7/2004 Kiessig et al.
2004/0143569 A1 7/2004 Gross et al.
2004/0158584 A1 8/2004 Necsoiu et al.
2004/0174396 A1 9/2004 Jobs et al.
2004/0177057 A1 9/2004 Fairchild et al.
2004/0186860 A1 9/2004 Lee et al.
2004/0199491 A1 10/2004 Bhatt
2004/0199507 A1 10/2004 Tawa, Jr.

| | | | | |
|---|---|---|---|---|
| 2004/0199921 | A1 | 10/2004 | Snader et al. | |
| 2004/0205076 | A1 | 10/2004 | Huang et al. | |
| 2004/0215611 | A1 | 10/2004 | Jawa et al. | |
| 2004/0230571 | A1* | 11/2004 | Robertson | 707/3 |
| 2004/0254923 | A1* | 12/2004 | Piersol | 707/3 |
| 2004/0267811 | A1 | 12/2004 | Nelson et al. | |
| 2005/0015389 | A1 | 1/2005 | Novak et al. | |
| 2005/0020043 | A1 | 1/2005 | Lai | |
| 2005/0027750 | A1 | 2/2005 | Martin et al. | |
| 2005/0038831 | A1 | 2/2005 | Souder et al. | |
| 2005/0050043 | A1 | 3/2005 | Pyhalammi et al. | |
| 2005/0050301 | A1 | 3/2005 | Whittle et al. | |
| 2005/0055351 | A1 | 3/2005 | Barton et al. | |
| 2005/0055372 | A1 | 3/2005 | Springer et al. | |
| 2005/0060337 | A1* | 3/2005 | Chou et al. | 707/102 |
| 2005/0075544 | A1 | 4/2005 | Shapiro et al. | |
| 2005/0080807 | A1 | 4/2005 | Beilinson et al. | |
| 2005/0165777 | A1 | 7/2005 | Hurst-Hiller et al. | |
| 2005/0210507 | A1 | 9/2005 | Hawkins et al. | |
| 2005/0216489 | A1 | 9/2005 | Young et al. | |
| 2005/0240640 | A1 | 10/2005 | Kaler et al. | |
| 2005/0246311 | A1 | 11/2005 | Whelan et al. | |
| 2005/0246324 | A1 | 11/2005 | Paalasmaa et al. | |
| 2005/0246645 | A1 | 11/2005 | Beam et al. | |
| 2005/0251753 | A1 | 11/2005 | Sawyer | |
| 2005/0283468 | A1 | 12/2005 | Kamvar et al. | |
| 2006/0004693 | A1 | 1/2006 | Ramanathan et al. | |
| 2006/0004787 | A1 | 1/2006 | Borthakur et al. | |
| 2006/0031214 | A1 | 2/2006 | Solaro et al. | |

FOREIGN PATENT DOCUMENTS

| | | | |
|---|---|---|---|
| WO | WO 01/46870 | A1 | 6/2001 |
| WO | WO 03/060774 | A1 | 7/2003 |
| WO | WO 03/090056 | A2 | 10/2003 |

OTHER PUBLICATIONS

PCT International Search Report and Written Opinion for PCT International Appln No. PCT/US2005/022535 mailed Feb. 27, 2006. (22 pages).

PCT Invitation To Pay Additional Fees For PCT International Appln No. PCT/US2005/022535, mailed Nov. 14, 2005 (6 pages).

PCT Invitation To Pay Additional Fees For PCT International Appln No. PCT/US2005/022536, mailed Nov. 16, 2005 (5pages).

PCT Invitation To Pay Additional Fees For PCT International Appln No. PCT/US2005/022537, mailed Nov. 14, 2005 (4 pages).

PCT International Search Report And Written Opinion for PCT International Appln No. PCT/US2005/022537 mailed Jan. 12, 2006. (16 pages).

PCT Chapter I International Preliminary Report on Patentability (IPER) for PCT Application No. PCT/US2005/022748 mailed Dec. 28, 2006.

PCT International Search Report And Written Opinion for PCT International Appln No. PCT/US2005/022748 mailed Jan. 5, 2006. (33 pages).

U.S Appl. No. 10/407,853, filed Apr. 4, 2003, titled "Method And Apparatus For Tagging And Locating Audio Data", by inventor Nikhil Bhatt, 51 pages (specification and drawings).

U.S. Appl. No. 10/461,642, filed Jun. 13, 2003, titled "Domain Specific Search Engine", by inventor Nikhil Bhatt, 72 pages (specification and drawings).

U.S. Appl. No. 10/873,661, filed Jun. 21, 2004, titled "Methods and Apparatuses for Operating a Data Processing System," by inventors Bas Ording and Donald Lindsay, 91 pages (specification and drawings).

U.S. Appl. No. 10/951,915, filed Apr. 22, 2005, titled "Live Content Resizing", by inventors Steven P. Jobs, Stephen O. Lemay, Jessica Kahn, Sarah Wilkin, David Hyatt, Jens Alfke and Wayne Loffbourrow, 38 pages (specification and drawings).

Baeza-Yates R.A., et al., "New Approaches to Information Management: Attribute-Centric Data Systems", String Processing and Information Retrieval, 2000. Spire 2000. Proceedings. Seventh International Symposium on Sep. 27-29, 2000, Piscataway, NJ, USA, IEEE, Sep. 27, 2000, pp. 17-27, XP01057584.

Bowman, C.M., "A File For Information Management", Proceedings Of the ISMM International Conference. Intelligent Information Management Systems. Proceedings of ISMM Symposium, Jun. 1, 1994, pp. 66-71, XP002224131.

Caban, Pipo, et al., "Improved Downloading Capabilities For Internet Browsers And File Management Capabilities For Windows Explorer To Minimize User Intervention", Research Disclosure, Mason Publications, Hampshire, GB, vol. 473, No. 23, Sep. 2003, 3 pages.

Giampaolo, Dominic, "Practical File System Design with the Be File System", 1999 Cover Page and Table Of Contents (p. 1-7), Chapters 4&5 (pp. 45-98) and Index (pp. 225-247), Morgan Kaufmann Publishers, San Francisco, CA.

Grimes, Richard, "Revolutionary File Storage System Lets Users Search And Manage Files Based On Content", MSDN Magazine, Jan. 2004, ( 6 pages).

Welch, Kevin P., "Find Files Under Presentation Manager And Windows With A Handy Utility", Microsoft Systems Journal, vol. 4, No. 5, Sep. 1989, pp. 61-68.

Davis, Marc., "Active Capture: Integrating Human-Computer Interaction And Computer Vision/Audition to Automate Media Capture", Multimedia and Expo, 2003. ICME 2003. Proceedings, 2003 International Conference on, vol. 2, July 6-9, 2003 pp. II-185-8 vol. 2.

Floyd, Richard A. , et al.,"Directory Reference Patterns in Hierarchical File Systems", Knowledge and Data Engineering, IEEE Transactions on vol. 1, Issue 2, Jun. 1989, pp. 238-247, Digital Object Identifier 10.1109/69.87963.

* cited by examiner

METHODS AND SYSTEMS FOR MANAGING DATA

This application is a continuation-in-part of co-pending U.S. patent application Ser. No. 10/877,584, filed on Jun. 25, 2004. This application also claims priority to co-pending U.S. Provisional Patent Application No. 60/643,087 filed on Jan. 7, 2005, which provisional application is incorporated herein by reference in its entirety; this application claims the benefit of the provisional's filing date under 35 U.S.C. §119(e). This present application hereby claims the benefit of these earlier filing dates under 35 U.S.C. §120.

BACKGROUND OF THE INVENTION

Modem data processing systems, such as general purpose computer systems, allow the users of such systems to create a variety of different types of data files. For example, a typical user of a data processing system may create text files with a word processing program such as Microsoft Word or may create an image file with an image processing program such as Adobe's PhotoShop. Numerous other types of files are capable of being created or modified, edited, and otherwise used by one or more users for a typical data processing system. The large number of the different types of files that can be created or modified can present a challenge to a typical user who is seeking to find a particular file which has been created.

Modem data processing systems often include a file management system which allows a user to place files in various directories or subdirectories (e.g. folders) and allows a user to give the file a name. Further, these file management systems often allow a user to find a file by searching for the file's name, or the date of creation, or the date of modification, or the type of file. An example of such a file management system is the Finder program which operates on Macintosh computers from Apple Computer, Inc. of Cupertino, Calif. Another example of a file management system program is the Windows Explorer program which operates on the Windows operating system from Microsoft Corporation of Redmond, Wash. Both the Finder program and the Windows Explorer program include a find command which allows a user to search for files by various criteria including a file name or a date of creation or a date of modification or the type of file. However, this search capability searches through information which is the same for each file, regardless of the type of file. Thus, for example, the searchable data for a Microsoft Word file is the same as the searchable data for an Adobe PhotoShop file, and this data typically includes the file name, the type of file, the date of creation, the date of last modification, the size of the file and certain other parameters which may be maintained for the file by the file management system.

Certain presently existing application programs allow a user to maintain data about a particular file. This data about a particular file may be considered metadata because it is data about other data. This metadata for a particular file may include information about the author of a file, a summary of the document, and various other types of information. A program such as Microsoft Word may automatically create some of this data when a user creates a file and the user may add additional data or edit the data by selecting the "property sheet" from a menu selection in Microsoft Word. The property sheets in Microsoft Word allow a user to create metadata for a particular file or document. However, in existing systems, a user is not able to search for metadata across a variety of different applications using one search request from the user. Furthermore, existing systems can perform one search for data files, but this search does not also include searching through metadata for those files.

SUMMARY OF THE DESCRIPTION

Methods for managing data in a data processing system and systems for managing data are described herein.

According to one aspect described herein, an exemplary embodiment includes a hierarchy of saved search folders, which may be referred to as "smart" folders. A first folder represents a first search query, and a second folder represents a second search query. The second folder may be nested graphically within the first folder or otherwise portrayed in a predetermined hierarchical relationship between the two folders. Opening the first folder reveals the search results of a first search query and opening the second folder displays the search results of the second search query. The predetermined relationship between the folders may be defined by user metadata. This embodiment allows the use of relationships of metadata to build a view of user files and to allow the user to browse the files within a system using that view. In one particular embodiment, the second folder may be portrayed in a graphical user interface system as a subfolder of the first folder. The view of files provided by the user metadata and the saved search folders may be different than a view provided by a file management system (e.g. Windows Explorer or the Finder on a Macintosh) which provides a graphical view based on the relative location in a file directory.

In another aspect of this description, an exemplary method of processing a result of a search operation includes receiving an input of a search operation and performing the search operation, and displaying a list of results from the search operation, where the list presents N items which is less than M items found from the search operation. In one embodiment, the N items are the N most relevant hits in the results. The list is typically grouped by categories and the number of items within each category is also limited to less than N. Typically the list is a non-scrollable list which is sorted by recency and relevance and includes a command to show all items since less than all items are shown in the list.

In another aspect of the disclosure, an exemplary embodiment of a method for handling data includes storing on a volume an index created from files and metadata for the files with an operating system and making the volume available for distribution to licensees or customers. Typically, the index is created for all user related files beyond merely help files, such as all files normally accessible to a user through the standard use of word processing programs, spreadsheet programs, presentation programs, graphics programs or other types of software. This index is stored with the user related files and with an operating system on a volume, which is made available for distribution to licensees or customers. These volumes may, for example, be CD ROMs or DVD ROMs or a bootable magnetic hard drive which is shipped with a newly manufactured computer system.

In another aspect of the disclosure, an exemplary embodiment of a method for processing data includes displaying an open file window, displaying a search input field to allow entry of a search query to find a file within the open file window, receiving a search query and performing a search, and displaying a result of a search within the open file window. Typically, the open file window is invoked by using a "open" command or an "open file" command from an application program such as a word processing program (e.g. Microsoft Word) or a spreadsheet program (e.g. Excel), or a presentation program (e.g. Keynote or PowerPoint), or a graphics program (e.g. PhotoShop), etc. The open file window typically provides an interface allowing the user to select the folder within which files may exist. The user can select the file which is displayed within a particular folder and then activate an "open" button to cause the file to be opened within the application from which the open file window was invoked.

According to another aspect of the present description, an exemplary embodiment of a method for processing data includes displaying text within a text processing application, receiving a selection of at least some of the text, receiving a selection of a command to search a plurality of files using the selection, and displaying results of a search of the plurality of files. The selection may be through a pop-up menu which appears associated with the selected text within the text processing application, such as a word processing application or an email application.

In another aspect of the present disclosure, an exemplary method for processing data includes displaying a search input parameter and interface which displays an expandable plurality of metadata search attributes, and receiving a selection of a particular metadata search attribute from the display of the expandable plurality of metadata attributes. The selection of a particular metadata search attribute is typically used in forming a search query.

In another aspect of the present description, an exemplary embodiment of a method for processing data includes receiving a command to perform a search for content and/or metadata of content, displaying search results and a search window, creating or receiving new documents, some of which may match or satisfy the search query while the search window is open, and updating the search results in the search window dynamically as the new documents are created or received. New documents which match the search query, as they are created or received, appear within the search window without having to open or close the search window or without having to select a command to refresh the search window. Thus, it appears as if the search window is updated live as new documents are created or received in the system.

A method of managing data in one exemplary embodiment includes capturing metadata from a plurality of files having different file types (and having different metadata content for the different file types) or created by a plurality of different software applications which execute on a data processing system. The type of information in the metadata for the files of a first software application differs from the type of information in metadata for files of a second software application. This captured metadata may be searched. In one embodiment, this search may occur concurrently for all of the metadata from the different files created by or used by the different software applications. In one implementation of this method, a single search interface may be provided to search all of the metadata for all of the different files created by the different software applications, thereby allowing a single search to search through all of the metadata for all of the files created by the different software applications. Further, the single search may also search through non-metadata such as the indexed (or non-indexed) content of the actual data files.

According to another aspect of the invention, an exemplary method includes capturing metadata from a plurality of different files created by a plurality of different software applications and storing the metadata on a storage medium in a flat file format. Another aspect relates to a flat file format for the metadata on the storage medium.

Another aspect of the present invention relates to various user interfaces which may be provided by a system to allow a user to search through the metadata. In one exemplary embodiment of such a user interface, the method includes capturing metadata from a plurality of files created by a plurality of different software applications and displaying a search input interface for searching through the metadata, wherein the type of information in metadata for files of a first software application differs from the type of information in metadata for files of a second software application. Various implementations of user interfaces are discussed for search input and also for the presentation (e.g. display) of search results. For example, the search results may be displayed in multiple different formats (e.g. list view, icon view, column view) and they may be displayed with headers or titles which separate the groups of matches in a search results list. Further, the displayed results may be limited to a predetermined number (or a dynamically generated number) for each category so that a limited viewing can still display multiple categories within a search result window. Further, a search query can be saved as a folder which appears within a user configurable portion of the search results window, and a selection of the folder causes another search to be performed using the saved search query (sometimes also referred to as search criteria). A display of the search results from the saved search query can then be sorted or further searched to limit the results to a subset of the original matches from the saved search query. Numerous other user interface implementations are shown and described. Another user interface feature includes the ability to provide both a list view and another view (e.g. icon view) for different portions (e.g. different categories) of a search results window.

Another aspect of the present invention relates to a software architecture for managing metadata. One exemplary embodiment of this architecture includes a first plurality of application programs which are capable of creating a plurality of different data files and a metadata management program which is coupled through programming interfaces with the first plurality of application programs and which is coupled to a file system storage of metadata which is captured from files created by the first plurality of application programs. Normally, the type of information in metadata for files of a first application program differs from the type of information in metadata for files of a second application program. The metadata management program is also coupled to other (non-metadata) sources of information about the data files such as an indexed database of the full text content of the data files and software which is capable of searching this indexed database. Search queries which are directed to the metadata may also be concurrently directed to the non-metadata sources so that the search results include matches from both the metadata and the non-metadata sources, and these searches, through both metadata and non-metadata sources, may be in response to a single search query or a single search request or command and these searches may be performed concurrently.

Another aspect of the inventions described herein relates to one or more importers which interact with new or modified files created by different application programs. These one or more importers may be invoked (e.g. called) by the application programs or by an operating system component (e.g. a metadata processing software) which responds to a call from the application programs or from an operating system kernel. In one particular example, an importer is called by a metadata processing software in response to a notification from an OS kernel that a new file has been created or an existing file has been modified; in this case, the particular importer called by the metadata processing system will typically depend upon the type of file (e.g. text file or image file or MP3 file, etc.), although one, single importer for all file types on a system may be used regardless of the type of file. An importer will typically specify a file path name for the extracted metadata and specify selected data to be extracted and written into the file path name of the file containing the extracted metadata.

Another aspect of the inventions described herein relates to performing a search through a system while receiving input from a user, where the search is through a plurality of data files created by different software applications on a data processing system. In an exemplary method of this aspect, the data processing system begins a search through the plurality of data files as the user enters input and before the user completes the entry of the search query. Thus, a user may enter a search ("quick brown fox") and before the user has entered "fox," the data processing system has searched through, or begins to search through, the plurality of data files created by different software applications and has displayed the list of matches to the partial search query "quick brown" (or at least begins to display a partial list of matches to the partial search query "quick brown"). This search may be performed through the plurality of data files as well as the metadata for the plurality of data files, wherein the type of information in metadata for files of a first software application differs from the type of information in metadata for files of a second software application. The search results may be sorted by relevancy, and the system may display first only a partial list of matches and then, in response to a user request, display all the matches. The search results may be organized by categories (e.g. see FIGS. 8A and 8B). Selecting one of the items in the search result may cause the display of additional information, beyond what is already displayed in the original search results listing.

Another aspect of the inventions relates to a method of selecting a group of items, such as a group of individual data files. In an exemplary method of this aspect, a data processing system receives a selection of a plurality of items such as data files, folders (e.g. graphical user interface representations of subdirectories), application programs or a combination of one or more of these items. This selection may be performed by one of the many conventional ways to select a plurality of items such as (a) pointing a cursor at each item individually (e.g. through movement of a mouse) and indicating a selection individually by, for example, pressing and releasing a button such as a mouse's button; (b) pointing a cursor at a first item in a list and indicating a selection of the first item and pointing the cursor at a last item in a list of items and indicating a selection of all items from the first item to the last item in the list; (c) drawing a selection rectangle by a dragging operation of the cursor, etc. After the selection of the plurality of items has been received, the data processing system receives a command to create a new folder and add or move, e.g. in one operation, the selected plurality of items into the new folder. The add operation creates the new folder (optionally with a name specified by the user as a result of a prompt or request by the system) and copies the selected files into the new folder, which represents a new subdirectory. This add operation is in response to the single command which requests that a new folder be created and that copies of the selected items be created and stored with a path name reflecting storage within the new folder. The move operation also creates a new folder (optionally with a name specified by the user as a result of a prompt or request by the system) and may merely change the path names associated with each of the selected items, which changed path names reflect the new file system location (within the subdirectory of the new folder) of the selected items.

Other aspects of the present invention include various data processing systems which perform these methods and machine readable media which perform various methods described herein.

BRIEF DESCRIPTION OF THE DRAWINGS

The present invention is illustrated by way of example and not limitation in the figures of the accompanying drawings in which like references indicate similar elements.

DETAILED DESCRIPTION

The subject invention will be described with reference to numerous details set forth below, and the accompanying drawings will illustrate the invention. The following description and drawings are illustrative of the invention and are not to be construed as limiting the invention. Numerous specific details are described to provide a thorough understanding of the present invention. However, in certain instances, well known or conventional details are not described in order to not unnecessarily obscure the present invention in detail.

The present description includes material protected by copyrights, such as illustrations of graphical user interface images. The owners of the copyrights, including the assignee of the present invention, hereby reserve their rights, including copyright, in these materials. The copyright owner has no objection to the facsimile reproduction by anyone of the patent document or the patent disclosure, as it appears in the Patent and Trademark Office file or records, but otherwise reserves all copyrights whatsoever. Copyright Apple Computer, Inc. 2005.

Figure 1:
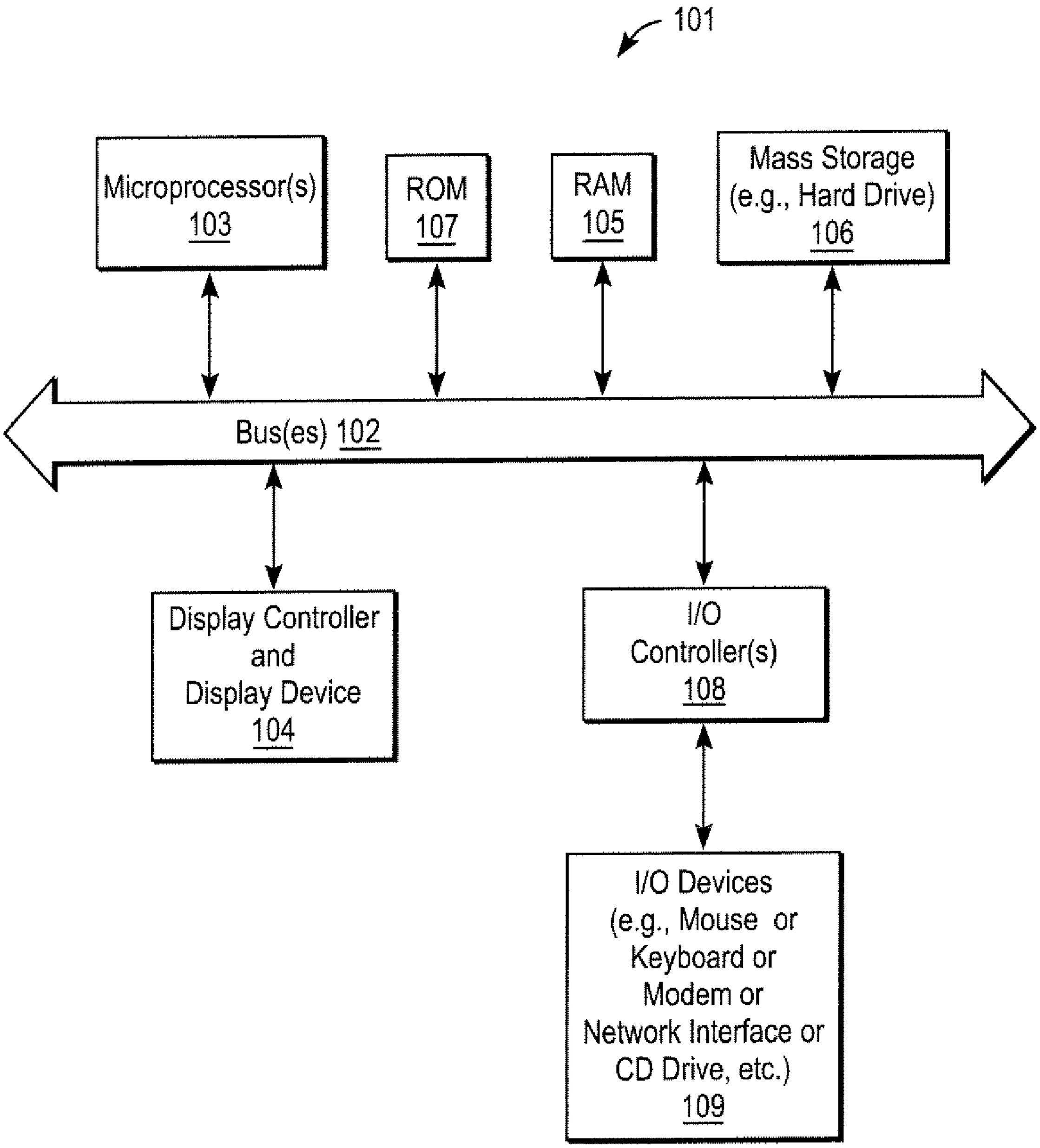
FIG. 1 shows an exemplary embodiment of a data processing system, which may be a general purpose computer system and which may operate in any of the various methods described herein.

FIG. 1 shows one example of a typical computer system which may be used with the present invention. Note that while FIG. 1 illustrates various components of a computer system, it is not intended to represent any particular architecture or manner of interconnecting the components as such details are not germane to the present invention. It will also be appreciated that network computers and other data processing systems which have fewer components or perhaps more components may also be used with the present invention. The computer system of FIG. 1 may, for example, be a Macintosh computer from Apple Computer, Inc.

As shown in FIG. 1, the computer system 101, which is a form of a data processing system, includes a bus 102 which is coupled to a microprocessor(s) 103 and a ROM (Read Only Memory) 107 and volatile RAM 105 and a non-volatile memory 106. The microprocessor 103 may be a G3 or G4 microprocessor from Motorola, Inc. or one or more G5 microprocessors from IBM. The bus 102 interconnects these various components together and also interconnects these components 103, 107, 105, and 106 to a display controller and display device 104 and to peripheral devices such as input/output (I/O) devices which may be mice, keyboards, modems, network interfaces, printers and other devices which are well known in the art. Typically, the input/output devices 109 are coupled to the system through input/output controllers 108. The volatile RAM (Random Access Memory) 105 is typically implemented as dynamic RAM (DRAM) which requires power continually in order to refresh or maintain the data in the memory. The mass storage 106 is typically a magnetic hard drive or a magnetic optical drive or an optical drive or a DVD RAM or other types of memory systems which maintain data (e.g. large amounts of data) even after power is removed from the system. Typically, the mass storage 106 will also be a random access memory although this is not required. While FIG. 1 shows that the mass storage 106 is a local device coupled directly to the rest of the components in the data processing system, it will be appreciated that the present invention may utilize a non-volatile memory which is remote from the system, such as a network storage device which is coupled to the data processing system through a network interface such as a modem or Ethernet interface. The bus 102 may include one or more buses connected to each other through various bridges, controllers and/or adapters as is well known in the art. In one embodiment the I/O controller 108 includes a USB (Universal Serial Bus) adapter for controlling USB peripherals and an IEEE 1394 controller for IEEE 1394 compliant peripherals.

It will be apparent from this description that aspects of the present invention may be embodied, at least in part, in software. That is, the techniques may be carried out in a computer system or other data processing system in response to its processor, such as a microprocessor, executing sequences of instructions contained in a memory, such as ROM 107, RAM 105, mass storage 106 or a remote storage device. In various embodiments, hardwired circuitry may be used in combination with software instructions to implement the present invention. Thus, the techniques are not limited to any specific combination of hardware circuitry and software nor to any particular source for the instructions executed by the data processing system. In addition, throughout this description, various functions and operations are described as being performed by or caused by software code to simplify description. However, those skilled in the art will recognize what is meant by such expressions is that the functions result from execution of the code by a processor, such as the microprocessor 103.

Capturing and Use of Metadata Across a Variety of Application Programs

Figure 2:
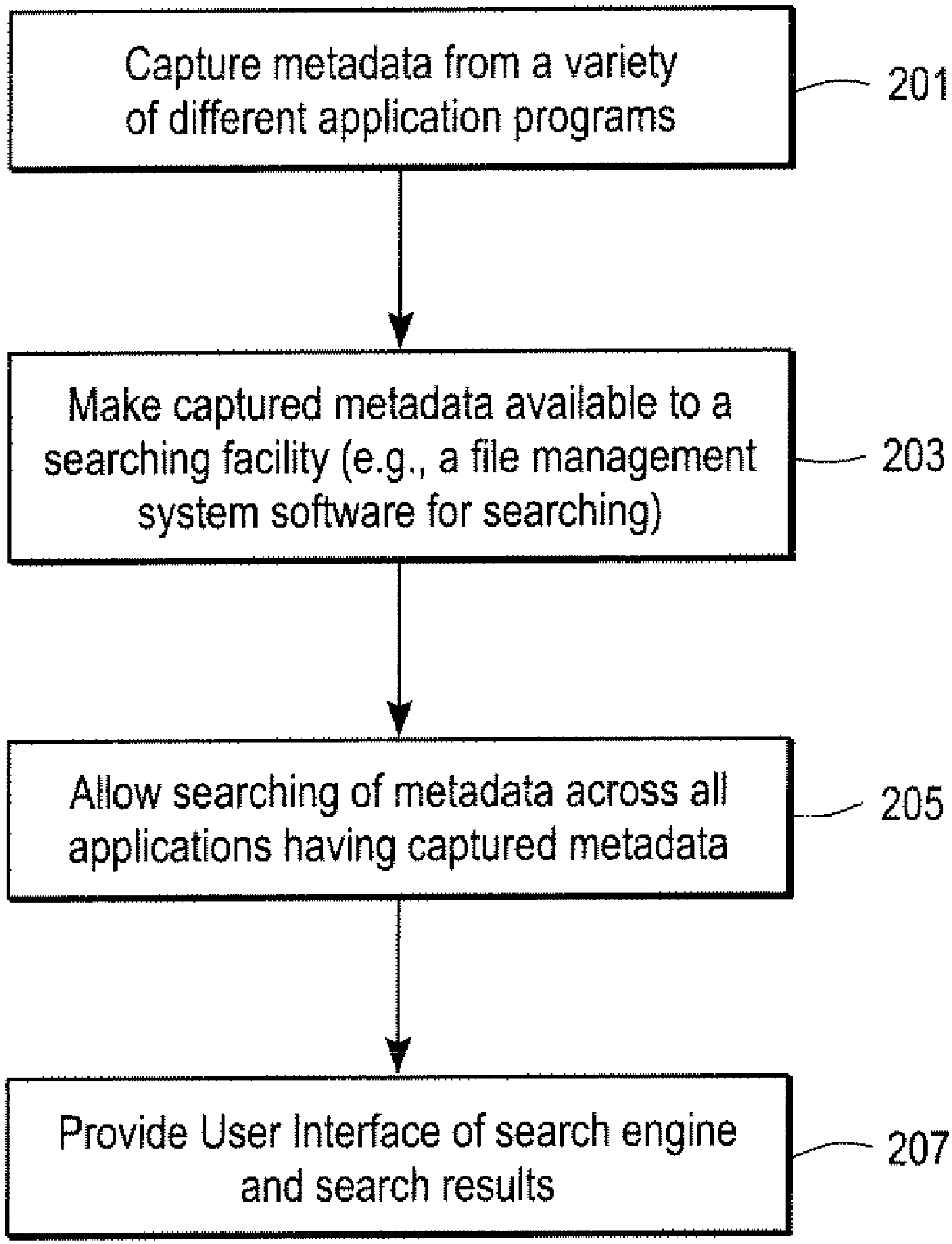
FIG. 2 shows a general example of one exemplary method of one aspect of the invention.
Figure 5:
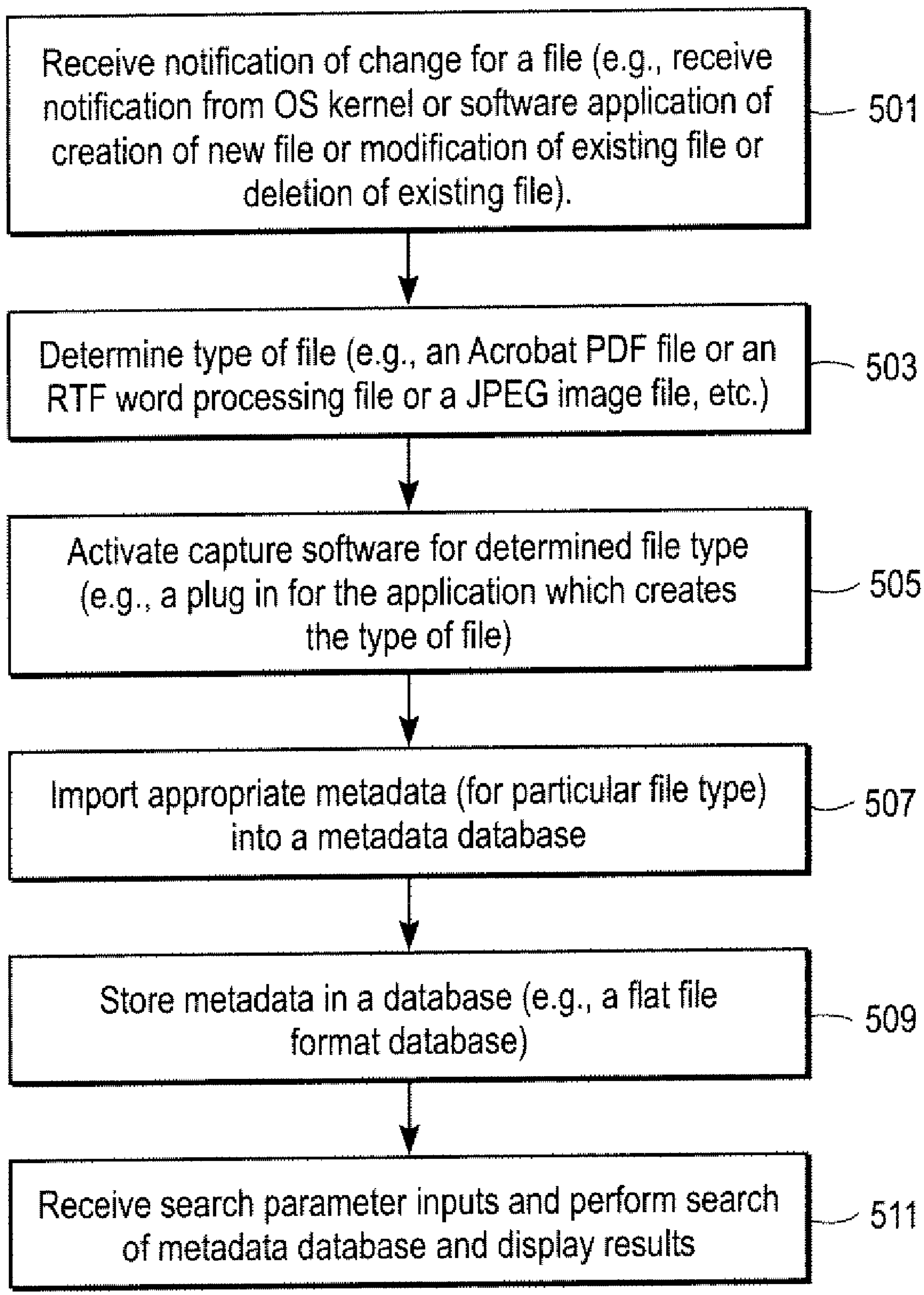
FIG. 5 is a flowchart showing another exemplary method of the present invention.

FIG. 2 shows a generalized example of one embodiment of the present invention. In this example, captured metadata is made available to a searching facility, such as a component of the operating system which allows concurrent searching of all metadata for all applications having captured metadata (and optionally for all non-metadata of the data files). The method of FIG. 2 may begin in operation 201 in which metadata is captured from a variety of different application programs. This captured metadata is then made available in operation 203 to a searching facility, such as a file management system software for searching. This searching facility allows, in operation 205, the searching of metadata across all applications having captured metadata. The method also provides, in operation 207, a user interface of a search engine and the search results which are obtained by the search engine. There are numerous possible implementations of the method of FIG. 2. For example, FIG. 5 shows a specific implementation of one exemplary embodiment of the method of FIG. 2. Alternative implementations may also be used. For example, in an alternative implementation, the metadata may be provided by each application program to a central source which stores the metadata for use by searching facilities and which is managed by an operating system component, which may be, for example, the metadata processing software. The user interface provided in operation 207 may take a variety of different formats, including some of the examples described below as well as user interfaces which are conventional, prior art user interfaces. The metadata may be stored in a database which may be any of a variety of formats including a B tree format or, as described below, in a flat file format according to one embodiment of the invention.

The method of FIG. 2 may be implemented for programs which do not store or provide metadata. In this circumstance, a portion of the operating system provides for the capture of the metadata from the variety of different programs even though the programs have not been designed to provide or capture metadata. For those programs which do allow a user to create metadata for a particular document, certain embodiments of the present invention may allow the exporting back of captured metadata back into data files for applications which maintain metadata about their data files.

Figure 4:
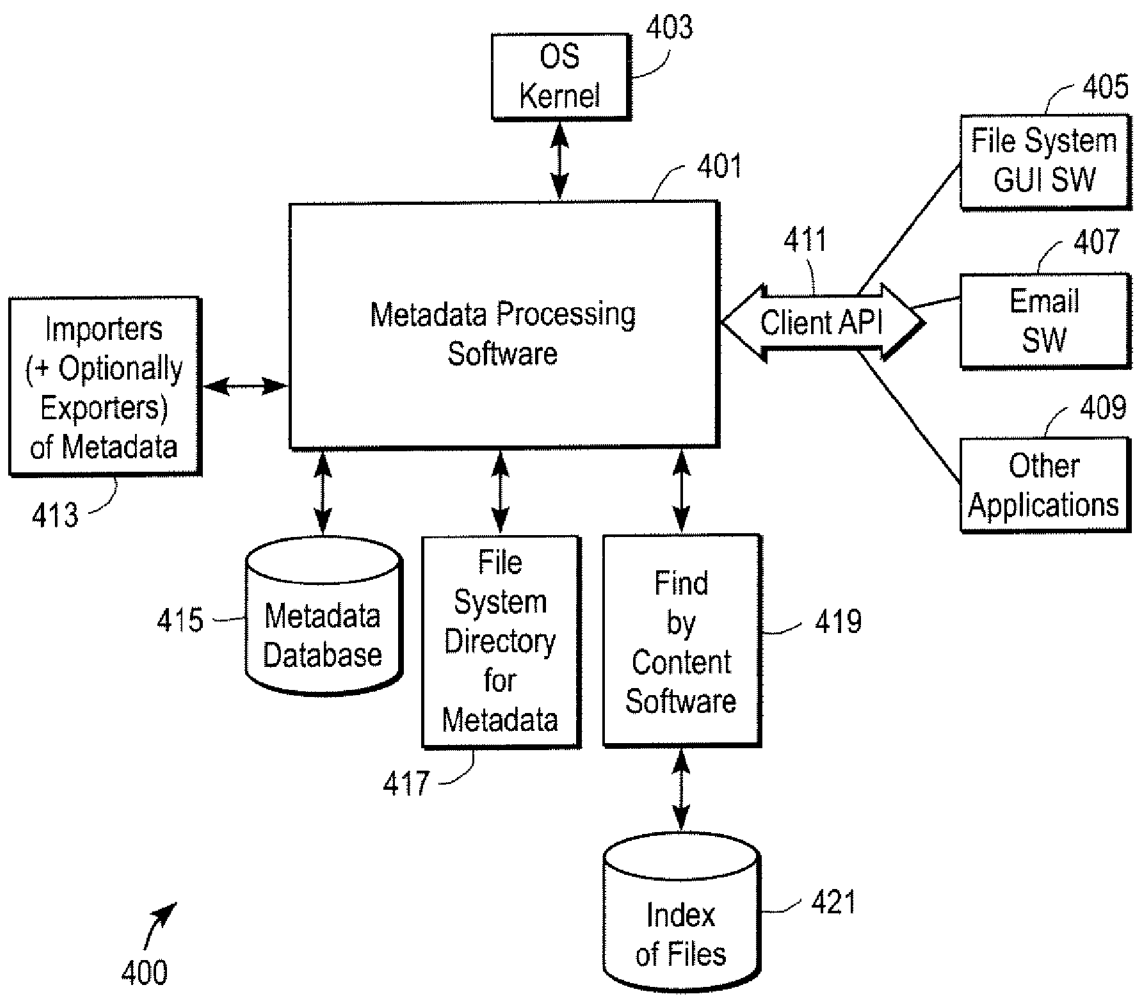
FIG. 4 shows an example of an architecture for managing metadata according to one exemplary embodiment of the invention.

The method of FIG. 2 allows information about a variety of different files created by a variety of different application programs to be accessible by a system wide searching facility, which is similar to the way in which prior art versions of the Finder or Windows Explorer can search for file names, dates of creation, etc. across a variety of different application programs. Thus, the metadata for a variety of different files created by a variety of different application programs can be accessed through an extension of an operating system, and an example of such an extension is shown in FIG. 4 as a metadata processing software which interacts with other components of the system and will be described further below.

Figure 3A:
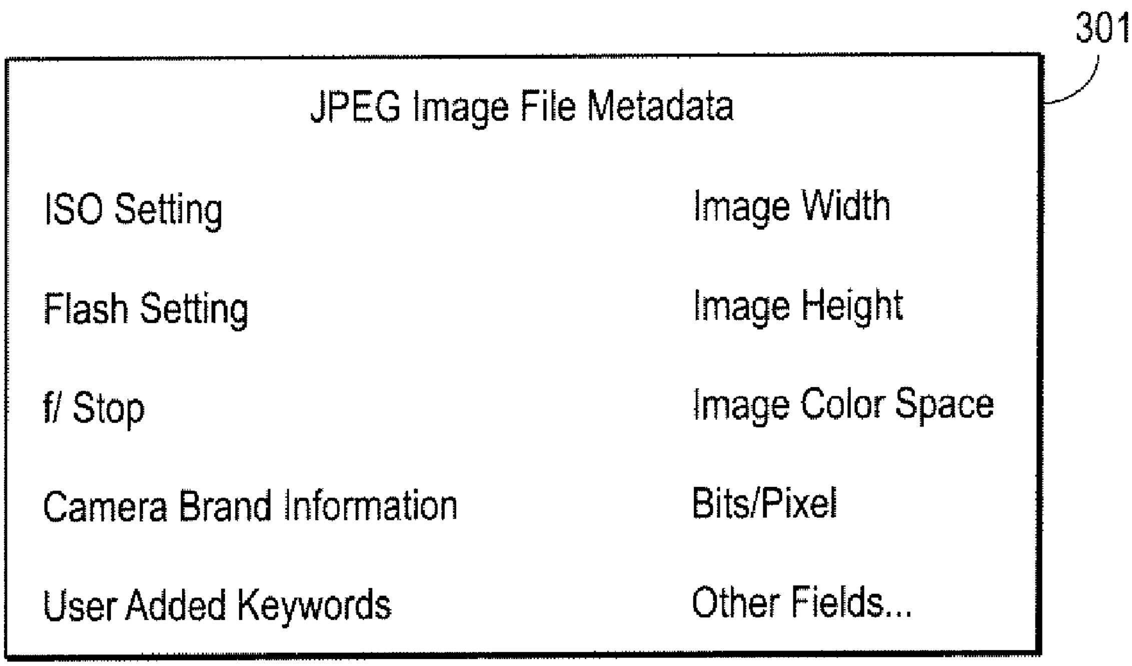
FIG. 3A shows an example of the content of the particular type of metadata for a particular type of file.
Figure 3B:
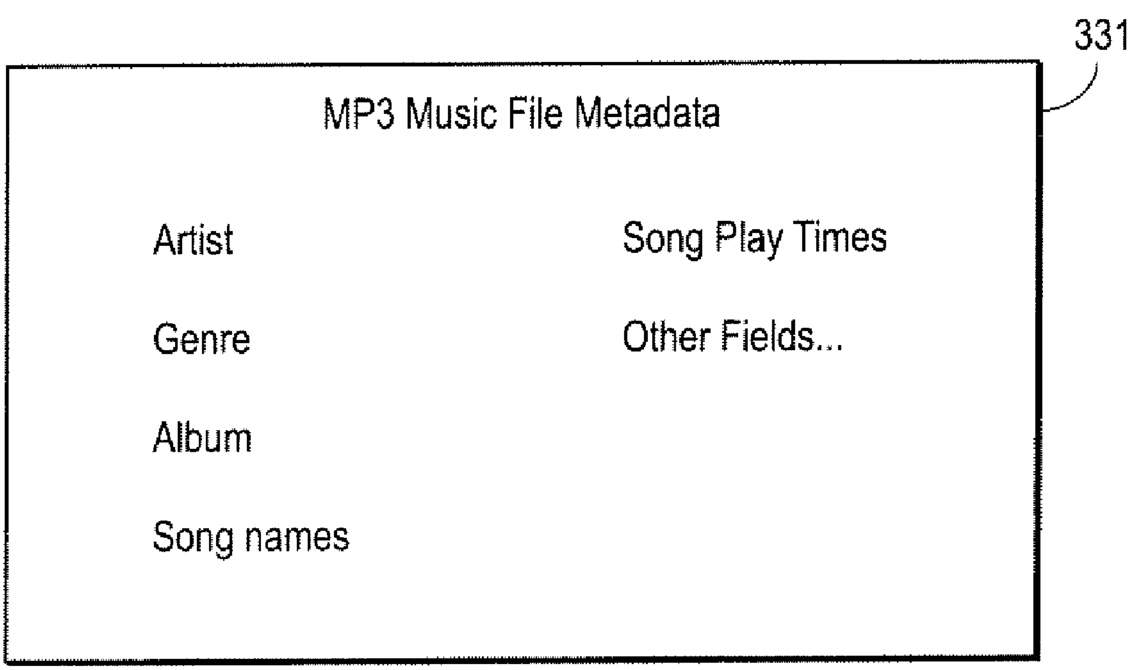
FIG. 3B shows another example of a particular type of metadata for another particular type of file.

FIGS. 3A and 3B show two different metadata formats for two different types of data files. Note that there may be no overlap in any of the fields; in other words, no field in one type of metadata is the same as any field in the other type of metadata. Metadata format 301 may be used for an image file such as a JPEG image file. This metadata may include information such as the image's width, the image's height, the image's color space, the number of bits per pixel, the ISO setting, the flash setting, the F/stop of the camera, the brand name of the camera which took the image, user-added keywords and other fields, such as a field which uniquely identifies the particular file, which identification is persistent through modifications of the file. Metadata format 331 shown in FIG. 3B may be used for a music file such as an MP3 music file. The data in this metadata format may include an identification of the artist, the genre of the music, the name of the album, song names in the album or the song name of the particular file, song play times or the song play time of a particular song and other fields, such as a persistent file ID number which identifies the particular MP3 file from which the metadata was captured. Other types of fields may also be used. The following chart shows examples of the various fields which may be used in metadata for various types of files.

| Item name | Parent in hierarchy | Attribute name | Description/Notes | CFType | Multi-value | Localized | User settable | Gettable | Copied with copy | App viewable |
|---|---|---|---|---|---|---|---|---|---|---|
| Item | n/a | Authors | Who created or contributed to the contents of this item | CFString | Yes | No | Yes | Yes | Yes | Address Book |
| | | Comment | A free form text comment | CFString | No | No | Yes | Yes | Yes | |
| | | ContentType | This is the type that is determined by UTI | CFString | No | ? | No | Yes | Yes | |
| | | ContentTypes | This is the inheritance of the UTI system | CFString | Yes | ? | No | Yes | Yes | |
| | | CreatedDate | When was this item created | CFDate | No | No | No | Yes | Yes | |
| | | DisplayName | The name of the item as the user would like to read it. Very well may be the file name, but it may also be the subject of an e-mail message or the full name of a person, for example. | CFString | No | Yes | Yes | Yes | Yes | Finder (or Launch Services) |
| | | Keywords | This is a list words set by the user to identify arbitrary sets of organization. The scope is determined by the user and can be flexibly used for any kind of organization. For example, Family, Hawaii, Project X, etc. | CFString | Yes | System-provided keywords (if any) | Yes | Yes | Ask | |
| | | Contact Keywords | A list of contacts that are associated with this document, beyond what is captured as Author. This may be a person who's in the picture or a document about a person or contact (performance review, contract) | CFString | Yes | No | Yes | Yes | Ask | Address Book |
| | | ModifiedDate | When this item was last modified | CFDate | No | No | No | Yes | | |
| | | Rating | A relative rating (0 to 5 value) on how important a particular item is to you, whether it's a person, file or message | CFNumber | No | n/a | Yes | Yes | | |
| | | RelatedTos | A list of other items that are arbitrarily grouped together. | CFString | Yes | No | Yes | Yes | | |
| | | TextContent | An indexed version of any content text | CFString | No | No | No | Yes | | |
| | | UsedDates | Which days was the document opened/viewed/played | CFDate | Yes | No | No | Yes | | |
| Content/ Data | Item | Copyright | Specifies the owner of this content, i.e. Copyright Apple Computer, Inc. | CFString | No | No | Yes | Yes | | |
| | | CreatorApp | Keeps track of the application that was used to create this document (if it's known). | CFString | No | ? | No | Yes | | |
| | | Languages | The languages that this document is composed in (for either text or audio-based media) | CFString | Yes | Yes | Yes | Yes | | |
| | | ParentalControl | A field that is used to determine whether this is kid-friendly content or not | CFString | No | ? | Yes | Yes | | |
| | | Publishers | The name or a person or organization that published this content. | CFString | Yes | No | Yes | Yes | | Address Book |
| | | PublishedDate | The original date that this content was published (if it was), independent of created date. | CFDate | No | No | Yes | Yes | | |
| | | Reviewers | A list of contacts who have reviewed the contents of this file. This would have to be set explicitly by an application. | CFString | Yes | No | Yes | Yes | | Address Book |

-continued

| Item name | Parent in hier-archy | Attribute name | Description/Notes | CFType | Multi-value | Localized | User settable | Getta-ble | Cop-ied with copy | App viewable |
|---|---|---|---|---|---|---|---|---|---|---|
| | | ReviewStatus | Free form text that used to specify where the document is in any arbitrary review process | CFString | No | ? | Yes | Yes | | |
| | | TimeEdited | Total time spent editing document | CFDate | No | No | No | Yes | | |
| | | WhereTos | Where did this go to, eg. CD, printed, backedup | CFString | Yes | System-provided words only (if any) | ? | Yes | | |
| | | WhereFroms | Where did this come from, e.g. camera, email, web download, CD | CFString | Yes | System-provided words only (if any) | ? | Yes | | |
| Image | Data | BitsPerSample | What is the bit depth of the image (8-bit, 16-bit, etc.) | CFNumber | No | | | Yes | | |
| | | ColorSpace | What color space model is this document following | CFString | No | | | Yes | | ColorSync Utility? |
| | | ImageHeight | The height of the image in pixels | CFNumber | No | | | Yes | | |
| | | ImageWidth | The width of the image in pixels | CFNumber | No | | | Yes | | |
| | | ProfileName | The name of the color profile used with for image | CFString | No | | | Yes | | ColorSync Utility? |
| | | Resolution-Width | Resolution width of this image (i.e. dpi from a scanner) | CFNumber | No | | | Yes | | |
| | | Resolution-Height | Resolution height of this image (i.e. dpi from a scanner) | CFNumber | No | | | Yes | | |
| | | LayerNames | For image formats that contain "named" layers (e.g. Photoshop files) | CFString | Yes | | | Yes | | |
| | | Aperture | The f-stop rating of the camera when the image was taken | CFNumber | No | | | Yes | | |
| | | CameraMake | The make of the camera that was used to acquire this image (e.g. Nikon) | CFString | No | Yes | | Yes | | |
| | | CameraModel | The model of the camera used to acquire this image (Coolpix 5700) | CFString | No | Yes | | Yes | | |
| | | DateTime-Original | Date/time the picture was taken | CFDate | No | | | Yes | | |
| | | ExposureMode | Mode that was used for the exposure | CFString | No | | | Yes | | |
| | | ExposureTime | Time that the lens was exposed while taking the picture | CFDate | No | | | Yes | | |
| | | Flash | This attribute is overloaded with information about red-eye reduction. This is not a binary value | CFNumber | No | | | Yes | | |
| | | GPS | Raw value received from GPS device associated with photo acquisition. It hasn't necessarily been translated to a user-understandable location. | CFString | No | | | Yes | | |
| | | ISOSpeed | The ISO speed the camera was set to when the image was acquired | CFNumber | No | | | Yes | | |
| | | Orientation | The orientation of the camera when the image was acquired | CFString | No | | | Yes | | |
| | | WhiteBalance | The white balance setting of the camera when the picture was taken | CFNumber | No | | | Yes | | |
| | | EXIFversion | The version of EXIF that was used to generate the metadata for the image | CFString | No | | | Yes | | |

-continued

| Item name | Parent in hierarchy | Attribute name | Description/Notes | CFType | Multi-value | Localized | User settable | Gettable | Copied with copy | App viewable |
|---|---|---|---|---|---|---|---|---|---|---|
| Time-based | Data | AcquisitionSources | The name or type of device that used to acquire the media | CFString | Yes | | | Yes | | |
| | | Codecs | The codecs used to encode/decode the media | CFString | Yes | | | Yes | | |
| | | DeliveryType | FastStart or RTSP | CFString | No | | | Yes | | |
| | | Duration | The length of time that the media lasts | CFNumber | No | | | Yes | | |
| | | Streamable | Whether the content is prepared for purposes of streaming | CFBoolean | No | | | Yes | | |
| | | TotalBitRate | The total bit rate (audio & video combined) of the media. | CFNumber | No | | | Yes | | |
| | | AudioBitRate | The audio bit rate of the media | CFNumber | No | | | Yes | | |
| | | AspectRatio | The aspect ratio of the video of the media | CFString | No | | | Yes | | |
| | | ColorSpace | The color space model used for the video aspect of the media | CFString | No | | | Yes | | |
| | | FrameHeight | The frame height in pixels of the video in the media | CFNumber | No | | | Yes | | |
| | | FrameWidth | The frame width in pixels of the video in the media | CFNumber | No | | | Yes | | |
| | | ProfileName | The name of the color profile used on the video portion of the media | CFString | No | | | Yes | | |
| | | VideoBitRate | The bit rate of the video aspect of the media | CFNumber | No | | | Yes | | |
| Text | Data | Subject | The subject of the text. This could be metadata that's supplied with the text or something automatically generated with technologies like VTWIN | CFString | No | | | Yes | | |
| | | PageCount | The number of printable pages of the document | CFNumber | No | | | Yes | | |
| | | LineCount | The number of lines in the document | CFNumber | No | | | Yes | | |
| | | WordCount | The number of words in the document | CFNumber | No | | | Yes | | |
| | | URL | The URL that will get you to this document (or at least did at one time). Relevant for saved HTML documents, bookmarks, RSS feeds, etc. | CFString | No | | | Yes | | |
| | | PageTitle | The title of a web page. Relevant to HTML or bookmark documents | CFString | No | | | Yes | | |
| | | Google Hierarchy | Structure of where this page can be found in the Google hierarchy. Relevant to HTML or bookmark documents | CFString | No | | | Yes | | |
| Compound document | Data | <Abstract> | There are no specific attributes assigned to this item. This is to catch all app-specific file formats that fall within Data, but don't fit into any of the other types. Typically these documents have multiple types of media embedded within them. (e.g. P | n/a | n/a | n/a | n/a | n/a | n/a | n/a |
| PDF | Compound document | NumberOfPages | The number of printable pages in the document | CFNumber | No | | | Yes | | |
| | | PageSize | The size of the page stored as points | CFNumber | No | | No | Yes | | |
| | | PDFTitle | PDF-specific title metadata for the document | CFString | No | | ? | Yes | | |
| | | PDFAuthor | PDF-specific author metadata for the document | CFString | No | | ? | Yes | | Address Book |
| | | PDFSubject | PDF-specific subject metadata for the document | CFString | No | | ? | Yes | | |

-continued

| Item name | Parent in hier-archy | Attribute name | Description/Notes | CFType | Multi-value | Localized | User settable | Getta-ble | Cop-ied with copy | App viewable |
|---|---|---|---|---|---|---|---|---|---|---|
| | | PDFKeywords | PDF-specific keywords metadata for the document | CFString | Yes | | ? | Yes | | |
| | | PDFCreated | PDF-specific created metadata for the document | CFDate | No | | ? | Yes | | |
| | | PDFModified | PDF-specific modified metadata for the document | CFDate | No | | ? | Yes | | |
| | | PDFVersion | PDF-specific version metadata for the document | CFString | No | | ? | Yes | | |
| | | Security-Method | Method by which this document is kept secure | CFString | No | | | Yes | | |
| Presentation (Keynote) | Com-pound docu-ment | SlideTitles | A collection of the titles on slides | CFString | Yes | | | Yes | | |
| | | SlideCount | The number of slides | CFString | No | | | Yes | | |
| | | SpeakerNotes-Content | The content of all the speaker notes from all of the slides together | CFString | ? | | | Yes | | |
| Application | Item | Categories | The kind of application this is: productivity, games, utility, graphics, etc. A set list that | CFString | Yes | | | Yes | | |
| Message | Item | Recipients | Maps to To and Cc: addresses in a mail message. | CFString | Yes | | | Yes | | Address Book |
| | | Priority | The priority of the message as set by the sender | CFString | No | | | Yes | | |
| | | Attachment-Names | The list of filenames that represent attachments in a particular message (should be actionable within the Finder) | CFString | Yes | | | Yes | | |
| | | Authors | maps to From address in mail message | CFString | Yes | No | Yes | Yes | Yes | Address Book |
| | | Comment | Not applicable to Mail right now (should we consider?) | CFString | No | No | Yes | Yes | Yes | |
| | | ContentType | | CFString | No | | No | Yes | Yes | |
| | | ContentTypes | | CFString | Yes | | No | Yes | Yes | |
| | | CreatedDate | When was this message was sent or received | CFDate | No | No | No | Yes | Yes | |
| | | DisplayName | Subject of the message | CFString | No | Yes | Yes | Yes | Yes | |
| | | Keywords | There will be a way to set keywords within Mail | CFString | Yes | System-provided keywords (if any | Yes | Yes | Ask | |
| | | Contact Keywords | Could be where recipients are held | CFString | Yes | No | Yes | Yes | Ask | Address Book |
| | | ModifiedDate | Not applicable | CFDate | No | No | No | Yes | | |
| | | Rating | A relative rating (0 to 5 stars) on how important a particular message is to you (separate from a message's Priority) | CFNumber | No | n/a | Yes | Yes | | |
| | | RelatedTos | Potentially threaded messages could be put into this category | CFString | Yes | No | Yes | Yes | | |
| | | TextContent | An indexed version of the mail message | CFString | No | No | No | Yes | | |
| | | UsedDates | The day/time in which the mail message was viewed/read | CFDate | Yes | No | No | Yes | | |
| Contact | Item | Company | The company that this contact is an employee of | CFString | No | | | Yes | | Address Book |
| | | E-mails | A list of e-mail addresses that this contact has | CFString | Yes | | | Yes | | Mail |
| | | IMs | A list of instant message handles this contact has | CFString | Yes | | | Yes | | iChat |
| | | Phones | A list of phone numbers that relate to this contact | CFString | Yes | | | | | |
| | | Addresses | A list of physical addresses that relate to this person | CFString | Yes | | | | | |
| | | Authors | the name of the owner of the Address Book (current user name) | CFString | Yes | No | Yes | Yes | Yes | Address Book |
| | | Comment | | CFString | No | No | Yes | Yes | Yes | |
| | | ContentType | | CFString | No | | No | Yes | Yes | |
| | | ContentTypes | | CFString | Yes | | No | Yes | Yes | |

-continued

| Item name | Parent in hierarchy | Attribute name | Description/Notes | CFType | Multi-value | Localized | User settable | Gettable | Copied with copy | App viewable |
|---|---|---|---|---|---|---|---|---|---|---|
| | | CreatedDate | date the user entered this into his AddressBook (either through import or direct entry) | CFDate | No | No | No | Yes | Yes | |
| | | DisplayName | Composite name of contact (First Name, Last Name) | CFString | No | Yes | Yes | Yes | Yes | |
| | | Keywords | There will be a way to set keywords within Address Book | CFString | Yes | System-provided keywords (if any) | Yes | Yes | Ask | |
| | | Contact Keywords | | CFString | Yes | No | Yes | Yes | Ask | Address Book |
| | | ModifiedDate | Last time this contact entry was modified | CFDate | No | No | No | Yes | | |
| | | Rating | A relative rating (0 to 5 stars) on how important a particular contact is to you (separate from a message's Priority) | CFNumber | No | n/a | Yes | Yes | | |
| | | RelatedTos | (potentially could be used to associate people from the same company or family) | CFString | Yes | No | Yes | Yes | | |
| | | TextContent | An indexed version of the Notes section | CFString | No | No | No | Yes | | |
| | | UsedDates | The day/time in which the contact entry was viewed in Address Book | CFDate | Yes | No | No | Yes | | |
| Meeting (TBD) | Item | Body | text, rich text or document that represents the full content of the event | CFString | No | | | Yes | | |
| | | Description | text describing the event | CFString | No | | | Yes | | |
| | | EventTimes | time/date the event starts | CFDate | Yes | | | Yes | | |
| | | Duration | The length of time that the meeting lasts | CFNumber | No | | | Yes | | |
| | | Invitees | The list of people who are invited to the meeting | CFString | Yes | | | Yes | | Address Book |
| | | Location | The name of the location where the meeting is taking place | CFString | No | | | Yes | | |

One particular field which may be useful in the various metadata formats would be a field which includes an identifier of a plug in or other software element which may be used to capture metadata from a data file and/or export metadata back to the creator application.

Various different software architectures may be used to implement the functions and operations described herein. The following discussion provides one example of such an architecture, but it will be understood that alternative architectures may also be employed to achieve the same or similar results. The software architecture shown in FIG. 4 is an example which is based upon the Macintosh operating system. The architecture 400 includes a metadata processing software 401 and an operating system (OS) kernel 403 which is operatively coupled to the metadata processing software 401 for a notification mechanism which is described below. The metadata processing software 401 is also coupled to other software programs such as a file system graphical user interface software 405 (which may be the Finder), an email software 407, and other applications 409. These applications are coupled to the metadata processing software 401 through client application program interface 411 which provide a method for transferring data and commands between the metadata processing software 401 and the software 405, 407, and 409. These commands and data may include search parameters specified by a user as well as commands to perform searches from the user, which parameters and commands are passed to the metadata processing software 401 through the interface 411. The metadata processing software 401 is also coupled to a collection of importers 413 which extract data from various applications. In particular, in one exemplary embodiment, a text importer is used to extract text and other information from word processing or text processing files created by word processing programs such as Microsoft Word, etc. This extracted information is the metadata for a particular file. Other types of importers extract metadata from other types of files, such as image files or music files. In this particular embodiment, a particular importer is selected based upon the type of file which has been created and modified by an application program. For example, if the data file was created by PhotoShop, then an image importer for PhotoShop may be used to input the metadata from a PhotoShop data file into the metadata database 415 through the metadata processing software 401. On the other hand, if the data file is a word processing document, then an importer designed to extract metadata from a word processing document is called upon to extract the metadata from the word processing data file and place it into the metadata database 415 through the metadata processing software 401. Typically, a plurality of different importers may be required in order to handle the plurality of different application programs which are used in a typical computer system. The importers 413 may optionally include a plurality of exporters which are capable of exporting the extracted metadata for particular types of data files back to property sheets or other data components maintained by certain application programs. For example, certain application programs may maintain some metadata for each data file created by the program, but this metadata is only a subset of the metadata extracted by an importer from this type of data file. In this instance, the exporter may export back additional metadata or may simply insert metadata into blank fields of metadata maintained by the application program.

The software architecture 400 also includes a file system directory 417 for the metadata. This file system directory keeps track of the relationship between the data files and their metadata and keeps track of the location of the metadata object (e.g. a metadata file which corresponds to the data file from which it was extracted) created by each importer. In one exemplary embodiment, the metadata database is maintained as a flat file format as described below, and the file system directory 417 maintains this flat file format. One advantage of a flat file format is that the data is laid out on a storage device as a string of data without references between fields from one metadata file (corresponding to a particular data file) to another metadata file (corresponding to another data file). This arrangement of data will often result in faster retrieval of information from the metadata database 415.

The software architecture 400 of FIG. 4 also includes find by content software 419 which is operatively coupled to a database 421 which includes an index of files. The index of files represents at least a subset of the data files in a storage device and may include all of the data files in a particular storage device (or several storage devices), such as the main hard drive of a computer system. The index of files may be a conventional indexed representation of the content of each document. The find by content software 419 searches for words in that content by searching through the database 421 to see if a particular word exists in any of the data files which have been indexed. The find by content software functionality is available through the metadata processing software 401 which provides the advantage to the user that the user can search concurrently both the index of files in the database 421 (for the content within a file) as well as the metadata for the various data files being searched. The software architecture shown in FIG. 4 may be used to perform the method shown in FIG. 5 or alternative architectures may be used to perform the method of FIG. 5.

The method of FIG. 5 may begin in operation 501 in which a notification of a change for a file is received. This notification may come from the OS kernel 403 which notifies the metadata processing software 401 that a file has been changed. This notification may come from sniffer software elements which detect new or modified files and deletion of files. This change may be the creation of a new file or the modification of an existing file or the deletion of an existing file. The deletion of an existing file causes a special case of the processing method of FIG. 5 and is not shown in FIG. 5. In the case of a deletion, the metadata processing software 401, through the use of the file system directory 417, deletes the metadata file in the metadata database 415 which corresponds to the deleted file. The other types of operations, such as the creation of a new file or the modification of an existing file, causes the processing to proceed from operation 501 to operation 503 in which the type of file which is the subject of the notification is determined. The file may be an Acrobat PDF file or an RTF word processing file or a JPEG image file, etc. In any case, the type of the file is determined in operation 503. This may be performed by receiving from the OS kernel 403 the type of file along with the notification or the metadata processing software 401 may request an identification of the type of file from the file system graphical user interface software 405 or similar software which maintains information about the data file, such as the creator application or parent application of the data file. It will be understood that in one exemplary embodiment, the file system graphical user interface software 405 is the Finder program which operates on the Macintosh operating system. In alternative embodiments, the file system graphical user interface system may be Windows Explorer which operates on Microsoft's Windows operating system. After the type of file has been determined in operation 503, the appropriate capture software (e.g. one of the importers 413) is activated for the determined file type. The importers may be a plug-in for the particular application which created the type of file about which notification is received in operation 501. Once activated, the importer or capture software imports the appropriate metadata (for the particular file type) into the metadata database, such as metadata database 415 as shown in operation 507. Then in operation 509, the metadata is stored in the database. In one exemplary embodiment, it may be stored in a flat file format. Then in operation 511, the metadata processing software 401 receives search parameter inputs and performs a search of the metadata database (and optionally also causes a search of non-metadata sources such as the index of files 421) and causes the results of the search to be displayed in a user interface. This may be performed by exchanging information between one of the applications, such as the software 405 or the software 407 or the other applications 409 and the metadata processing software 401 through the interface 411. For example, the file system software 405 may present a graphical user interface, allowing a user to input search parameters and allowing the user to cause a search to be performed. This information is conveyed through the interface 411 to the metadata processing software 401 which causes a search through the metadata database 415 and also may cause a search through the database 421 of the indexed files in order to search for content within each data file which has been indexed. The results from these searches are provided by the metadata processing software 401 to the requesting application which, in the example given here, was the software 405, but it will be appreciated that other components of software, such as the email software 407, may be used to receive the search inputs and to provide a display of the search results. Various examples of the user interface for inputting search requests and for displaying search results are described herein and shown in the accompanying drawings.

It will be appreciated that the notification, if done through the OS kernel, is a global, system wide notification process such that changes to any file will cause a notification to be sent to the metadata processing software. It will also be appreciated that in alternative embodiments, each application program may itself generate the necessary metadata and provide the metadata directly to a metadata database without the requirement of a notification from an operating system kernel or from the intervention of importers, such as the importers 413. Alternatively, rather than using OS kernel notifications, an embodiment may use software calls from each application to a metadata processing software which receives these calls and then imports the metadata from each file in response to the call.

Figure 6:
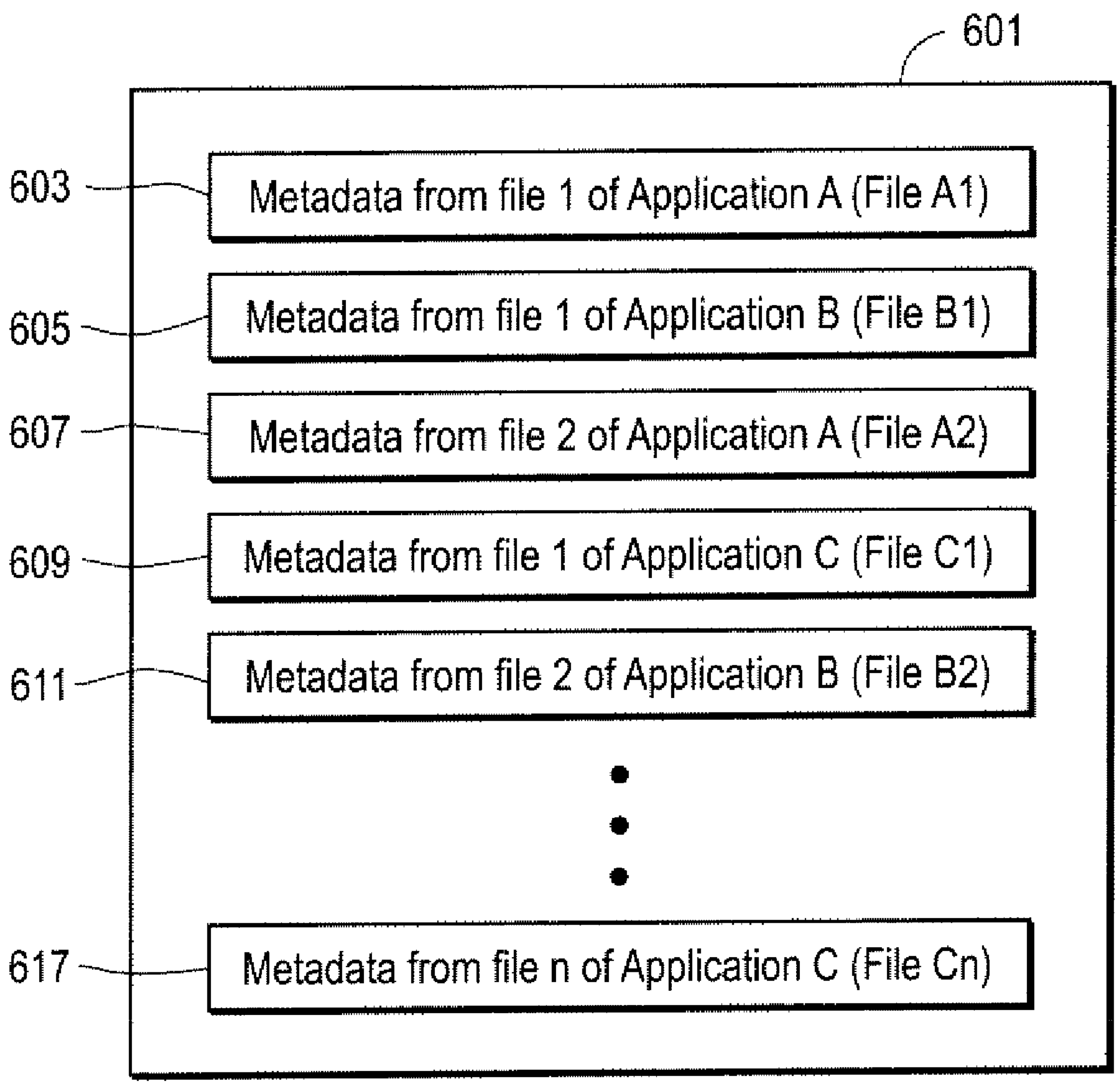
FIG. 6 shows an example of a storage format which utilizes a flat file format for metadata according to one exemplary embodiment of the invention.

As noted above, the metadata database 415 may be stored in a flat file format in order to improve the speed of retrieval of information in most circumstances. The flat file format may be considered to be a non-B tree, non-hash tree format in which data is not attempted to be organized but is rather stored as a stream of data. Each metadata object or metadata file will itself contain fields, such as the fields shown in the examples of FIGS. 3A and 3B. However, there will typically be no relationship or reference or pointer from one field in one metadata file to the corresponding field (or another field) in the next metadata file or in another metadata file of the same file type. FIG. 6 shows an example of the layout in a flat file format of metadata. The format may be streamable and updateable by virtue of its flat file format. The format 601 includes a plurality of metadata files for a corresponding plurality of data files. As shown in FIG. 6, metadata file 603 is metadata from file 1 of application A and may be referred to as metadata file A1. Similarly, metadata file 605 is metadata from file 1 of application B and may be referred to as metadata file B I. Each of these metadata files typically would include fields which are not linked to other fields and which do not contain references or pointers to other fields in other metadata files. It can be seen from FIG. 6 that the metadata database of FIG. 6 includes metadata files from a plurality of different applications (applications A, B, and C) and different files created by each of those applications. Metadata files 607, 609, 611, and 617 are additional metadata files created by applications A, B, and C as shown in FIG. 6.

A flexible query language may be used to search the metadata database in the same way that such query languages are used to search other databases. The data within each metadata file may be packed or even compressed if desirable. As noted above, each metadata file, in certain embodiments, will include a persistent identifier which uniquely identifies its corresponding data file. This identifier remains the same even if the name of the file is changed or the file is modified. This allows for the persistent association between the particular data file and its metadata.

User Interface Aspects

Various different examples of user interfaces for inputting search parameters and for displaying search results are provided herein. It will be understood that some features from certain embodiments may be mixed with other embodiments such that hybrid embodiments may result from these combinations. It will be appreciated that certain features may be removed from each of these embodiments and still provide adequate functionality in many instances.

Figure 7A:
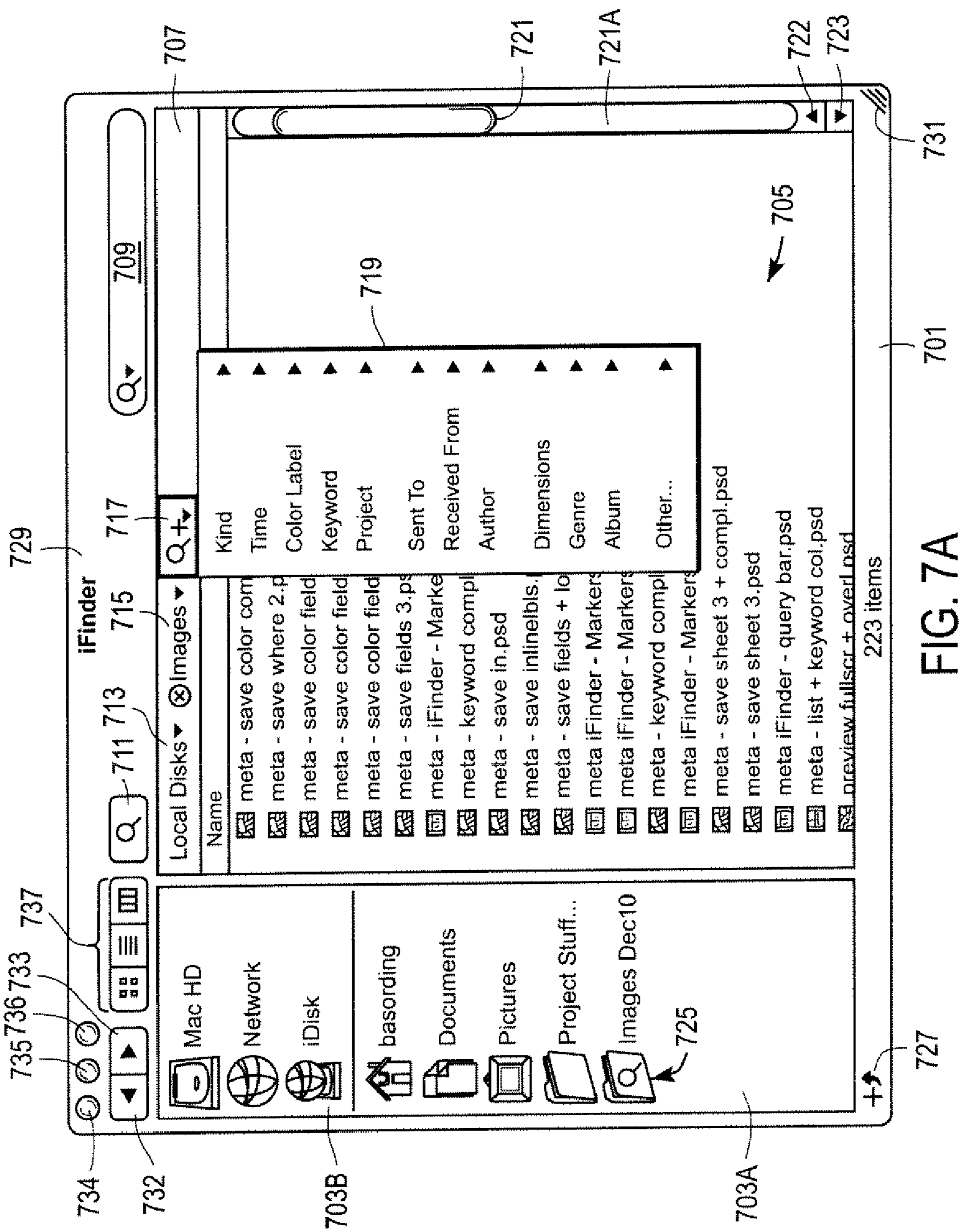
FIGS. 7A-7E show a sequence of graphical user interfaces provided by one exemplary embodiment in order to allow searching of metadata and/or other data in a data processing system.

FIG. 7A shows a graphical user interface which is a window which may be displayed on a display device which is coupled to a data processing system such as a computer system. The window 701 includes a side bar having two regions 703A, which is a user-configurable region, and 703B, which is a region which is specified by the data processing system. Further details in connection with these side bar regions may be found in co-pending U.S. patent application Ser. No. 10/873,661 filed Jun. 21, 2004, and entitled "Methods and Apparatuses for Operating a Data Processing System," by inventors Donald Lindsay and Bas Ording. The window 701 also includes a display region 705 which in this case displays the results of searches requested by the user. The window 701 also includes a search parameter menu bar 707 which includes configurable pull down menus 713, 715, and 717. The window 701 also includes a text entry region 709 which allows a user to enter text as part of the search query or search parameters. The button 711 may be a start search button which a user activates in order to start a search based upon the selected search parameters. Alternatively, the system may perform a search as soon as it receives any search parameter inputs or search queries from the user rather than waiting for a command to begin the search. The window 701 also includes a title bar 729 which may be used in conjunction with a cursor control device to move, in a conventional manner, the window around a desktop which is displayed on a display device. The window 701 also includes a close button 734, a minimize button 735, and a resize button 736 which may be used to close or minimize or resize, respectively, the window. The window 701 also includes a resizing control 731 which allows a user to modify the size of the window on a display device. The window 701 further includes a back button 732 and a forward button 733 which function in a manner which is similar to the back and forward buttons on a web browser, such as Internet Explorer or Safari. The window 701 also includes view controls which include three buttons for selecting three different types of views of the content within the display region 705. When the contents found in a search exceed the available display area of a display region 705, scroll controls, such as scroll controls 721, 722, and 723, appear within the window 701. These may be used in a conventional manner, for example, by dragging the scroll bar 721 within the scroll region 721A using conventional graphical user interface techniques.

The combination of text entry region 709 and the search parameter menu bar allow a user to specify a search query or search parameters. Each of the configurable pull down menus presents a user with a list of options to select from when the user activates the pull down menu. As shown in FIG. 7A, the user has already made a selection from the configurable pull down menu 713 to specify the location of the search, which in this case specifies that the search will occur on the local disks of the computer systems. Configurable pull down menu 715 has also been used by the user to specify the kind of document which is to be searched for, which in this case is an image document as indicated by the configurable pull down menu 715 which indicates "images" as the selected configuration of this menu and hence the search parameter which it specifies. The configurable pull down menu 717, as shown in FIG. 7A, represents an add search parameter pull down menu. This add search parameter pull down menu allows the user to add additional criteria to the search query to further limit the search results. In the embodiment shown in FIG. 7A, each of the search parameters is logically ANDed in a Boolean manner. Thus the current search parameter specified by the user in the state shown in FIG. 7A searches all local disks for all images, and the user is in the middle of the process of selecting another search criteria by having selected the add search criteria pull down menu 717, resulting in the display of the pull down menu 719, which has a plurality of options which may be selected by the user.

Figure 7B:
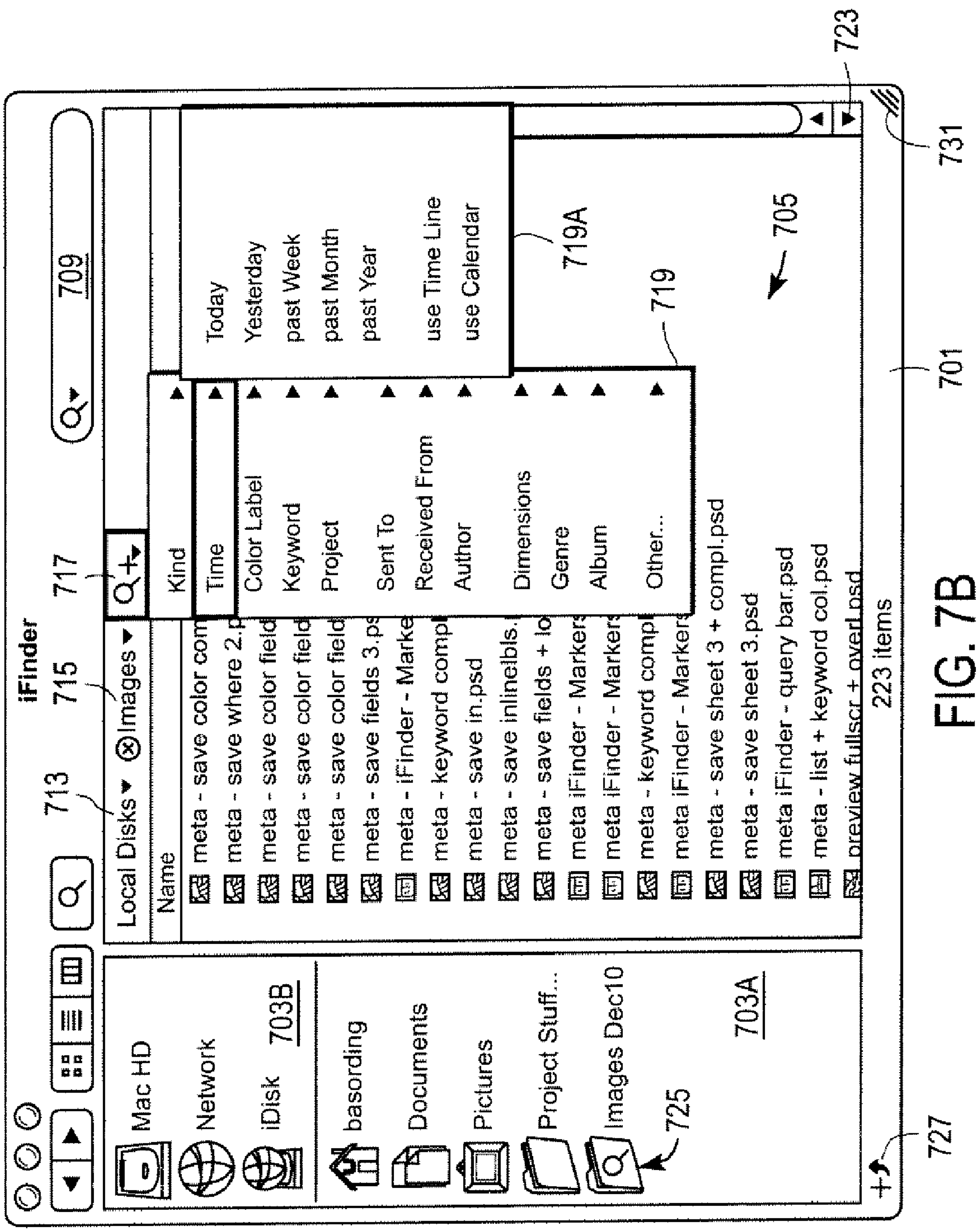

FIG. 7B shows the window 701 after the user has caused the selection of the time option within pull down menu 719, thereby causing the display of a submenu 719A which includes a list of possible times which the user may select from. Thus it appears that the user wants to limit the search to all images on all local disks within a certain period of time which is to be specified by making a selection within the submenu 719A.

Figure 7C:
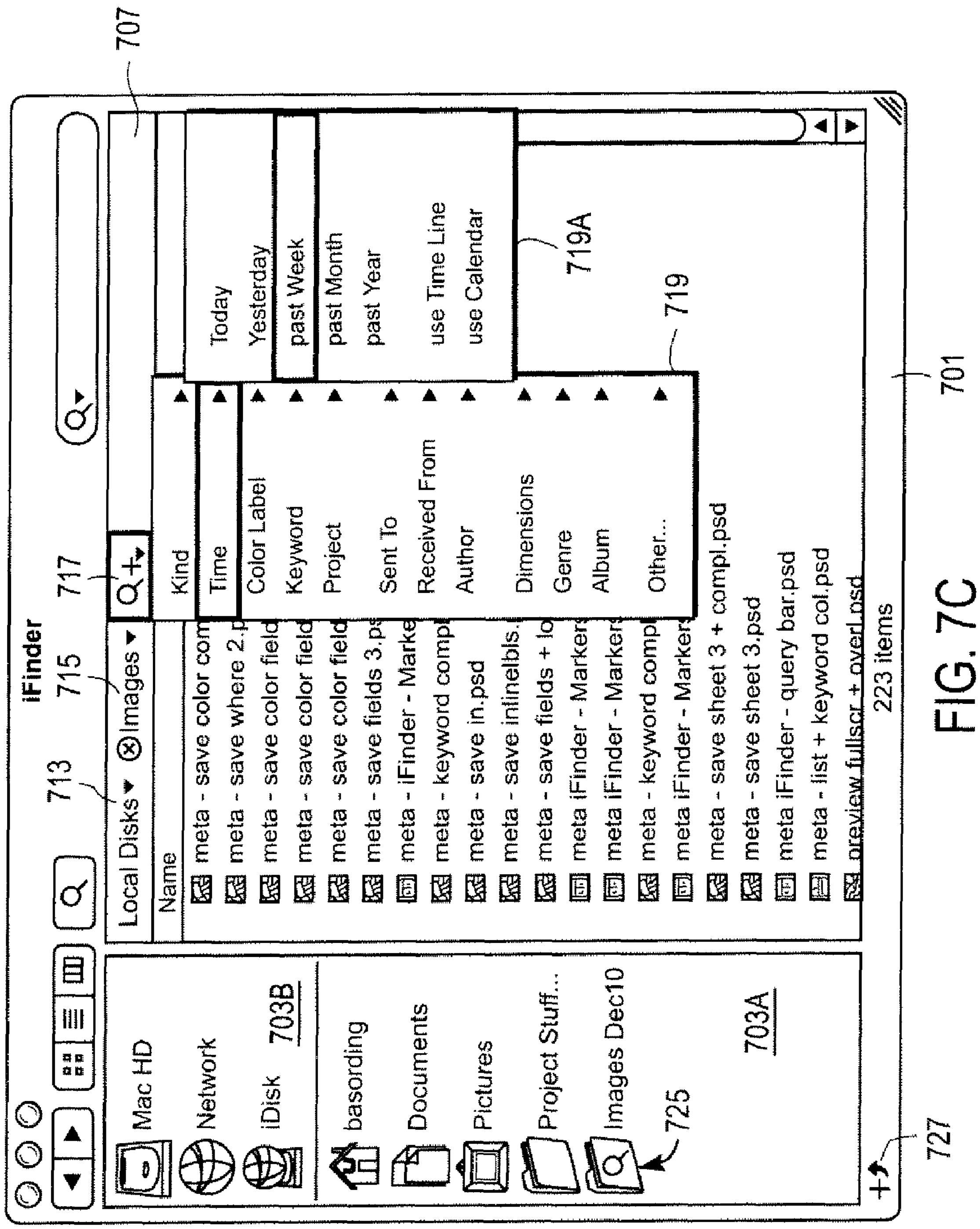
Figure 7D:
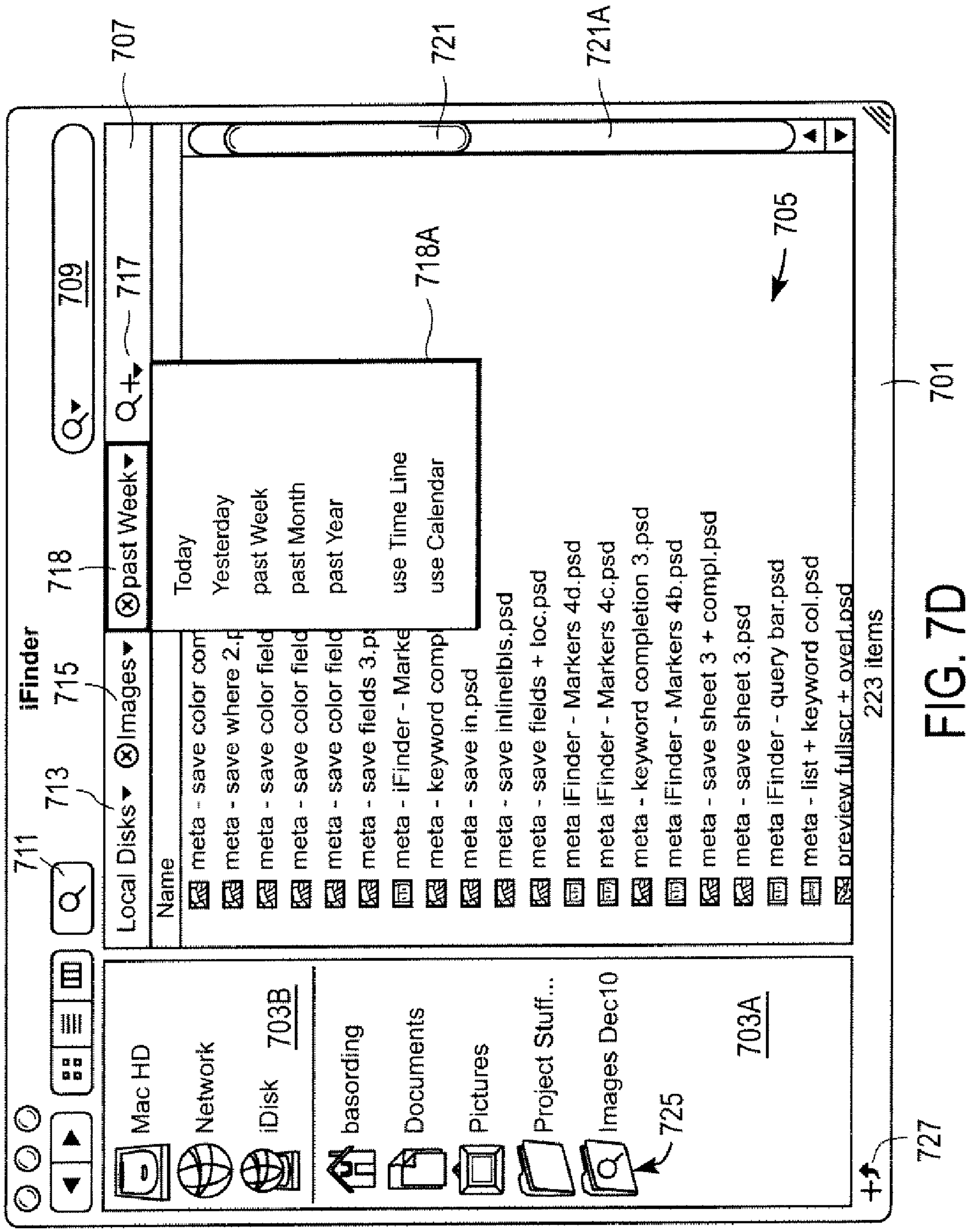
Figure 7E:
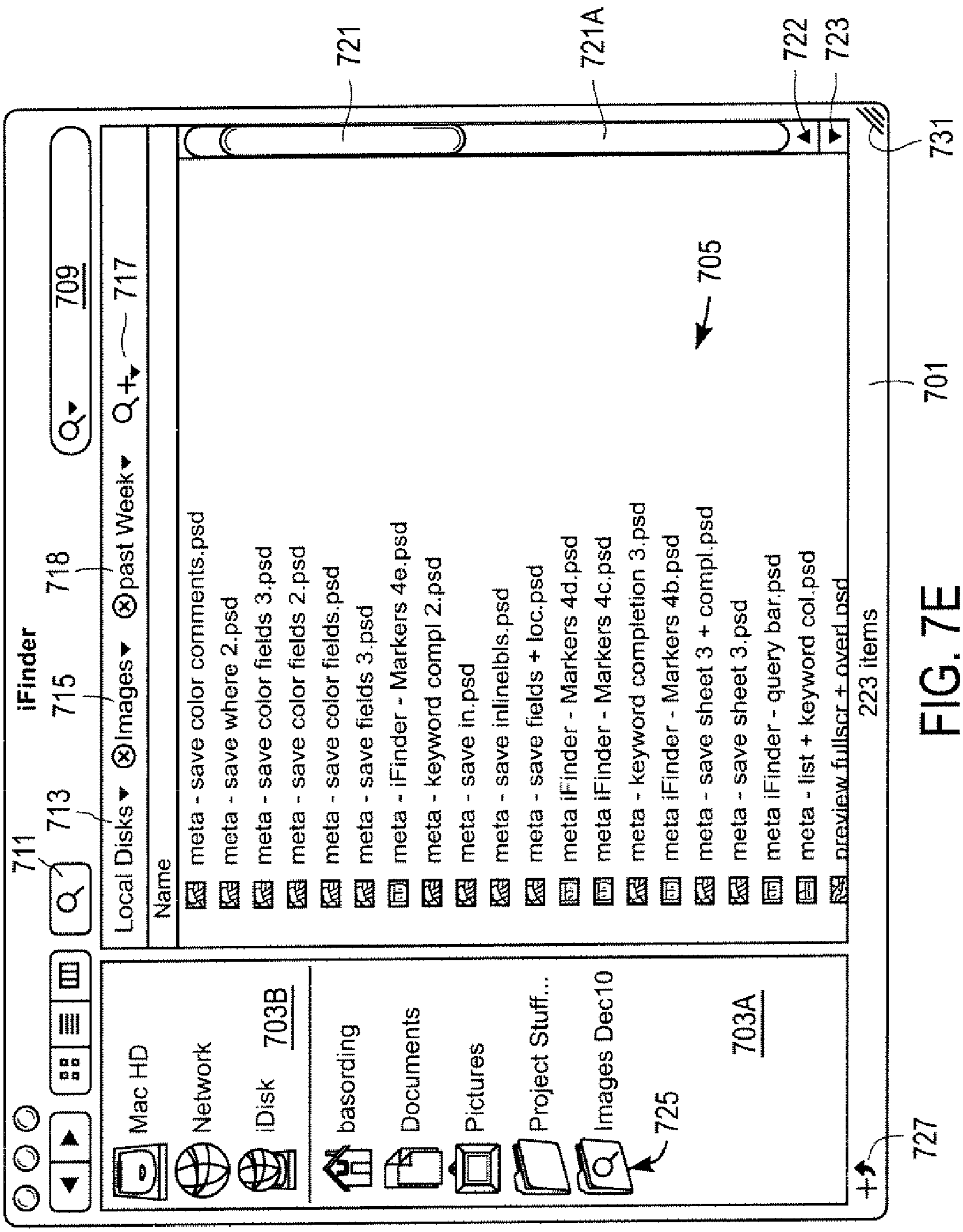

FIG. 7C shows the window 701 on the display of a data processing system after the user has selected a particular option (in this case "past week") from the submenu 719A. If the user accepts this selection, then the display shown in FIG. 7D results in which the configurable pull down menu 718 is displayed showing that the user has selected as part of the search criteria files that have been created or modified in the past week. It can be seen from FIG. 7D that the user can change the particular time selected from this pull down menu 718 by selecting another time period within the pull down menu 718A shown in FIG. 7D. Note that the configurable pull down menu 717, which represents an add search parameter menu, has now moved to the right of the configurable pull down menu 718. The user may add further search parameters by pressing or otherwise activating the configurable pull down menu 717 from the search parameter menu bar 707. If the user decides that the past week is the proper search criteria in the time category, then the user may release the pull down menu 718A from being displayed in a variety of different ways (e.g. the user may release the mouse button which was being depressed to keep the pull down menu 718A on the display). Upon releasing or otherwise dismissing the pull down menu 718A, the resulting window 701 shown in FIG. 7E then appears. There are several aspects of this user interface shown in FIG. 7A-7E which are worthy of being noted. The search parameters or search query is specified within the same window as the display of the search results. This allows the user to look at a single location or window to understand the search parameters and how they affected the displayed search results, and may make it easier for a user to alter or improve the search parameters in order to find one or more files. The configurable pull down menus, such as the add search parameter pull down menu, includes hierarchical pull down menus. An example of this is shown in FIG. 7B in which the selection of the time criteria from the pull down menu 717 results in the display of another menu, in this case a submenu 719A which may be selected from by the user. This allows for a compact presentation of the various search parameters while keeping the initial complexity (e.g. without submenus being displayed) at a lower level. Another useful aspect of the user interface shown in FIGS. 7A-7E is the ability to reconfigure pull down menus which have previously been configured. Thus, for example, the configurable pull down menu 713 currently specifies the location of the search (in this case, all local disks), however, this may be modified by selecting the pull down region associated with the configurable pull down menu 713, causing the display of a menu of options indicating alternative locations which may be selected by the user. This can also be seen in FIG. 7D in which the past week option has been selected by the user (as indicated by "past week" being in the search parameter menu bar 707), but a menu of options shown in the pull down menu 718A allows the user to change the selected time from the "past week" to some other time criteria. Another useful aspect of this user interface is the ability to continue adding various search criteria by using the add search criteria pull down menu 717 and selecting a new criteria.

It will also be appreciated that the various options in the pull down menus may depend upon the fields within a particular type of metadata file. For example, the selection of "images" to be searched may cause the various fields present in the metadata for an image type file to appear in one or more pull down menus, allowing the user to search within one or more of those fields for that particular type of file. Other fields which do not apply to "images" types of files may not appear in these menus in order reduce the complexity of the menus and to prevent user confusion.

Another feature of the present invention is shown in FIGS. 7A-7E. In particular, the side bar region 703A, which is the user-configurable portion of the side bar, includes a representation of a folder 725 which represents the search results obtained from a particular search, which search results may be static or they may be dynamic in that, in certain instances, the search can be performed again to obtain results based on the current files in the system. The folder 725 in the example shown in FIGS. 7A-7E represents a search on a local disk for all images done on December 10$^{th}$. By selecting this folder in the side bar region 703A, the user may cause the display in the display region 705 of the results of that search. In this way, a user may retrieve a search result automatically by saving the search result into the side bar region 703A. One mechanism for causing a search result or a search query to be saved into the side bar region 703A is to select the add folder button 727 which appears in the bottom portion of the window 701. By selecting this button, the current search result or search query is saved as a list of files and other objects retrieved in the current search result. In the case where the search query is saved for later use rather than the saving of a search result, then the current search query is saved for re-use at a later time in order to find files which match the search query at that later time. The user may select between these two functionalities (saving a search result or saving a search query) by the selection of a command which is not shown.

Figure 8A:
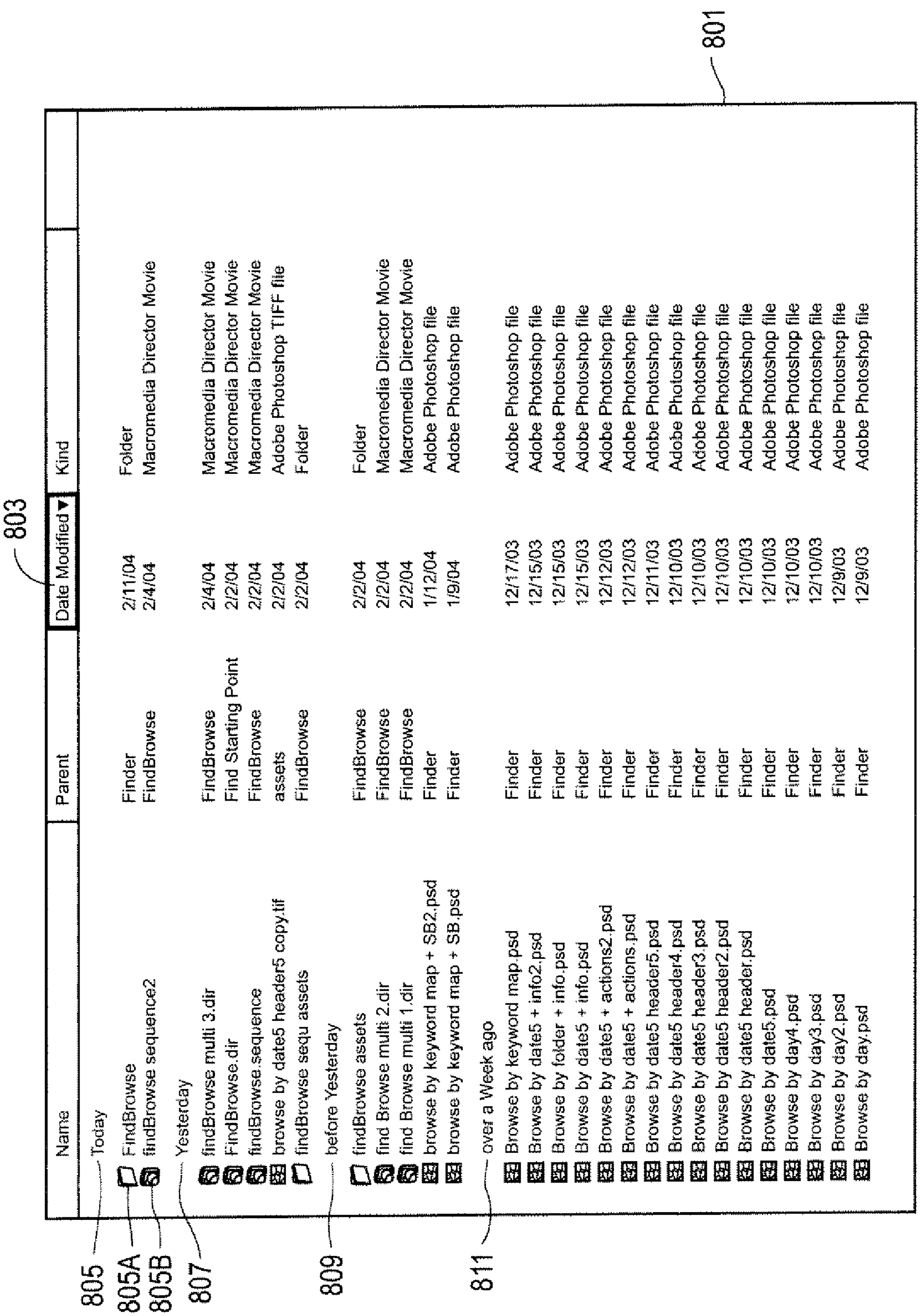
FIGS. 8A and 8B show two examples of formats for displaying search results according to one exemplary embodiment of the invention.
Figure 8B:
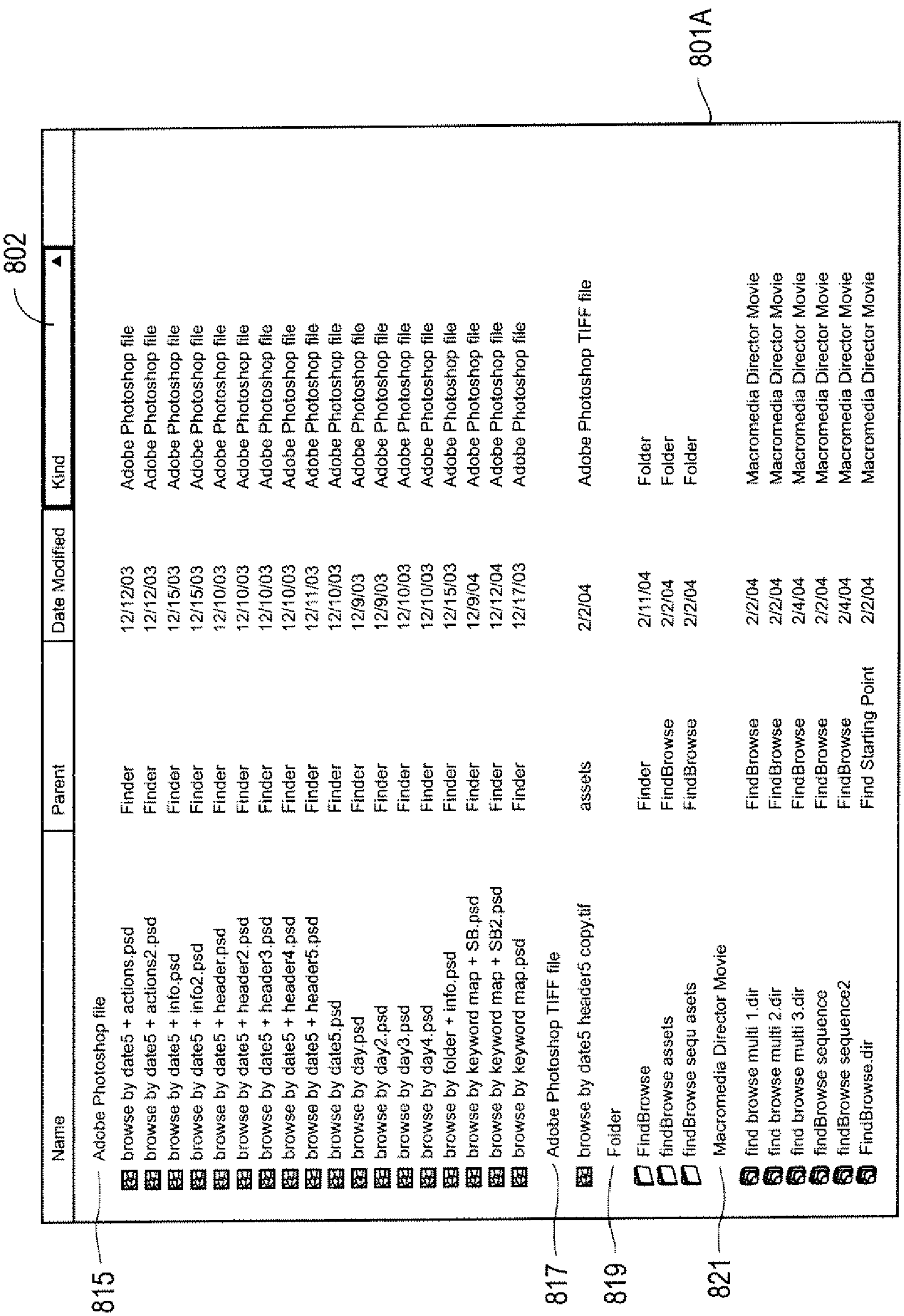

FIGS. 8A and 8B show another aspect of a user interface feature which may be used with certain embodiments of the present invention. The window 801 of FIG. 8A represents a display of the search results which may be obtained as a result of using one of the various different embodiments of the present invention. The search results are separated into categories which are separated by headers 805, 807, 809, and 811 which in this case represent periods of time. This particular segmentation with headers was selected by the user's selecting the heading "date modified" using the date modified button 803 at the top of the window 801. An alternative selection of the kind category by selecting the button 802 at the top of the window 801A shown in FIG. 8B results in a different formatting of the search results which are now categorized by headers which indicate the types of files which were retrieved in the search and are separated by the headings 815, 817, 819, and 821 as shown in FIG. 8B. The use of these headings in the search results display allows the user to quickly scan through the search results in order to find the file.

Figure 9:
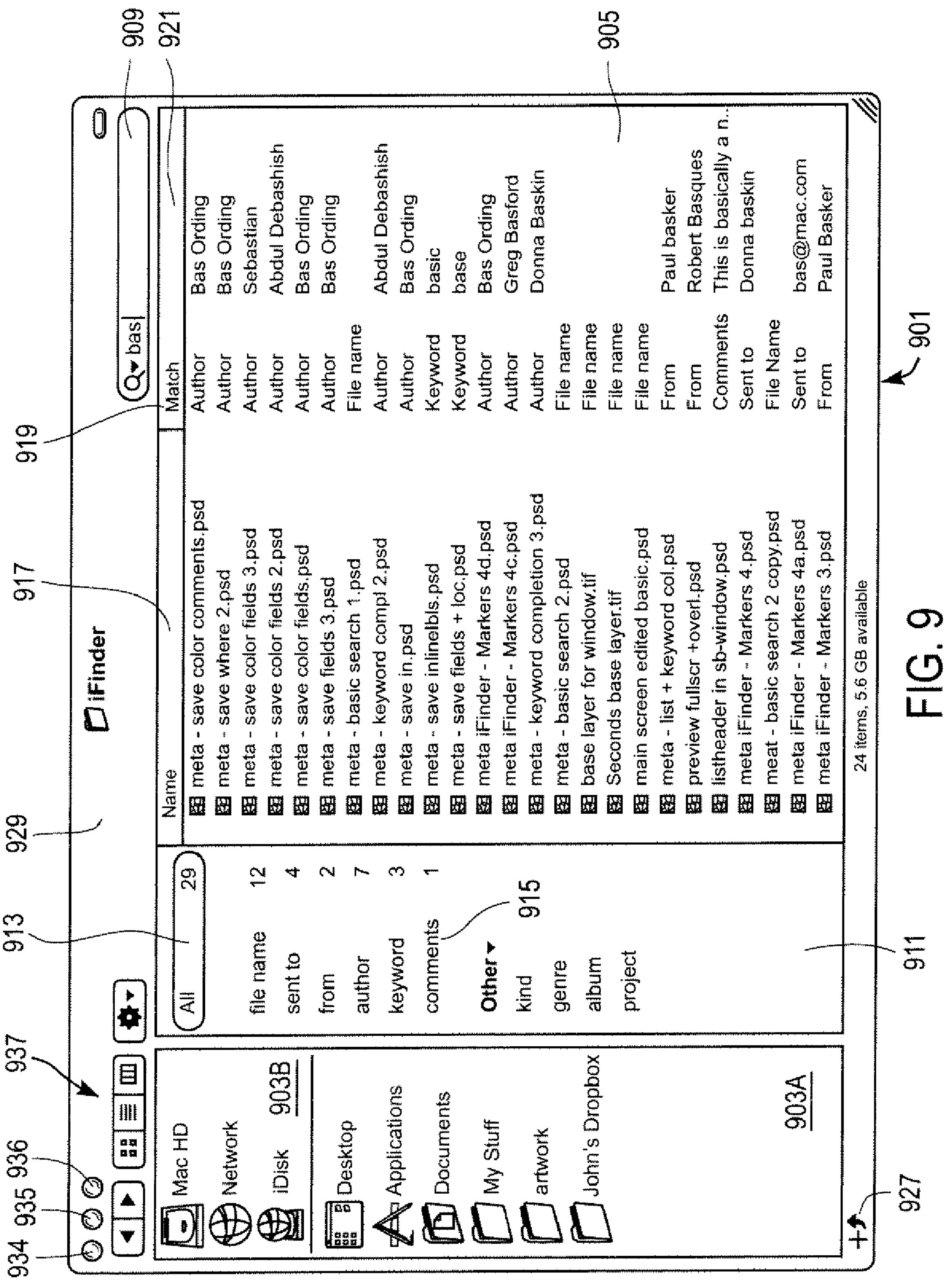
FIG. 9 shows another exemplary user interface of the present invention.

FIG. 9 shows another aspect of the present invention that is illustrated as part of the window 901 shown in FIG. 9. This window includes a display region 905 which shows the results of the search and the window also includes two side bar regions 903A and 903B, where the side bar region 903A is the user-configurable portion and the side bar region 903B is the system controlled portion. A folder add button 927 may be selected by the user to cause the addition of a search result or a search query to be added to the user-configurable portion of the side bar. The window 901 also includes conventional window controls such as a title bar or region 929 which may be used to move the window around a display and view select buttons 937 and maximize, minimize and resize buttons 934, 935, and 936 respectively. The window 901 shows a particular manner in which the results of a text-based search may be displayed. A text entry region 909 is used to enter text for searching. This text may be used to search through the metadata files or the indexed files or a combination of both. The display region 905 shows the results of a search for text and includes at least two columns, 917 and 919, which provide the name of the file that was found and the basis for the match. As shown in column 919, the basis for the match may be the author field or a file name or a key word or comments or other data fields contained in metadata that was searched. The column 921 shows the text that was found which matches the search parameter typed into the text entry field 909. Another column 911 provides additional information with respect to the search results. In particular, this column includes the number of matches for each particular type of category or field as well as the total number of matches indicated in the entry 913. Thus, for example, the total number of matches found for the comments field is only 1, while other fields have a higher number of matches.

Figure 10:
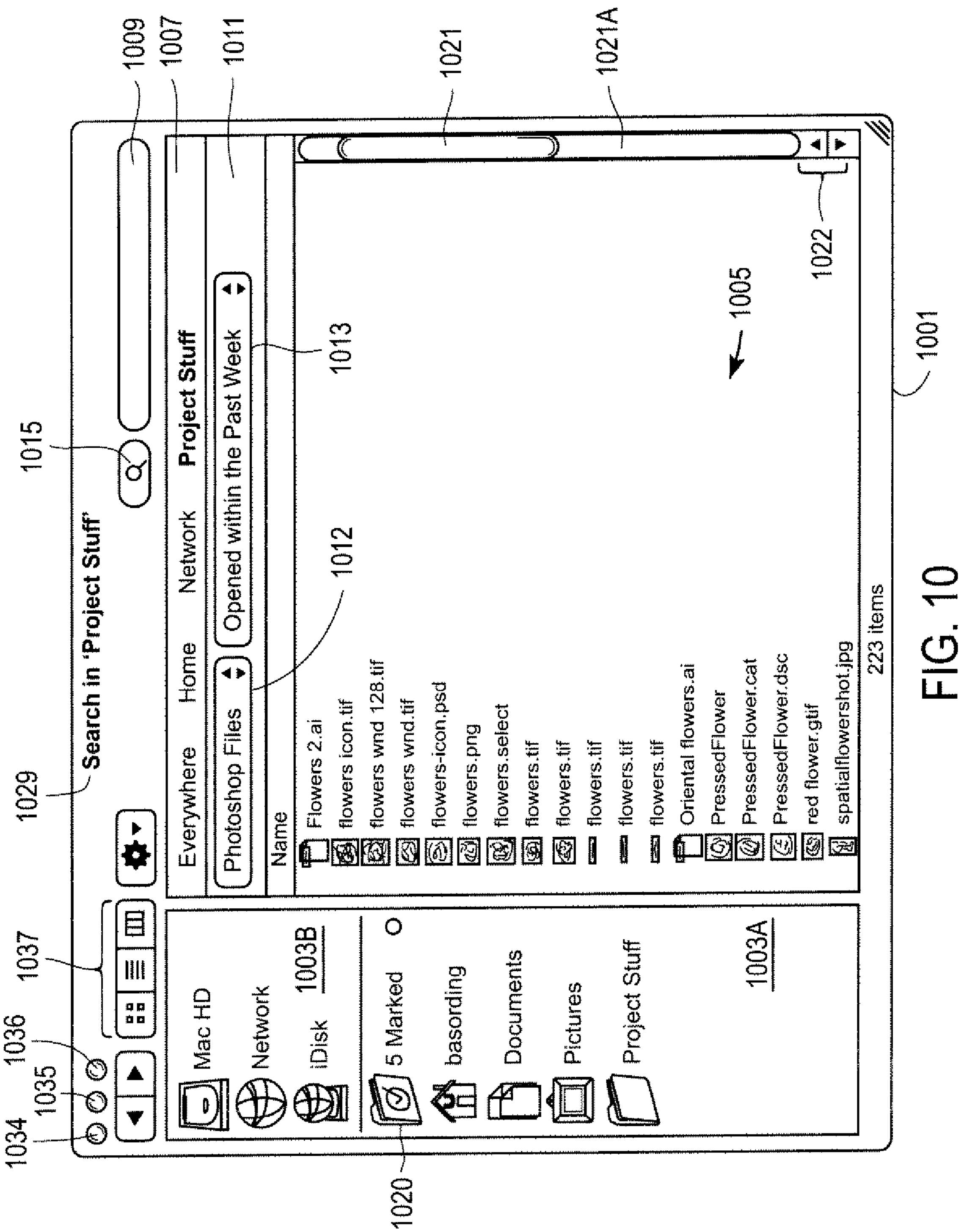
FIG. 10 shows another exemplary user interface of the present invention.

FIG. 10 shows certain other aspects of some embodiments of the present invention. Window 1001 is another search result window which includes various fields and menus for a user to select various search parameters or form a search query. The window 1001 includes a display region 1005 which may be used to display the results of a search and a user-configurable side bar portion 1003A and a system specified side bar portion 1003B. In addition, the window 1001 includes conventional scrolling controls such as controls 1021 and 1022 and 1021A. The window further includes conventional controls such as a title bar 1029 which may be used to move the window and view control buttons 1037 and maximize, minimize, and resize buttons 1034, 1035, and 1036. A start search button 1015 is near a text entry region 1009. A first search parameter menu bar 1007 is displayed adjacent to a second search parameter bar 1011. The first search parameter search bar 1007 allows a user to specify the location for a particular search while two menu pull down controls in the second search parameter menu bar 1011 allow the user to specify the type of file using the pull down menu 1012 and the time the file was created or last modified using the menu 1013.

The window 1001 includes an additional feature which may be very useful while analyzing a search result. A user may select individual files from within the display region 1005 and associate them together as one collection. Each file may be individually marked using a specific command (e.g. pressing the right button on a mouse and selecting a command from a menu which appears on the screen, which command may be "add selection to current group") or similar such commands. By individually selecting such files or by selecting a group of files at once, the user may associate this group of files into a selected group or a "marked" group and this association may be used to perform a common action on all of the files in the group (e.g. print each file or view each file in a viewer window or move each file to a new or existing folder, etc.). A representation of this marked group appears as a folder in the user-configurable portion 1003A. An example of such a folder is the folder 1020 shown in the user-configurable portion 1003A. By selecting this folder (e.g. by positioning a cursor over the folder 1020 and pressing and releasing a mouse button or by pressing another button) the user, as a result of this selection, will cause the display within the display region 1005 of the files which have been grouped together or marked. Alternatively, a separate window may appear showing only the items which have been marked or grouped. This association or grouping may be merely temporary or it may be made permanent by retaining a list of all the files which have been grouped and by keeping a folder 1020 or other representations of the grouping within the user-configurable side bar, such as the side bar 1003A. Certain embodiments may allow multiple, different groupings to exist at the same time, and each of these groupings or associations may be merely temporary (e.g. they exist only while the search results window is displayed), or they may be made permanent by retaining a list of all the files which have been grouped within each separate group. It will be appreciated that the files within each group may have been created from different applications. As noted above, one of the groupings may be selected and then a user may select a command which performs a common action (e.g. print or view or move or delete) on all of the files within the selected group.

FIGS. 11A, 11B, 11C, and 11D show an alternative user interface for allowing a user to input search queries or search parameters. The user interface shown in these figures appears within the window 1101 which includes a user-configurable side bar region 1103A and a system specified side bar region 1103B. The window 1101 also includes traditional window controls such as a window resizing control 1131 which may be dragged in a conventional graphical user interface manner to resize the window, and the window further includes scrolling controls such as controls 1121, 1122, and 1123. The scrolling control 1121 may, for example, be dragged within the scrolling region 1121A or a scroll wheel on a mouse or other input device may be used to cause scrolling within a display region 1105. Further, traditional window controls include the title bar 1129 which may be used to move the window around a desktop which is displayed on a display device of a computer system and the window also includes view buttons 1137 as well as close, minimize, and resize buttons 1134, 1135 and 1136. A back and forward button, such as the back button 1132, are also provided to allow the user to move back and forth in a manner which is similar to the back and forth commands in a web browser. The window 1101 includes a search parameter menu bar 1111 which includes a "search by" pull down menu 1112 and a "sort by" pull down menu 1114. The "search by" pull down menu 1112 allows a user to specify the particular search parameter by selecting from the options which appear in the pull down menu once it is activated as shown in FIG. 1B. In particular, the pull down menu 1113 shows one example of a pull down menu when the "search by" pull down menu 1112 has been activated. The "sort by" pull down menu 1114 allows a user to specify how the search results are displayed within a display region 1105. In the example shown in FIGS. 11A-11D a user has used the "sort by" pull down menu 1114 to select the "date viewed" criteria to sort the search results by. It should also be noted that the user may change the type of view of the search results by selecting one of the three view buttons 1137. For example, a user may select an icon view which is the currently selected button among the view buttons 1137, or the user may select a list view or a column view.

Figure 11A:
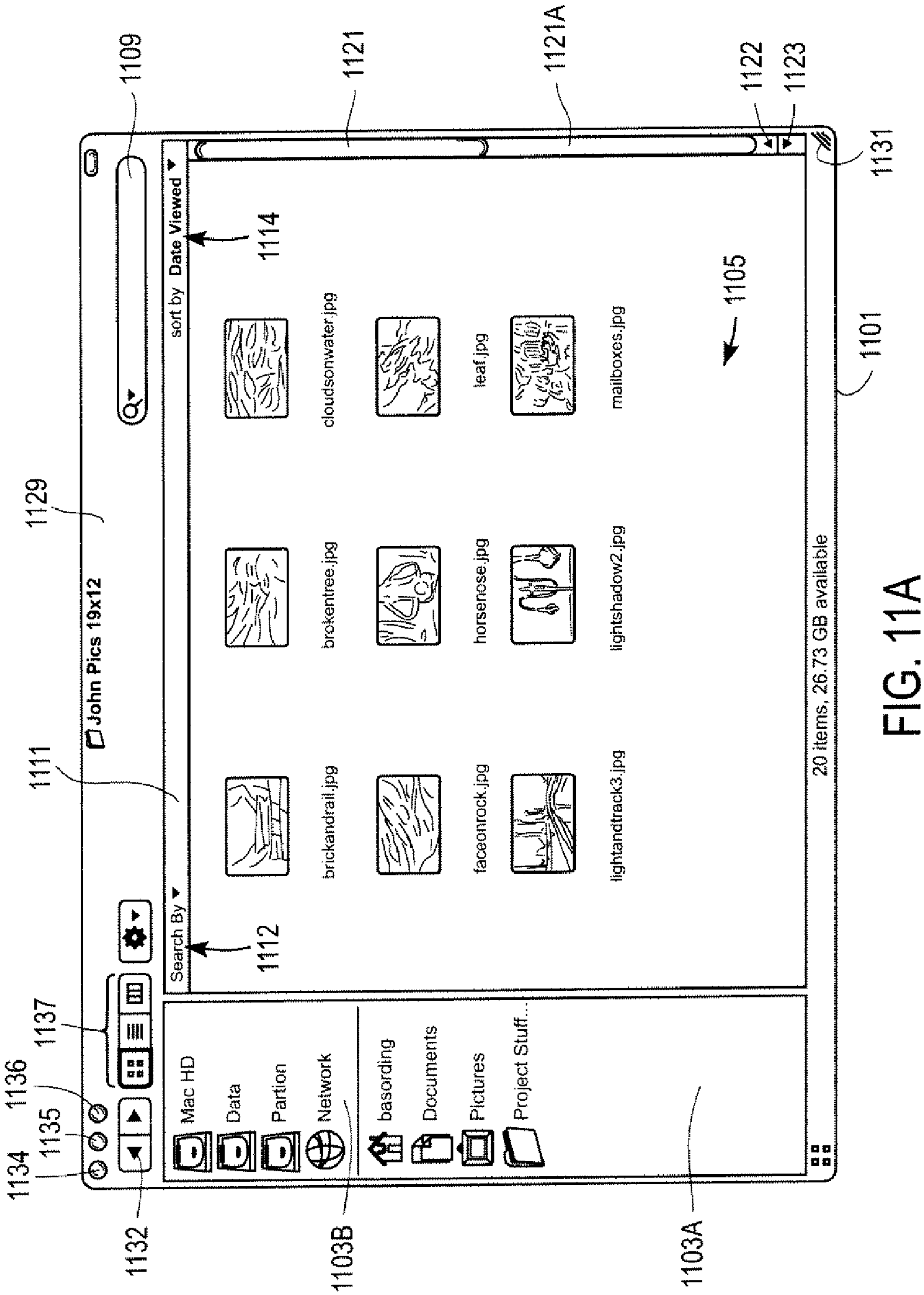
FIGS. 11A-11D show, in sequence, another exemplary user interface according to the present invention.
Figure 11B:
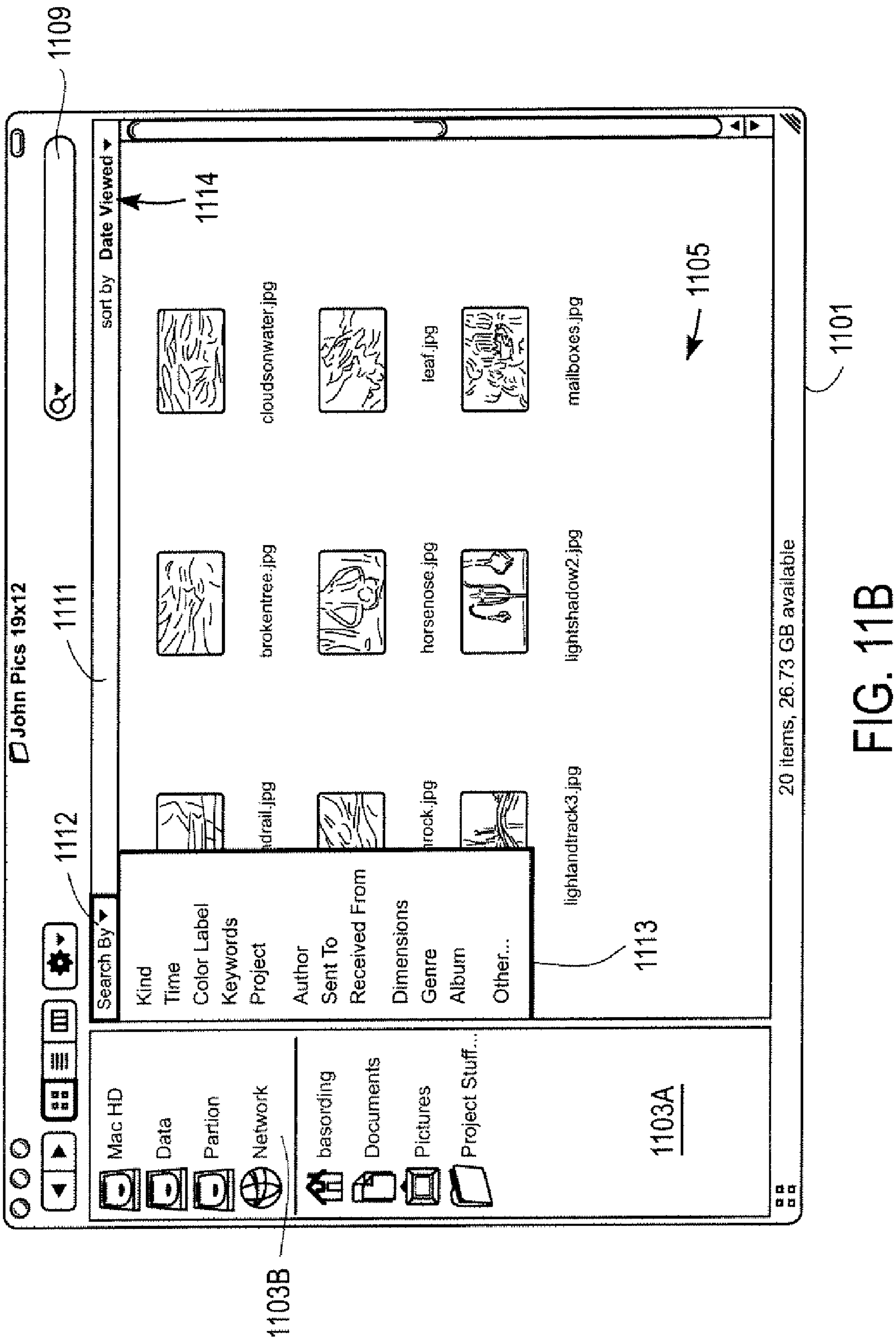
Figure 11C:
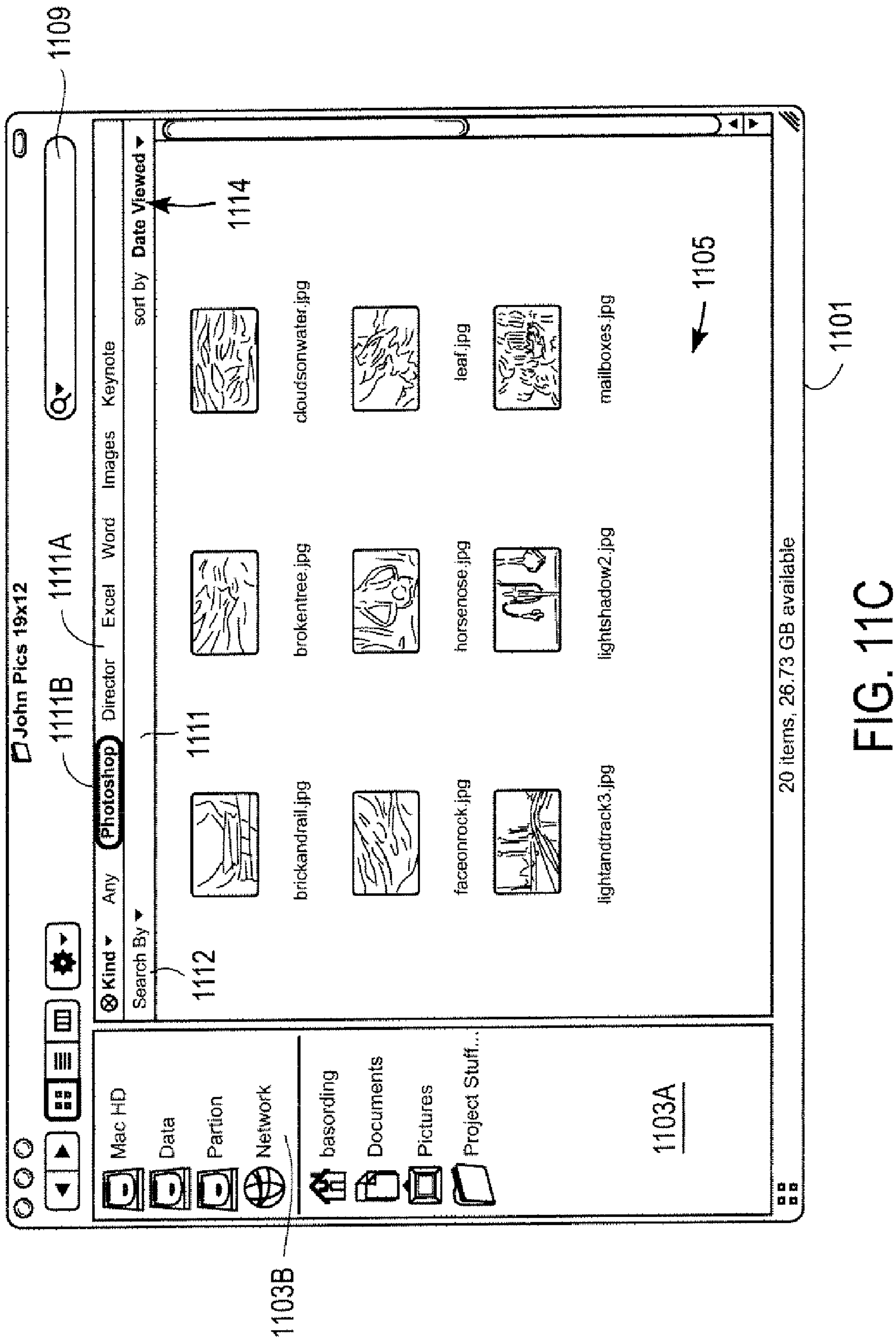
Figure 11D:
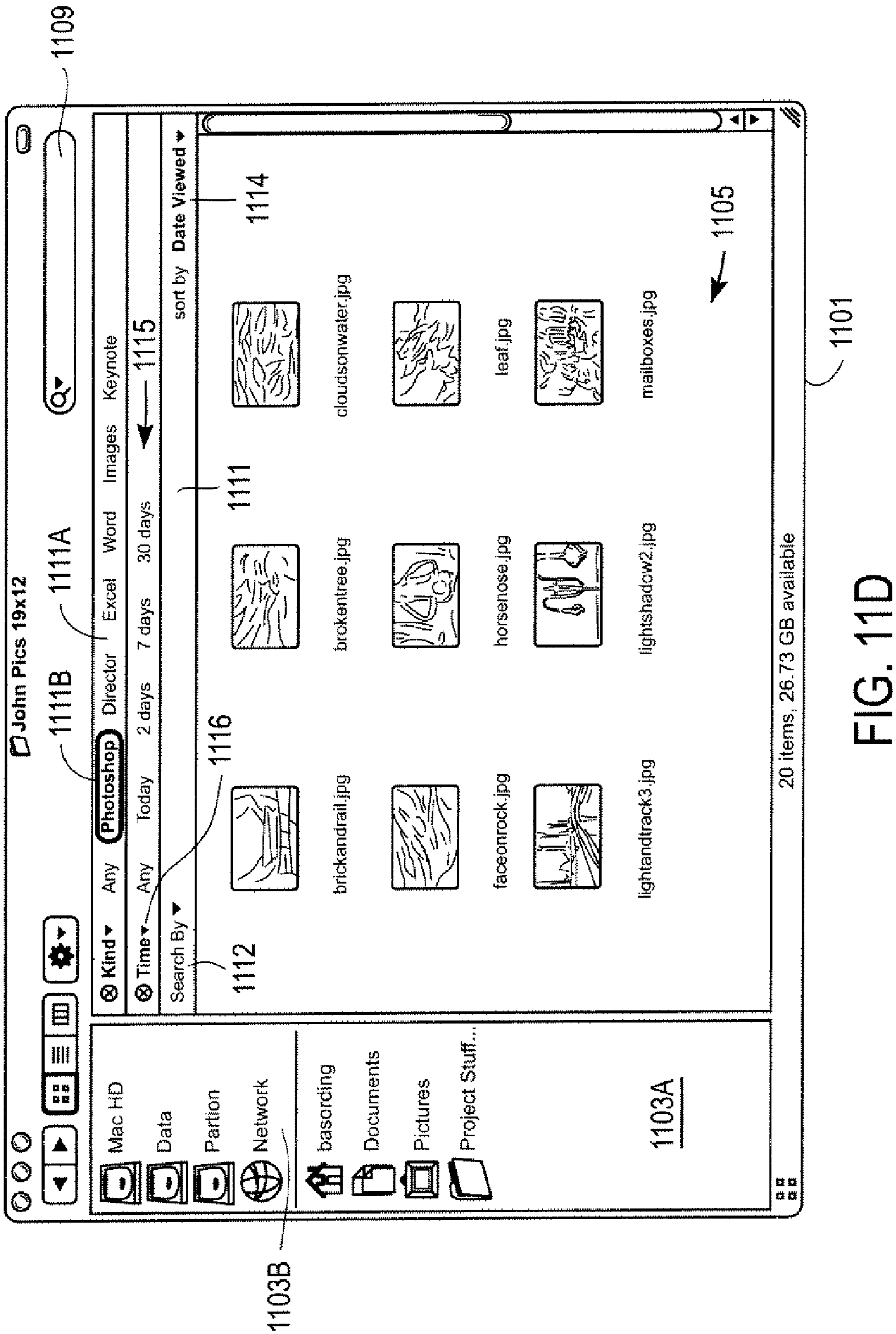

FIG. 11B shows the result of the user's activation of a "search by" pull down menu 1112 which causes the display of the menu 1113 which includes a plurality of options from which the user may choose to perform a search by. It will be appreciated that there are a number of different ways for a user to activate the "search by" pull down menu 1112. One way includes the use of a cursor, such as a pointer on a display which is controlled by a cursor control device, such as a mouse. The cursor is positioned over the region associated with the "search by" menu title (which is the portion within the search parameter menu bar 1111 which contains the words "search by") and then the user indicates the selection of the menu title by pressing a button, such as a mouse's button, to cause the pull down menu to appear, which in this case is the menu 1113 shown in FIG. 11B. At this point, the user may continue to move the cursor to point to a particular option within the menu, such as the "time" option. This may result in the display of a submenu to the left or to the right of the menu 1113. This submenu may be similar to the submenu 719A or to the menu 1214 shown in FIG. 12A. If the "kind" option is selected in the menu 1113, the submenu may include a generic list of the different kinds of documents, such as images, photos, movies, text, music, PDF documents, email documents, etc. or the list may include references to specific program names such as PhotoShop, Director, Excel, Word, etc. or it may include a combination of generic names and specific names. FIG. 11C shows the result of the user having selected PhotoShop type of documents from a submenu of the "kind" option shown in menu 1113. This results in the display of the search parameter menu bar 1111A shown in FIG. 11C which includes a highlighted selection 1111B which indicates that the PhotoShop type of documents will be searched for. The search parameter menu bar 1111 appears below the search parameter menu bar 1111A as shown in FIG. 11C. The user may then specify additional search parameters by again using the "search by" pull down menu 112 or by typing text into the text entry field 1109. For example, from the state of the window 1101 shown in FIG. 11C, the user may select the "search by" pull down menu 1112 causing the display of a menu containing a plurality of options, such as the options shown within the menu 1113 or alternative options such as those which relate to PhotoShop documents (e.g. the various fields in the metadata for PhotoShop type of documents). A combination of such fields contained within metadata for PhotoShop type documents and other generic fields (e.g. time, file size, and other parameters) may appear in a menu, such as the menu 1113 which is activated by selecting the "search by" pull down menu. The user may then select another criteria such as the time criteria. In this case, the window 1101 displays a new search parameter menu bar 1115 which allows a user to specify a particular time. The user may select one of the times on the menu bar 1115 or may activate a pull down menu by selecting the menu title "time," which is shown as the menu title 1116. The state of the window 1101 shown in FIG. 11D would then search for all PhotoShop documents created in the last 30 days or 7 days or 2 days or today or at any time, depending on the particular time period selected by the user.

FIGS. 12A, 12B, 12C and 12D show another example of a user interface for allowing the creation of search queries for searching metadata and other data and for displaying the results of the search performed using a search query. The different implementation shown in FIGS. 12A-12D shows a user interface presentation in a column mode; this can be seen by noting the selection of the column button, which is the rightmost button in the view buttons 1237 shown in FIG. 12A. The window 1201 has two columns 1211 and the display region 1205, while the window 1251 of FIG. 12C has three columns which are columns 1257, 1259, and the display region 1255, and the window 1271 has three columns which are columns 1277, 1279, and the display region 1275.

Figure 12A:
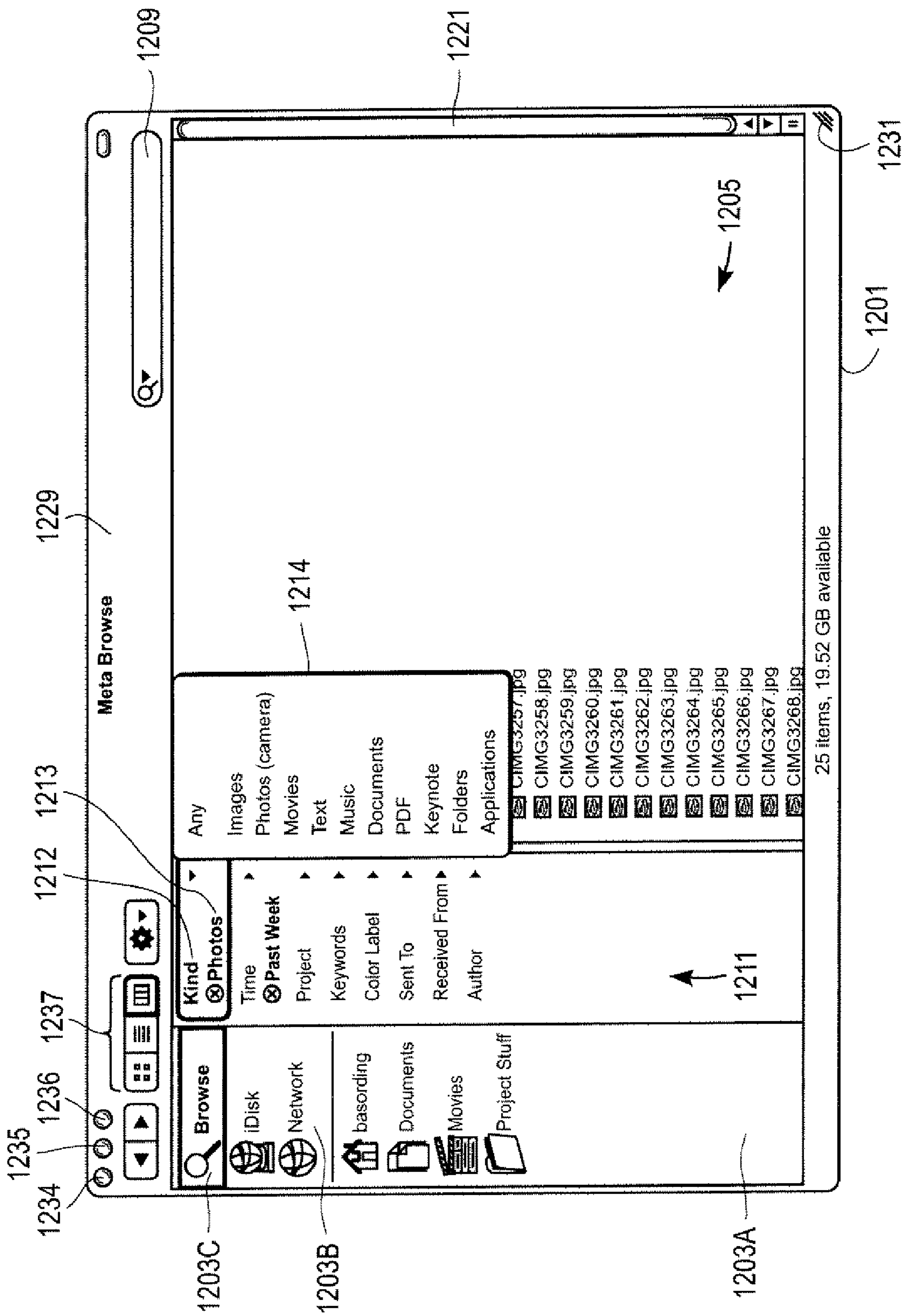
FIGS. 12A-12D show alternative embodiments of user interfaces according to the present invention.
Figure 12B:
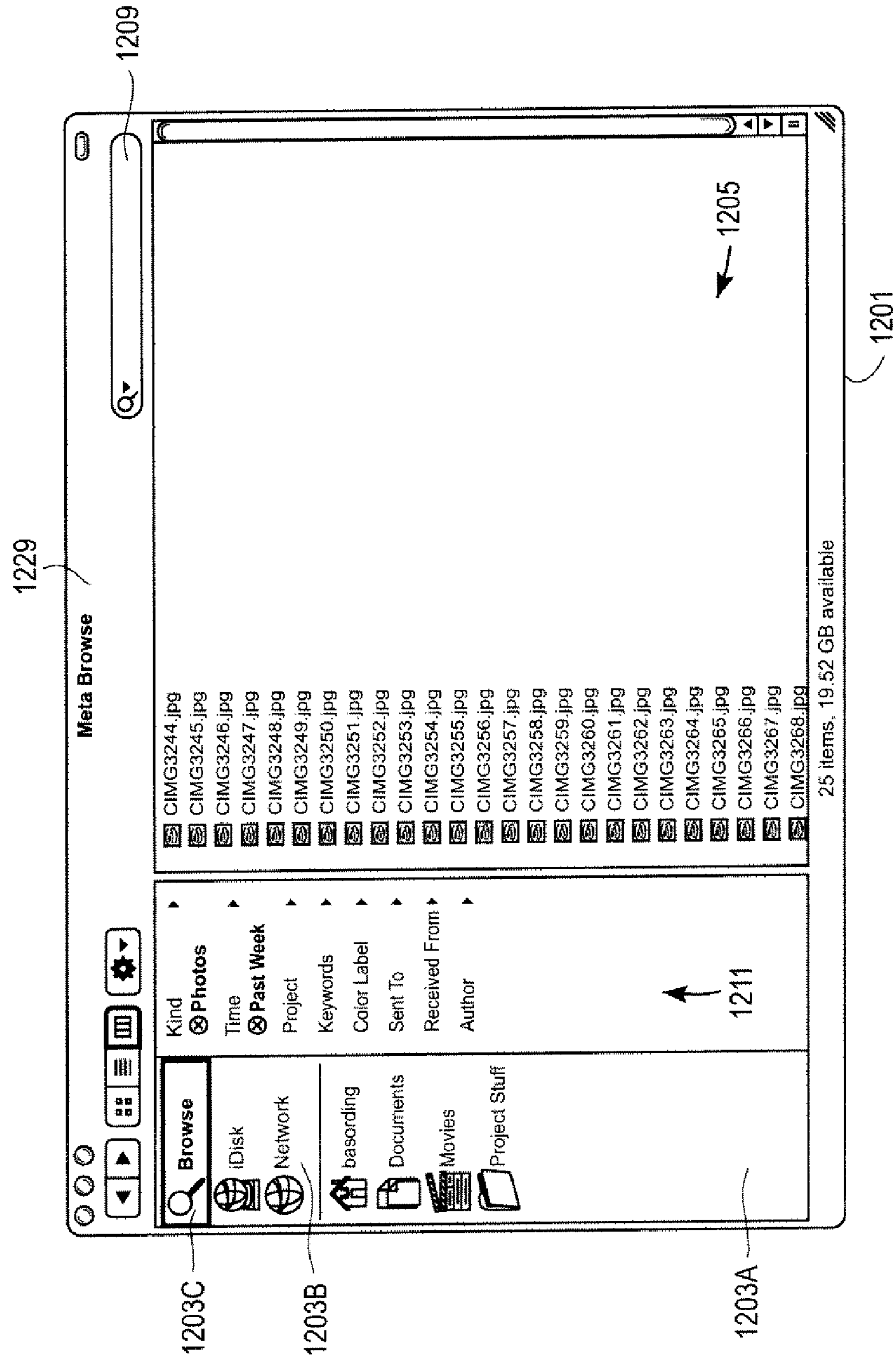

The window 1201 shown in FIGS. 12A and 12B includes a display region 1205 which shows the results of a search; these results may be shown dynamically as the user enters search parameters or the results may be shown only after the user has instructed the system to perform the search (e.g. by selecting a "perform search" command). The window 1201 includes conventional window controls, such as a resizing control 1231, a scrolling control 1221, a title bar 1229 which may be used to move the window, a window close button, a window minimize button, and a window resize button 1234, 1235, and 1236, respectively. The window 1201 also includes a user-configurable side bar region 1203A and a system specified side bar region 1203B. It can be seen from FIG. 12A that a browse mode has been selected as indicated by the highlighted "browse" icon 1203C in the system specified side bar region 1203B. The window 1201 also includes a text entry region 1209, which a user may use to enter text for a search, and the window 1201 also includes view selector buttons 1237.

A column 1211 of window 1201 allows a user to select various search parameters by selecting one of the options which in turn causes the display of a submenu that corresponds to the selected option. In the case of FIG. 12A, the user has selected the "kind" option 1212 and then has used the submenu 1214 to select the "photos" option from the submenu, resulting in an indicator 1213 (photos) to appear in the column 1211 under the "kind" option as shown in FIG. 12A. It can also be seen that the user has previously selected the "time" option in the column 1211 and has selected from a submenu brought up when the "time" option was selected the "past week" search parameter. When the user has finished making selections of the various options and suboptions from both the column 1112 and any of the corresponding submenus which appear, then the display showed in FIG. 12B appears. Note that the submenus are no longer present and that the user has completed the selection of the various options and suboptions which specify the search parameters. Column 1211 in FIG. 12B provides feedback to the user indicating the exact nature of the search query (in this case a search for all photos dated in the past week), and the results which match the search query are shown in the display region 1205.

Figure 12C:
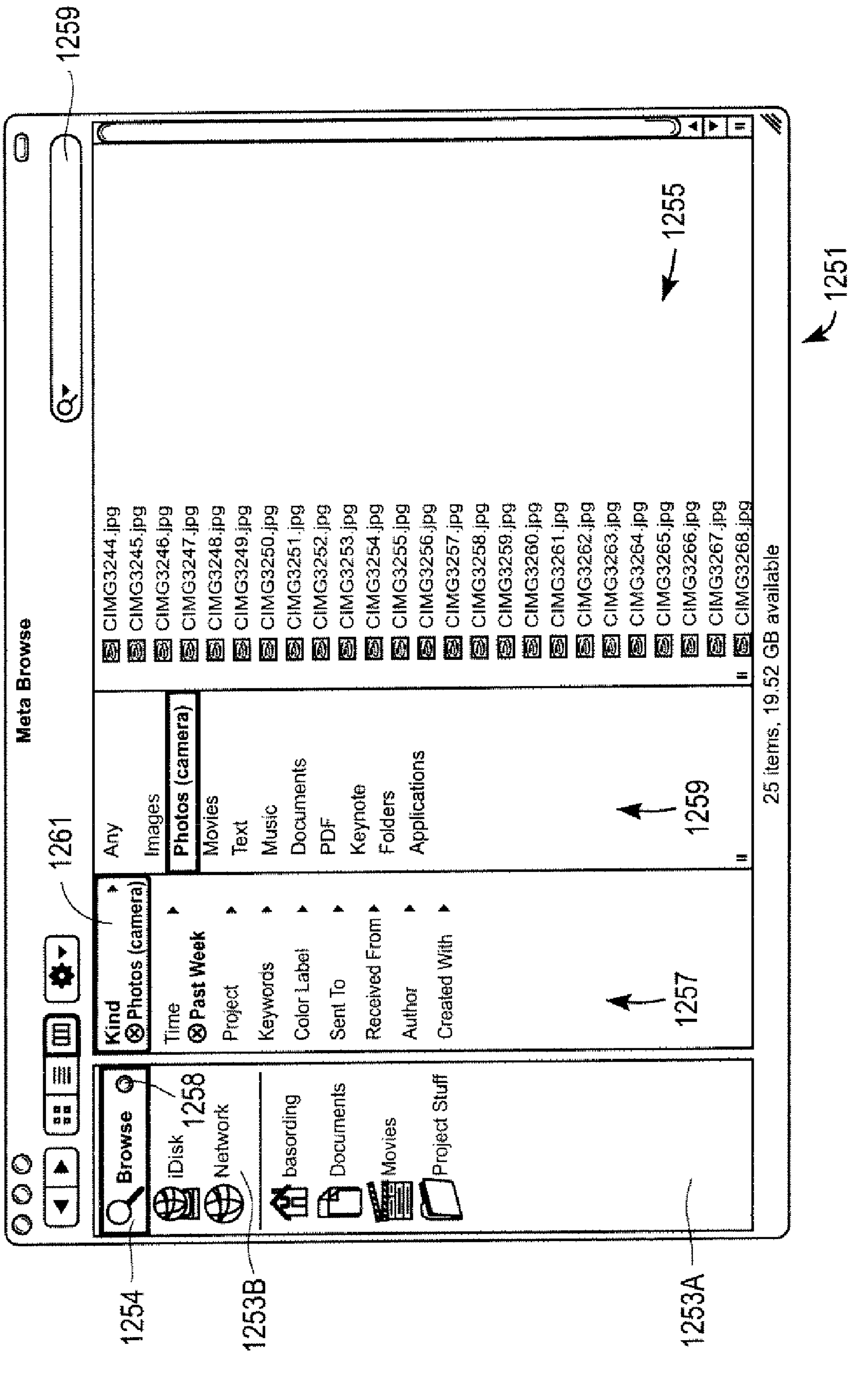
Figure 12D:
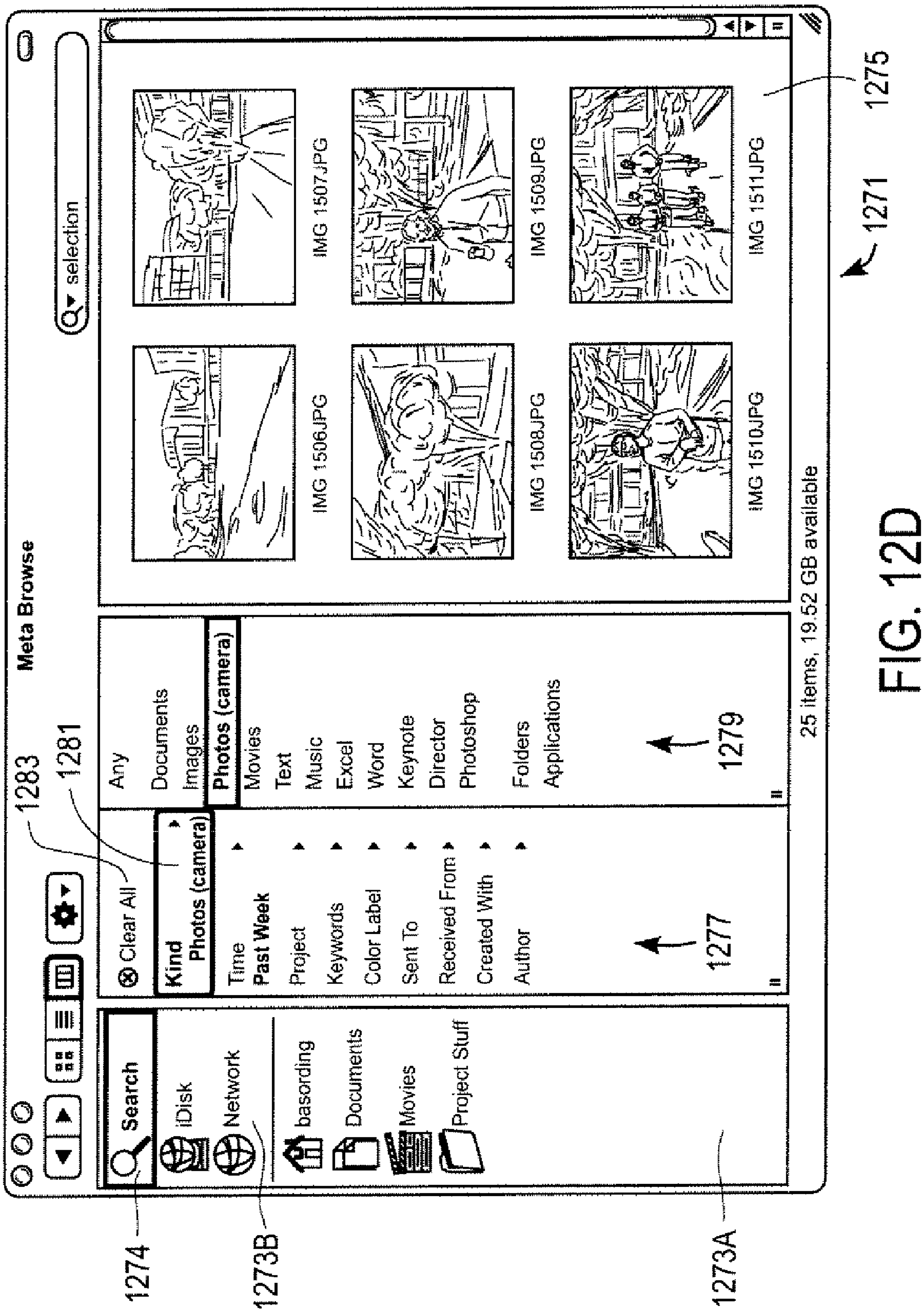

FIGS. 12C and 12D show an alternative embodiment in which the submenus which appear on a temporary basis in the embodiment of FIGS. 12A and 12B are replaced by an additional column which does not disappear after a selection is made. In particular, the column 1259 of the window 1251 functions in the same manner as the submenu 1214 except that it remains within the window 1251 after a selection is made (wherein the submenu 1214 is removed from the window after the user makes the selection from the submenu). The column 1279 of window 1271 of FIG. 12D is similar to the column 1259. The window 1251 includes a side bar which has a user-configurable side bar region 1253A and a system defined side bar region 1253B. The system specified side bar region 1253B includes a "browse" selection region 1254 which has a clear button 1258 which the user may select to clear the current search query. The window 1271 of FIG. 12D provides an alternative interface for clearing the search query. The window 1271 also includes a user configurable side bar region 1273A and a system specified side bar region 1273B, but the clear button, rather than being with the "search" region 1274 is at the top of the column 1277. The user may clear the current search parameter by selecting the button 1283 as shown in FIG. 12D.

Figure 13A:
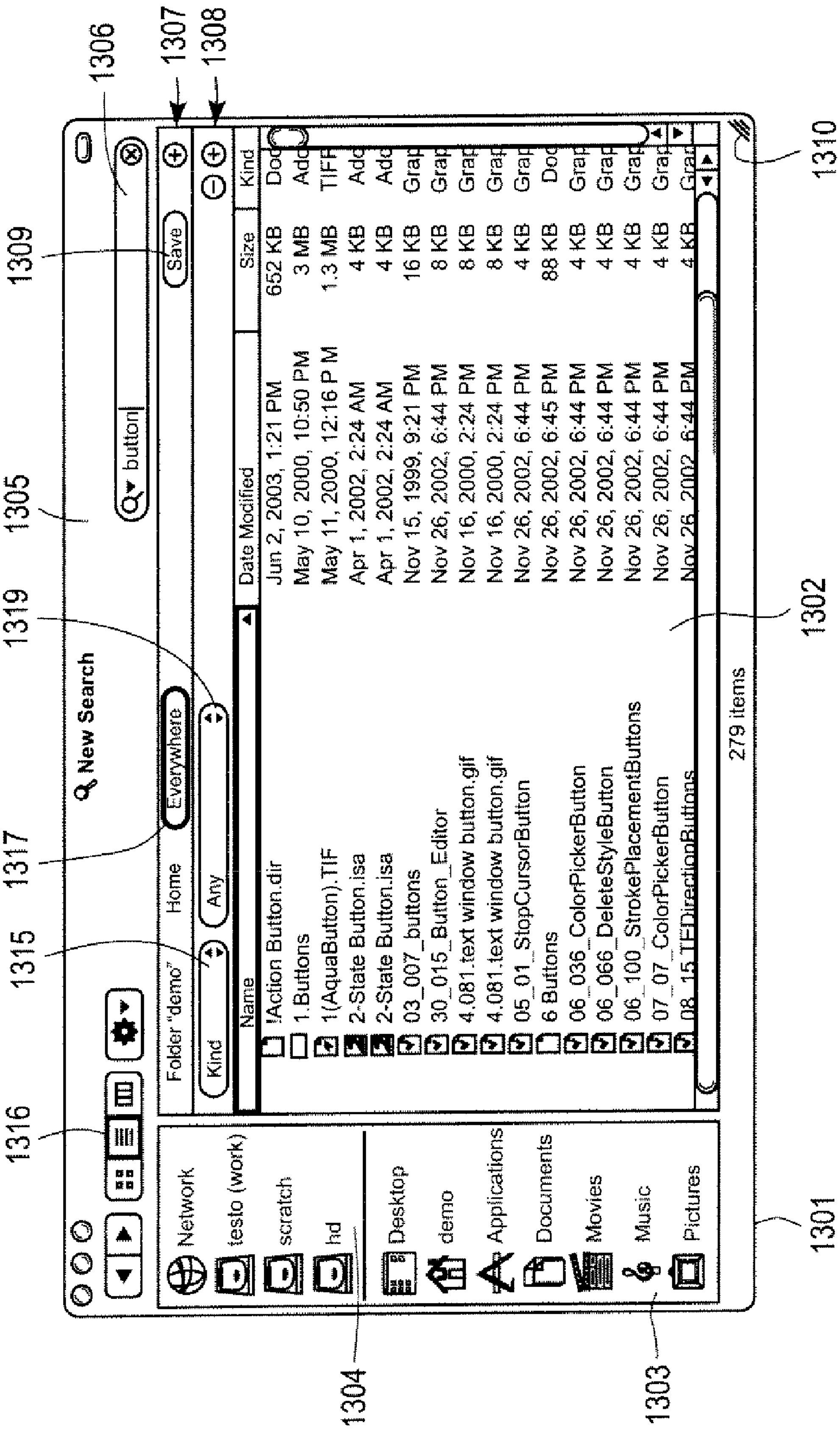
FIGS. 13A and 13B show further alternative embodiments of user interfaces according to the present invention.
Figure 13B:
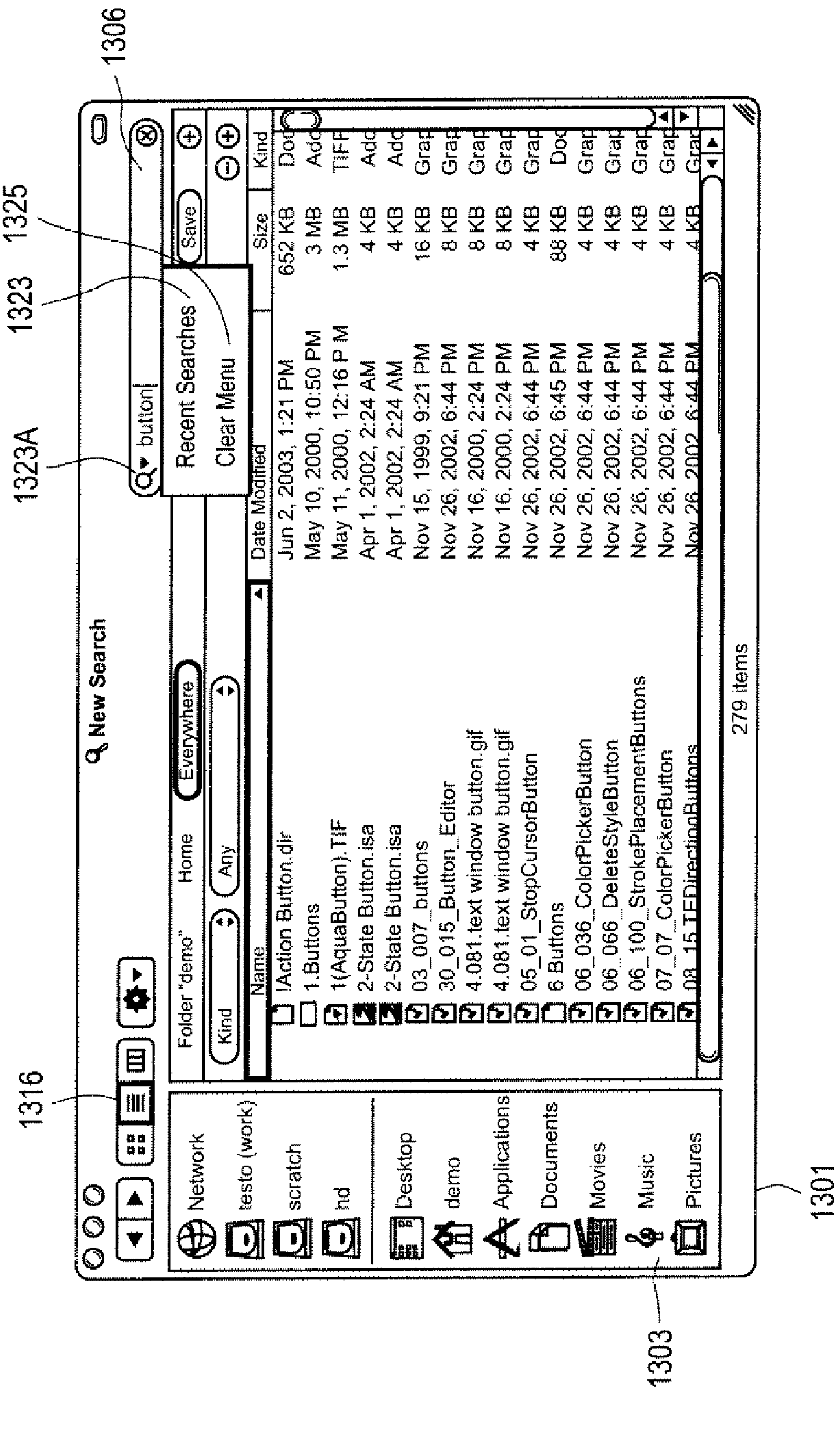

FIG. 13A shows another embodiment of a window 1301 which displays search results within a display region 1302. The window 1301 may be a closeable, minimizeable, resizeable, and moveable window having a resizing control 1310, a title bar 1305 which may be used to move the window, a text entry region 1306 and a user configurable portion 1303, and a system specified portion 1304. The window 1301 further includes buttons for selecting various views, including an icon view, a list view, and a column view. Currently, the list view button 1316 has been selected, causing the display of the search results in a list view manner within the display region 1302. It can be seen that the text ("button") has been entered into the text entry region 1306 and this has caused the system to respond with the search results shown in the display region 1302. The user has specified a search in every location by selecting "everywhere" button 1317. Further, the user has searched for any kind of document by selecting the "kind" option from the pull down menu 1315 and by selecting the "any" option in the pull down menu 1319. The where or location slice 1307 includes a "+" button which may be used to add further search parameters, and similarly, the slice 1308 includes a "+" and a "–" button for adding or deleting search parameters, respectively. The slice 1307 further includes a "save" button 1309 which causes the current search query to be saved in the form of a folder which is added to the user configurable portion 1303 for use later. This is described further below and may be referred to as a "smart folder." The search input user interface shown in FIGS. 13A and 13B is available within, in certain embodiments, each and every window controlled by a graphical user interface file management system, such as a Finder program which runs on the Macintosh or Windows Explorer which runs on Microsoft Windows. This interface includes the text entry region 1306 as well as the slices 1307 and 1308.

The window 1301 shown in FIG. 13B shows the activation of a menu by selecting the search button 1323A, causing a display of a menu having two entries 1323 and 1325. Entry 1323 displays recently performed searches so that a user may merely recall a prior search by selecting the prior search and cause the prior search to be run again. The menu selection 1325 allows the user to clear the list of recent searches in the menu.

Figure 14A:
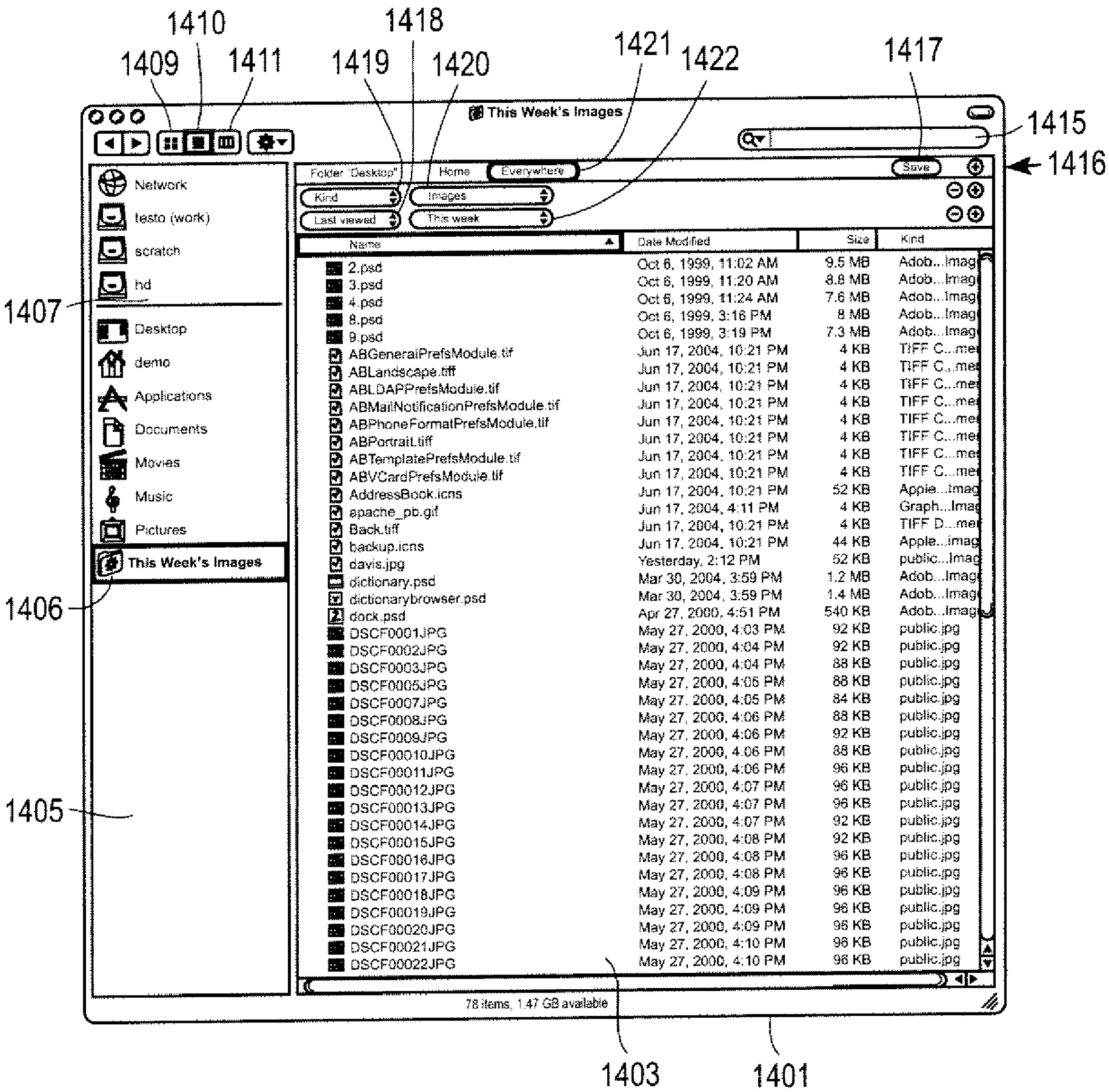
FIGS. 14A, 14B, 14C, and 14D show further alternative embodiments of user interfaces according to the present invention.
Figure 14B:
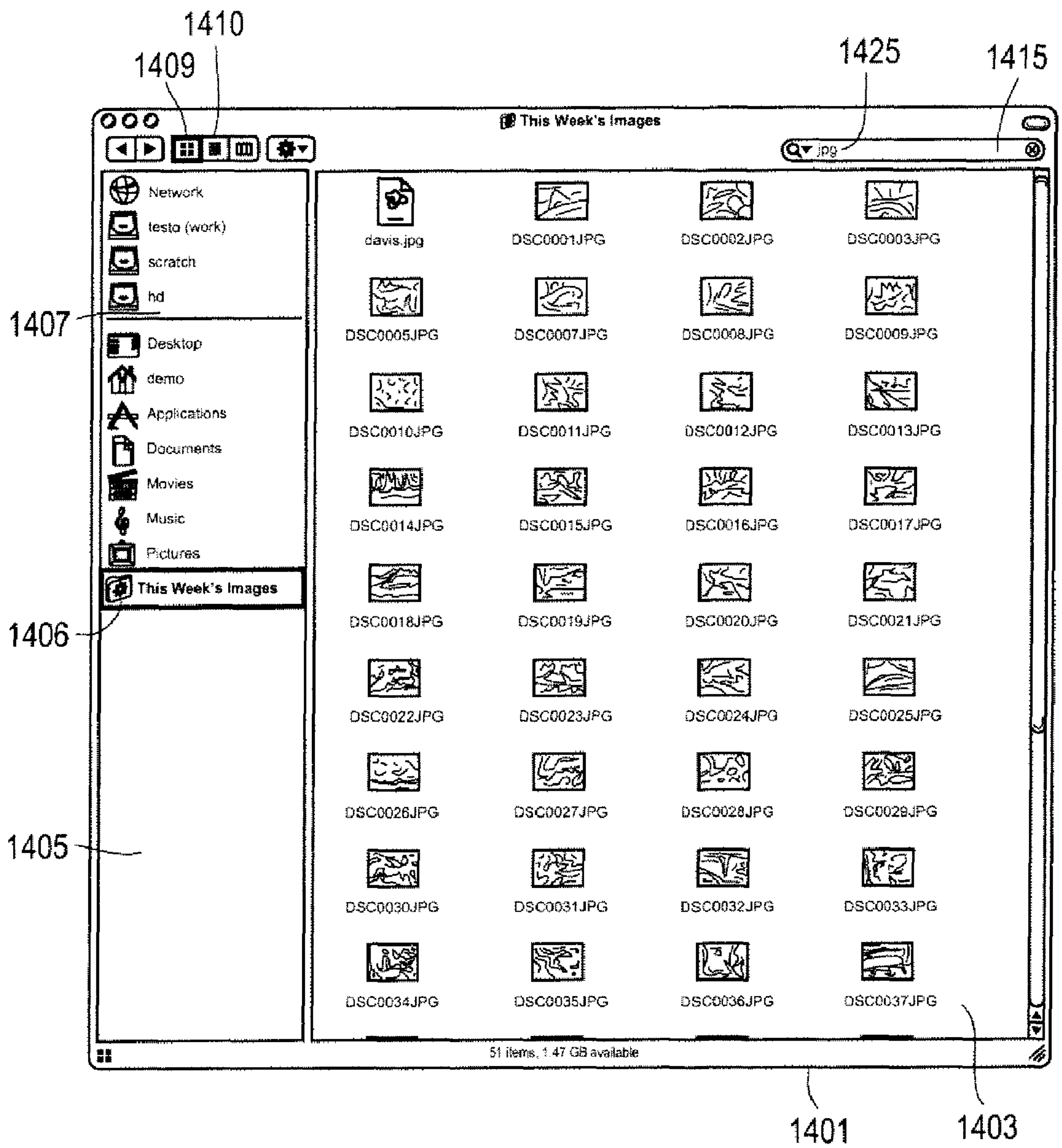
Figure 14C:
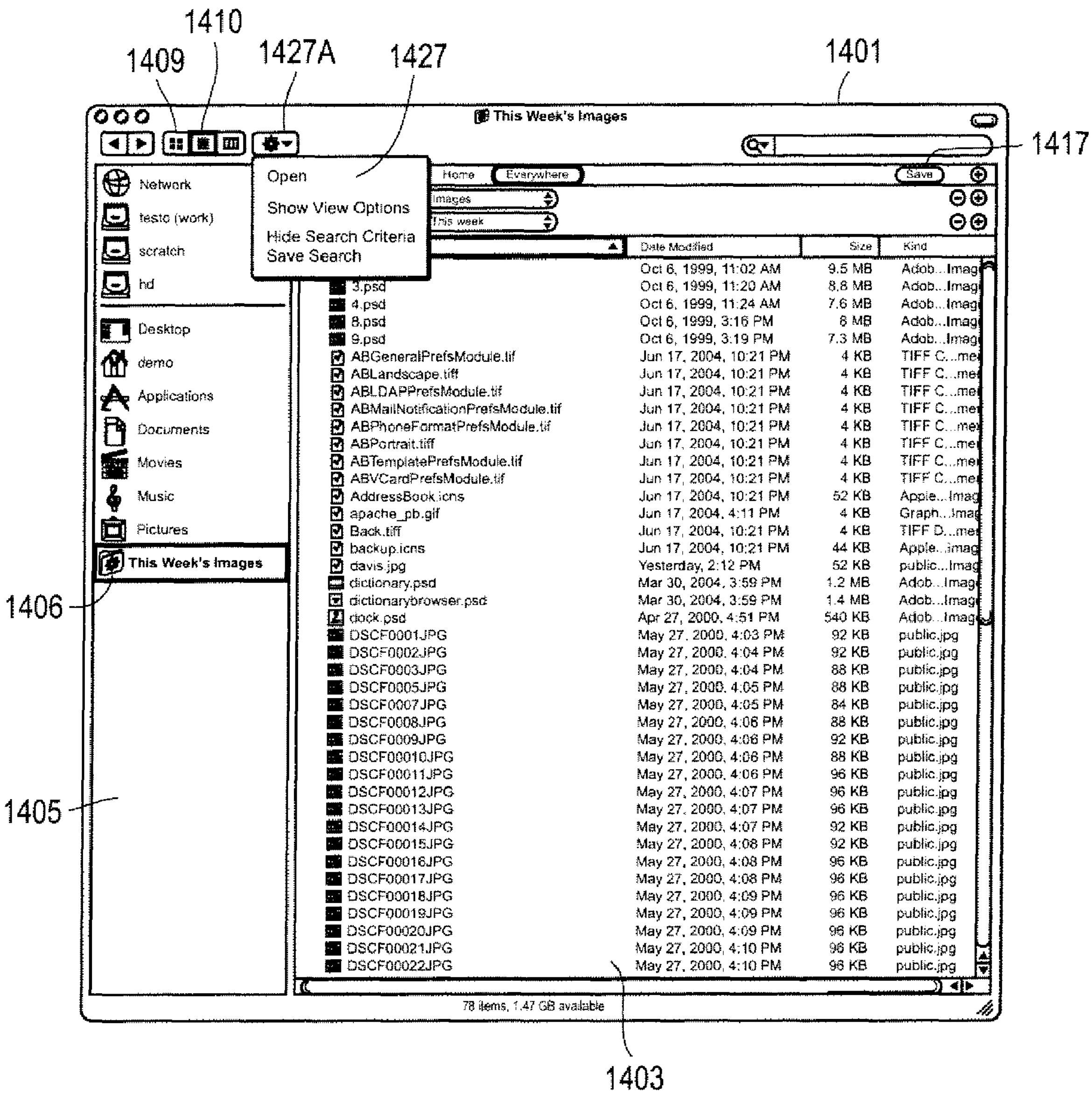

FIGS. 14A, 14B, and 14C show examples of another window in a graphical user interface file system, such as the Finder which runs on the Macintosh operating system. These windows show the results of a particular search and also the ability to save and use a smart folder which saves a prior search. The window 1401 shown in FIG. 14A includes a display region 1403, a user configurable region 1405, a smart folder 1406, a system specified region 1407, an icon view button 1409, a list view button 1410, and a column view button 1411. The window 1401 also includes a text entry region 1415 and a location slice 1416 which may be used to specify the location for the search, which slice also includes a save button 1417. Additional slices below the slice 1416 allow the user to specify further details with respect to the search, in this case specifying types of documents which are images which were last viewed this week. The user has set the search parameters in this manner by selecting the "kind" option from the pull down menu 1419 and by selecting the "images" type from the pull down menu 1420 and by selecting the "last viewed" option from pull down menu 1418 and by selecting "this week" from the pull down menu 1422. The user has also selected "everywhere" by selecting the button 1421 so that the search will be performed on all disks and storage devices connected to this system. The results are shown within the display region 1403. The user can then save the search query by selecting the "save" button 1417 and may name the saved search query as "this week's images" to produce the smart folder 1406 as shown in the user configurable portion 1405. This allows the user to repeat this search at a later time by merely selecting the smart folder 1406 which causes the system to perform a new search again, and all data which matches the search criteria will be displayed within the display region 1403. Thus, after several weeks, a repeating of this search by selecting the smart folder 1406 will produce an entirely different list if none of the files displayed in the display region 1403 of FIG. 14A are viewed in the last week from the time in which the next search is performed by selecting the smart folder 1406.

FIG. 14B shows a way in which a user may sort or further search within the search results specified by a saved search, such as a smart folder. In the case of FIG. 14B, the user has selected the smart folder 1406 and has then entered text "jpg" 1425 in the text entry region 1415. This has caused the system to filter or further limit the search results obtained from the search query saved as the smart folder 1406. Thus, PhotoShop files and other files such as TIF files and GIF files are excluded from the search results displayed within the display region 1403 of FIG. 14B because the user has excluded those files by adding an additional search criteria specified by the text 1425 in the text entry region 1415. It can be seen that the "jpg" text entry is ANDed logically with the other search parameters to achieve the search results displayed in the display region 1403. It can also be seen that the user has selected the icon view by selecting the icon view button 1409. Thus, it is possible for a user to save a search query and use it later and to further limit the results of the search query by performing a search on the results of the search query to further limit the search results. An aspect of this further limiting of the search results from a saved search query is described below and may be referred to as hierarchical smart folders.

FIG. 14C shows the window 1401 and shows the search results displayed within the display region 1403, where the results are based upon the saved search specified by the smart folder 1406. The user has caused a pull down menu 1427 to appear by selecting the pull down region 1427A. The pull down region 1427 includes several options which a user may select. These options include hiding the search criteria or saving the search (which is similar to selecting the button 1417) or showing view options or opening the selected file. This allows the user, for example, to hide the search criteria, thereby causing the slice 1416 and the other search parameters to be removed from the window 1401 which is a moveable, resizeable, minimizeable, and closeable window.

Figure 14D:
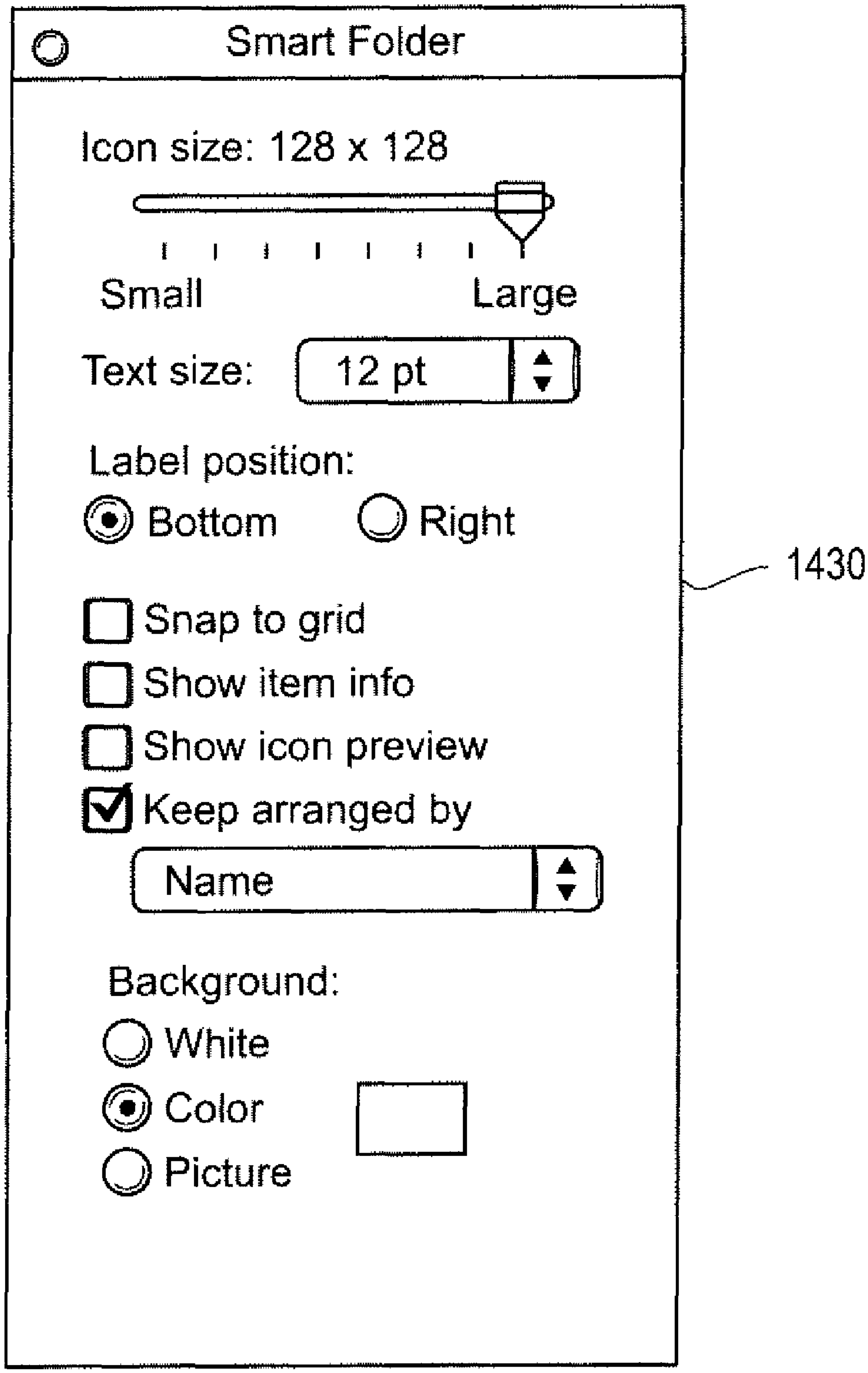

FIG. 14D shows an example of a user interface which allows the user to specify the appearance of a smart folder, such as the smart folder 1406.

Figure 23:
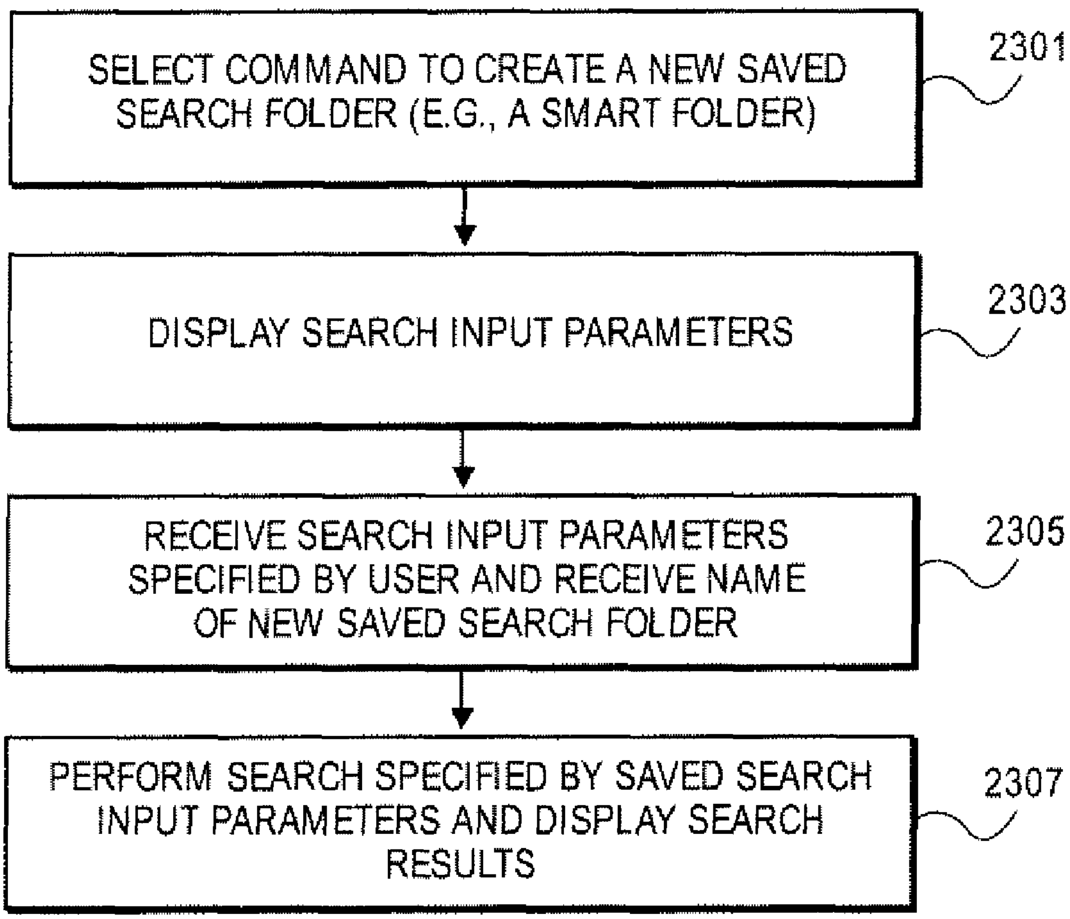
FIG. 23 is a flowchart showing an exemplary method for creating a saved search folder.
Figure 24:
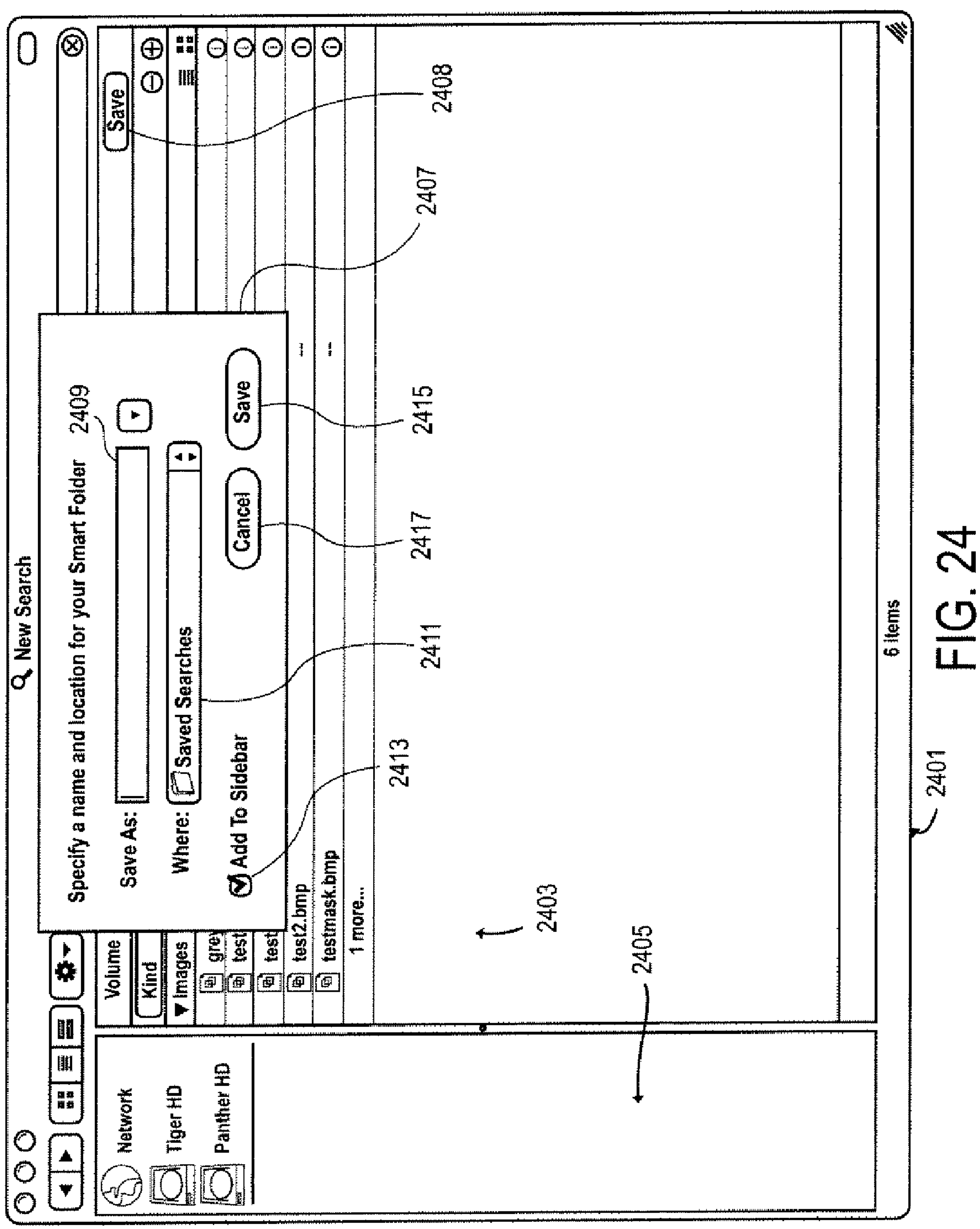
FIG. 24 shows an exemplary user interface for creating a saved search folder.

A saved search folder may also be created before doing a search rather than after a search has been performed. An exemplary method for creating a saved search folder before a search is performed is shown in FIG. 23. In operation 2301, a data processing system receives a command to create a new saved search folder. This command may be from the selection of an option in a pull down menu or from a user's activation of a button on a graphical user interface. In operation 2303, the system may then display an interface for selecting or inputting search input parameters. The system then receives, in operation 2305, the inputted search input parameters specified by a user as well as a name of the new saved search folder. Then in operation 2307, the system performs the search specified by the saved search folder and displays the search results in an interface, such as a window.

FIGS. 24, 25, 26, 27 and 28 show examples of graphical user interfaces for creating, editing, and using one or more saved search folders, such as a "smart" folder. Window 2401 may be a typical window found in the Macintosh 10.3 operating system (referred to as "Panther"), and thus the window may be resizeable, moveable, closeable, and capable of being minimized through the activation of various interface features. The window 2401 also includes a side bar region 2405 and a main display region 2403. The main display region 2403 shows, in FIG. 24, the results of a search. The user has decided to save this search and has instructed the system to do so by activating a button, such as the "save" button 2408. This can cause the display of the naming panel 2407 which includes a text field 2409 into which a user may enter the name for the saved search folder. The panel 2407 also includes a location menu 2411 which the user can use to select the location of the saved search folder. The panel 2407 also includes a save button 2415 and a cancel button 2417 as well as a check box 2413. Activation of the save button 2415 causes the smart folder to be saved in the location specified by the location menu 2411. If the check box 2413 is checked, then a representation, such as an icon, of the saved search folder will appear in the side bar 2405. If the user activates the cancel button 2417, then the system closes the naming panel 2407 and the search query is not saved as a saved search folder.

Figure 25:
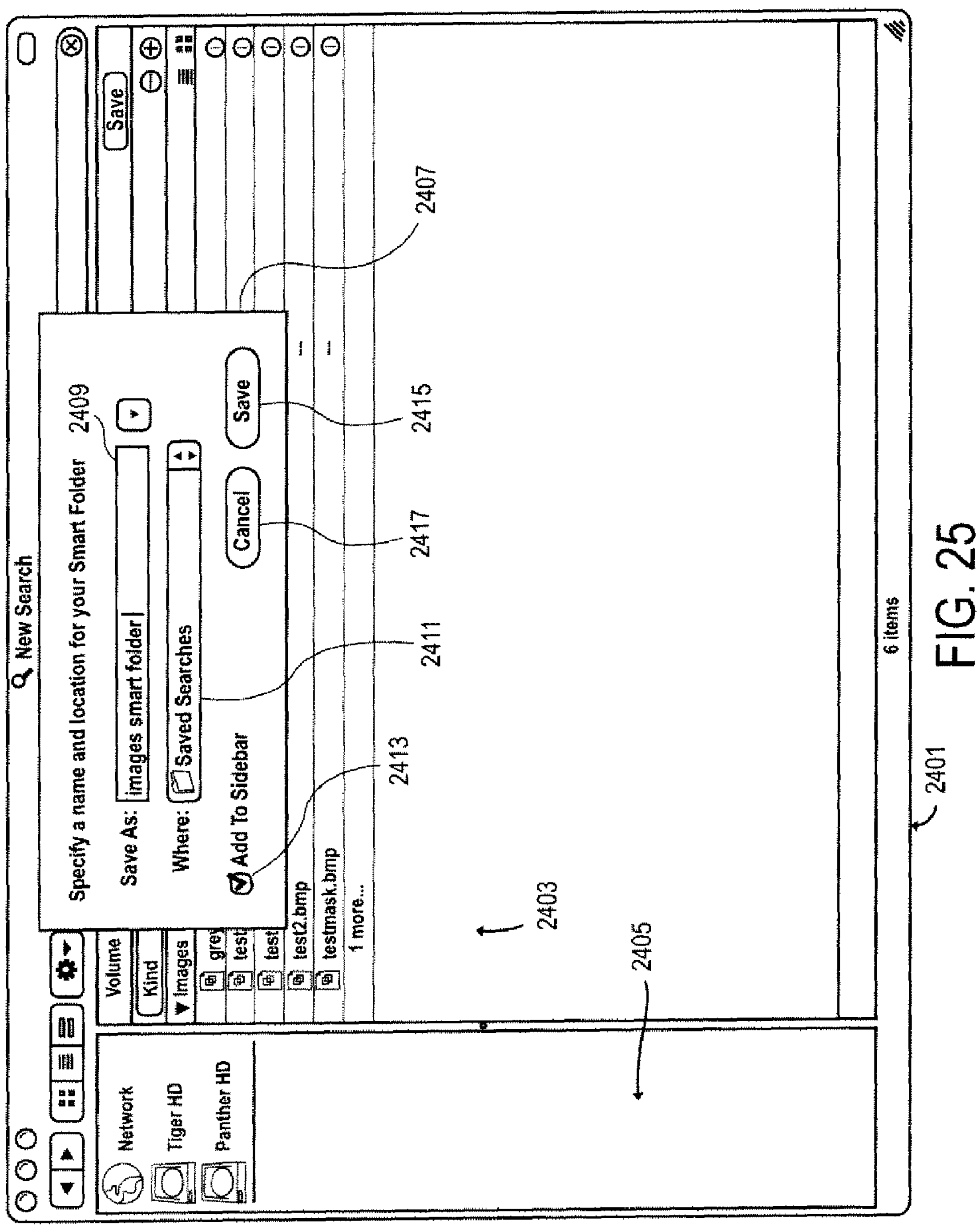
FIG. 25 shows a further user interface for creating a saved search folder.
Figure 26:
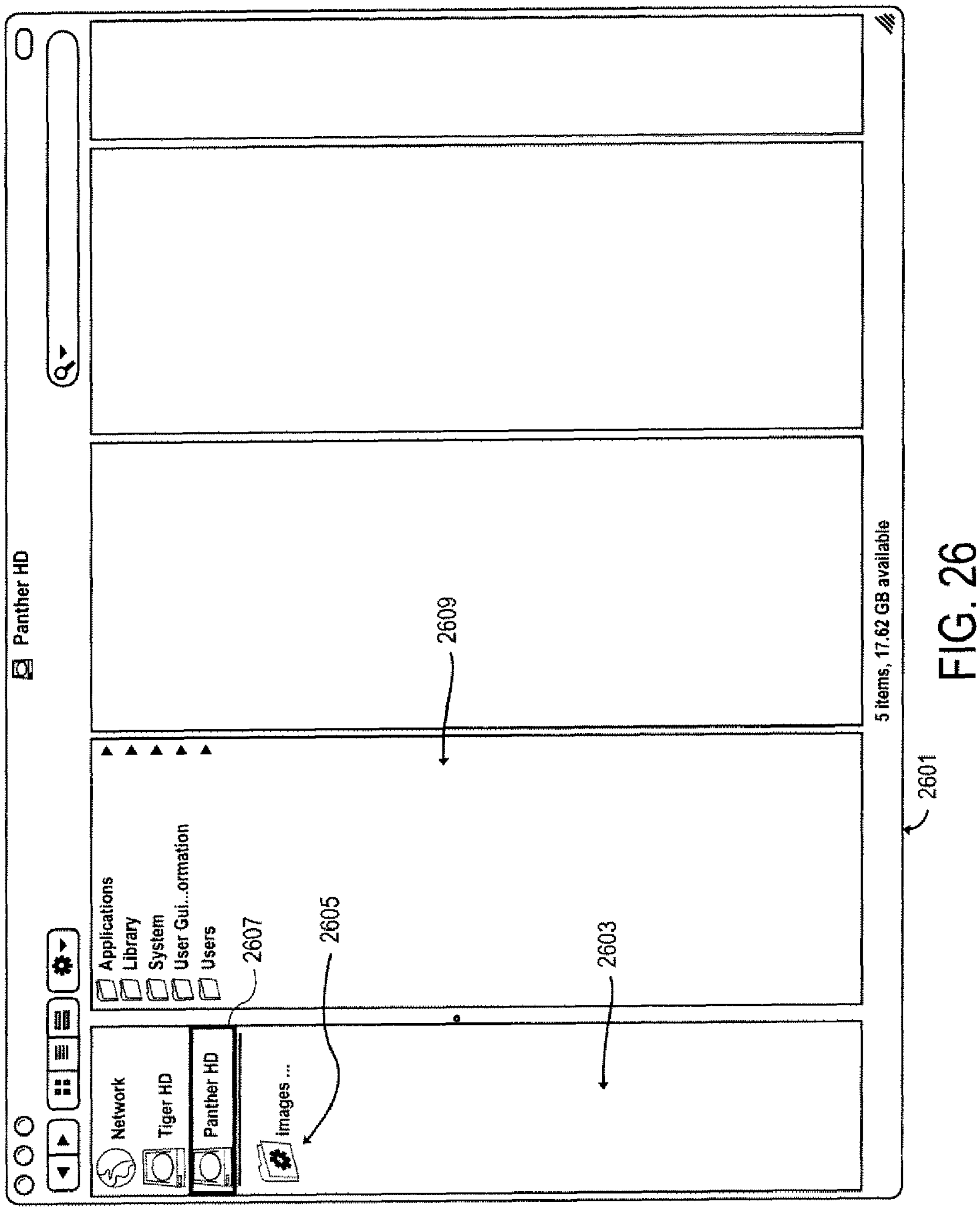
FIG. 26 and FIG. 27 and FIG. 28 show user interfaces for using a saved search folder.
Figure 27:
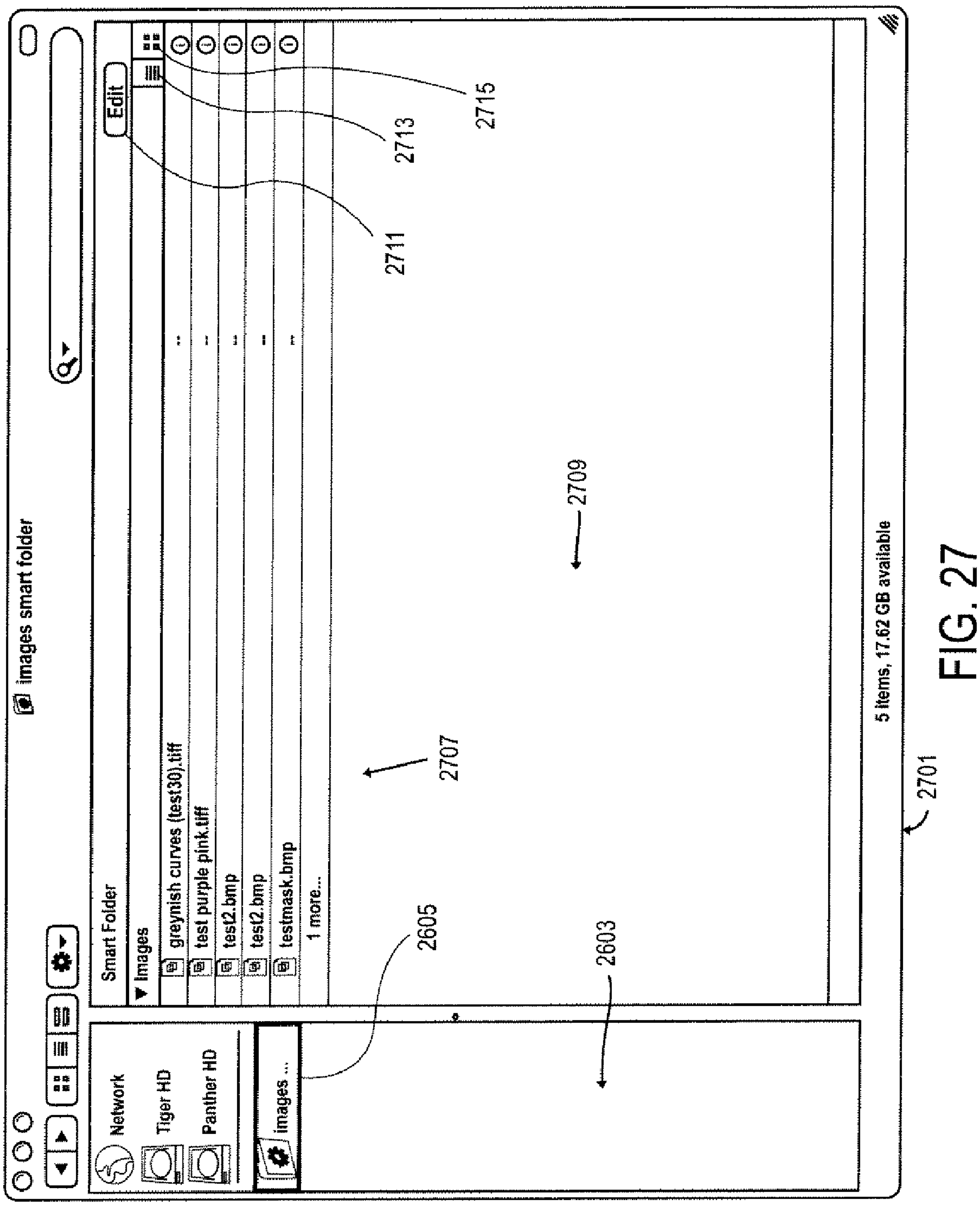
Figure 28:
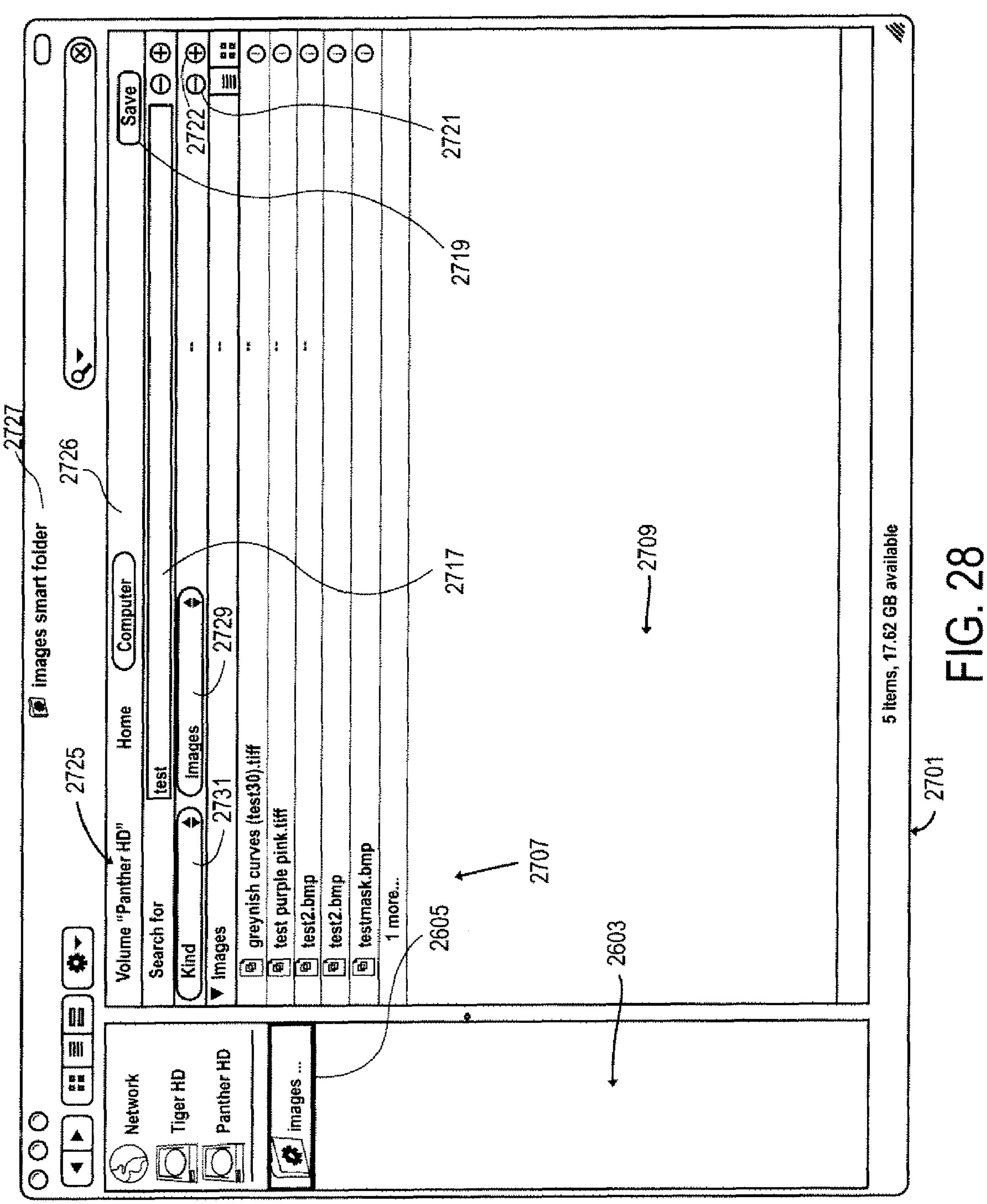

FIG. 25 shows the window 2401 after the user has entered text into the text input field 2409. The user can then save the new saved search folder by activating the save button 2415 (e.g. by positioning a cursor over the save button 2415 and by pressing a mouse button or by otherwise signaling to the computer to activate the button). The saving of the new smart folder may, in one embodiment, cause the system to close the folder and also cause an icon of the saved search folder to appear in the side bar. FIG. 26 shows an example of a saved search folder which has been added to the side bar. In particular, the window 2601 includes a side bar 2603 which displays an icon of a saved search folder 2605 which was created from the operations shown in FIG. 25. The first panel 2609 of the window 2601 shows folders which are contained within the volume "Panther HD" indicated by icon 2607. The selection of the icon 2605, which represents the saved search folder, causes the system to perform the search specified by the saved search folder and to display the search results within a window. This can be seen in FIG. 27 in which the user has selected the icon 2605 in the side bar region 2603, causing the display of a plurality of files 2707 within the main display portion 2709 of the window 2701. The files 2707 represent the results of this current search performed through the use of the saved search folder which specifies a saved search query. These results represent all of the current files which match the search query. Buttons 2713 and 2715 allow a user to change the views within the main portion 2709 from a list view shown in FIG. 27 to an icon view. Currently, button 2713 has been activated, resulting in the list view. The user may edit the saved search folder by selecting the edit button 2711 which results in the display of the window 2701 shown in FIG. 28. The edit button changes from an edit button to a save button 2719 and an upper portion of the window now includes a text entry field 2717 as well as pull down menus which allow for the selection of various search input parameters. The pull down menu 2731 allows for the selection of a type of a search input parameter, such as a "kind" type, and the pull down menu 2729 allows for the selection of a further specification of that type. In the example shown in FIG. 28, the user has selected "kind" from the pull down menu 2731 and "images" from the pull down menu 2729 and has entered the word "test" in the text input field 2717. This represents the originally saved search input or search query for the images smart folder saved from the interface shown in FIG. 25. This may be edited by changing the text within the text input field 2717 or by selecting a different parameter from either of the pull down menus 2731 and 2729. Furthermore, the search input may be varied or edited by adding additional search parameters by selecting the "addition" button 2722, or a search parameter may be removed by selecting the "subtraction" button 2721. The window 2721 in its upper portion includes a slice 2726 which allows for the selection of various search locations and which also specifies, by indicator 2725, the presently selected location. The window also includes the name of the saved search folder in the title region 2727.

Figure 29:
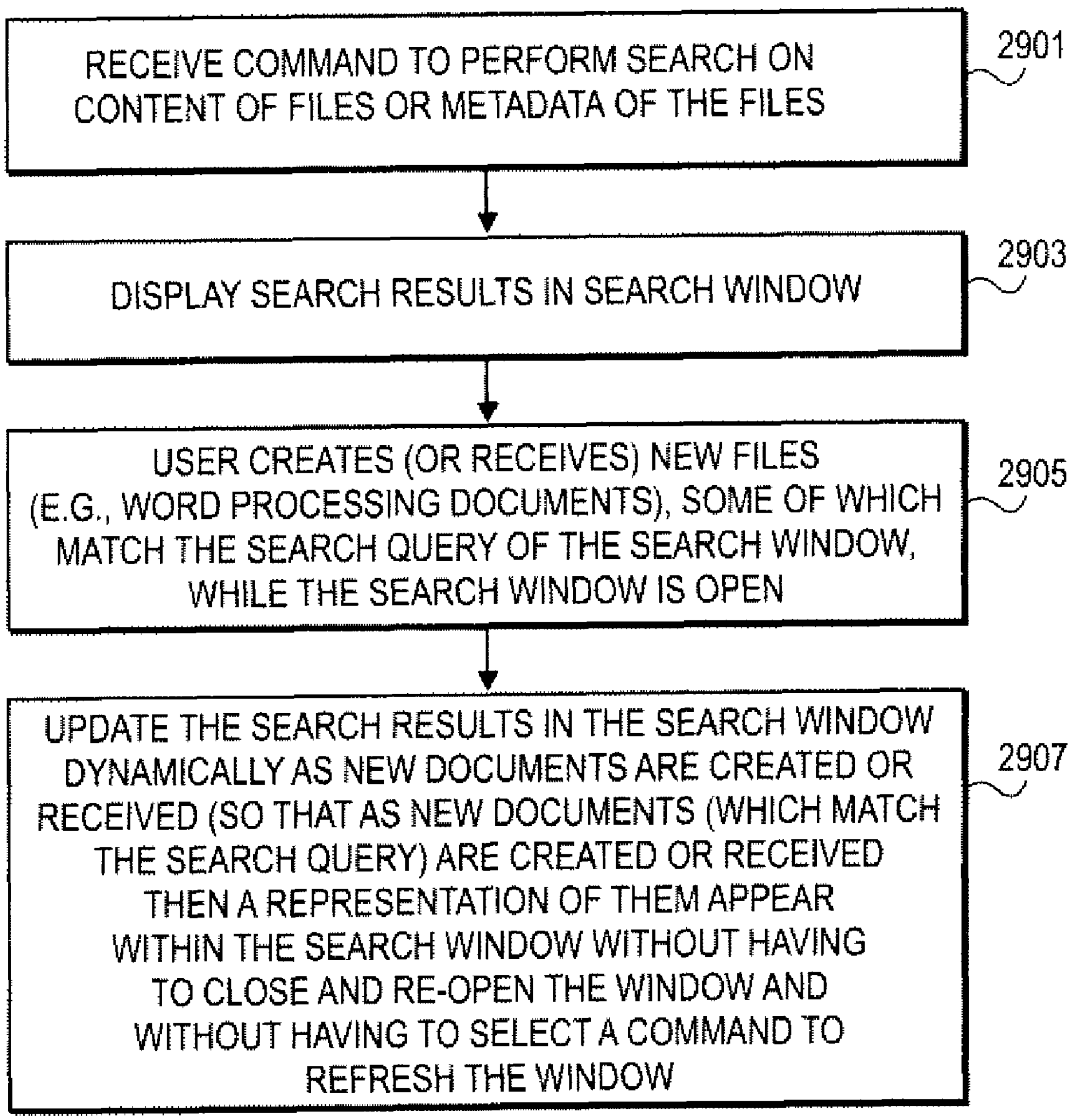
FIG. 29 is a flowchart which shows an exemplary embodiment for live updating of search results within a search window as new documents are created or received in the system which is being searched.

One attribute of windows which display search results, according to at least certain embodiments of the present invention, is the ability for live updating, wherein the results in the search results window are dynamically updated as new documents are created or received by the system which is executing the search. FIG. 29 shows an exemplary method for providing live updating of search results windows. In operation 2901, the system receives a command to perform a search on the content of files or metadata of the files. This input may be a result of opening a saved search folder or the result of typing text in a search input field or by selecting one or more search parameters and causing the system to do a search. In operation 2903, the system responds by displaying the search results in a search window. While this search window is still displayed, the user may create or receive new files, such as word processing files or documents or email messages, some of which match the search query of the search window which is still open. This is shown in operation 2905 of FIG. 29. Then in operation 2907, the system updates automatically the search results in the search window dynamically as the new documents are created or received. Thus, as new documents which match the search query are created or received, then a representation of them appear within the search result window without having to close and reopen the window and without having to select a command to refresh the window.

Figure 30:
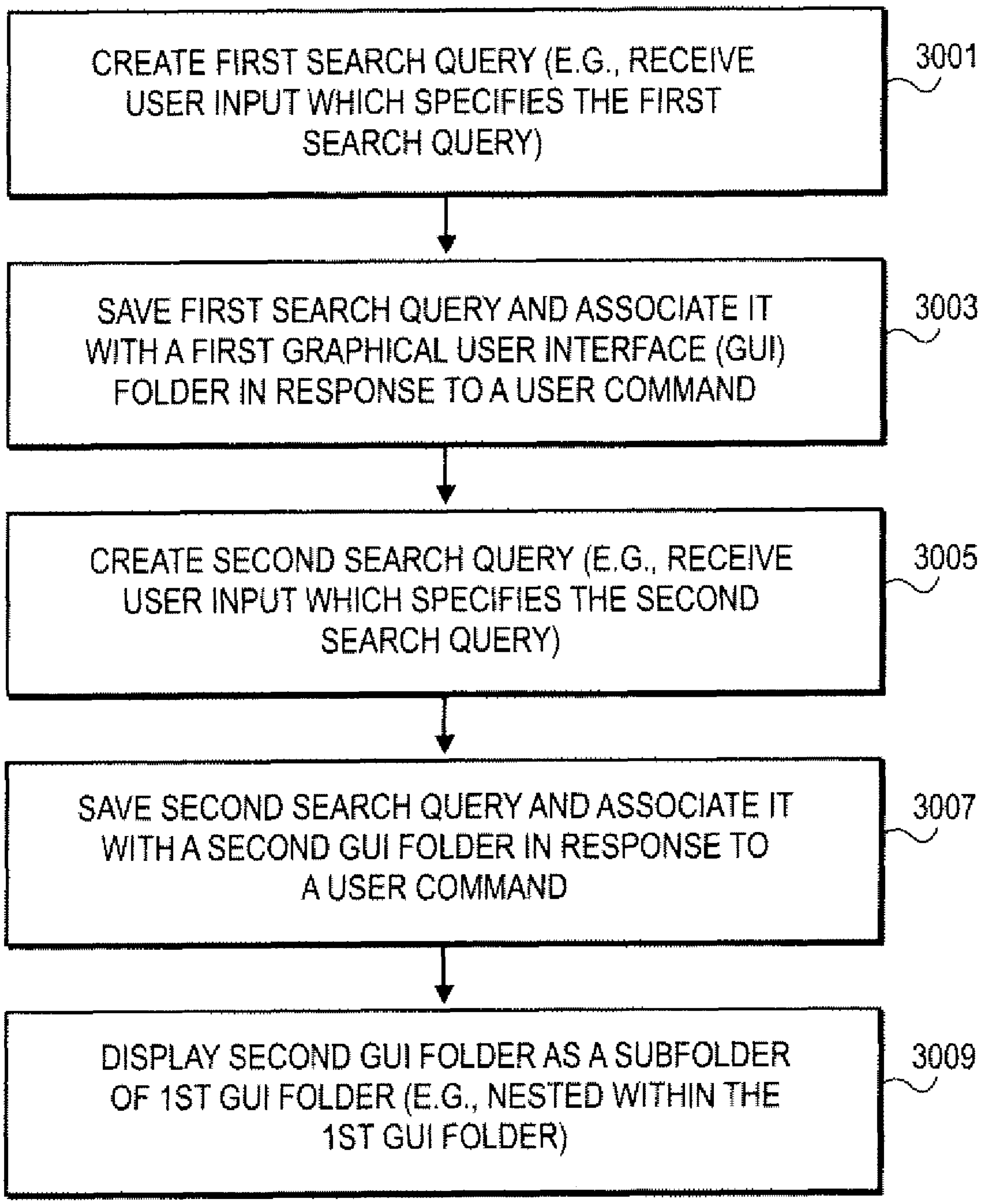
FIG. 30 is a flowchart which shows one exemplary embodiment for creating a hierarchy of saved search folders or subdirectories.
Figure 31:
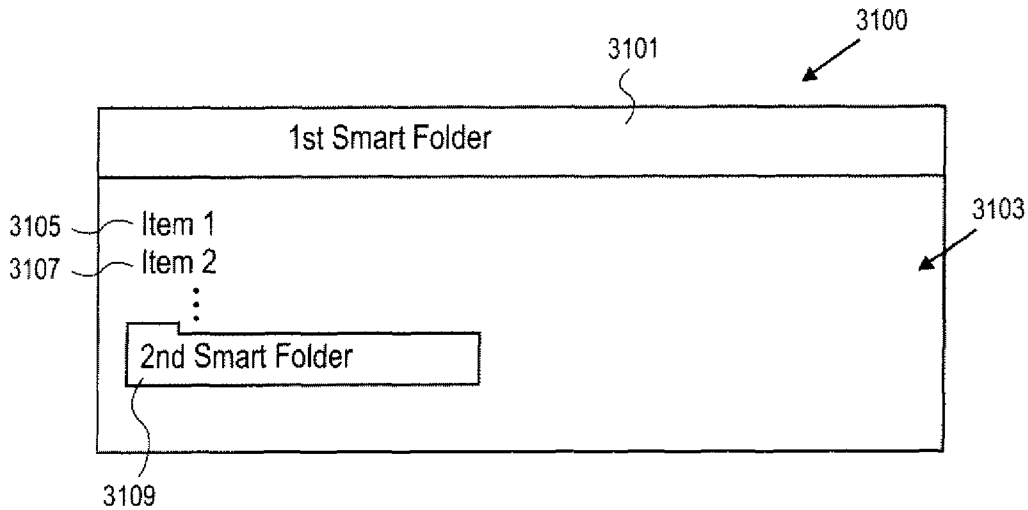
FIG. 31 shows an exemplary user interface, such as a window, for a first saved search folder which encloses, in a hierarchical manner, a second saved search folder.
Figure 32:
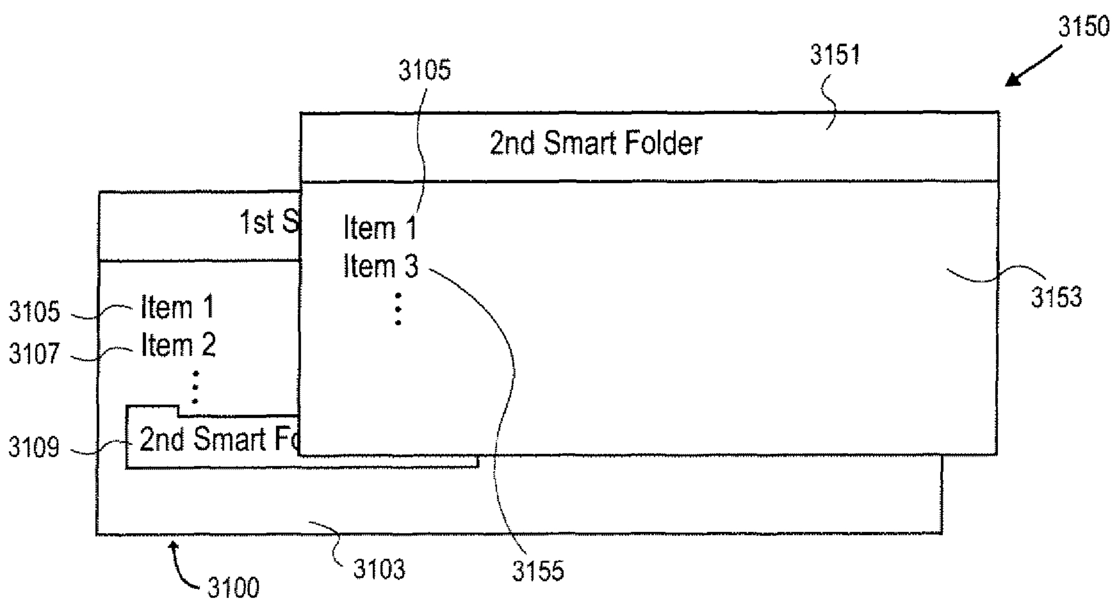
FIG. 32 shows another exemplary user interface wherein the second saved search folder, which may be considered a subfolder of the first saved search folder, has been opened in a separate window which overlaps the window showing the contents of the first saved folder.

FIGS. 30, 31, 32, 33, and 34 illustrate exemplary embodiments in which a plurality of saved search folders have a hierarchical relationship among themselves, such as a predetermined relationship in a graphical user interface. FIG. 30 shows one method for creating such a hierarchy. In operation 3001, a first search query is created; this may occur as a result of receiving user input which specifies this first search query and user input which specifies that the first search query is to be saved. The system responds in operation 3003 by saving the first search query and by associating it with a first graphical user interface folder in response to the user command. Then in operation 3005 a second search query is created, and this second search query is saved and associated with a second graphical user interface folder in response to a user command in operation 3007. Then in operation 3009, the second graphical user interface folder is displayed as a subfolder of the first graphical user interface folder. This is one exemplary form of a predetermined relationship or hierarchical relationship between the two folders. FIGS. 31 and 32 show a portion of a graphical user interface which includes one or more windows which may overlap. In particular, FIG. 31 shows the window 3100 which includes a main display portion 3103 and a title portion 3101. Within the main display portion 3103, a plurality of items, which represent the items found in the first search query, are displayed, including items 3105, 3107 and 3109. The icon 3109 represents a second saved search folder which may be opened into a second window using conventional graphical user interface techniques. For example, the user may position a mouse over the icon 3101 and select an open command or rapidly depress a button twice, causing the display of the window 3150 shown in FIG. 32, which overlaps the window 3100. The window 3150 shows the search results of the second saved search which represents the second smart folder within the main display portion 3153 of the window 3150. The second smart folder, or second saved search folder, may represent a more specific search created by adding additional search parameters in a Boolean AND operation. The graphical user interface for a hierarchy of smart folders may use overlapping windows, with one or more folders nested within another folder, as in the case of the example shown in FIGS. 31 and 32 or may use a hierarchical view within the same window, as in the case of FIGS. 5 and 6 of U.S. Pat. No. 6,486,897 which is, for the purposes of these FIGS. 5 and 6, incorporated herein by reference. Other alternative hierarchical views may also be used, such as column views or Web browser style views (which use back and forward buttons or commands to move within a hierarchy, optionally in the same window).

Figure 33:
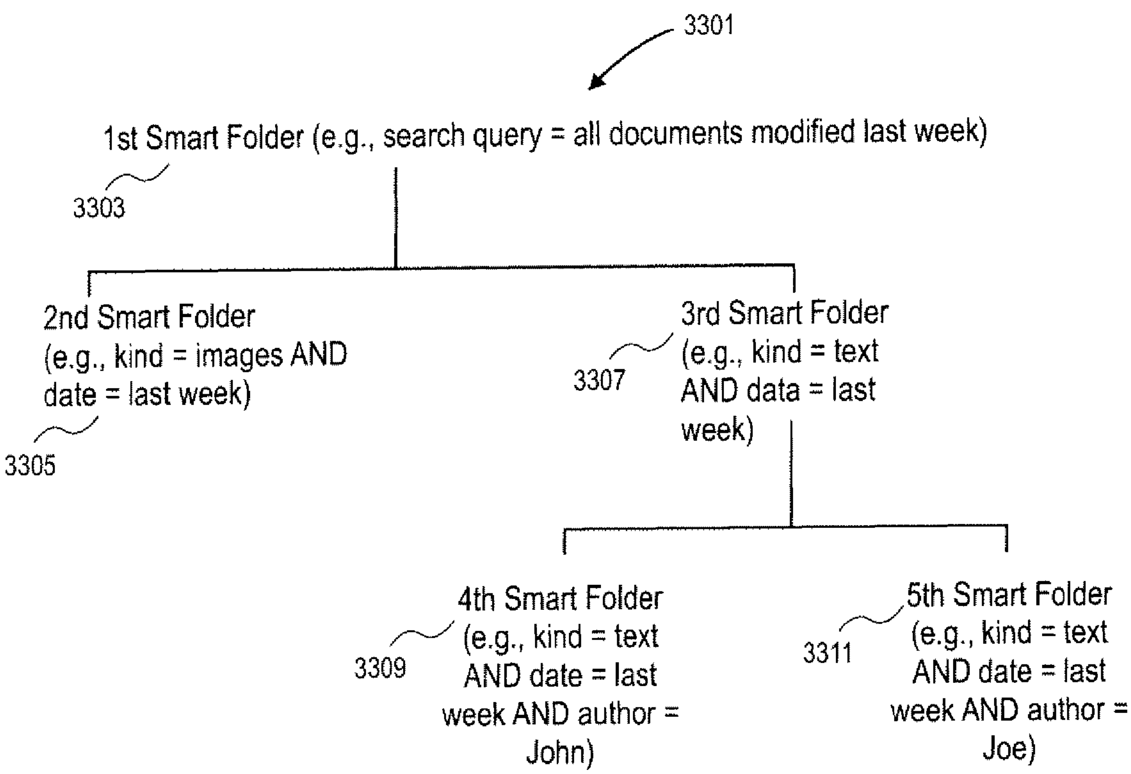
FIG. 33 shows an example of a hierarchy of saved search folders, such as smart folders.

FIG. 33 shows an example of a hierarchy created by adding search parameters with a Boolean AND operation. The hierarchy 3301 shown in FIG. 33 includes a first smart folder which represents a saved search query which causes the search for all documents which have been modified in the last week. The second smart folder modifies that first search query by adding a "kind" parameter which specifies a search for images (e.g. JPG or PhotoShop files, etc.). Thus, the second saved search query represented by the second smart folder 3305 searches for all images modified in the last week. A second smart folder may be graphically nested within the first smart folder as shown in FIGS. 31 and 32 or may be displayed or represented in other fashions to show the predetermined relationship between the two folders. The third smart folder, 3307, may also be considered nested within or a subfolder of the first smart folder 3303. The third smart folder represents a saved search query which searches for all documents of a text type (e.g. Microsoft Word ".doc" documents, ".txt", ".rtf", and other types of text files) that have been modified in the last week. The fourth smart folder 3309 and the fifth smart folder 3311 may be considered to be subfolders of the third smart folder 3307 or otherwise enclosed within or dependent upon the third smart folder. Thus, for example, the fourth and fifth smart folders may be shown as folders within the contents (e.g. search results of) the third smart folder in a manner which is similar to that shown in FIG. 31. The fourth smart folder 3309 represents a saved search query which causes a search for all text type documents modified in the last week and which were authored by "John." The fifth smart folder 3311 represents a saved search query which causes the search for all text type documents modified in the last week and which were authored by "Joe." It can be seen that both the fourth and fifth smart folders can be obtained from the third smart folder by editing or modifying the saved search query which is represented by the third smart folder. For example, the saved search query of the third smart folder may be edited to include (through a Boolean AND operator) an author input field in which the name of the author, such as Joe or John, can be specified.

The user interface provided by a hierarchy of saved search folders provides a powerful mechanism to browse user files on a data processing system. In the example shown in FIG. 33, a single smart folder encapsulates or encloses four other folders. By opening the first smart folder, the user will see a display of search results showing all documents which have been modified in the last week, and the search results, at least in certain embodiments, will also include four folders which represent the second, third, fourth, and fifth smart folders. The user may then "tunnel" into the different folders (which may be saved with names that indicate the content of the folders or which specify the search query) and thereby provide or obtain more specific search results. A window displaying the search results obtained by the first smart folder 3303 will include icons representing at least the second smart folder 3305 and the third smart folder 3307. A hierarchical view within this window may also optionally display the fourth and fifth smart folders 3309 and 3311 (e.g. in an indented manner to show the nesting or hierarchy of the smart folders). The user may, from the window displaying the results of the first saved search, open the third smart folder, causing the display of search results obtained by the third smart folder, which results will also include at least a representation of the fourth and fifth smart folders 3309 and 3311. The user may continue to "dig" into the fourth or fifth smart folders to look for a file. These smart folders may be implemented within or in conjunction with a file management system (e.g. such as the Finder on Macintosh operating systems (OS) or Windows Explorer on Microsoft's Windows OS) or within an application program, such as an email program (e.g. Apple Computer's Mail program or IBM's Lotus Notes program) which includes the ability for the user to create folders within an email "in box" to store emails (e.g. received emails) within the user created folders. The user created folders could be implemented as one or more smart folders (e.g. each being a saved search folder) which can search all the saved emails (or a selected group of saved emails) based on a search query which causes a search through content (e.g. indexed content) of the saved emails as well as metadata for those saved emails. User interfaces for implementing this may employ folders or other graphical representations; see, for example, U.S. Pat. No. 6,613,101.

Figure 34:
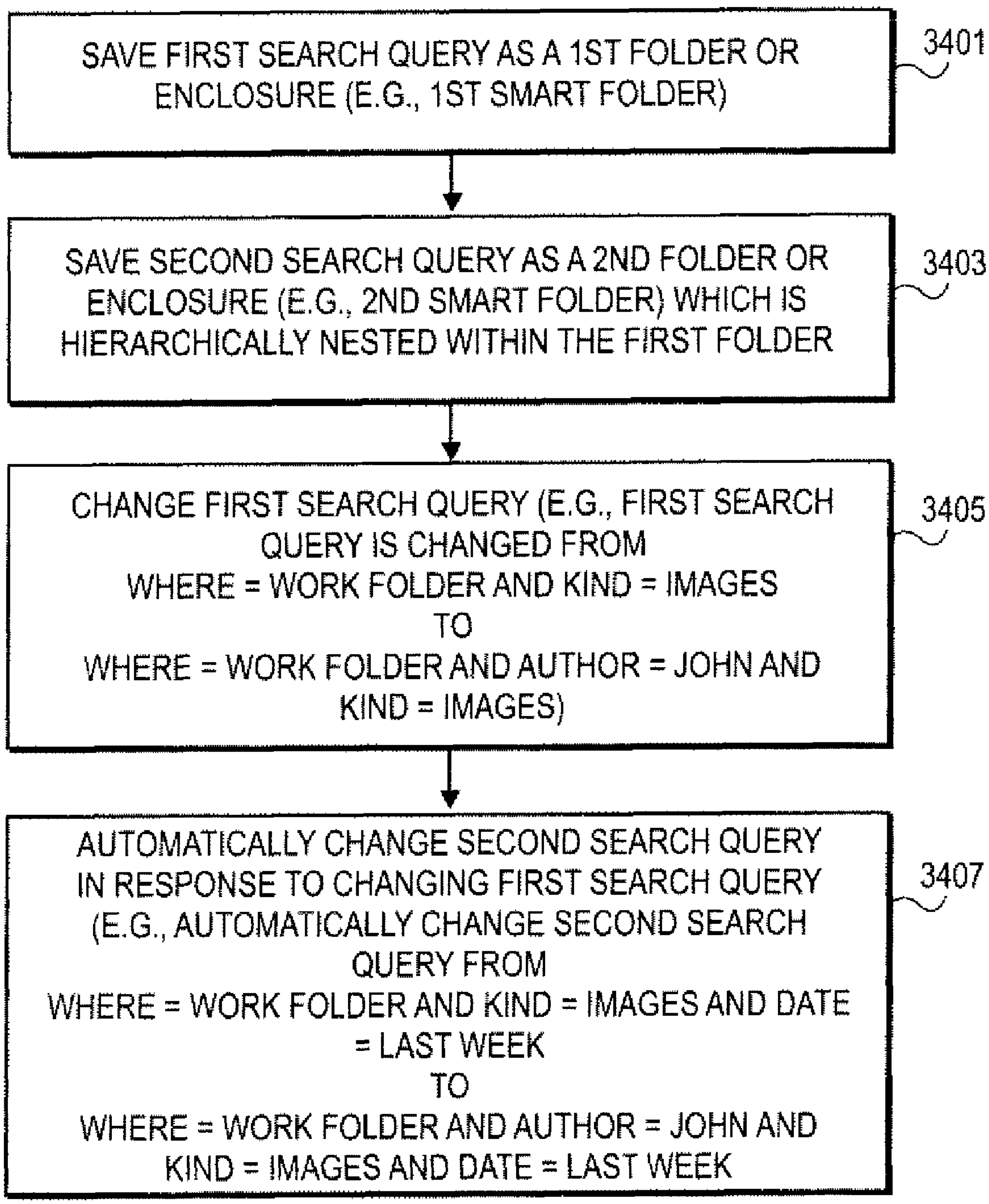
FIG. 34 shows a flowchart which illustrates an exemplary method in which modifications to one saved search folder result in modifications to other saved search folders when the folders have a hierarchy.

FIG. 34 shows an exemplary embodiment in which the system automatically changes search queries for subfolders in the hierarchy of saved search folders. In operation 3401, a first search query is saved as a first folder or enclosure, such as a first smart folder. In operation 3403, a second search query is saved as a second folder or enclosure, such as a second smart folder which is hierarchically nested within the first folder. The user, in operation 3405, changes the first search query. For example, the first search query is changed from a location of documents within a work folder which have an image type to a query specified by a location within the work folder and which are also image type files and have been authored by John. Since the second smart folder is contained within or hierarchically dependent upon the first smart folder, the second search query is automatically modified by the system in operation 3407 in response to the user's changing of the first search query. For example, the system would automatically change the second search query from "location=work folder AND kind=images AND date=last week" to a search query of "location=work folder AND author=John AND kind=images AND date=last week." In this manner, if a user has specified to the system that the hierarchy of the folders is to be maintained through changes of the search queries, the system will automatically adjust dependent search queries in a manner which is similar to that shown in FIG. 34.

Figure 35:
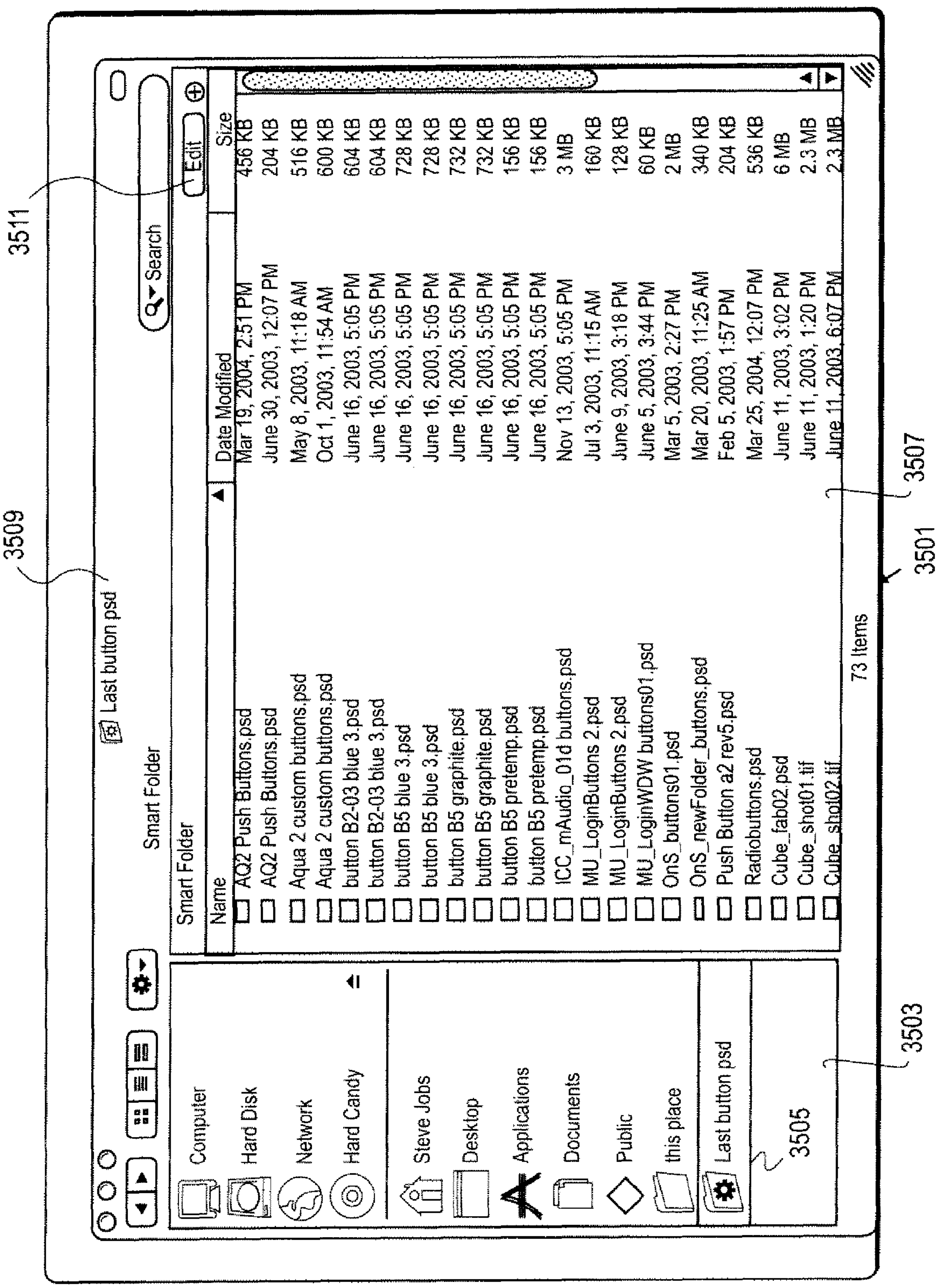
FIGS. 35, 36, and 37 illustrate exemplary user interfaces for managing saved search folders, such as “smart” folders.
Figure 36:
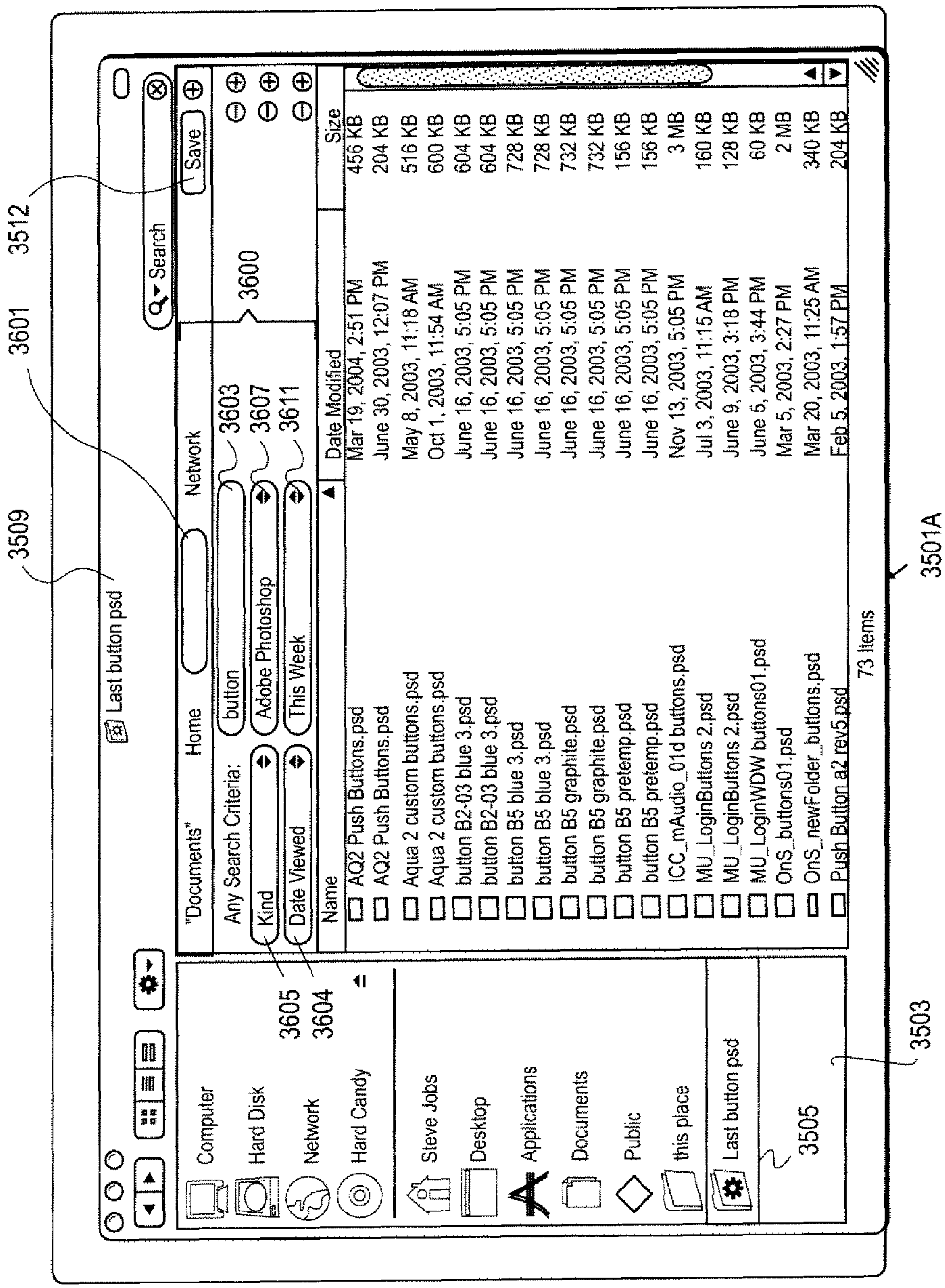
Figure 37:
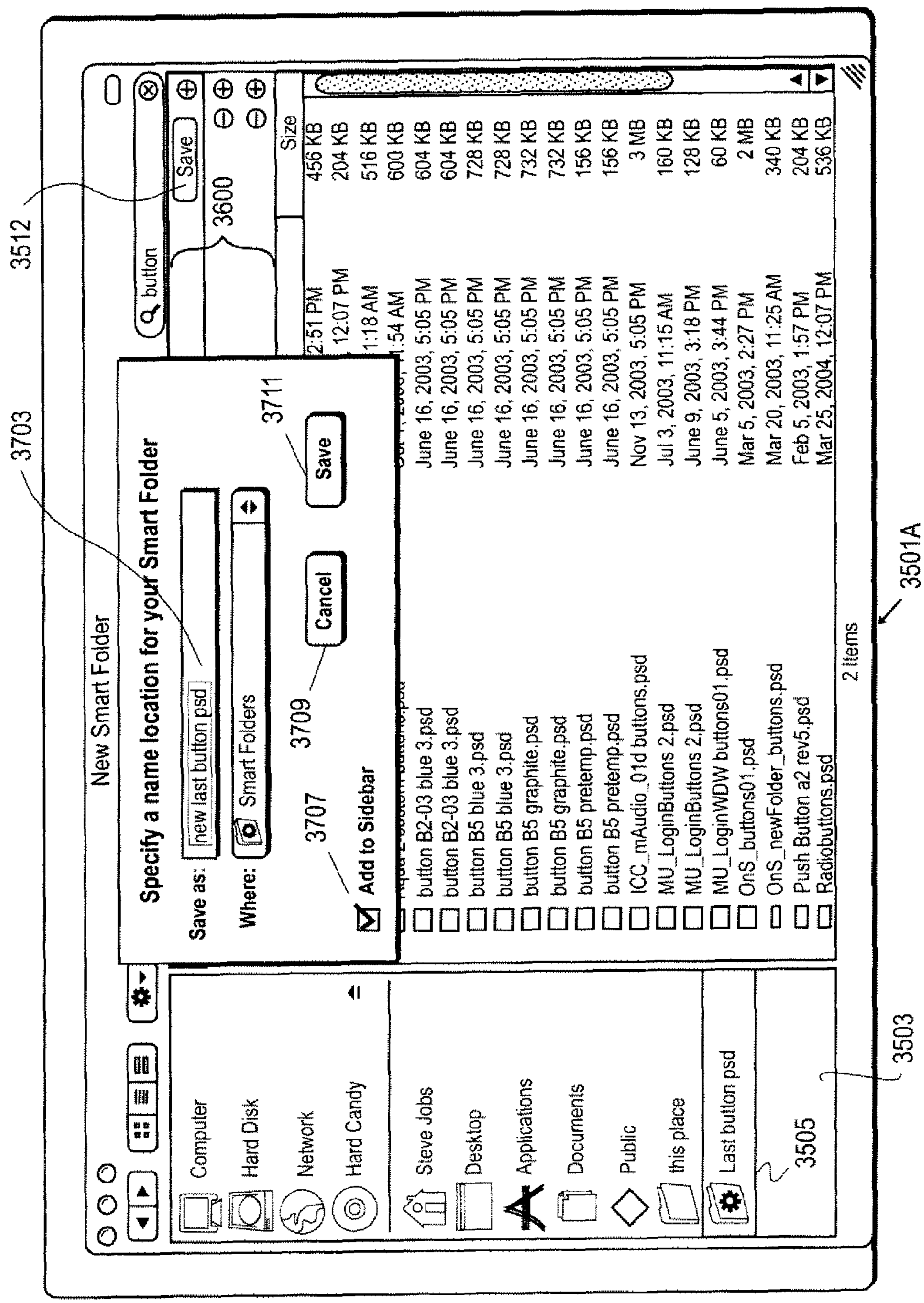

FIGS. 35, 36 and 37 illustrate exemplary graphical user interfaces for editing and displaying a saved search folder. The window 3501 shown in FIG. 35 includes a side bar region 3503 which includes an icon 3505 which represents the smart folder "last button psd." The user has selected the icon 3505, causing the display of the search results performed in response to the saved search query represented by the smart folder. The main display portion 3507 of the window 3501 shows the search results. The window also includes a title 3509 which shows the name of the smart folder. The window 3501 also includes an edit button 3511 which the user may activate to allow editing of the saved search query. Activating the button 3511 causes the display of the window 3501*a* in which a search input region 3600 is displayed. The edit button now changes to a save button 3512 which may be activated if the user modifies the search query to save another search query as a new smart folder. If the search query is modified by ANDing in a Boolean operation an additional search parameter, then the search may be considered hierarchically dependent upon the original search and thus two hierarchical smart folders may be created through an editing operation of the first smart folder. The search query may be edited using the various controls within the input region 3600. This region includes a location slice which specifies a location, such as everywhere 3601 and also includes a text entry field 3603 into which text may be entered. In the case shown in FIG. 36, the word "button" has been entered into the text entry field 3603 such that the search query searches for any Adobe PhotoShop document containing the word "button" which was viewed this week. The additional parameters of the kind of document and the date of the document are specified by the pull down menus 3605, 3607, 3609, and 3611. Additional search parameters may be added to the search by selecting one of the + buttons or one of the input parameters may be removed from the search query by selecting the appropriate—button in the right portion of the input region 3600. Thus, for example, if the user wanted to add a search parameter relating to the author of a document, the user can select one of the + buttons and from a pull down menu select the author input attribute and then select a particular author from the menu. In the example shown in FIG. 36, the current saved search query represented by the last button psd smart folder has been specified by selecting the "kind" attribute from the pull down menu 3605 and by specifying Adobe PhotoShop as the particular type or kind from the pull down menu 3607. Further, the date parameter has been specified by selecting the "date viewed" parameter from the pull down menu 3609 and then selecting the "this week" input from the pull down menu 3611. After the user has finished modifying the search query, the user may activate the save button 3512, resulting in the display of the naming panel 3701 shown in FIG. 37. This panel includes a text input field 3703 into which a user may enter the new name for the new smart folder. It also includes a location menu 3705, from which the user may select the location for storing the new smart folder. The panel 3701 also includes a save button 3711, a cancel button 3709, and a check box 3707, each of which function in a manner which is similar to the corresponding elements shown in FIG. 25. If the user activates the save button 3711, a new smart folder will be created. If the user created this new smart folder by adding an additional search input parameter which is ANDed in a Boolean fashion with the previous saved search query, then a hierarchical set of folders will be created in at least certain embodiments of the present invention.

Figure 15A:
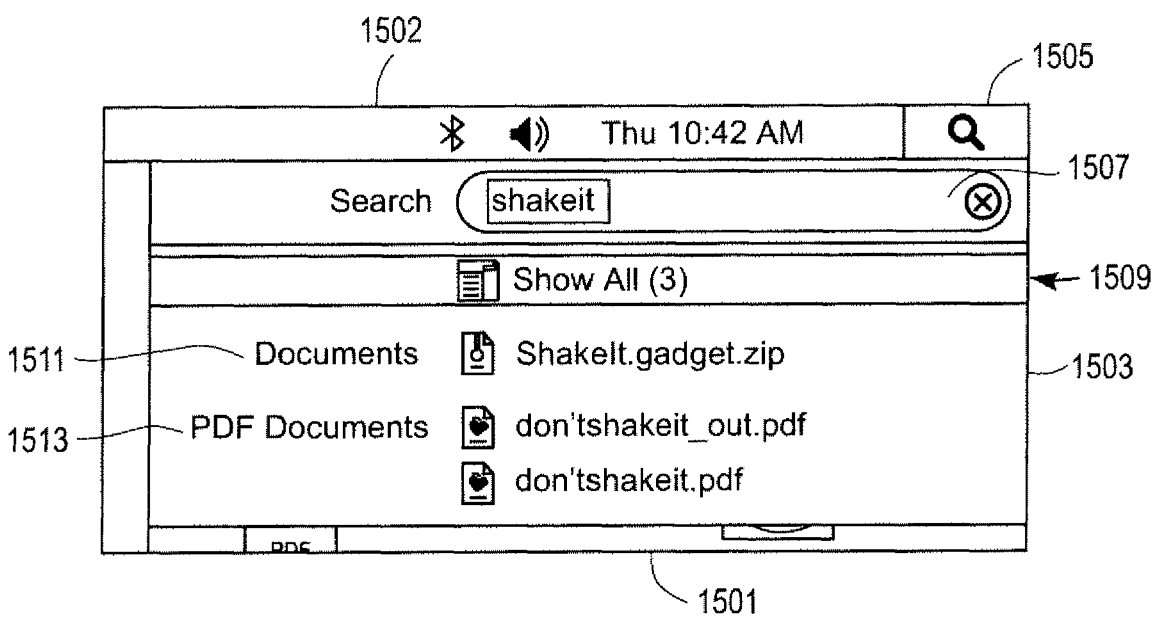
FIGS. 15A, 15B, 15C and 15D show another alternative embodiment of user interfaces according to the present invention.
Figure 15B:
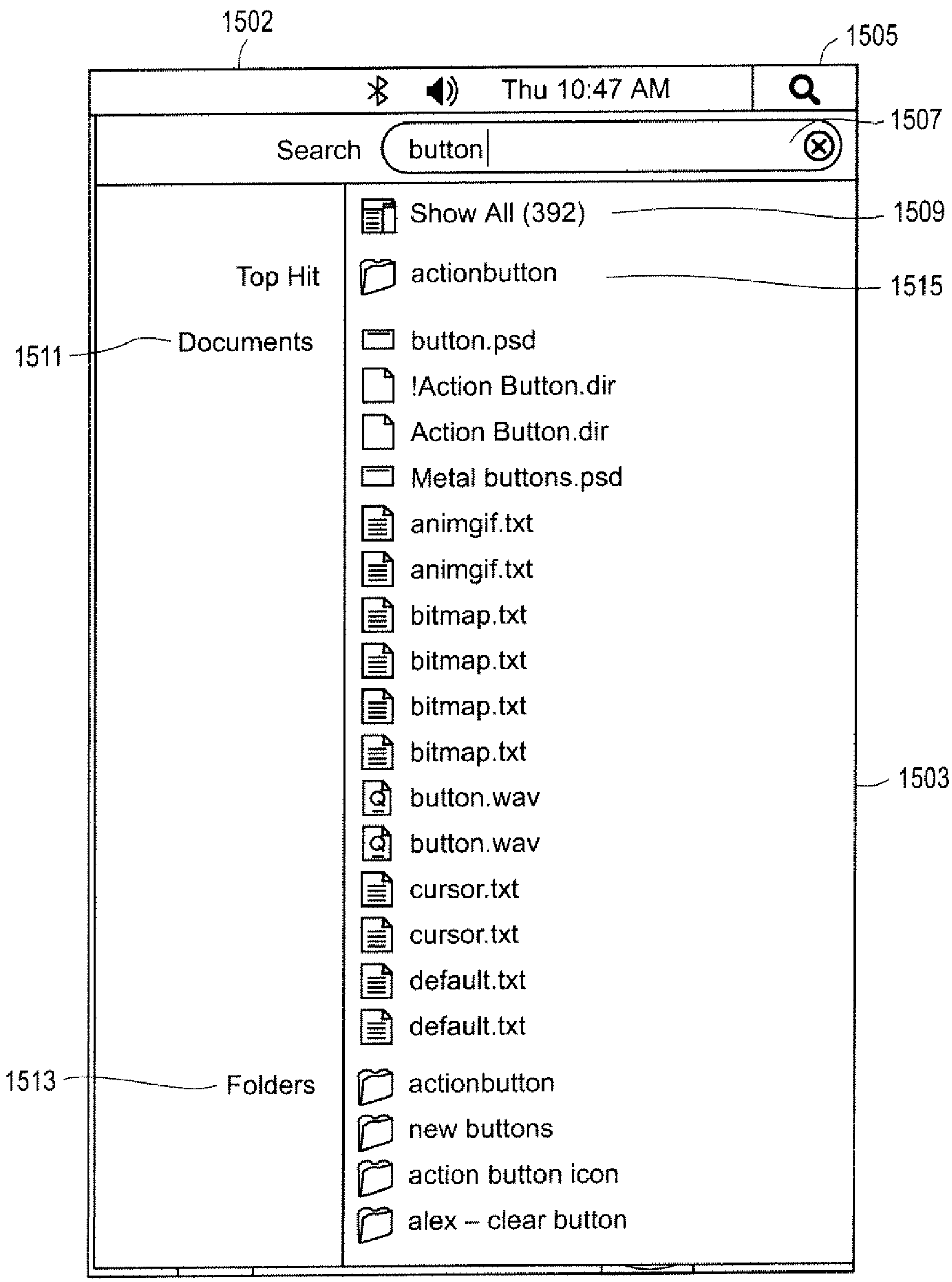
Figure 15C:
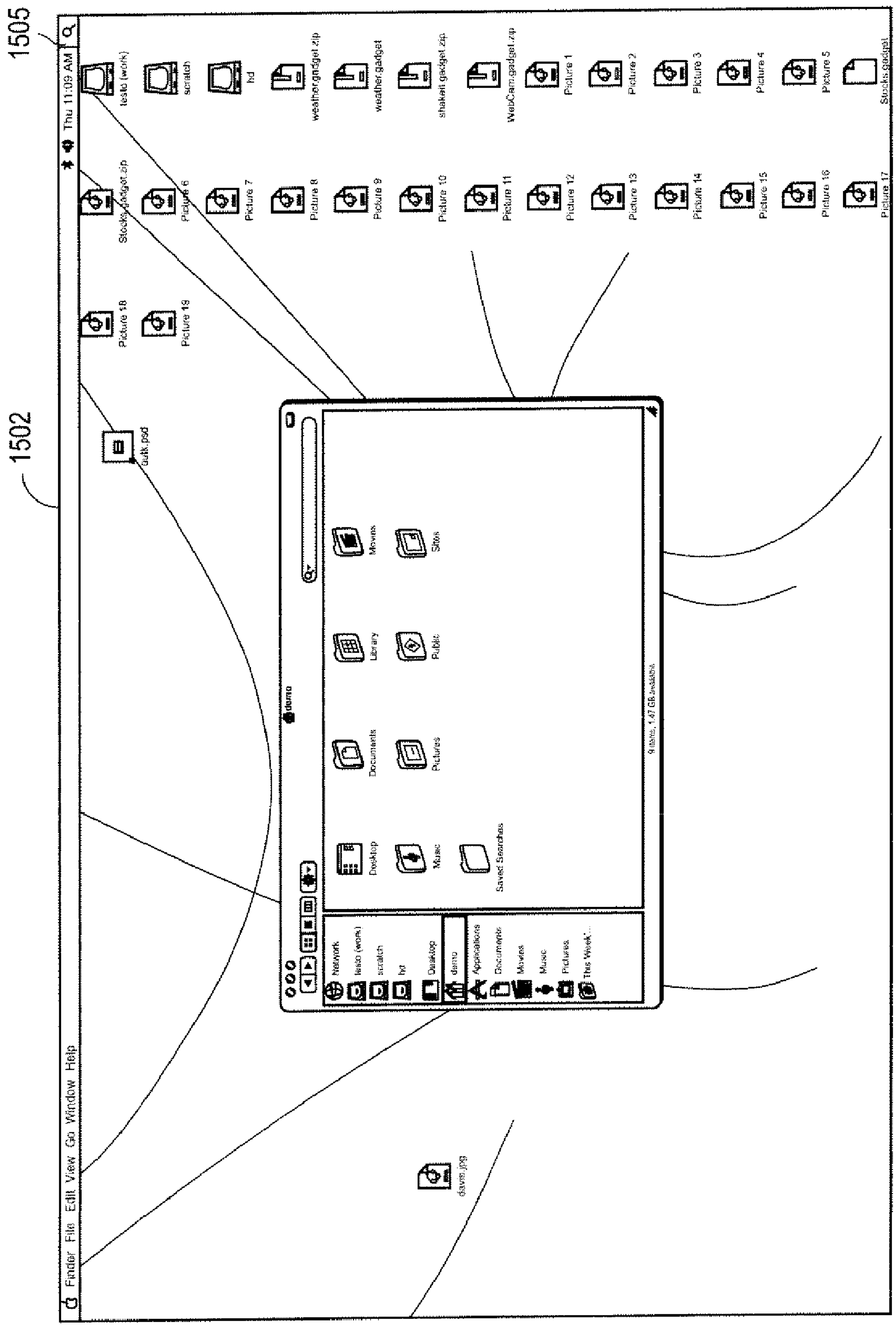
Figure 15D:
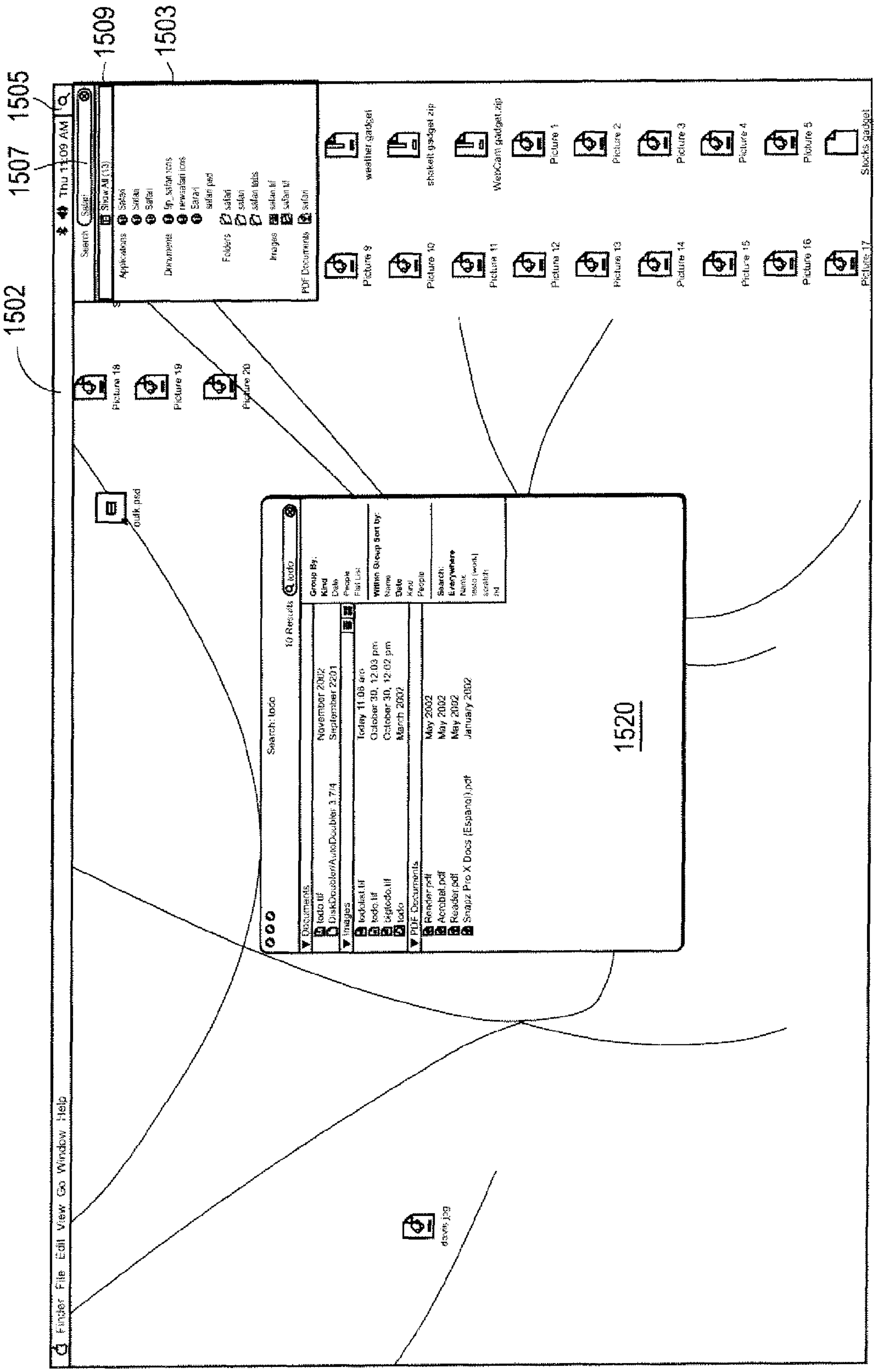

FIGS. 15A, 15B, 15C, and 15D show an example of a system wide search input user interface and search result user interface. In one particular exemplary embodiment, these user interfaces are available on the entire system for all applications which run on the system and all files and metadata, and even address book entries within an address book program, such as a personal information manager, and calendar entries within a calendar program, and emails within an email program, etc. In one exemplary embodiment, the system begins performing the search and begins displaying the results of the search as the user types text into a text entry field, such as the text entry field 1507. The search results are organized by categories and are displayed as a short list which is intentionally abbreviated in order to present only a selected number of the most relevant (scored) matches or hits to the search query. The user can ask for the display of all the hits by selecting a command, such as the "show all" command 1509. FIG. 15A shows a portion of a display controlled by a data processing system. This portion includes a menu bar 1502 which has at its far end a search menu command 1505. The user can select the search menu command by positioning a cursor, using a mouse, for example, over the search menu command 1505 and by pressing a button or by otherwise activating or selecting a command. This causes a display of a text entry region 1507 into which a user can enter text. In the example shown in FIG. 15A, which is a portion of the display, the user has entered the text "shakeit" causing the display of a search result region immediately below a "show all" command region 1509 which is itself immediately below the text entry region 1507. It can be seen that the hits or matches are grouped into categories ("documents" and "PDF documents") shown by categories 1511 and 1513 within the search result region 1503. FIG. 15B shows another example of a search. In this case, a large number of hits was obtained (392 hits), only a few of which are shown in the search result region 1503. Again, the hits are organized by categories 1511 and 1513. Each category may be restricted in terms of the number of items displayed within the search result region 1503 in order to permit the display of multiple categories at the same time within the search result region. For example, the number of hits in the documents category may greatly exceed the available display space within the search result region 1503, but the hits for this category are limited to a predetermined or dynamically determinable number of entries within the search result region 1503 for the category 1511. An additional category, "top hit" is selected based on a scoring or relevancy using techniques which are known in the art. The user may select the "show all" command 1509 causing the display of a window, such as window 1601 shown in FIG. 16A. FIG. 15C shows a display of a graphical user interface of one embodiment of the invention which includes the menu bar 1502 and the search menu command 1505 on the menu bar 1502. FIG. 15D shows another example of the search result region 1503 which appeared after a search of the term "safari" was entered into the text entry region 1507. It can be seen from the search result region 1503 of FIG. 15D that the search results are again grouped into categories. Another search result window 1520 is also shown in the user interface of FIG. 15D. It can be seen that application programs are retrieved as part of the search results, and a user may launch any one of these application programs by selecting it from the search result region, thereby causing the program to be launched.

Figure 16A:
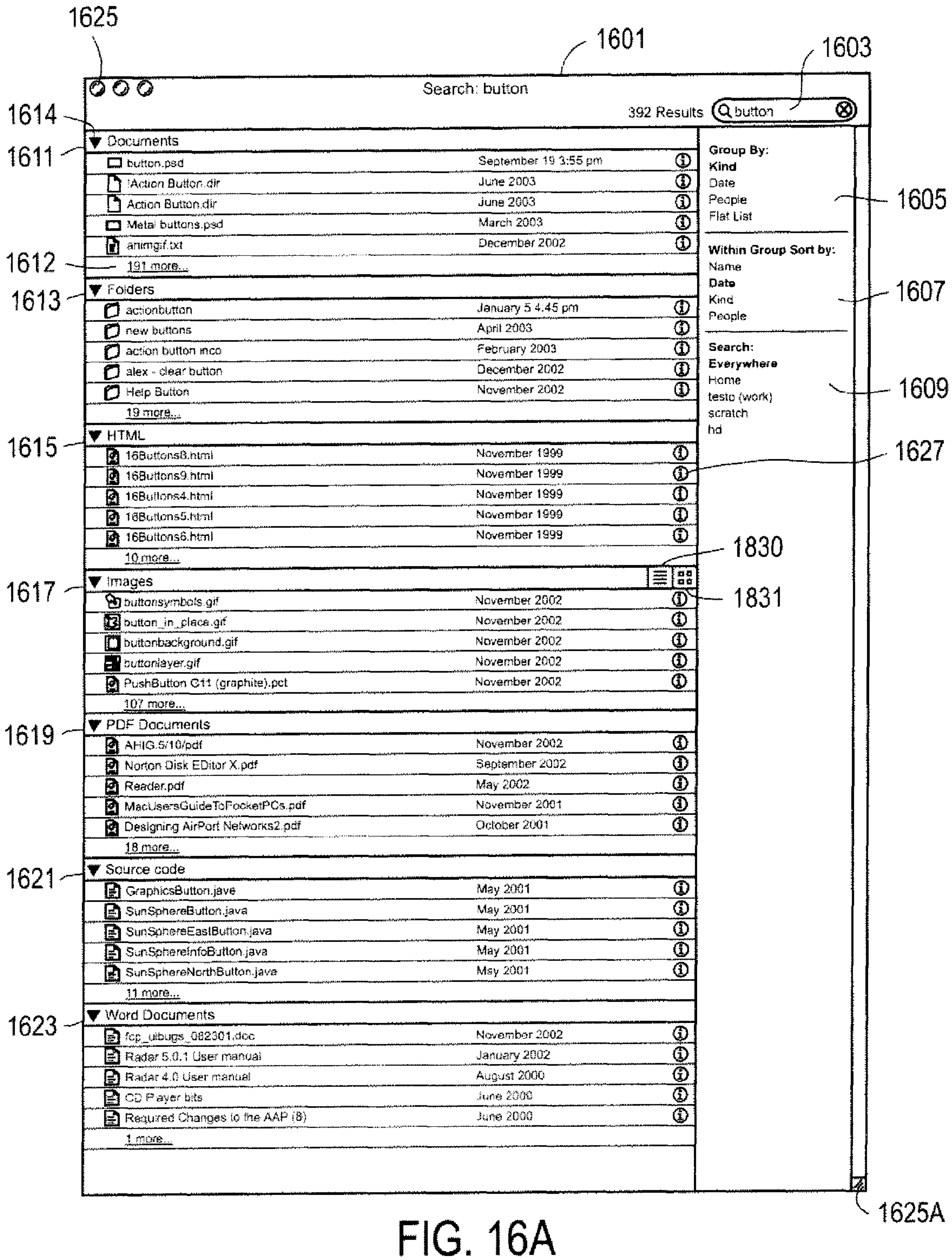
FIGS. 16A and 16B show certain aspects of embodiments of user interfaces according to the present invention.
Figure 16B:
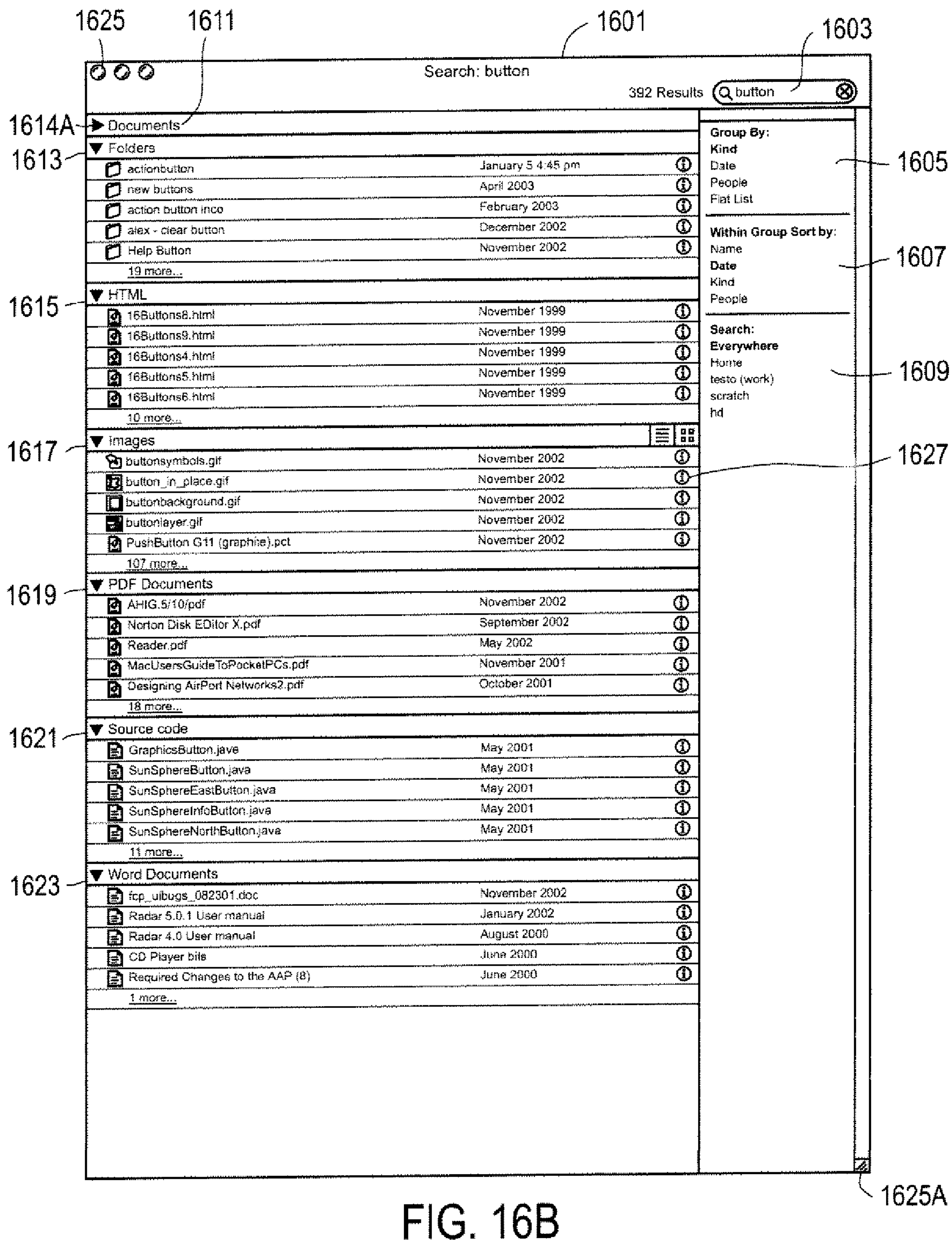
Figure 17:
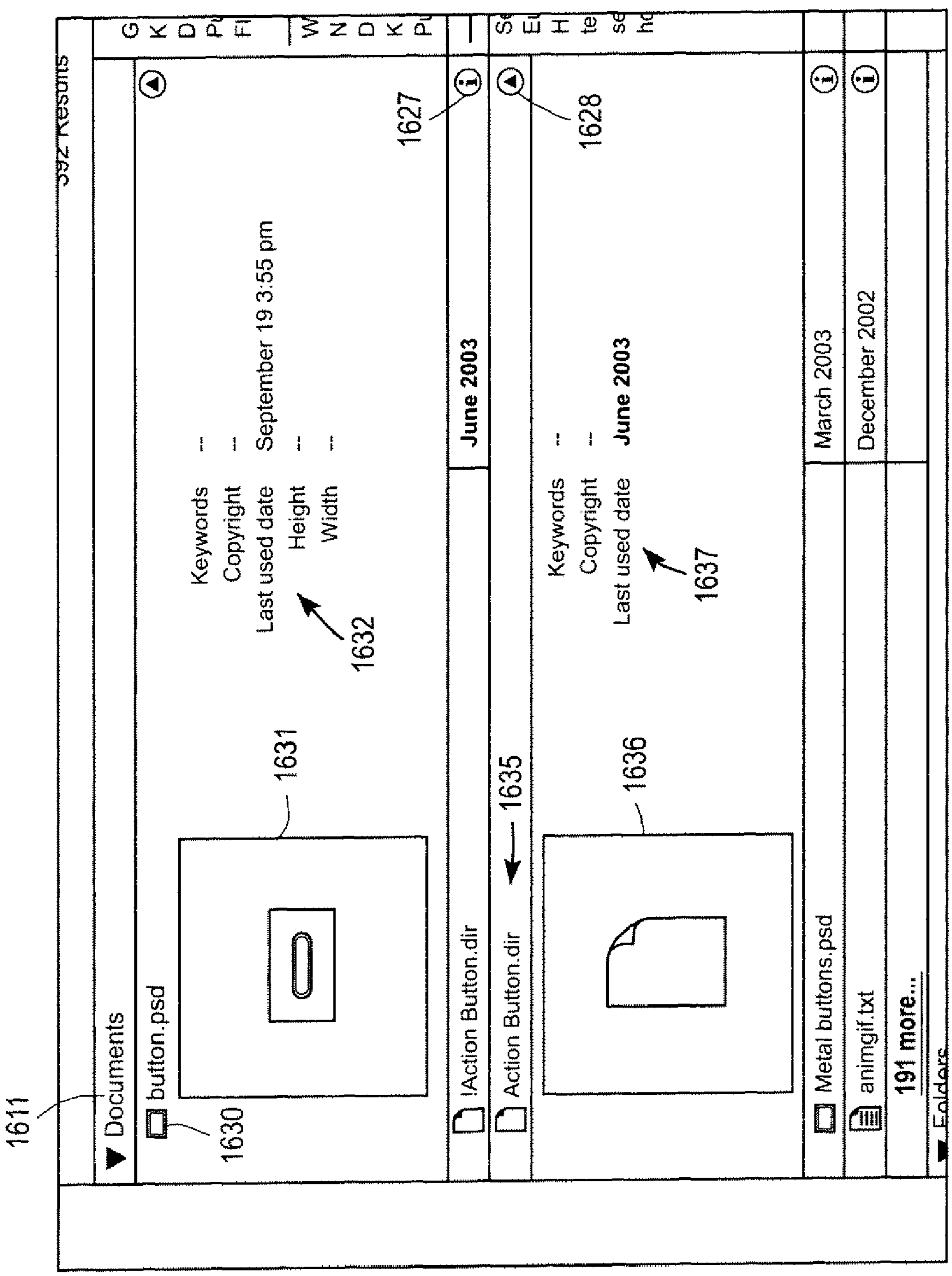
FIG. 17 shows an aspect of certain embodiments of user interfaces according to the present invention.

FIGS. 16A and 16B show examples of search result windows which may be caused to appear by selecting the "show all" command 1509 in FIG. 15A or 15B. Alternatively, these windows may appear as a result of the user having selected a "find" command or a some other command indicating that a search is desired. Moreover, the window 1601 shown in FIGS. 16A and 16B may appear in response to either of the selection of a show all command or the selection of a find command. The window 1601 includes a text entry region 1603, a group by menu selection region 1605, a sort by menu selection region 1607, and a where menu selection region 1609. The group by selection region 1605 allows a user to specify the manner in which the items in the search results are grouped according to. In the example shown in FIG. 16A, the user has selected the "kind" option from the group by menu selection region 1605, causing the search results to be grouped or sorted according to the kind or type of document or file. It can be seen that the type of file includes "html" files, image files, PDF files, source code files, and other types of files as shown in FIG. 16A. Each type or kind of document is separated from the other documents by being grouped within a section and separated by headers from the other sections. Thus, headers 1611, 1613, 1615, 1617, 1619, 1621, and 1623 designate each of the groups and separate one group from the other groups. This allows a user to focus on evaluating the search results according to certain types of documents. Within each group, such as the document groups or the folder groups, the user has specified that the items are to be sorted by date, because the user has selected the date option within the sort by menu region 1607. The user has also specified that all storage locations are to be searched by selecting "everywhere" from the where menu selection region 1609. Each item in the search result list includes an information button 1627 which may be selected to produce the display of additional information which may be available from the system. An example of such additional information is shown in FIG. 17 in which a user has selected the information button 1627 for item 1635, resulting in the display of an image 1636 corresponding to the item as well as additional information 1637. Similarly, the user has selected the information button for another item 1630 to produce the display of an image of the item 1631 as well as additional information 1632. The user may remove this additional information from the display by selecting the close button 1628 which causes the display of the information for item 1635 to revert to the appearance for that item shown in FIG. 16A. The user may collapse an entire group to hide the entries or search results from that group by selecting the collapse button 1614 shown in FIG. 16A, thereby causing the disappearance of the entries in this group as shown in FIG. 16B. The user may cause these items to reappear by selecting the expand button 1614A as shown in FIG. 16B to thereby revert to the display of the items as shown in FIG. 16A.

The search results user interface shown in FIGS. 16A and 16B presents only a limited number of matches or hits within each category. In the particular example of these figures, only the five top (most relevant or most highly sorted) hits are displayed. This can be seen by noticing the entry at the bottom of each list within a group which specifies how many more hits are within that group; these hits can be examined by selecting this indicator, such as indicator 1612, which causes the display of all of the items in the documents category or kind for the search for "button" which was entered into the text entry region 1603. Further examples of this behavior are described below and are shown in conjunction with FIGS. 18A and 18B. It will be appreciated that window 1601 is a closeable and resizable and moveable window and includes a close button and a resizing control 1625A.

Figure 18A:
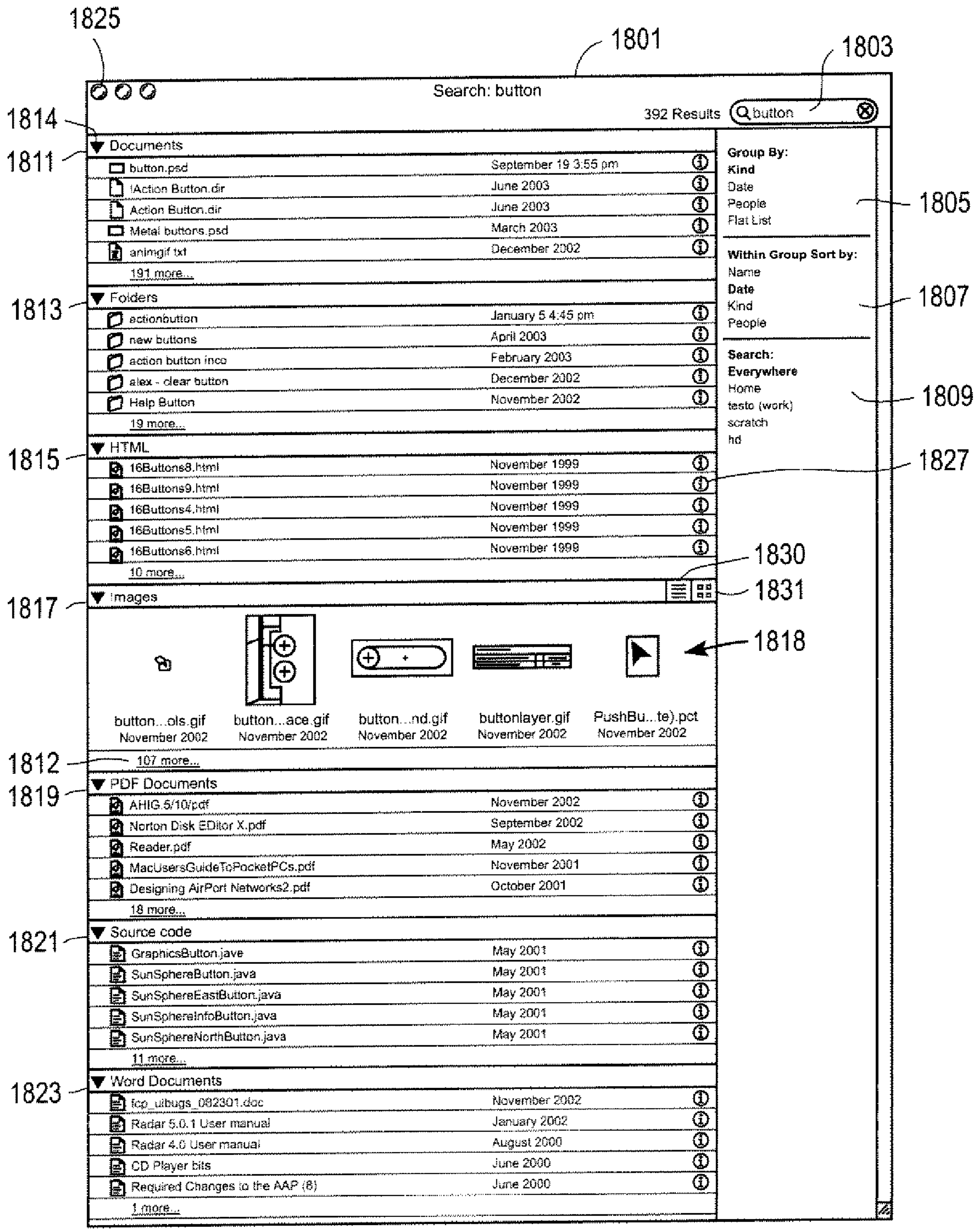
FIGS. 18A and 18B show further aspects of certain embodiments of user interfaces according to the present invention.
Figure 18B:
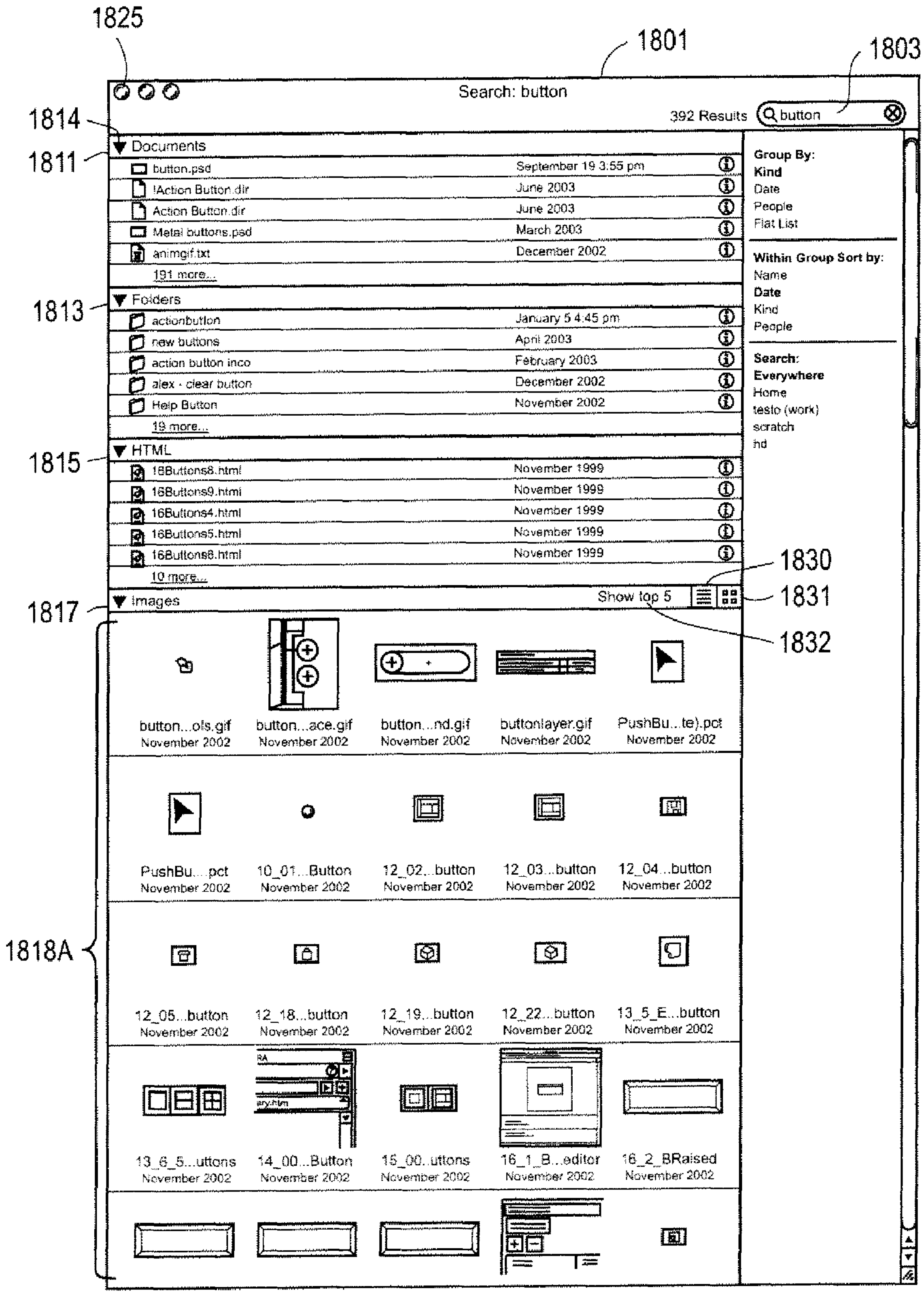

FIGS. 18A and 18B illustrate another window 1801 which is very similar to the window 1601. The window 1801 includes a text entry region 1803, a group by menu selection region 1805, a sort by menu selection region 1807, and a where menu selection region 1809, each of which function in a manner which is similar to the regions 1605, 1607, and 1609 respectively of FIG. 16A. Each item in a list view within the window 1801 includes an information button 1827, allowing a user to obtain additional information beyond that listed for each item shown in the window 1801. The window 1801 further includes headers 1811, 1813, 1815, 1817, 1819, 1821, and 1823 which separate each group of items, grouped by the type or kind of document, and sorted within each group by date, from the other groups. A collapse button 1814 is available for each of the headers. The embodiment shown in FIGS. 18A and 18B shows the ability to switch between several modes of viewing the information. For example, the user may display all of the hits within a particular group by selecting the indicator 1812 shown in FIG. 18A which results in the display of all of the images files within the window 1801 within the region 1818A. The window is scrollable, thereby allowing the user to scroll through all the images. The user can revert back to the listing of only five of the most relevant images by selecting the "show top 5" button 1832 shown in FIG. 18B. Further, the user can select between a list view or an icon view for the images portion shown in FIGS. 18A and 18B. The user may select the list view by selecting the list view button 1830 or may select the icon view by selecting the icon view button 1831. The list view for the images group is shown in FIG. 16A and the icon view for the images group is shown in FIGS. 18A and 18B. It can be seen that within a single, moveable, resizable, closeable search result window, that there are two different views (e.g. a list view and an icon view) which are concurrently shown within the window. For example, the PDF documents under the header 1819 are displayed in a list view while the images under the header 1817 are displayed in an icon view in FIGS. 18A and 18B. It can also be seen from FIGS. 18A and 18B that each image is shown with a preview which may be capable of live resizing as described in a patent application entitled "Live Content Resizing" by inventors Steve Jobs, Steve Lemay, Jessica Kahn, Sarah Wilkin, David Hyatt, Jens Alfke, Wayne Loofbourrow, and Bertrand Serlet, filed on the same date as this application, and being assigned to the assignee of the present inventions described herein, and which is hereby incorporated herein by reference.

Figure 19A:
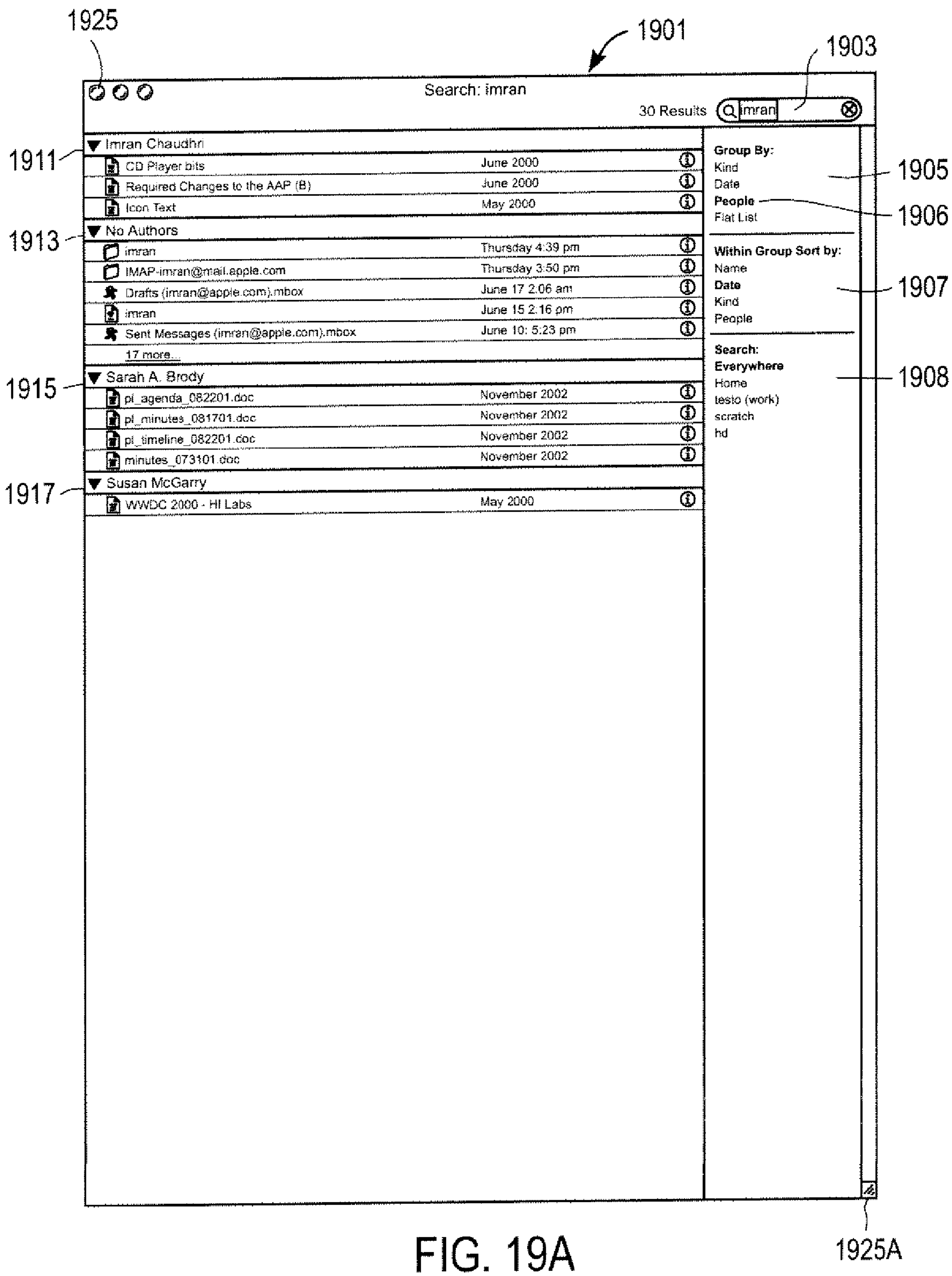
FIGS. 19A, 19B, 19C, 19D, and 19E show further illustrative embodiments of user interfaces according to the present invention.
Figure 19B:
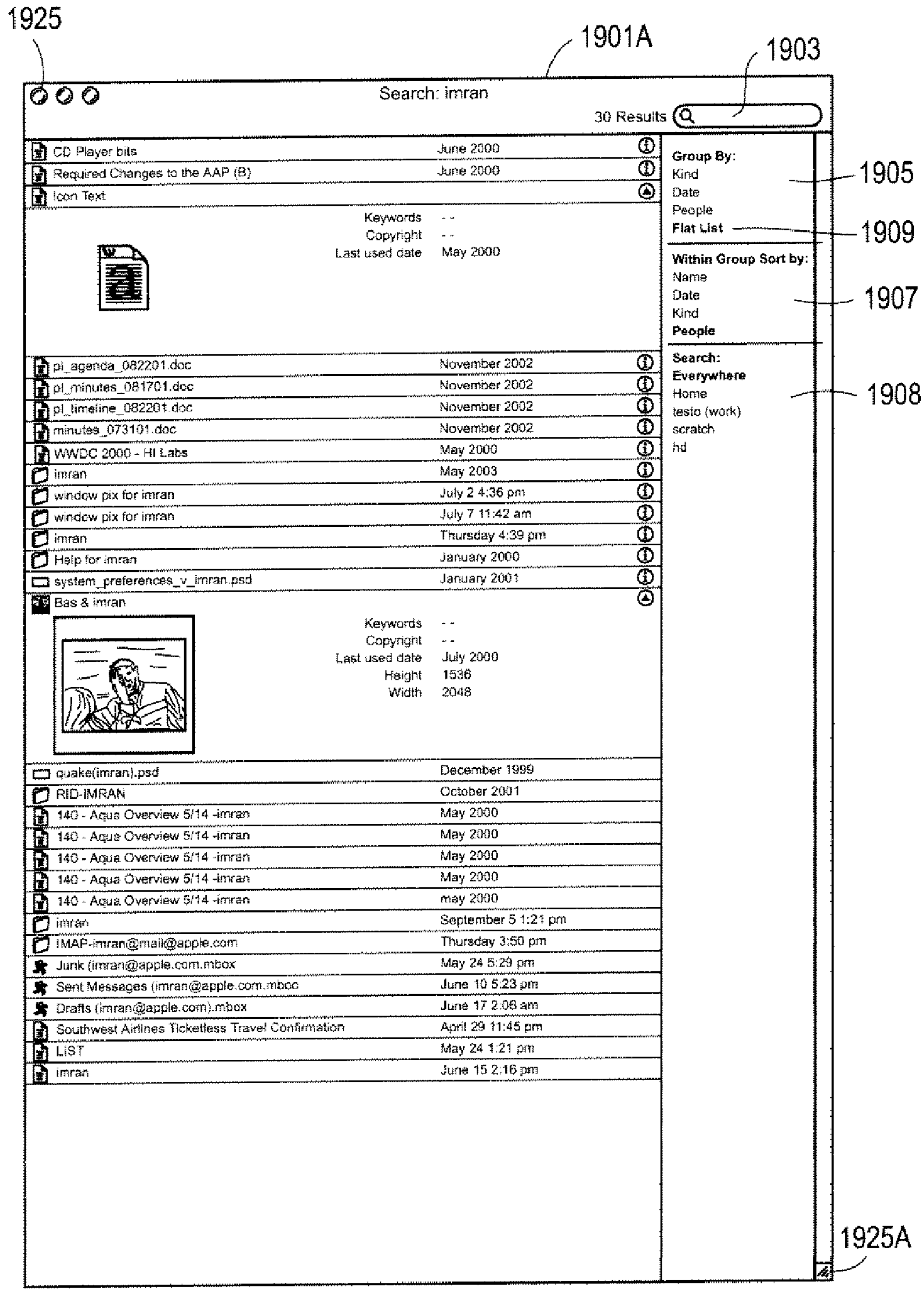

FIG. 19A shows another example of a search result window which is similar to the window 1601. The window 1901 shown in FIG. 19A includes a text entry region 1903 and a group by menu selection region 1905 and a sort by menu selection region 1907 and a where menu selection region 1908. Further, the window includes a close button 1925 and a resizing control 1925A. Text has been entered into the text entry region 1903 to produce the search results shown in the window 1901. The search results again are grouped by a category selected by a user which in this case is the people options 1906. This causes the headers 1911, 1913, 1915, and 1917 to show the separation of the groups according to names of people. Within each group, the user has selected to sort by the date of the particular file or document. The user interface shown in FIG. 19A allows a user to specify an individual's name and to group by people to look for communications between two people, for example. FIG. 19B shows another way in which a user can group a text search ("imran") in a manner which is different from that shown in FIG. 19A. In the case of FIG. 19B, the user has selected a flat list from the group by menu selection region 1905 and has selected "people" from the sort by menu region 1907. The resulting display in window 1901A is without headers and thus it appears as a flat list.

Figure 19C:
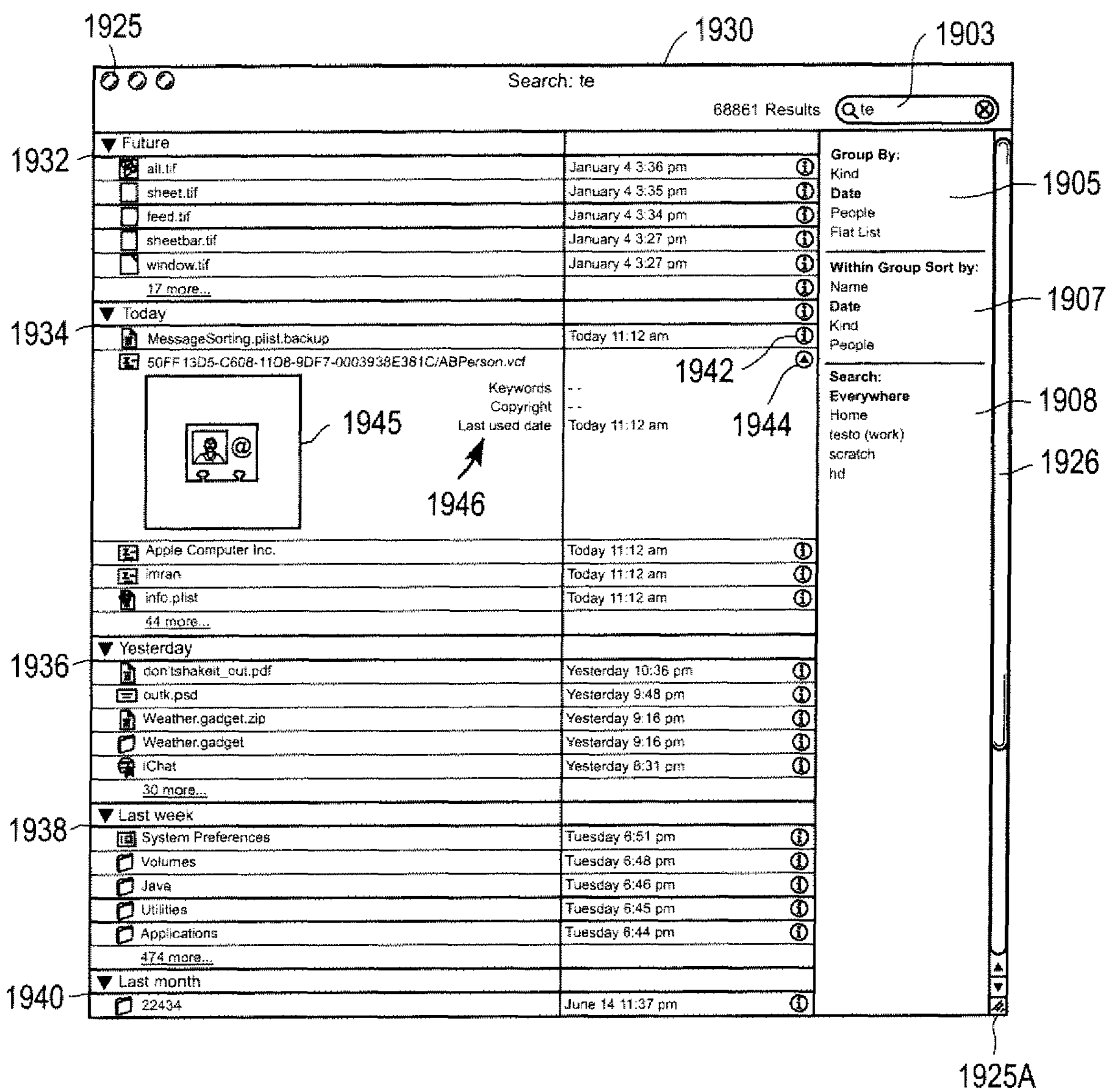

FIG. 19C shows the user interface of another search result window 1930 which includes a text entry region 1903 and the selection regions 1905, 1907, and 1908 along with a scrolling control 1926. The results shown in the window 1930 have been grouped by date and sorted within each group by date. Thus, the headers 1932, 1934, 1936, 1938, and 1940 specify time periods such as when the document was last modified (e.g. last modified today, or yesterday, or last week). Also shown within the search results window 1930 is the information button 1942 which may be selected to reveal further information, such as an icon 1945 and additional information 1946 as shown for one entry under the today group. This additional information may be removed by selecting the contraction button 1944.

Figure 19D:
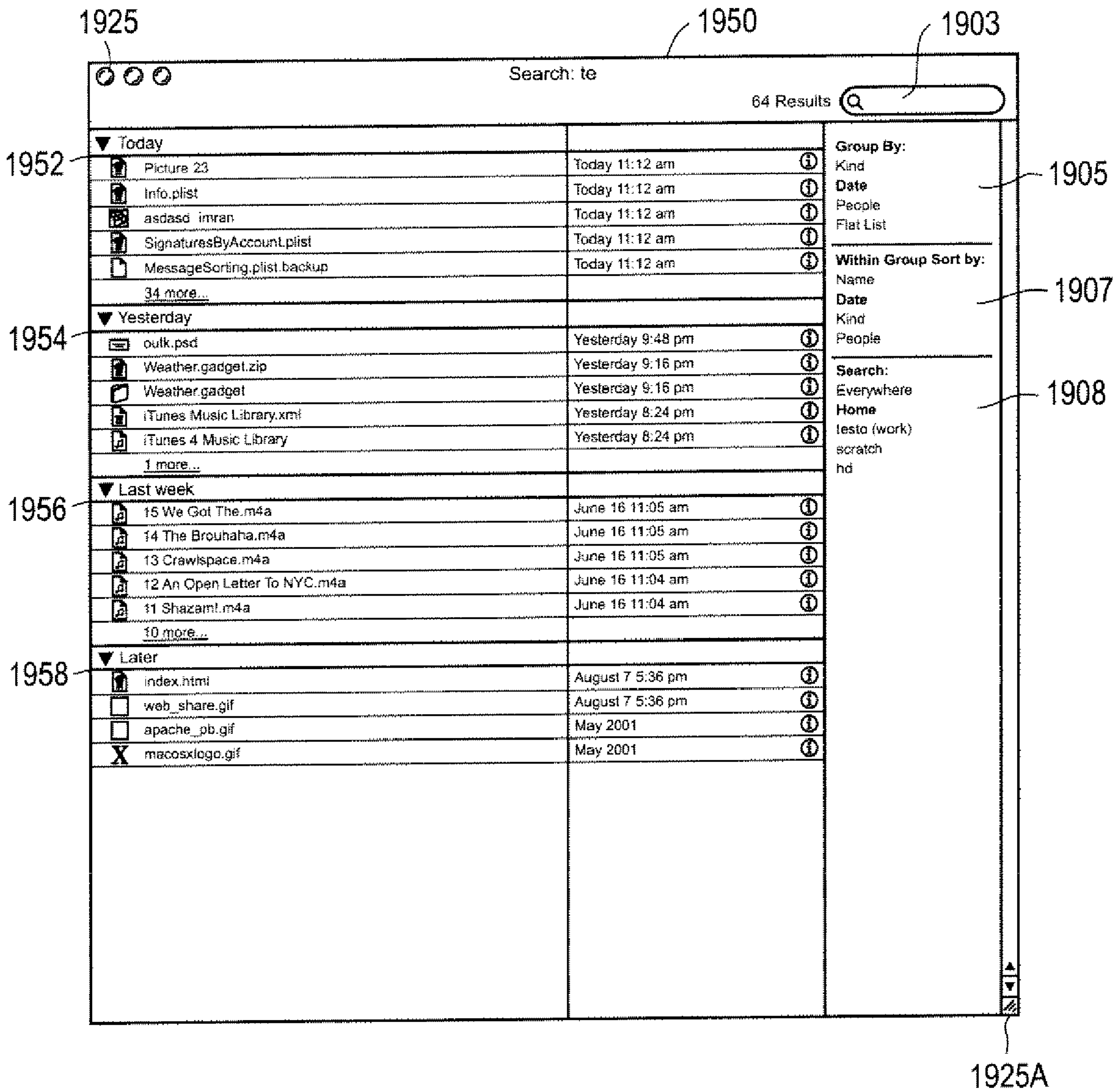

FIG. 19D shows a search result window 1950 in which a search for the text string "te" is grouped by date but the search was limited to a "home" folder as specified in the where menu selection region 1908. Time specific headers 1952, 1954, 1956, and 1958 separate items within one group from the other groups as shown in FIG. 19D.

Figure 19E:
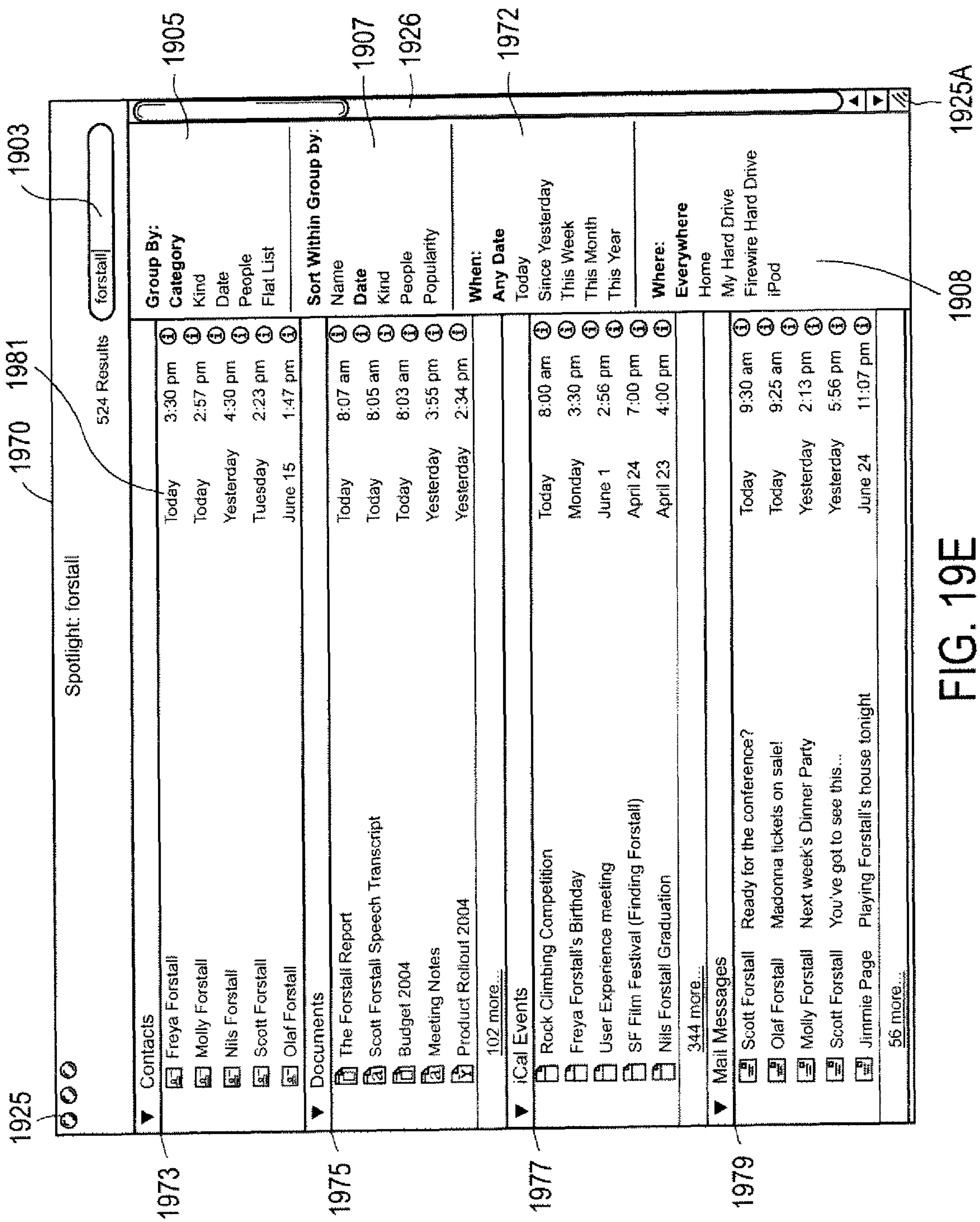

FIG. 19E shows an alternative embodiment of a search result window. In this embodiment, the window 1970 includes elements which are similar to window 1901 such as the selection regions 1905, 1907, and a scrolling control 1926 as well as a close button 1925 and a resizing control 1925A. The search result window 1970 further includes a "when" menu selection region 1972 which allows the user to specify a search parameter based on time in addition to the text entered into the text entry region 1903. It can be seen from the example shown in FIG. 19E that the user has decided to group the search results by the category and to sort within each group by date. This results in the headers 1973, 1975, 1977, and 1979 as shown in FIG. 19E.

Figure 20:
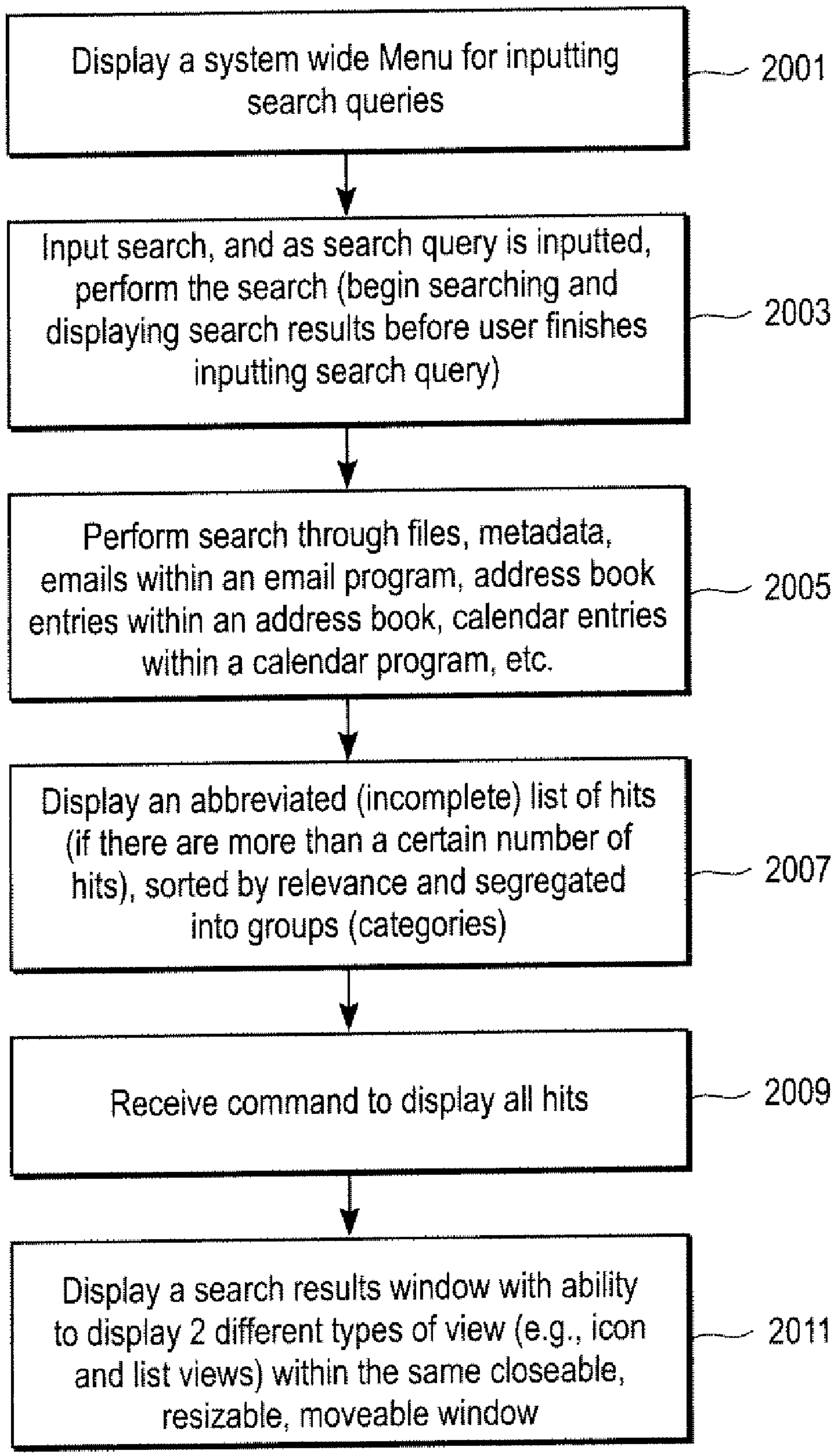
FIG. 20 is a flow chart which illustrates another exemplary method of the present invention.

FIG. 20 shows an exemplary method of operating a system wide menu for inputting search queries, such as the system wide menu available by selecting the search menu command 1505 shown in FIG. 15A or 15B, or 15C. In operation 2001, the system displays a system wide menu for inputting search queries. This may be the search menu command 1505. The user, in operation 2003, inputs a search, and as the search query is being inputted, the system begins performing and begins displaying the search results before the user finishes inputting the search query. This gives immediate feedback and input to the user as the user enters this information. The system is, in operation 2005, performing a search through files, metadata for the files, emails within an email program, address book entries within an address book program, calendar entries within a calendar program, etc. The system then, in operation 2007, displays an abbreviated (e.g. incomplete) list of hits if there are more than a certain number of hits. An example of this abbreviated listing is shown in FIG. 15B. The listing may be sorted by relevance and segregated into groups such as categories or types of documents. Then in operation 2009, the system receives a command from the user to display all the hits and in operation 2011 the system displays the search results window, such as the window 1601 shown in FIG. 16A. This window may have the ability to display two different types of views, such as an icon view and a list view within the same closeable, resizable, and moveable window. It will be appreciated that the searching, which is performed as the user is typing and the displaying of results as the user is typing may include the searching through the metadata files created from metadata extracted from files created by many different types of software programs.

FIGS. 21, and 22A, 22B, 22C, and 22D will now be referred to while describing another aspect of the inventions. This aspect relates to a method of selecting a group of files, such as a group of individual data files. In an exemplary method of this aspect, a data processing system receives a selection of a plurality of items, such as data files, folders (e.g. graphical user interface representations of subdirectories), application programs or a combination of one or more of these items. This selection may be performed by one of the many conventional ways to select a plurality of items such as (a) positioning a cursor at each item individually (e.g. through the movement of a mouse) and indicating a selection individually by, for example, pressing and releasing a button, such as a mouse's button; (b) pointing a cursor at a first item in a list and indicating a selection of the first item and pointing the cursor at a last item in a list of items and indicating a selection of all items from the first item to the last item in the list; (c) drawing a selection rectangle by a dragging operation of the cursor, etc. Thus operation 2101 shown in FIG. 21 receives one or more inputs indicating a selection of a plurality of items. The system in operation 2103 receives a command requesting both the creation of a new storage facility (e.g. a folder) and an association of the plurality of items with the new storage facility. While the operation 2103 is shown following operation 2101, in certain embodiments operation 2103 may precede operation 2101. The association of operation 2103 may be a copy or a move operation. For example, the user may select multiple items and then command the system to move those items from their existing locations to a new folder which is created in one operation as a result of the move and create new folder command. In response to the command received in operation 2103, the system creates a new storage facility, such as a new folder, with a predetermined directory path name or a user specified path name and the system further associates the selected plurality of items with the new storage facility. This association may be either a move or a copy operation. A copy operation would typically involve making a copy of each selected item and storing the item with a path name that reflects the storage of the item within the new folder having a predetermined directory path name or a user specified directory path name. A move operation, in which the items are moved into the new folder, may merely change the path names associated with each of the selected items (rather than making a copy of the items) which changed path names will reflect the new file system location (e.g. within the subdirectory of the new folder) of the selected items.

Figure 21:
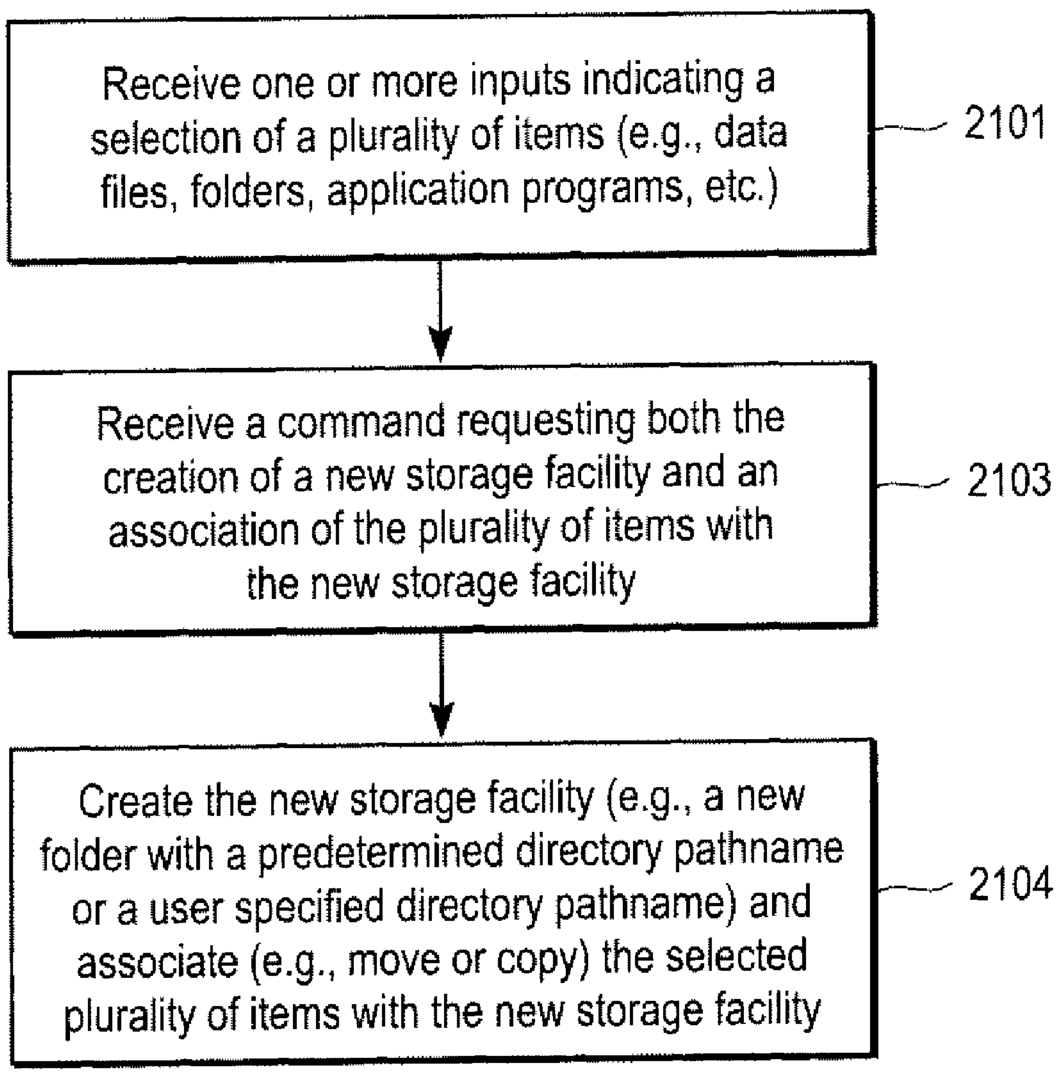
FIG. 21 is a flow chart showing another exemplary method of the present invention.
Figure 22A:
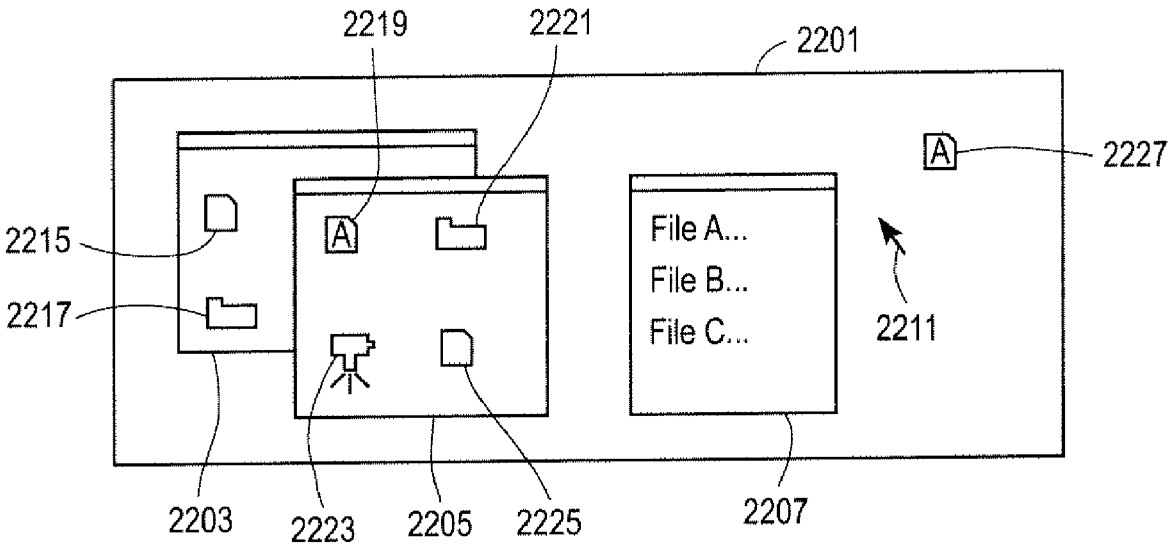
FIGS. 22A, 22B, 22C, and 22D illustrate the display of a display device on which an embodiment of the method of FIG. 21 is performed.
Figure 22B:
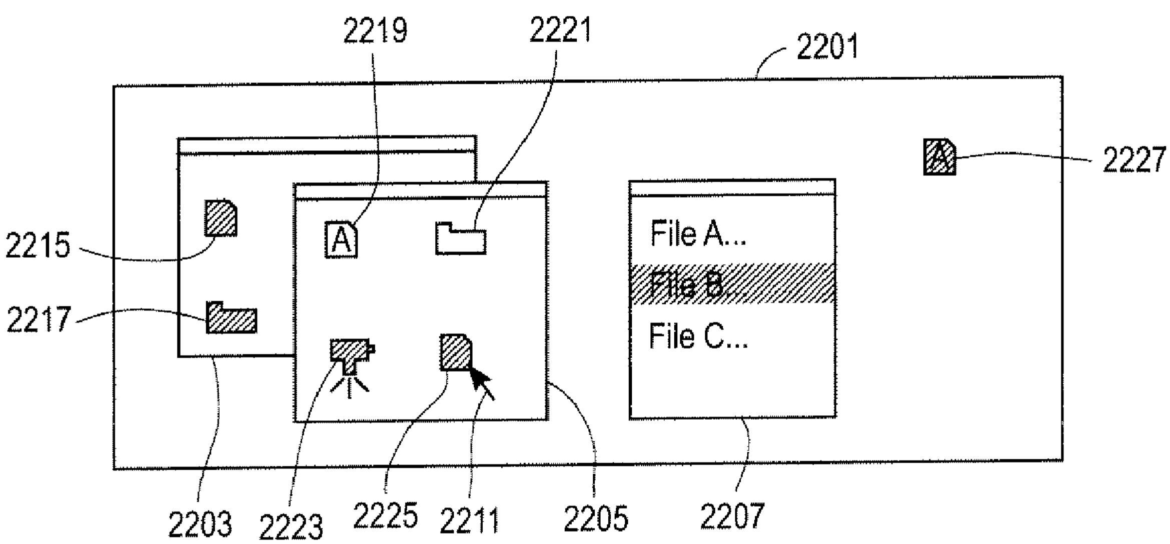
Figure 22C:
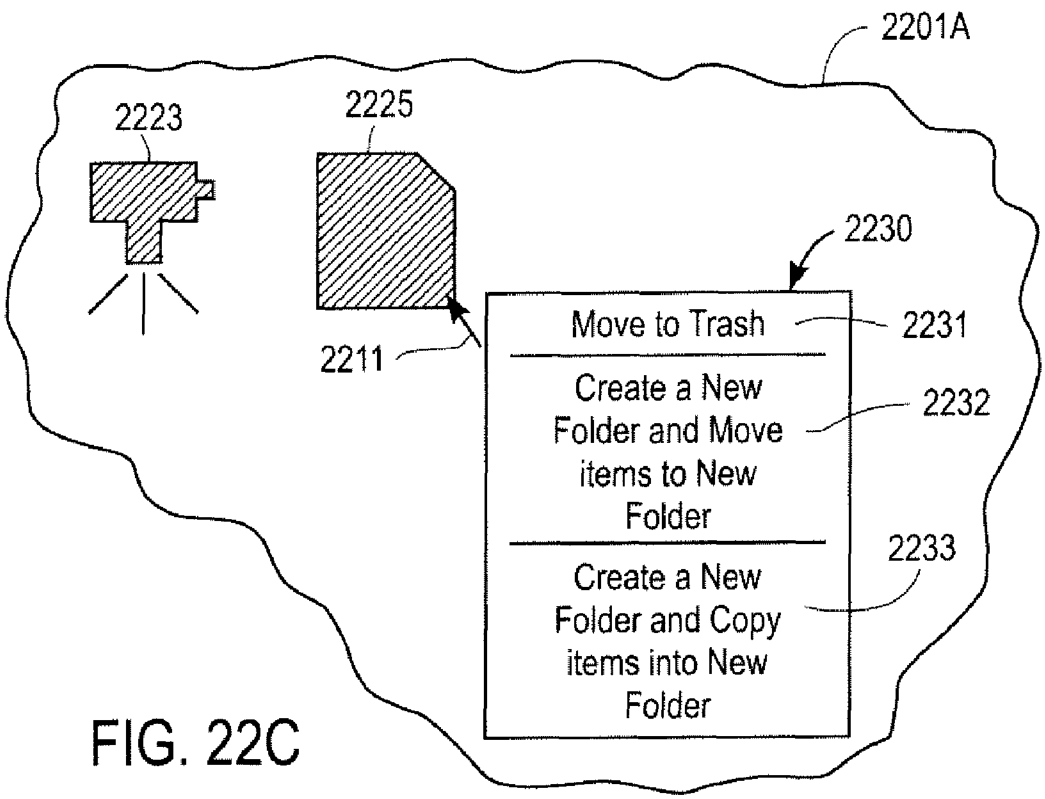
Figure 22D:
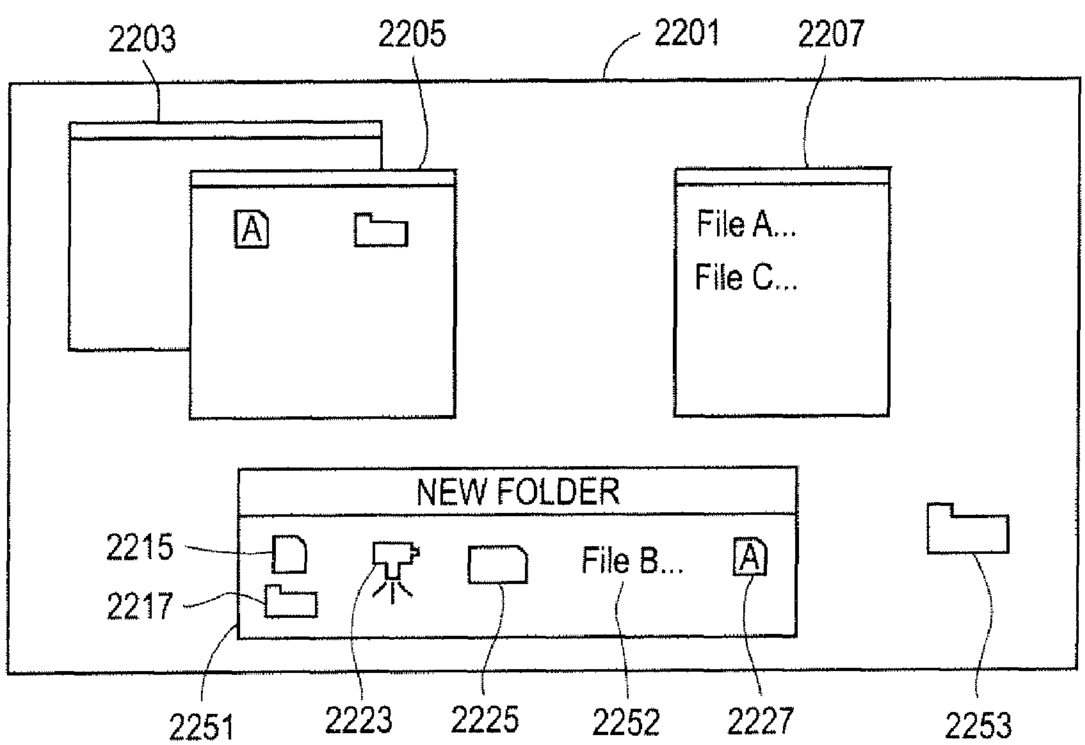

FIGS. 22A-22D show one example of the method of FIG. 21. A desktop 2201 on a display device is shown containing multiple windows and also an icon 2227 on the desktop. A cursor 2211 is also shown on the desktop. The windows 2203, 2205, and 2207 each contain a plurality of items shown as icons. In particular, window 2203 includes a data file represented by icon 2215 in a folder (e.g. a graphical representation of a subdirectory in a file storage system) represented by icon 2217. The window 2205 includes a program icon 2223 and a document icon 2219 and another document icon 2225 and a folder icon 2221. The window 2207 shows a list view of several files including "File B." The user may then, using the cursor 2211 or using other conventional user interface techniques, select multiple items. This may be done with one input or more inputs which indicate the selection of multiple items. FIG. 22B shows the result of the user having selected icons 2215, 2217, 2223, 2225, 2227, and "File B" in window 2207. It can be seen that the cursor 2211 is positioned adjacent to the icon 2225 at this point in the operation. Then the user, after having selected a plurality of items, may invoke the command referred to in operation 2103. An example of this is shown in FIG. 22C which represents a portion of the desktop 2101, which portion is designated 2201A as shown in FIG. 22C. The user has caused a pop-up menu 2230 to appear, which pop-up menu includes three options 2231, 2232, and 2233. Option 2231 would allow a user to move all the selected items into the trash (e.g. delete them) while options 2232 and 2233 relate to the command referred to in operation 2103 of FIG. 21. In particular, option 2232 is a command which is selectable by the user to create a new folder and, in the same operation, move the items which have been selected into the new folder. Option 2233 is a command which allows the user to, in one operation, create a new folder and copy the selected items into the new folder. In the example shown in FIGS. 22A-22D, the user will select option 2232, thereby causing the system to create a new storage facility, such as a new folder with a predetermined directory name (e.g. "new folder") or alternatively, a user specified path name. This result is shown in FIG. 22D in which the desktop 2201 now includes a new window labeled "new folder" which represents and shows the contents of this new folder, which is also shown as the folder 2253 which is a graphical user interface representation of this new folder.

It will be appreciated that this method may employ various alternatives. For example, a window may appear after the command option 2232 or 2233 has been selected, and this window asks for a name for the new folder. This window may display a default name (e.g. "new folder") in case the user does not enter a new name. Alternatively, the system may merely give the new folder or new storage facility a default path name. Also, the system may merely create the new folder and move or copy the items into the new folder without showing the new window as shown in FIG. 22D.

Figure 38:
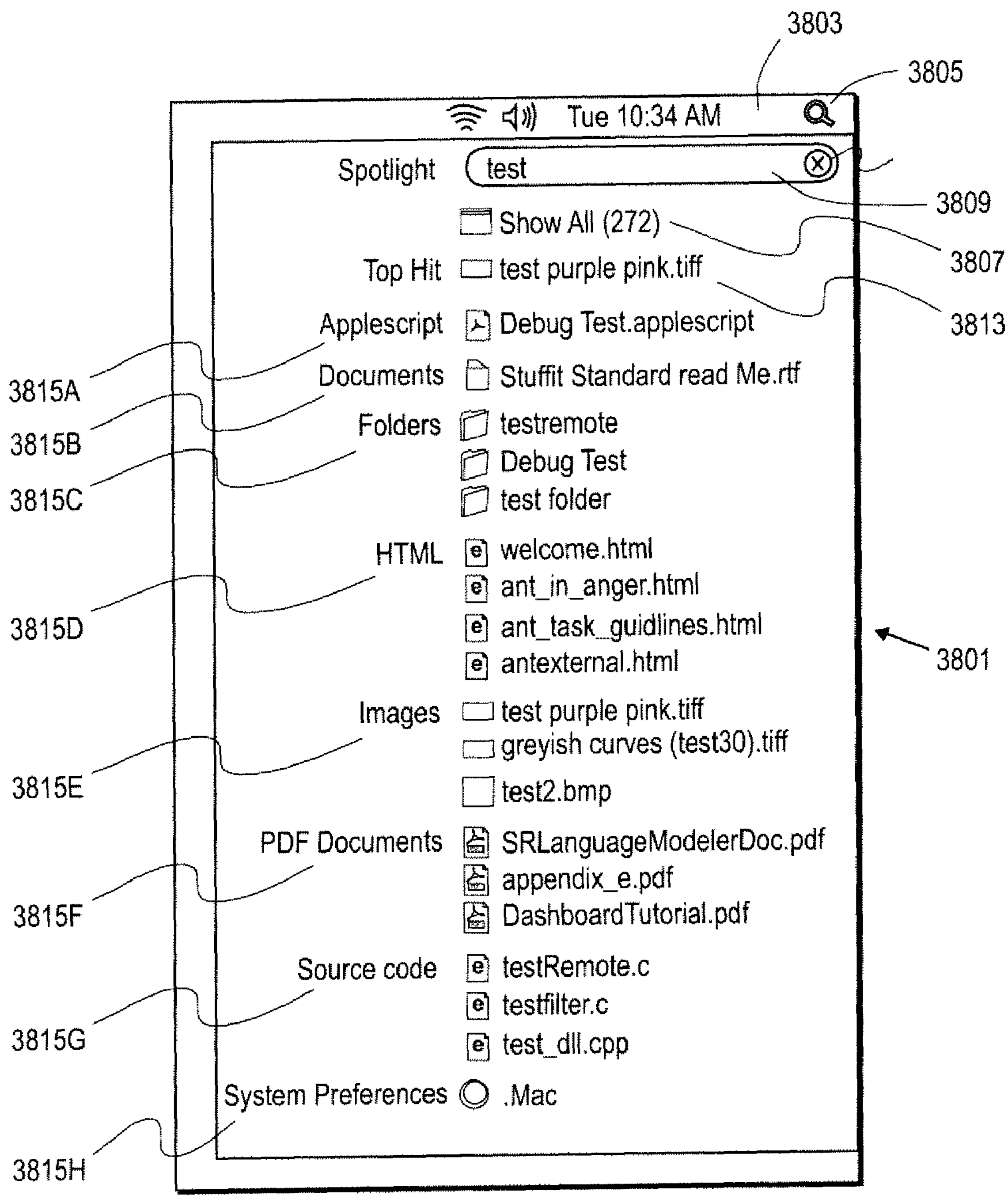
FIG. 38 shows an exemplary user interface for displaying search results, wherein the number of items from the search result is limited within a non-scrollable view.

Another aspect of certain embodiments of aspects described herein relate to the presentation of a limited number of items found from a search query rather than displaying a full list of items found from the search query. In a particular implementation, shown in FIG. 38, a limited number of items (e.g. the N most relevant hits, where N is a finite number such as 20) is displayed within a non-scrollable display region, such as display region 3801 shown in FIG. 38. This region also includes a command "show all" 3811 which may be selected by the user to display all of the items found in the search, and the region may also include a "top hit" command such as top hit 3813 shown in FIG. 38. Selection of the "show all" command 3811 causes the display of a window which is capable of showing all of the items found in the search (which may be referred to as "hits"); examples of such windows are shown in FIGS. 39, 40, 41, 42, and 43. The contents of display region 3801 are obtained by performing a search, which may occur by selecting the icon 3805 on the menu bar 3803, which causes the display of a text entry field 3807, into which a user may enter a word or phrase to cause the search to be performed. The results may appear as a user enters characters in the search entry field 3807 or after the user hits a return key or otherwise instructs the system to perform a search using the inputted text. The icon 3809 may be used to either start or stop a search. The items which are found in the search are ranked according to relevancy and/or recency. Techniques for ranking files that are found in a search according to recency and/or relevancy are known in the art. This ranking typically results in the determination of a most relevant file which is shown as the top hit file 3813 for a particular search. The system identifies this file as shown in FIG. 38 so that the user can select the file to be opened. For example, in one embodiment, pressing the return key will cause the "show all" window to be displayed, while pressing the enter key or a combination of keys will open the top hit. The items found in the search are grouped and displayed within their categories as shown in FIG. 38. For example, categories 3815*a*, 3815*b*, 3815*c*, 3815*d*, 3815*e*, 3815*f*, 3815*g*, and 3815*h* are all distinct categories having items which were found in the search. The total number of hits within the display region 3801 is limited to a predetermined number or, alternatively, to some number less than the total number of items which were found in the search. In addition, the number of items within each category, such as category 3815*d* (which is for html documents) is also limited such that it will be less than the total number of items found. This also allows more than one category to be displayed in the listing. The interface provided by the example shown in FIG. 38 allows a user to quickly assimilate a small number of hits. This may facilitate a recognition by the user that the search query was improper. It may also facilitate the rapid finding of a particular item. The use of grouping by categories as shown in FIG. 38 also facilitates rapid finding as the user may be able to examine a category of a document which is being searched for and thus can look into that category quickly. FIG. 44 shows an exemplary method for displaying an interface such as that shown in FIG. 38. In operation 4401, a search is performed and the files which are found are ranked within each category. Optionally, the categories themselves may be ranked; for example, the categories may be ranked based upon the most relevant file within each category. In operation 4403, an abbreviated list is displayed, such as the list shown in the display region 3801 of FIG. 38. This list of search results may be displayed in a non-scrollable list, and the list does not show all of the items found. For example, if the number M is the number of files found in a search, only N number of most relevant files are displayed in the display region 3801, where N is less than M. Further, the files are grouped within categories in the list as shown in FIG. 38 and the number of displayed files in the list within a category is also limited. Concurrently with operation 4403 or at a different time, a top hit selection will be displayed and a show all command may also be displayed as in operation 4405. Operation 4407 indicates the manner in which the user may cause the show all window to be displayed in certain embodiments or may cause the top hit to be opened in those certain embodiments.

Figure 39:
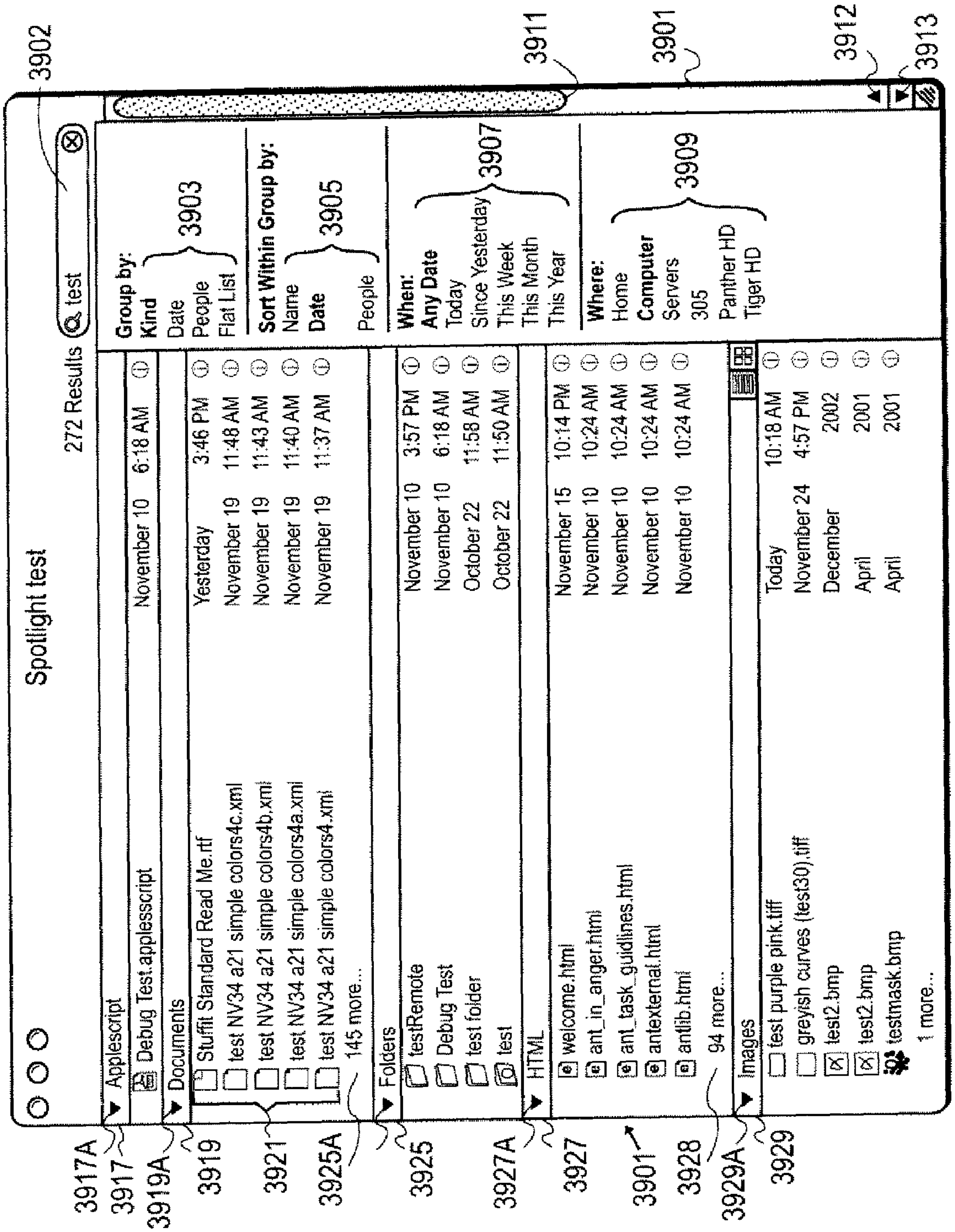
FIGS. 39, 40, 41, 42, and 43 show various exemplary user interfaces for displaying search results according to certain embodiments of the present invention.
Figure 40:
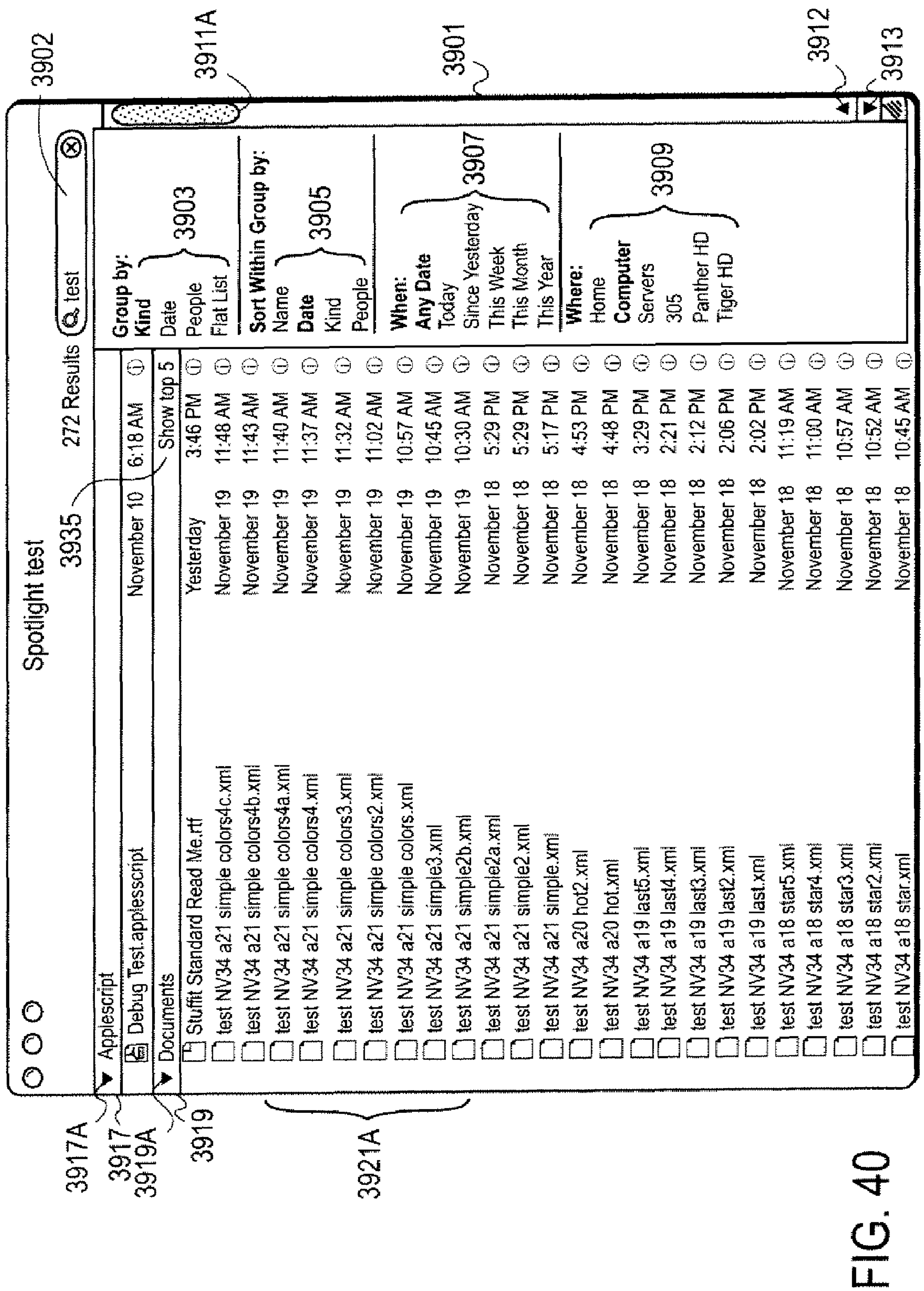
Figure 41:
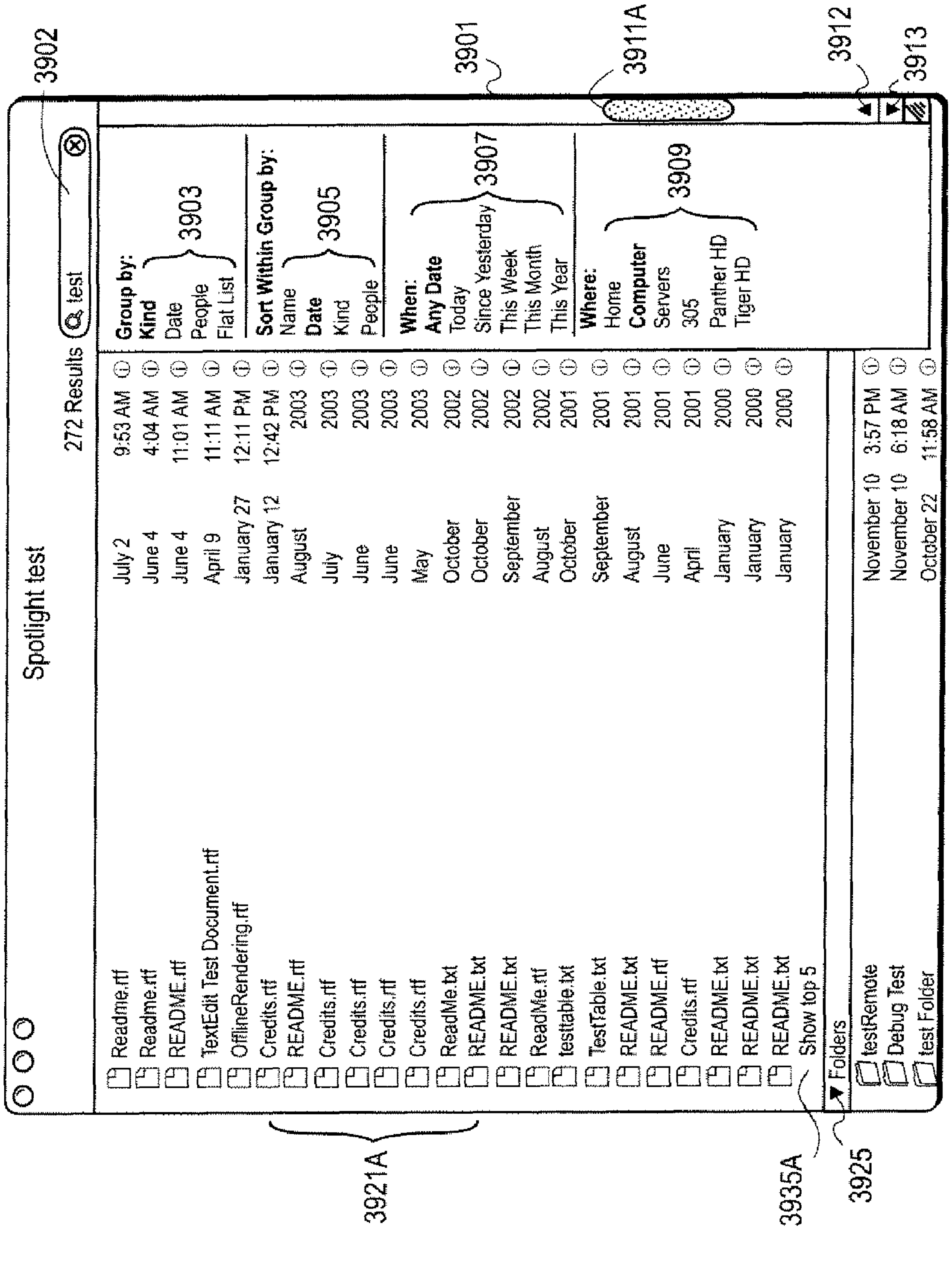
Figure 42:
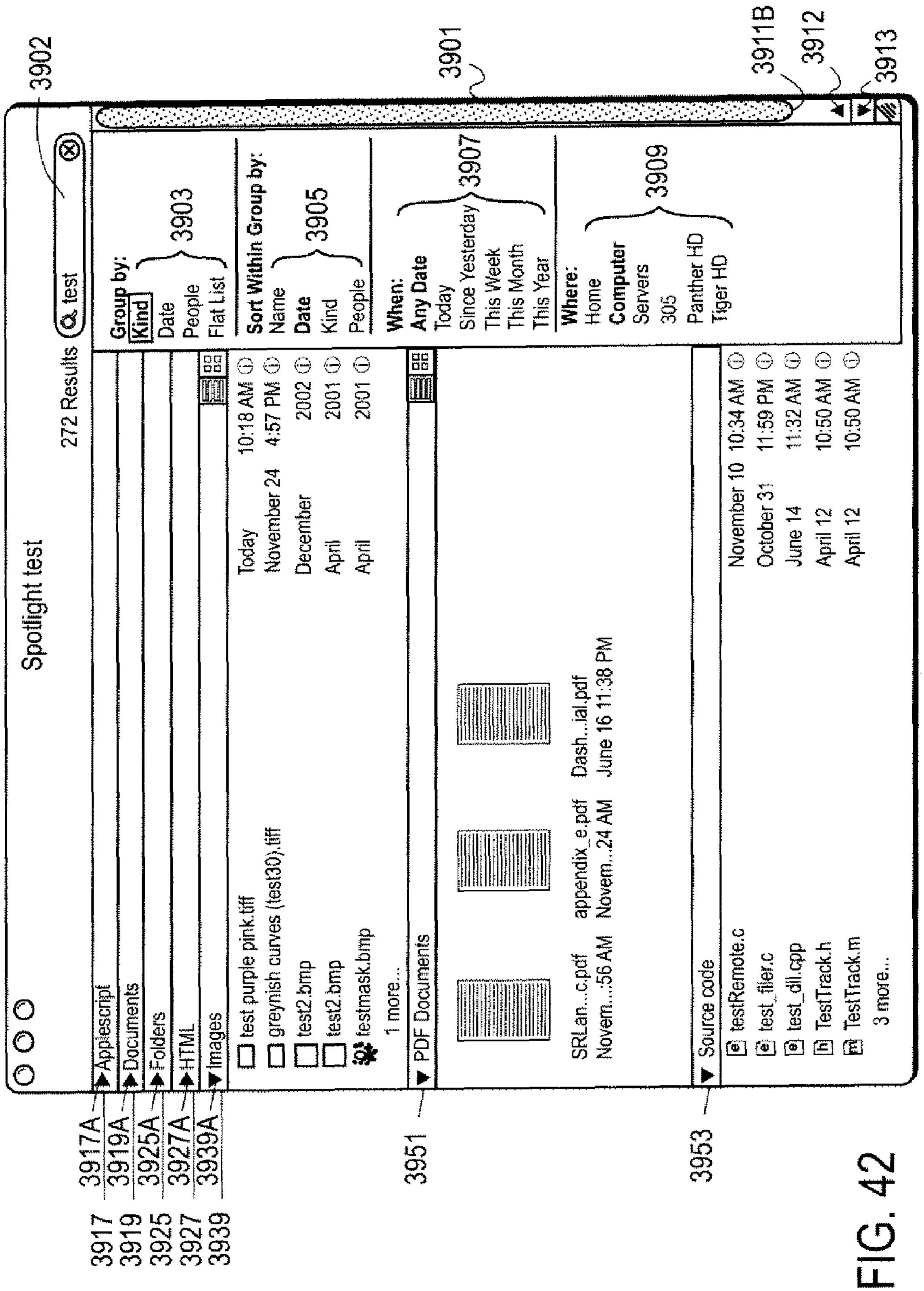
Figure 43:
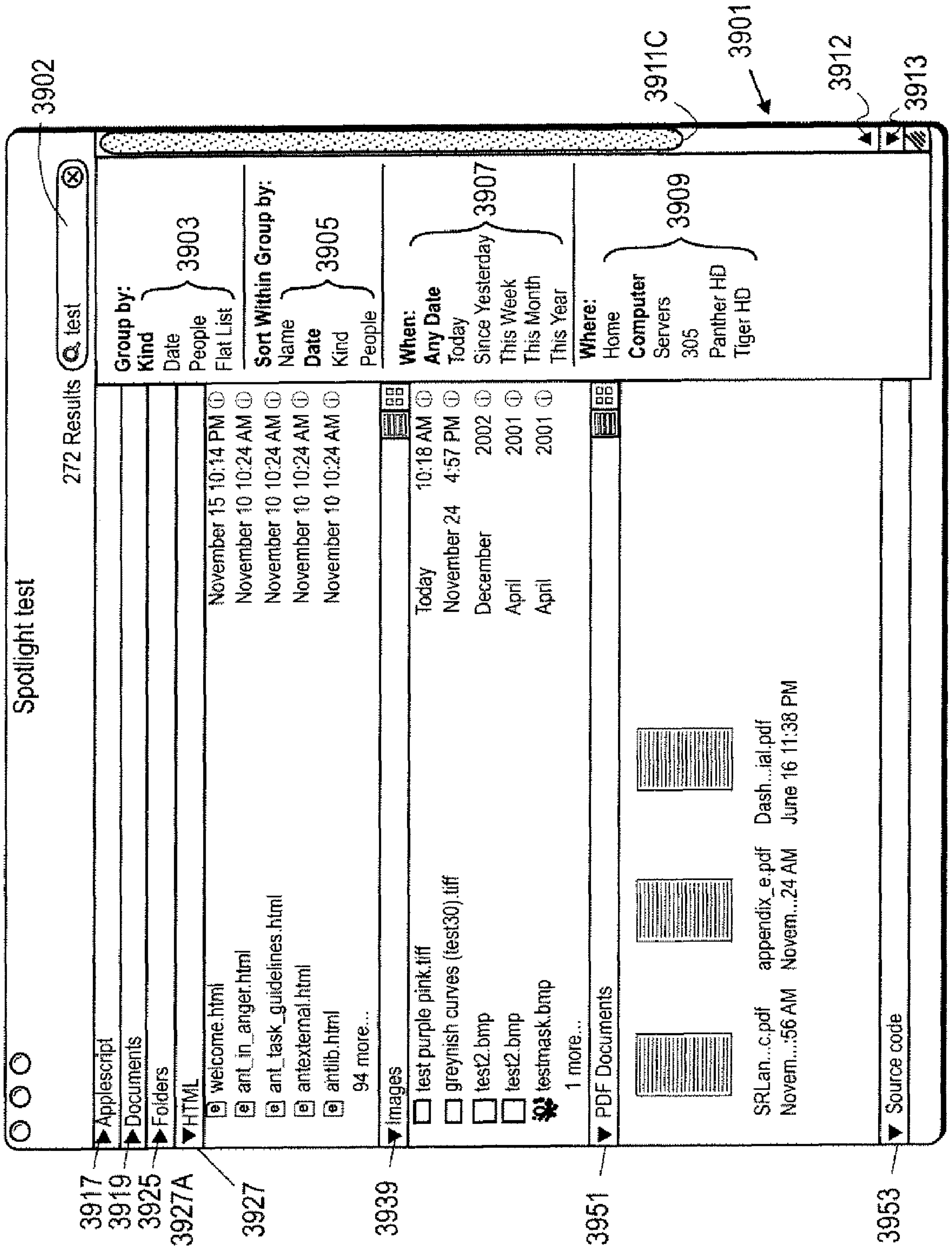
Figure 44:
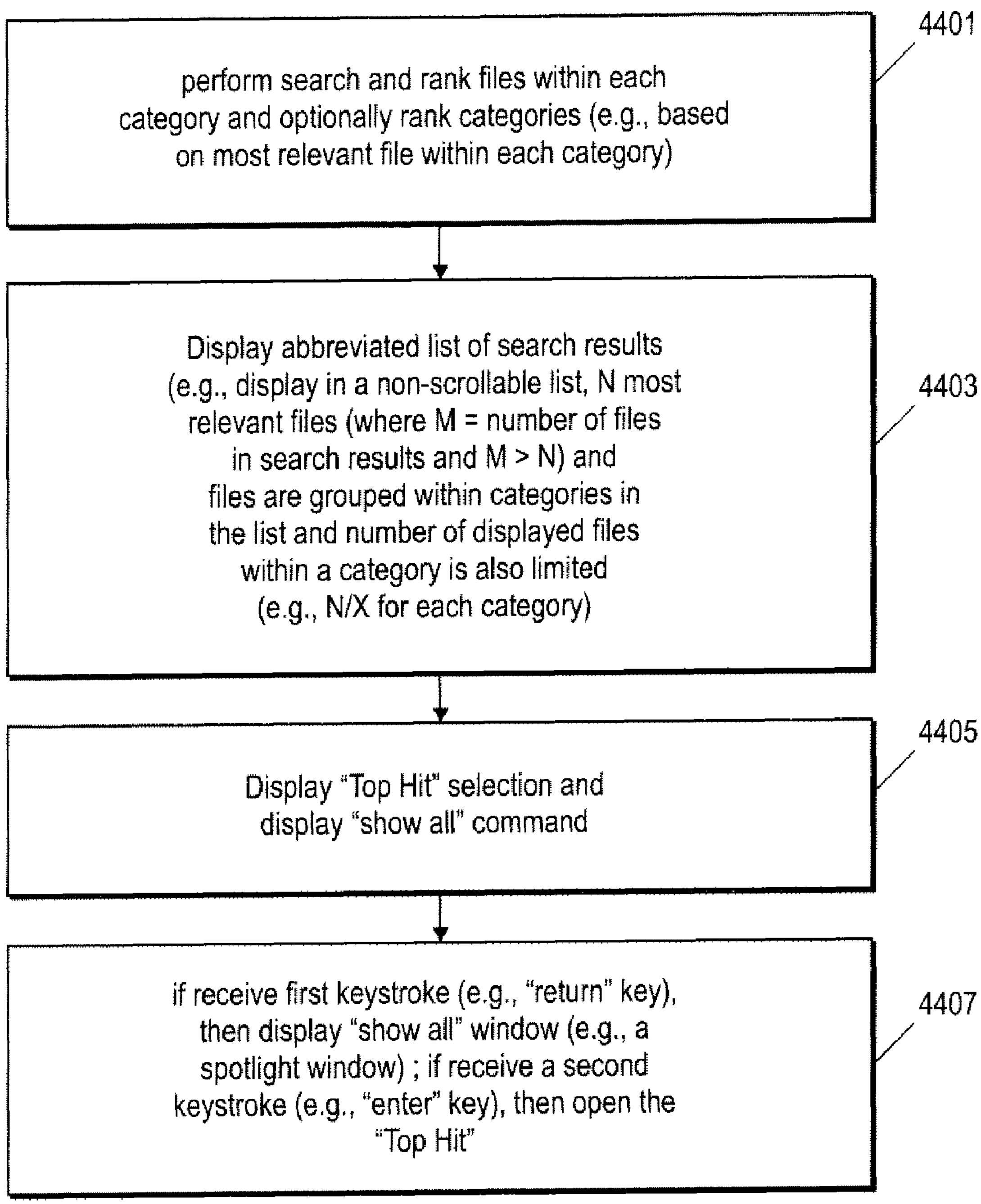
FIG. 44 is a flowchart illustrating an exemplary method for displaying a limited number of items within a search result window or interface.

FIGS. 39-43 illustrate a graphical user interface which allows the user to control the manner in which the search results are displayed. In the example shown in FIG. 39, the window 3901 has the capability of displaying all of the search results from performing the search shown in FIG. 38. Window 3901 thus is capable of displaying all of the search results from performing the search shown in FIG. 38. Window 3901 thus is capable of displaying all 272 results from the search, rather than the limited number shown in display region 3801. The window 3901 is a scrollable window which includes a scroll control 3911 and scrolling arrow buttons 3912 and 3913, all of which allow for the control of the scrolling of the files displayed within the window 3901. Headings for each category with the name of the category are included within the main display region of the window 3901. These headings distinguish between the different categories of files, such as folders, html documents, images, PDF files, documents, etc. The headings 3917, 3919, 3925, 3927, and 3929 also include corresponding toggle switches 3917*a*, 3919*a*, 3925*a*, 3927*a*, and 3929*a* which allow for the display of items within each category to be collapsed or expanded depending upon the state of the particular toggle switch. This is described further below in conjunction with FIGS. 42 and 43. The text input field 3902 shows the text that was entered to cause the search. The group control 3903 allows the user to group the search results according to a variety of different parameters. In the particular example shown in FIG. 39, the user has selected the "kind" parameter to group the search results by. In other words, the type of document (e.g. an html document or an image document, etc.) is used to group the results by so that the documents are displayed within categories. Alternatively, using the group control 3903, the user may select the date parameter (to group by dates), the people parameter (to group by people), or a flat list (no group) to achieve different displays. The date parameter will list and group the documents by date, and the people parameter will list and group the documents based upon the author of the document so that the categories will be the author of the document or in some other way which is based upon an identifier of a person. The sort by control 3905 allows the user to sort within groups to the extent that the results are displayed within groups. In the example shown in FIG. 39, the user has selected the date parameter from the sort control 3905. A "when" control 3907 shows that the search input is not restricted by date (and thus "any date" is highlighted in the "when" control 3907). Thus this control indicates a parameter as opposed to receiving an input from a user. Alternatively, the "when" control 3907 may allow the user to alter the selected time period which will cause the search to be redone based upon a new time period. The "where" control 3909 shows where the search was performed. It may be the entire computer or remote servers or a particular partition or folder of a volume or hard drive. The "where" control 3909 may be a mere display which shows the location or, alternatively, may be a control which allows the user to change the location and thereby redo the search. The search results shown in FIG. 39 are similar to the search results shown in FIG. 38 in that within each category, there are only a limited number of documents shown in the window 3901. Thus, for example, in the "documents" category under the heading 3919, there are five files 3921 which are shown within the window 3901. A clickable button 3920 shows that there are a 145 more documents which were found by the search. The activation of this button will cause the display of all of the files in this category as shown in FIGS. 40 and 41 which figuratively show, in a scrollable view, all the files within the "documents" category. Scrolling may be performed by using the scroll control 3911*a* or by using the scrolling arrows 3912 and 3913. The user may return back to the view showing only the top 5 (top 5 most relevant files within the "documents" category) by activating either button 3935 or 3935*a* shown in FIGS. 40 and 41, respectively. The files 3921*a* shown in both FIGS. 40 and 41 represent the complete files in the "documents" category, where the view in FIG. 40 is the top of the list within the documents category and the view within FIG. 41 is the bottom of the list within the documents category; it will be appreciated that a set of files between this top and bottom is not displayed in either FIG. 40 or 41. The user can return back to showing the top 5 files within the documents category by selecting either button 3935 or 3935*a*, thereby returning to the view shown in FIG. 39. The user can also expand and collapse the categories themselves to provide more space to reveal other files in other categories. An example of this is shown in FIGS. 42 and 43. In FIG. 42, the categories "AppleScript", "documents", "folders", and "html" have been collapsed while the categories "images", "PDF documents", and "source code" are shown in expanded form (but in each case limited to the top 5 hits within each category). The expansion or collapsing is controlled by activation of the respective toggle for each category, such as the toggle 3917*a* for the AppleScript category. The html category is shown in a collapsed form in FIG. 42 while in FIG. 43 it has been expanded by the user's activation of a toggle 3927*a*.

Figure 45:
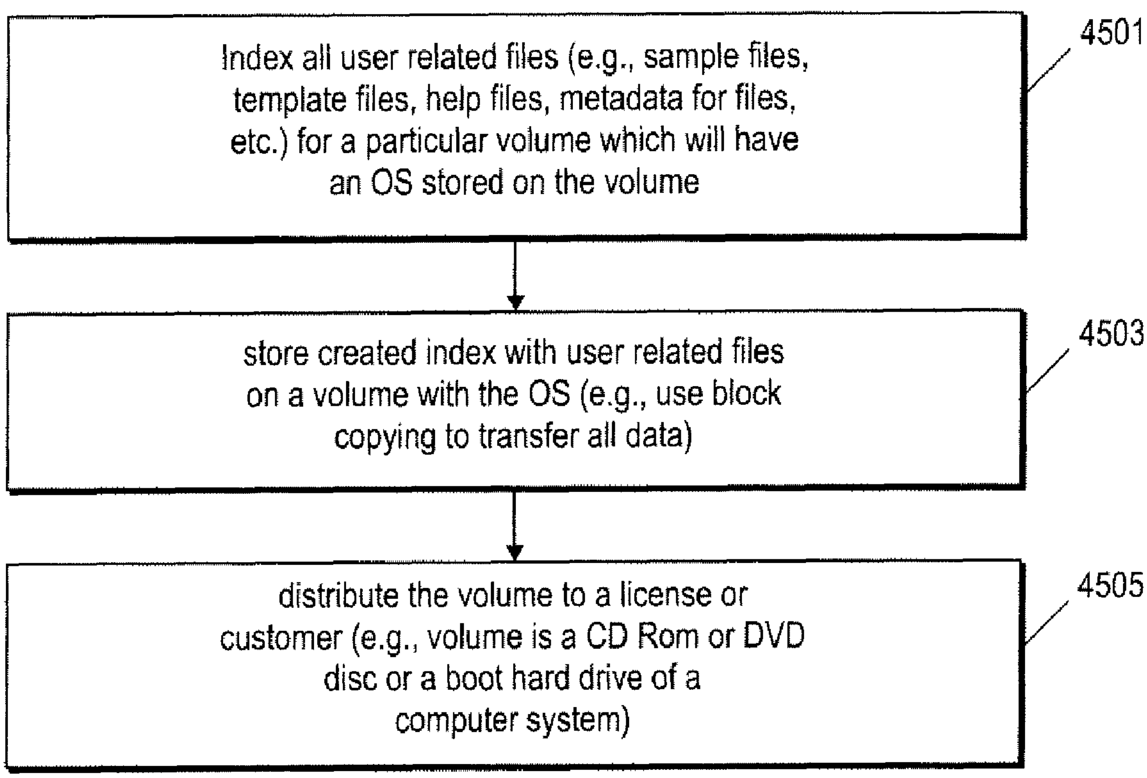
FIG. 45 is a flowchart illustrating an exemplary method for indexing all user related files prior to the user receiving the volume which contains the user related files and which may also contain an operating system software on the same volume.

FIG. 45 shows another aspect of at least certain embodiments in which volumes containing user related files are indexed prior to the user receiving the volume. The volume may be a CD ROM containing an operating system, certain user software applications and user related files. The user related files may include template files, reference data files (e.g. a dictionary or encyclopedia), read me files, and other related files in addition to help files. So, for example, if the volume contains a word processing application, such as Microsoft Word, the user related files may include many Word template files and other preexisting user related files which are accessible by the user through the use of Microsoft Word or another user application program. The volume may alternatively be a magnetic hard drive which is the main boot drive of a computer system, and the method of FIG. 45 describes a portion of the manufacturing process in which the hard drive is created with all of the necessary operating system software as well as the user related files and application programs for use by the user. The method of FIG. 45 may begin in operation 4501 in which the manufacturer's system indexes all user related files for a particular volume. The data which is indexed includes user sample files, user template files, and metadata for the files. It is clear, thus, that the indexing which is performed is beyond indexing of just help files. After the index is created in operation 4501, it is stored with the user related files and with the operating system software on a volume. The storage process may involve a block copy operation to write the data to the storage volume, such as a CD ROM or a magnetic hard drive which would be the main boot drive of a newly manufactured computer system. Then in operation 4505, the volume is distributed to a licensee or customer. For example, the volume is distributed as a CD ROM or a DVD disk to a licensee or customer or the customer of a newly manufactured computer receives the volume as a magnetic hard drive of the system which causes the system to start up by using the operating system software on the hard drive. The pre-indexing of files prior to the user receiving the volume saves the user time. However, files may be indexed on volumes not previously indexed and the user may be alerted of this indexing process in the manners shown in FIGS. 46 and 47.

Figure 46:
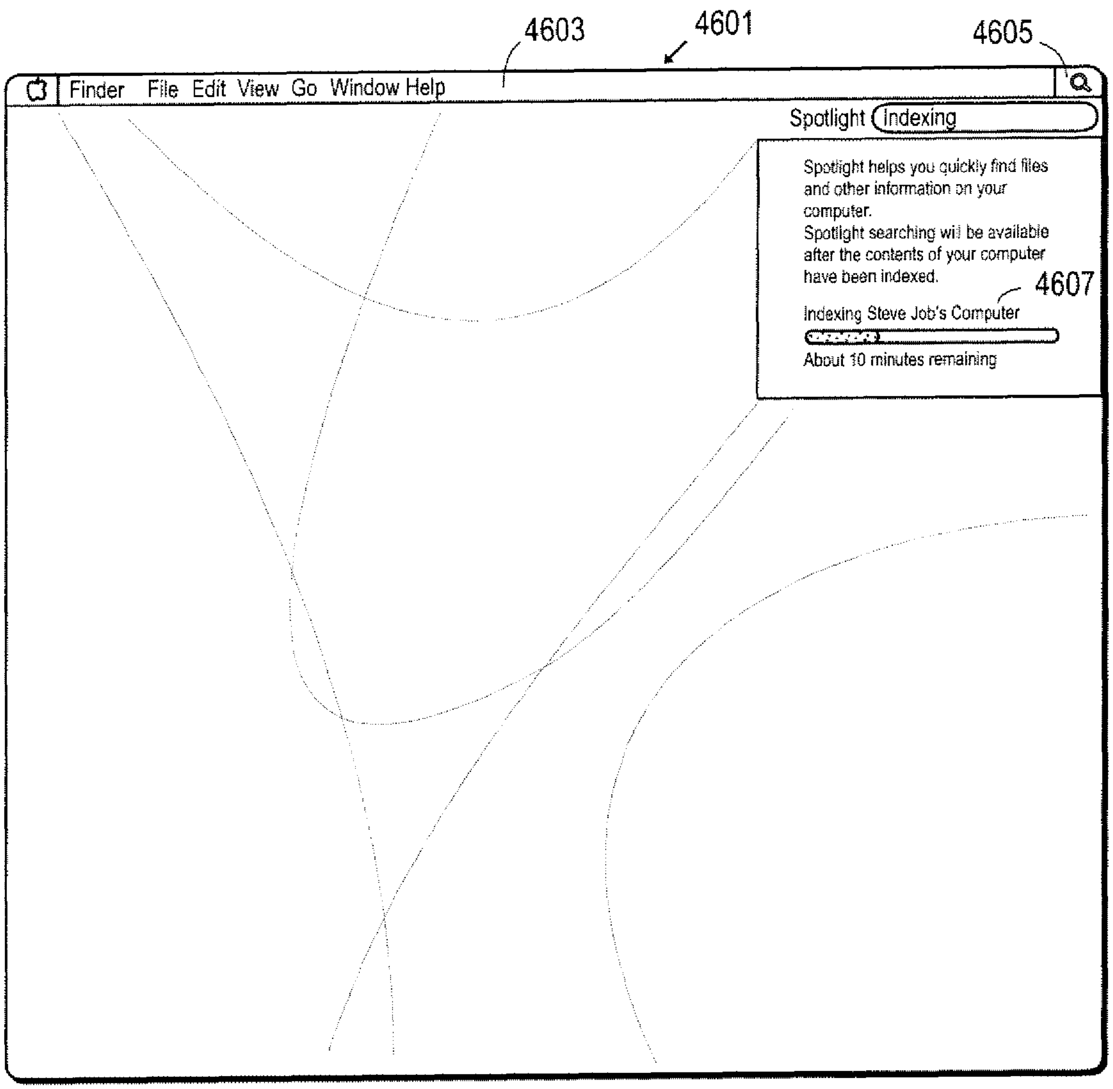
FIGS. 47 and 46 show exemplary user interfaces for indicating the status of an indexing operation, which may be necessary if the volume being searched or to be searched has not been previously indexed, as is the case with a pre-indexed volume.
Figure 47:
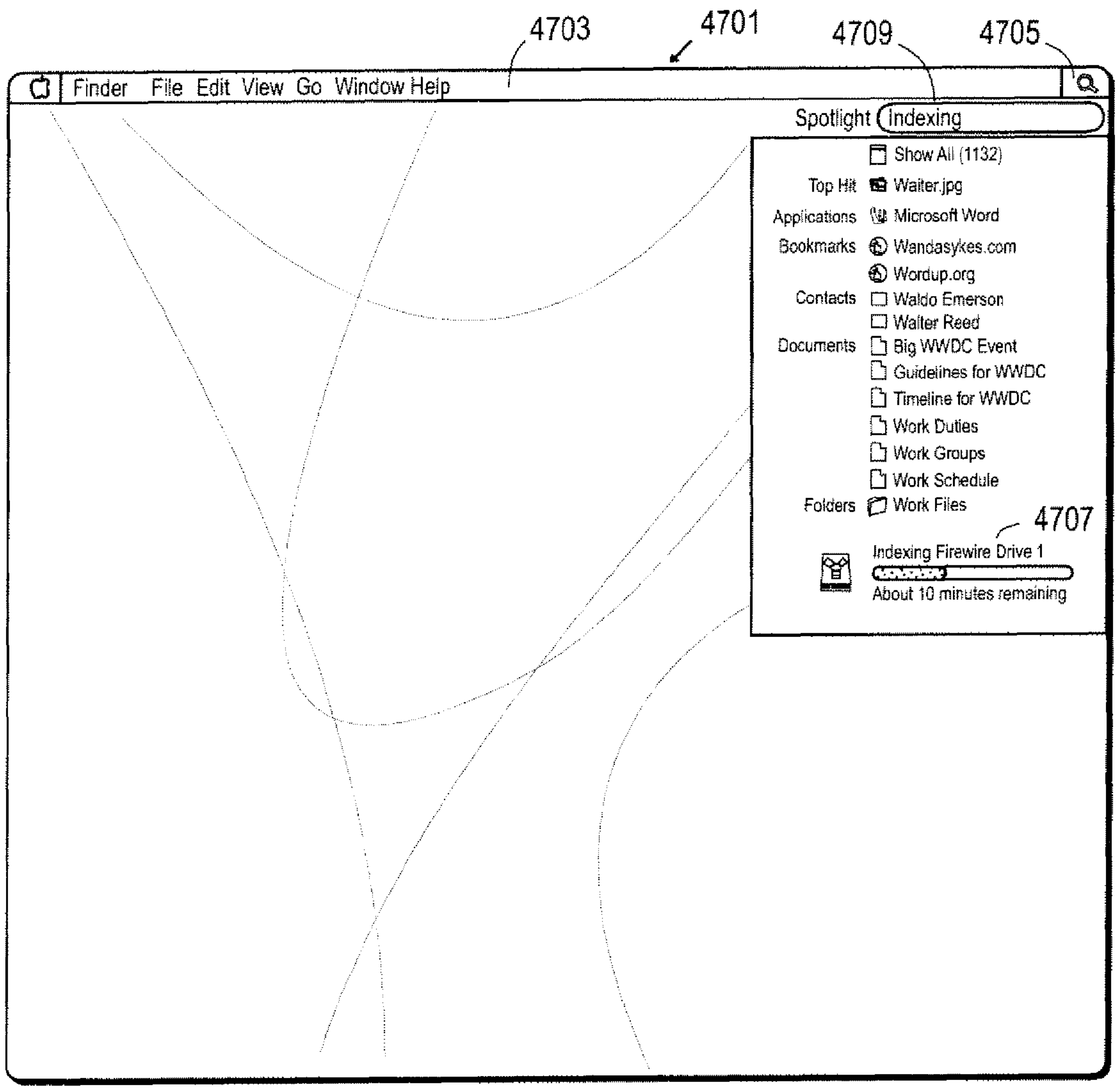

When a volume has not been previously indexed, the user may still cause the volume to be indexed. This may happen automatically as a consequence of attaching the volume (e.g. attaching a hard drive which is portable and which includes a USB interface to a computer system through a USB port, etc.) or as a result of the user instructing the system to do so through a command on a graphical user interface. In either case, it may take some time to index the volume, and a progress bar, such as the progress bars 4607 or 4707 may be displayed while this indexing is being performed. In one implementation (e.g. the example shown in FIG. 46), no searching may be allowed while the indexing is being performed. In an alternative implementation, a search of the files which have been indexed so far may be allowed, which is the implementation shown in FIG. 47. FIG. 46 shows a graphical user interface 4601 which includes a menu bar 4603 and a search pull down icon 4605 which may be used to enter text into a text entry field, such as the field 4709 shown in FIG. 47. Similarly, FIG. 47 shows another graphical user interface 4701 which includes a menu bar 4703 and a search menu 4705 which is activated from the search pull down icon on the menu bar 4703.

Figure 48:
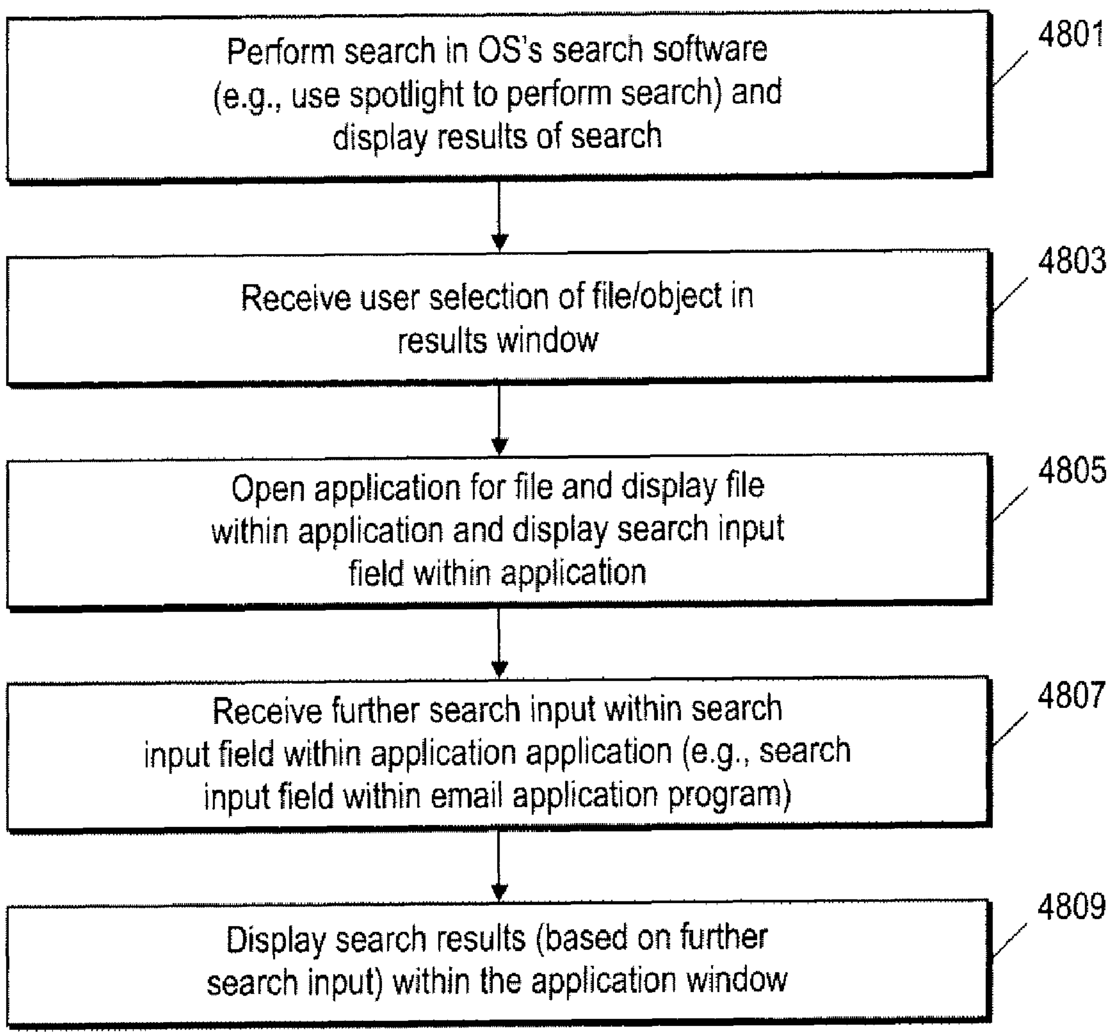
FIG. 48 shows a flowchart illustrating an exemplary embodiment for passing a search query, which has been processed by a system wide search interface and software, to a particular application having the file found in the search, if further searching may be performed within the application after the search query has passed to the application.

FIG. 48 shows another aspect of certain embodiments described herein. The method shown in FIG. 48 allows a system wide search utility to pass a search query to an application which created a file which was found by the search query, to thereby allow the application to continue searching by modifying the search query within the application. An example of this method may be implemented with an email program, where an email file is found by the system wide search utility (e.g. "Spotlight") as a result of the search query. Opening of the email file from the search results window results in launching the email program and displaying the particular email which was found in the search results. In addition, the email program may display the search parameters, such as the search query which was used to find the opened file in the system wide search utility, and may allow the user to modify that request and search specifically within email files managed by the email program. The method of FIG. 48 may begin in operation 4801 in which a search is performed in the operating system's search software (for example, using Spotlight to perform a search), and the results of the search are displayed in a search window, such as the search results window shown in FIG. 39. In operation 4803, the system receives a user selection of a particular file in the search results window, and this results in the system opening the application for the file and displaying the file within the application and also displaying a search input field within the application. This search input field may indicate the search query which was used in operation 4801. Further, the search input field may allow the user to further modify the search query or introduce a new search query in operation 4807. Then the email program or other application program which was opened or launched in operation 4805 will then display the search results based on either a new search input or a further search input within the application window itself.

Figure 49:
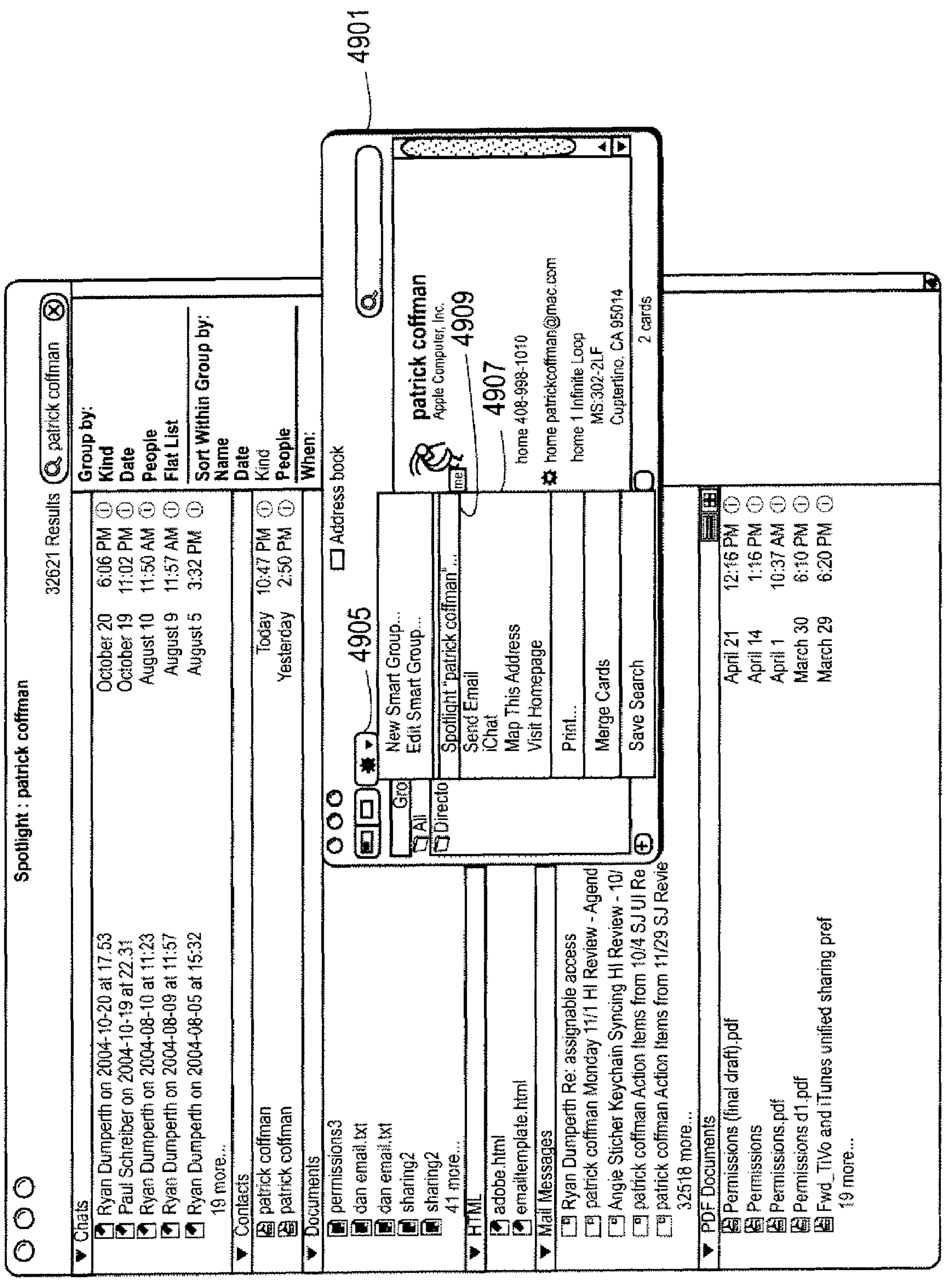
FIG. 49 shows an exemplary user interface having a contextual pull down menu which includes a search option based upon the present context of the window or interface which provides the pull down menu.

FIG. 49 illustrates another aspect of certain embodiments of the inventions described herein. According to this aspect, a search menu option generated by a window or application program is based upon the context of the window or application program, and the search option allows for the execution of a system wide search through files, including files created by other applications and including searching through the content as well as metadata of the files. In the example shown in FIG. 49, an address book program which controls the window 4901 has a menu option for searching based on the context. The context may be, as in the case of window 4901, some predetermined type of information in the currently opened window. This predetermined type may be user selectable. This menu option is activated by activating the icon 4905, which may be referred to as a tool icon. The activation of this icon results in the display of a pull down menu 4907 which includes the search option 4909. Since the address book is currently showing address information for a person "Patrick Coffman," the menu option 4909 allows the user to launch a search using the term "Patrick Coffman." Thus, the context of the address book software application which controls window 4901 controls, in this exemplary embodiment, the particular search term which is passed through, in this case, a system wide search utility, causing the display of the search result window 4903 which is shown behind the window 4901. The search may be through content of all indexed files on the system and through the metadata of files (of various different file types) on the entire system or a portion of the system (e.g., specific folders). The search result window 4903 is similar to the window 3901 shown in FIG. 39. If the software application is an email application as opposed to an address book application, the contextual menu 4907, which may be activated from a tool icon within the email program, may allow for the searching using either the sender's name or the recipient's name of a particular email which is displayed within the email window when the tool icon is activated to produce a pull down menu which is similar to the menu 4907 shown in FIG. 49. Similarly, in a word processing application, the contextual menu, which is similar to the menu 4907, for a particular document may allow for the searching of the author's name, where the author is specified as metadata for the particular file being viewed within the word processing application's window.

Figure 50:
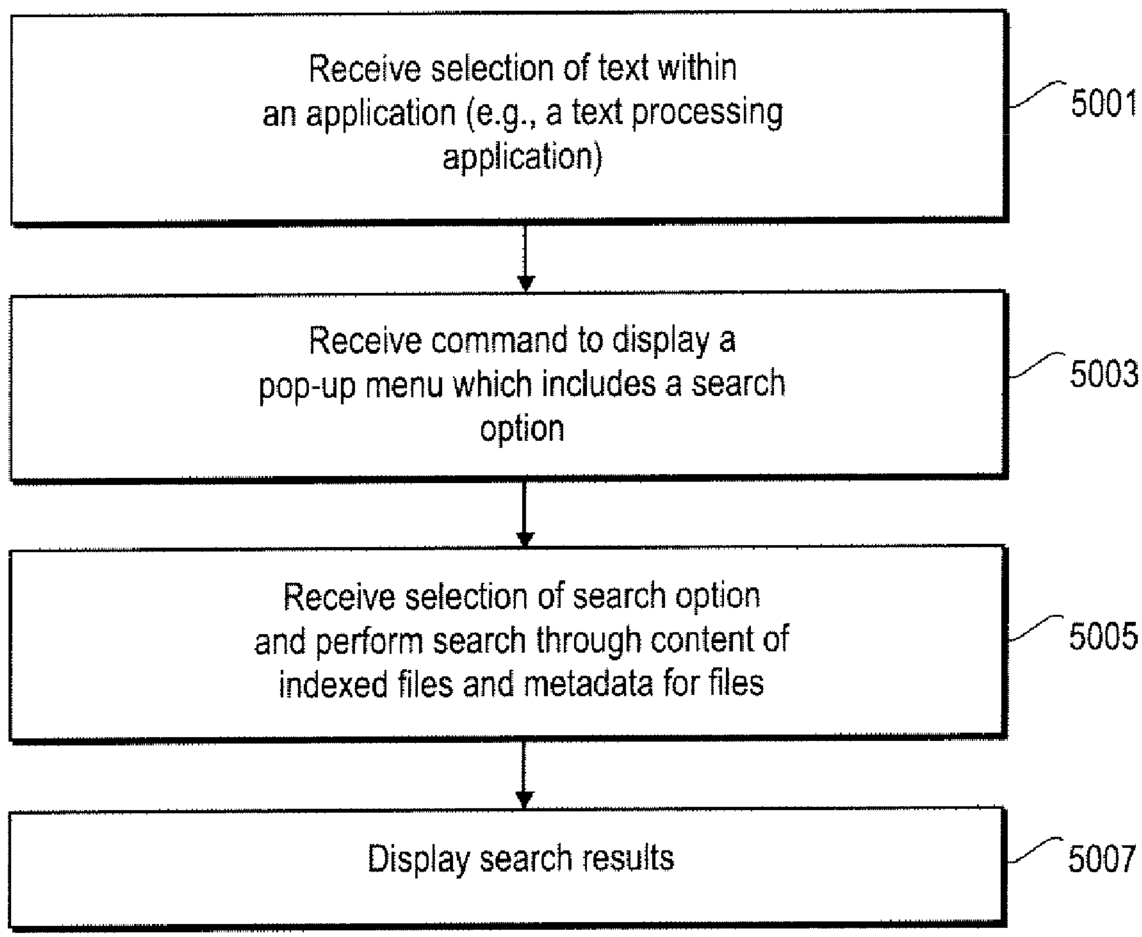
FIG. 50 is a flowchart showing an exemplary embodiment of a method allowing, in at least certain embodiments, system wide searching using text selected from a text processing application, such as a word processing application or an email application.
Figure 51:
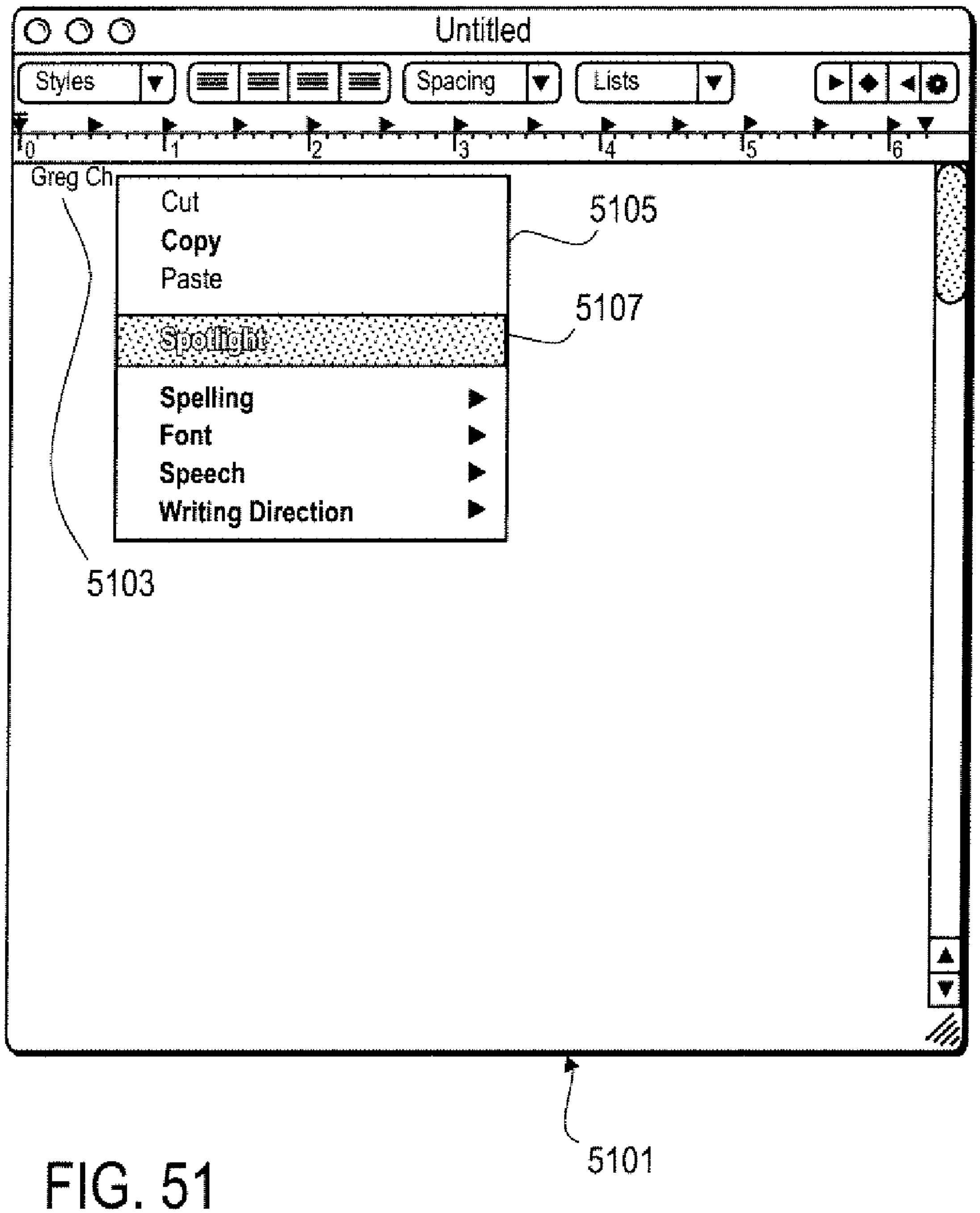
FIGS. 51, 52, and 53 illustrate an exemplary user interface which implements a method such as that shown in FIG. 50.
Figure 52:
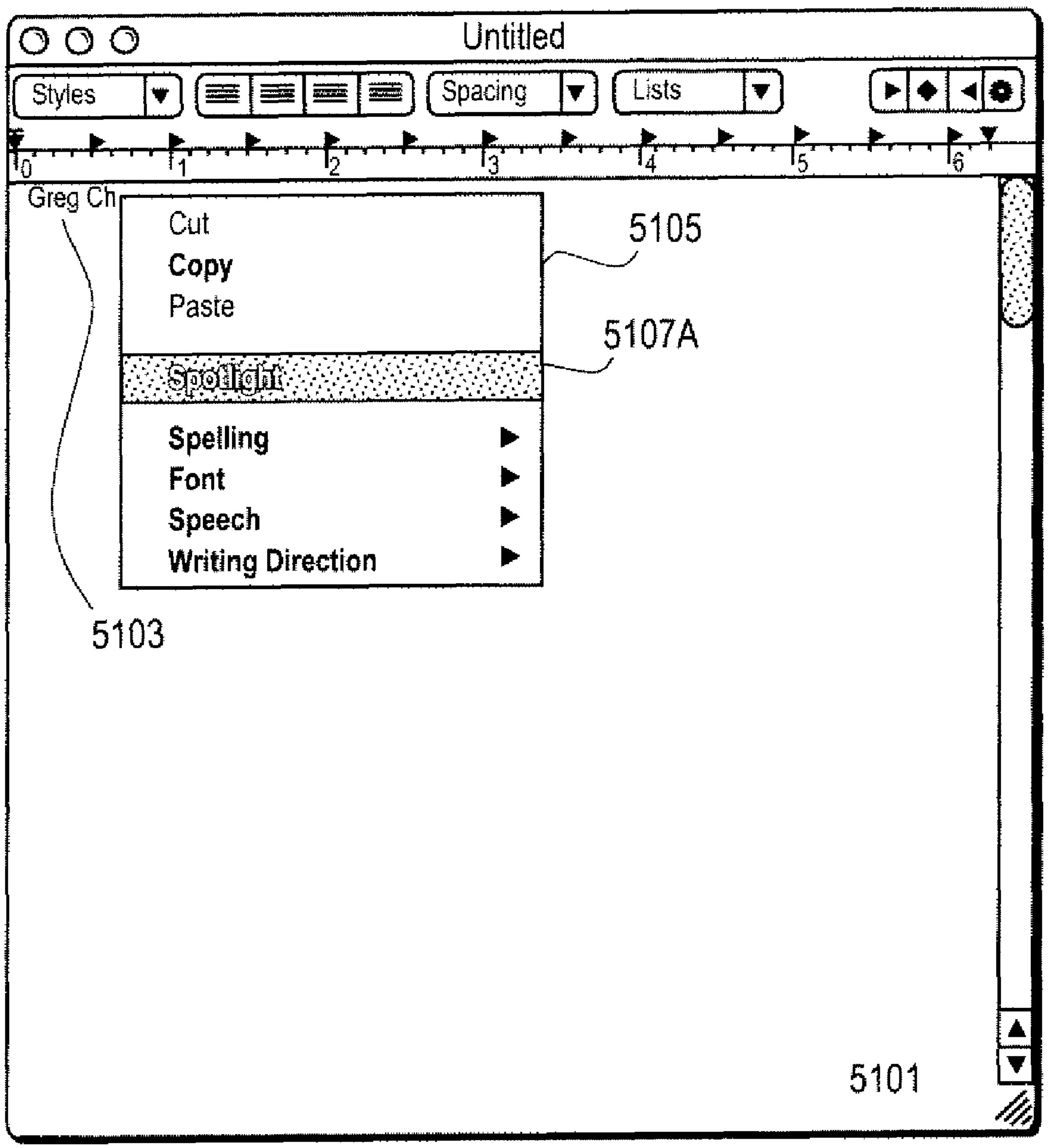
Figure 53:
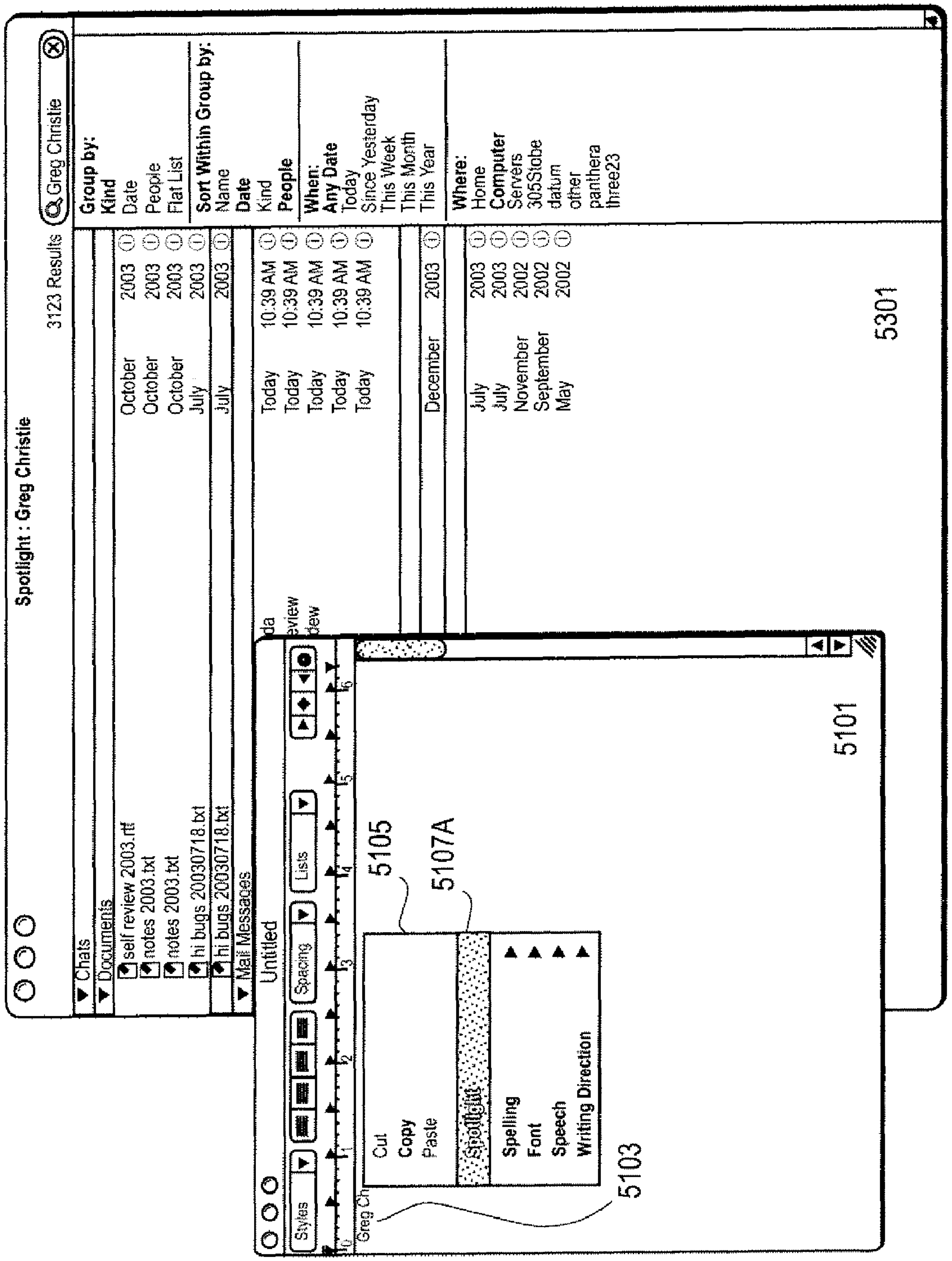

FIG. 50 shows another aspect of the present invention. According to this aspect, text within a text processing application, such as a word processing application or a text editing application or an email application or a PDF processing application, may be selected, and then after selection, a user may cause a menu to appear or may command the system to perform a search through other files (e.g. of different file types) in the system, including other files created by other software programs. Further, the search may be a search of content of the files as well as metadata of the files. The search may be in files of selected directories or through all user files in the system, as in the case of a system wide search. An exemplary method is shown in FIG. 50 and is also illustrated in FIGS. 51, 52, and 53 which illustrate an exemplary user interface. In operation 5001, the system receives a selection of text within an application, such as a text processing application. The text, "Greg Christie," is shown selected in FIGS. 51, 52 and 53. The selected text 5103 may then be used as an input to a system wide search by causing a menu to appear. This is shown in operation 5003 in which the system receives a command to display a pop-up menu which includes a search option. There are a number of different ways to cause this menu to appear, such as right-clicking (placing a cursor over the selected text and pressing and releasing a mouse's right button) on the selected text or by pressing a combination of keys, etc. before or after the text has been selected. Then the system, in operation 5005, receives the selection of the search option from the pop-up menu, which is shown as option 5107 within the menu 5105 shown in FIG. 51. FIG. 52 shows that the option has been selected by the highlighting 5107*a*. After the system receives the selection of the option, it performs a search through the content of the indexed files and the metadata for the files. The searching occurs in the file having the selected text as well as other files created by the same application and other files which are not created by the same application. The search results are then displayed in operation 5007, and an example of the display of the search results is shown as window 5301 in FIG. 53. Thus, a system wide search through files (e.g. of various different types) and metadata for the files may be activated from a text processing application, such as the application which controls the window 5101 shown in FIGS. 51, 52 and 53 which may be a text editing application or an email program or a word processing application. The text processing application is, at least in certain embodiments, capable of creating a new text document (e.g. a new word processing document or a new email message) and is capable of editing existing text documents. Further, the text processing application is typically capable of creating a text document which contains character codes (e.g. ASCII or Unicode codes) which represent text characters. The selection of text within the window of the text processing application may be through one of a variety of graphical user interface techniques (e.g. dragging a cursor across the text while pressing a button, etc.).

Figure 54:
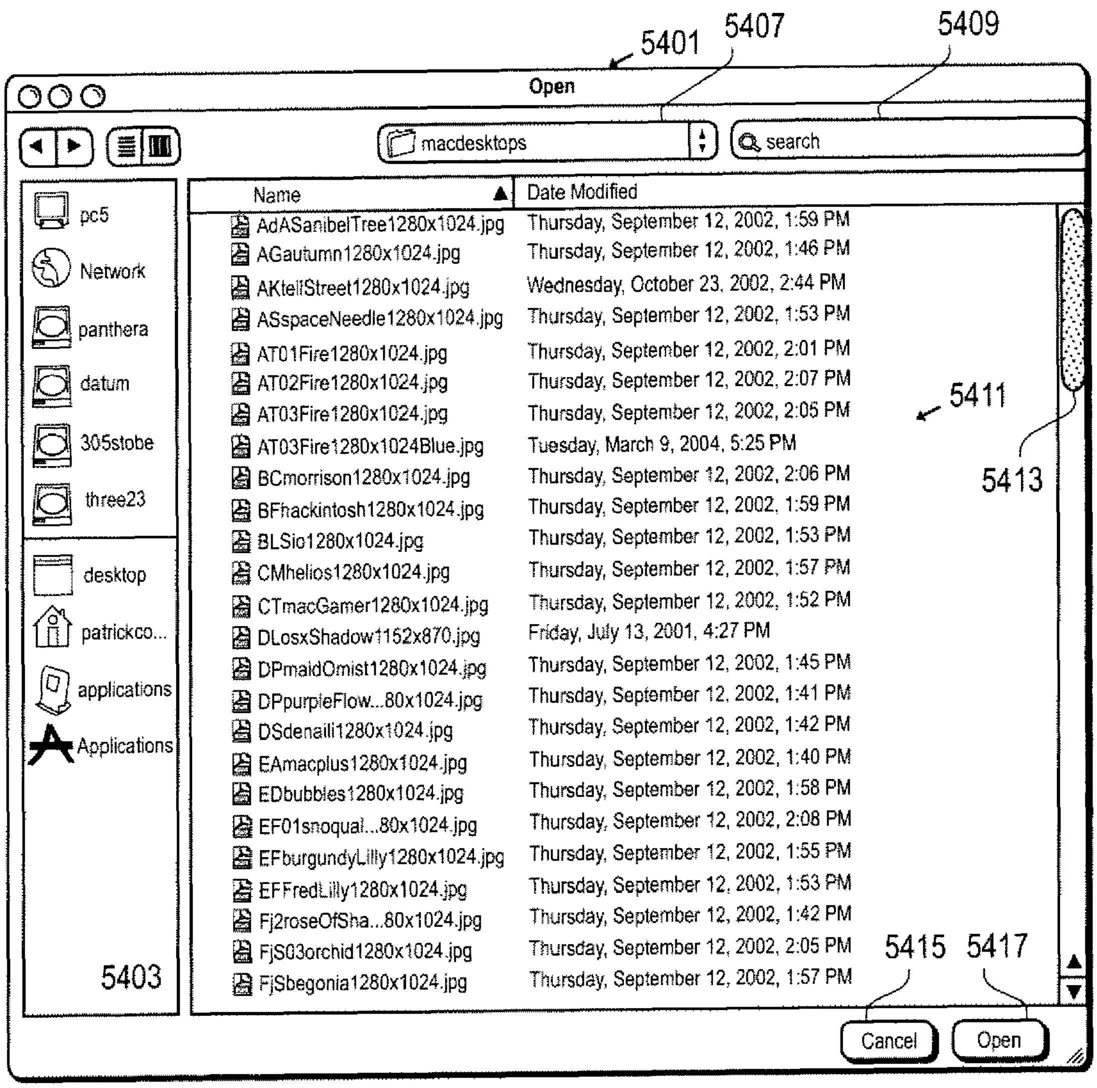
FIGS. 54 and 55 show exemplary user interfaces for a file open window which includes a system wide, at least in certain embodiments, search feature.
Figure 55:
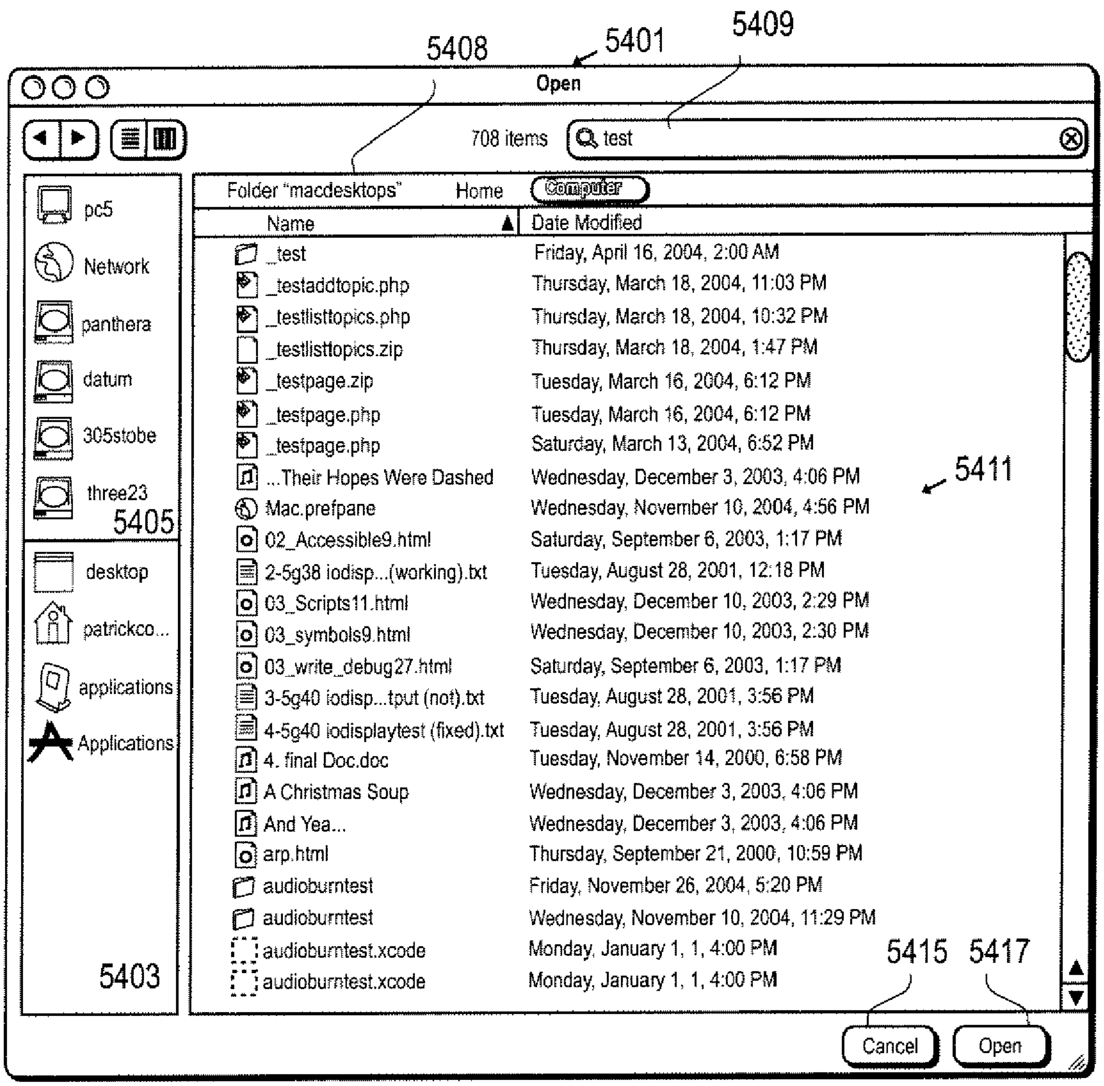
Figure 56:
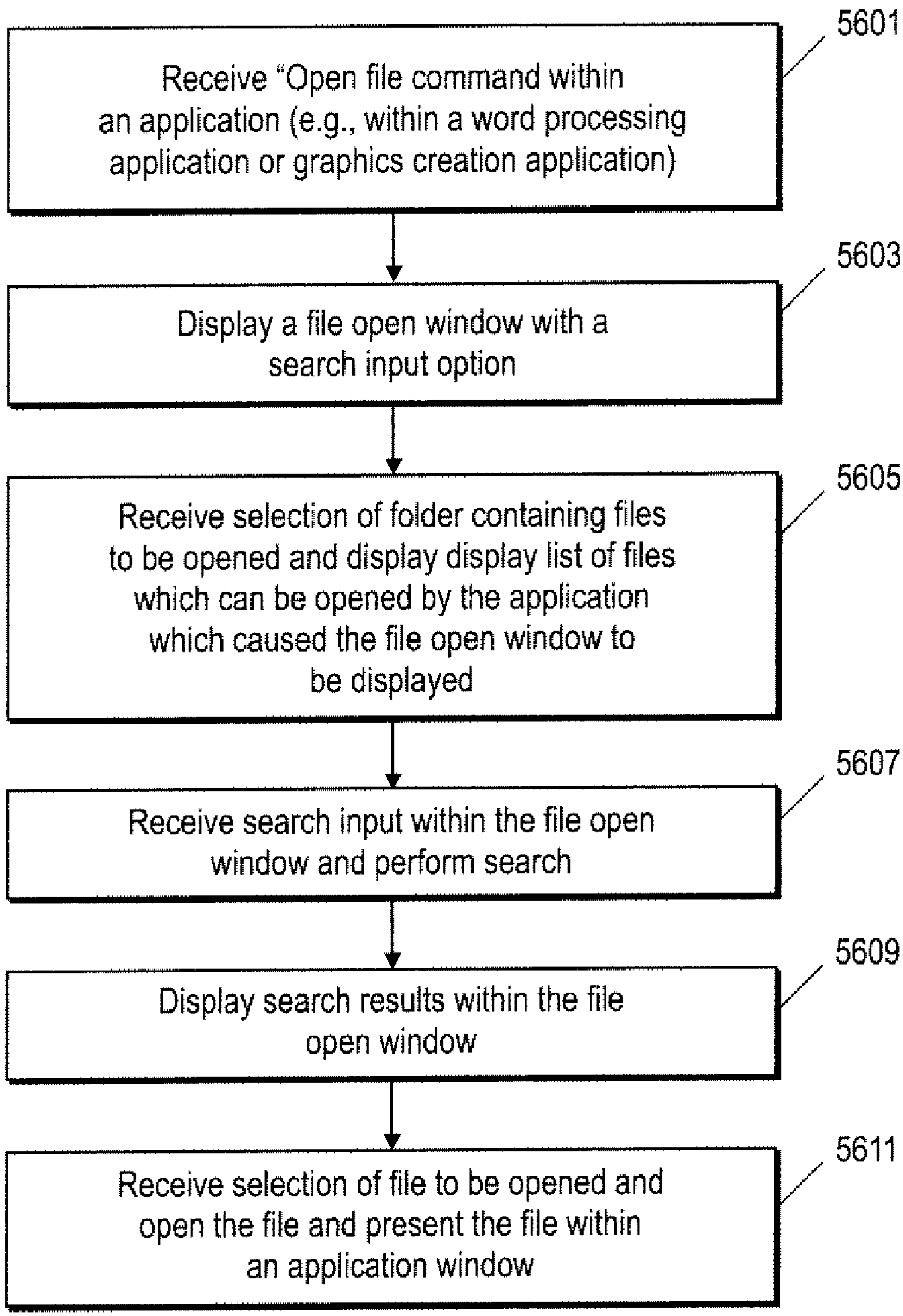
FIG. 56 is a flowchart which illustrates an exemplary method for providing a search input option within a file open window.

FIGS. 54, 55 and 56 show another aspect according to certain embodiments of the present invention. Conventional open dialog boxes or windows normally provide a list view of files within a particular folder or subfolder on a storage medium. These open dialog boxes or windows further include an open button and a cancel button to allow the user to either cancel the operation or to open the selected file. If the user needed to perform a search in order to find a file, the user had to cancel the open operation by selecting the cancel button and then invoke a searching utility to search the storage medium. According to one aspect as described herein, certain embodiments of the present invention provide the ability to search a plurality of different files having different file types and different types of metadata created by the same application or different software applications and to perform that search within an open dialog box or open window or open panel which is used to open a file within a software program. The search function provided within the file open window, such as window 5401 shown in FIGS. 54 and 55, may be similar to or identical to the search functionality provided by any one of the system wide software mechanisms described herein, including a mechanism to search for content within files and metadata for the files for a plurality of different software applications, where the metadata is different for different types of files. The open window 5401 includes a conventional open button 5417 and a conventional cancel button 5415. In addition, it includes a list view 5411 which displays the files within a particular folder or subfolder selected by the location menu 5407. In addition, the open window 5401 also includes a side bar region 5403 and a volume region 5405. The user may enter text for a search into the text input field 5409 to cause a search to be performed within a designated location, such as the location "macdesktops" as indicated in FIG. 54. Once the user enters the text (or other search parameters such as types of files, etc. through user interfaces which are similar to those described herein), then the system will perform a search for files which match the search criteria and display those files in a list view 5411 as shown in FIG. 55. In this way, a file open window which is invoked from an application program may allow a user to perform a search for files within that file open window. FIG. 56 shows an exemplary method which may be performed with such a file open window. Operation 5601 involves receiving an open file command within an application, such as a word processing application or a graphics creation application. Typically, most software applications designed for use by normal consumers allow for the opening of files created by that application and possibly other applications. It is this open file command which is referred to in operation 5601. The system responds, in operation 5603, by displaying a file open window with a search input option. This option may be a single text input field or a text input field in combination with additional parameters which may be defined by a user such as the region 3600 shown in FIG. 36. In addition, in operation 5605, the user may specify a particular folder containing files to be opened and the system can display a list of files which can be opened by the application which caused the file open window to be displayed. Then the user may enter, in operation 5607, a search input within the file open window and cause the search to be performed. The results of the search may be displayed within the file open window in operation 5609 and the user may complete the open operation by selecting a file within the file open window and instructing the system to open the file by, for example, activating the open button 5417.

Figure 57:
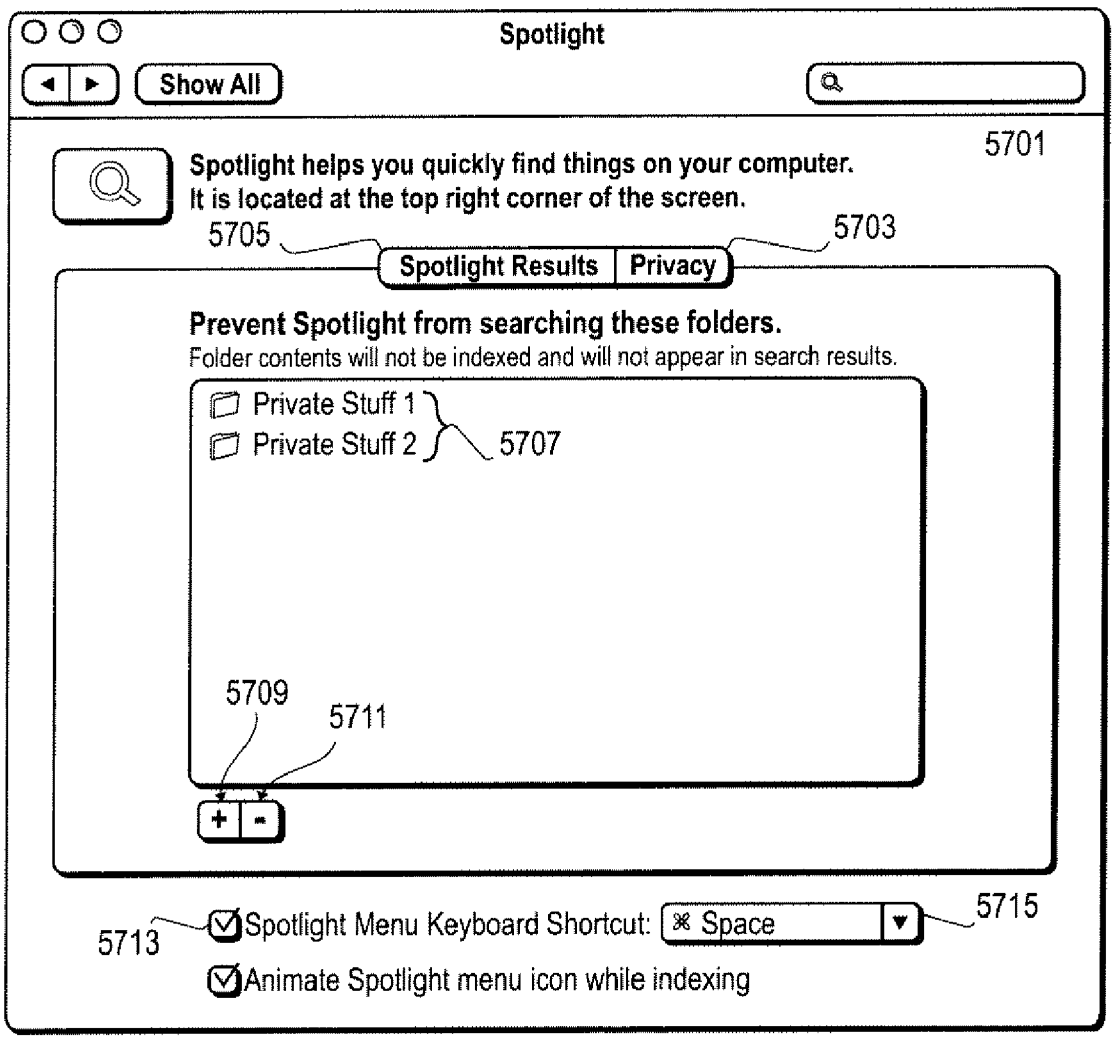
FIGS. 57 and 58 illustrate an exemplary user interface for allowing the user to control or select preferences for searching functions within a system.
Figure 58:
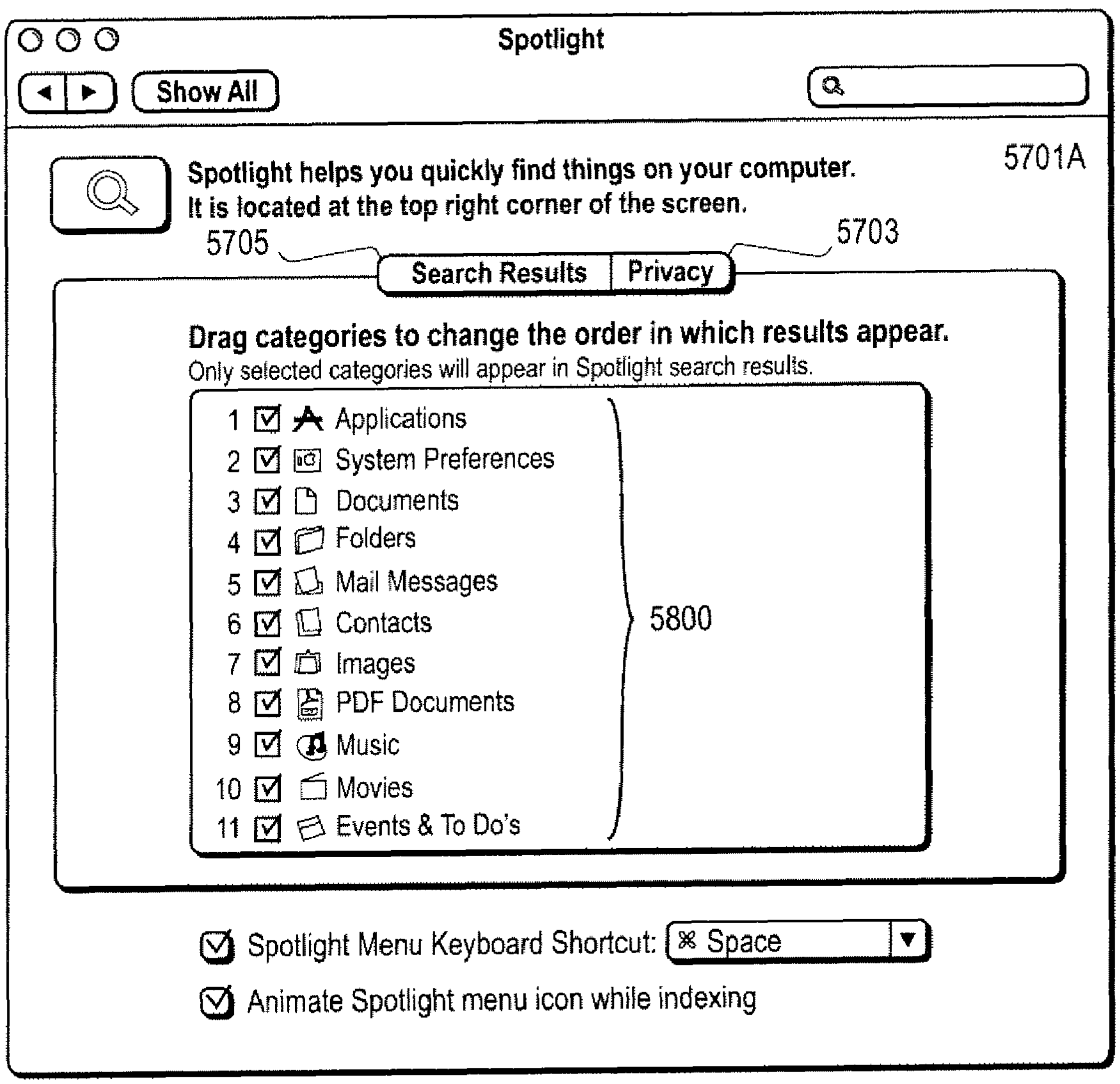

In certain embodiments, it may be desirable to provide the user with the ability to set preferences for the searching functions provided by the various embodiments described herein. FIGS. 57 and 58 provide an example of user interfaces which allow a user to set such preferences. The window 5701 shown in FIG. 57 includes a privacy button 5703 and a results button 5705. These two buttons switch between windows 5701 (which is selected when the privacy button 5703 is activated) and window 5701*a* (which is selected and displayed when the results button 5705 has been activated). The window 5701 also includes a list 5707 which displays folders and files which can be added to the list by using the add button 5709 or which can be removed from the list by using the remove button 5711. Adding a folder to the list 5707, in certain embodiments, will prevent files contained within those folders from being indexed and thus they will not appear in the search results. In certain embodiments, the metadata from these files will also not be included in any metadata databases so that searches through metadata will not retrieve these files. A folder may be removed from the list 5707 by selecting the folder and then selecting the remove button 5711. A folder may be added to the list 5707 by activating the add button 5709 which then causes a file open window to be displayed, from which the user can select a folder or file to be added to the list 5707. The window 5701 also includes a check box 5713 which allows the user to activate and specify a particular keyboard shortcut. The particular shortcut which is selected may be selected from the pull down menu 5715. In an alternative embodiment, adding a folder to the list 5707 does not prevent the contents of the folder from being indexed or searched, but the contents are not displayed in the search results. In other words, the contents of folders in the list 5707 are still indexed and still searched, but they are not displayed in the search results (and thus they are hidden); in a further alternative embodiment, they can be caused to be displayed by the entry of a password or code by the user.

The window 5701*a* is displayed in response to activating the results window 5705. This window includes a list 5800, which is a list of the various categories which appear in the search result windows, such as the window of FIG. 39. The check boxes, such as check box 5801, may be checked by a user to indicate that that particular category may appear in search results. If a check box is not selected (e.g. there is no check in the box), then the category will not appear in the search results window (however, for reasons relating to efficiency of indexing, the items within such a category will still be indexed, and searched through, even though they do not appear in the search results). The order of the categories may be changed by dragging the categories within the list 5800.

Figure 59:
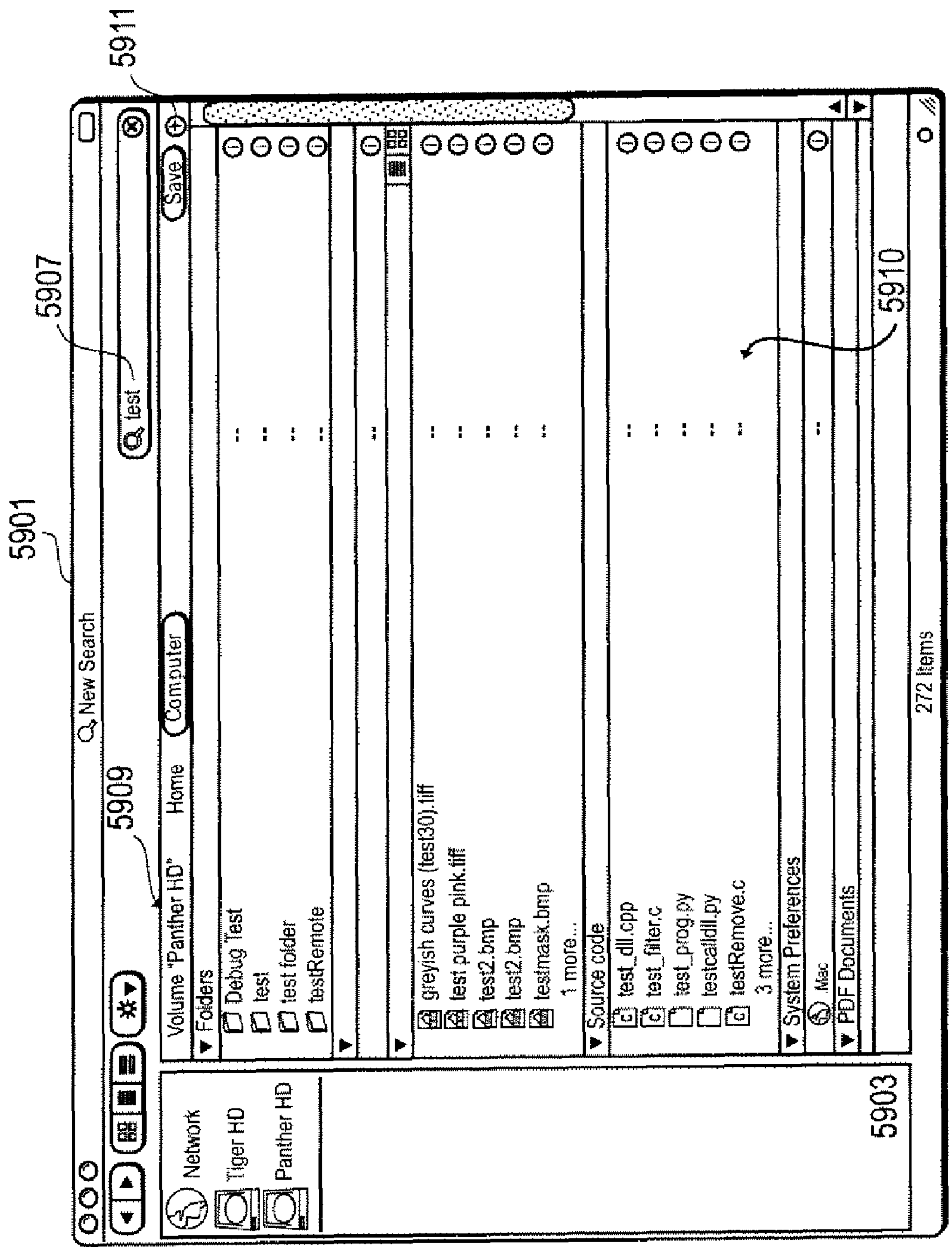
FIGS. 59 and 60 show an exemplary user interface for providing search results within a file browser or file management system.
Figure 60:
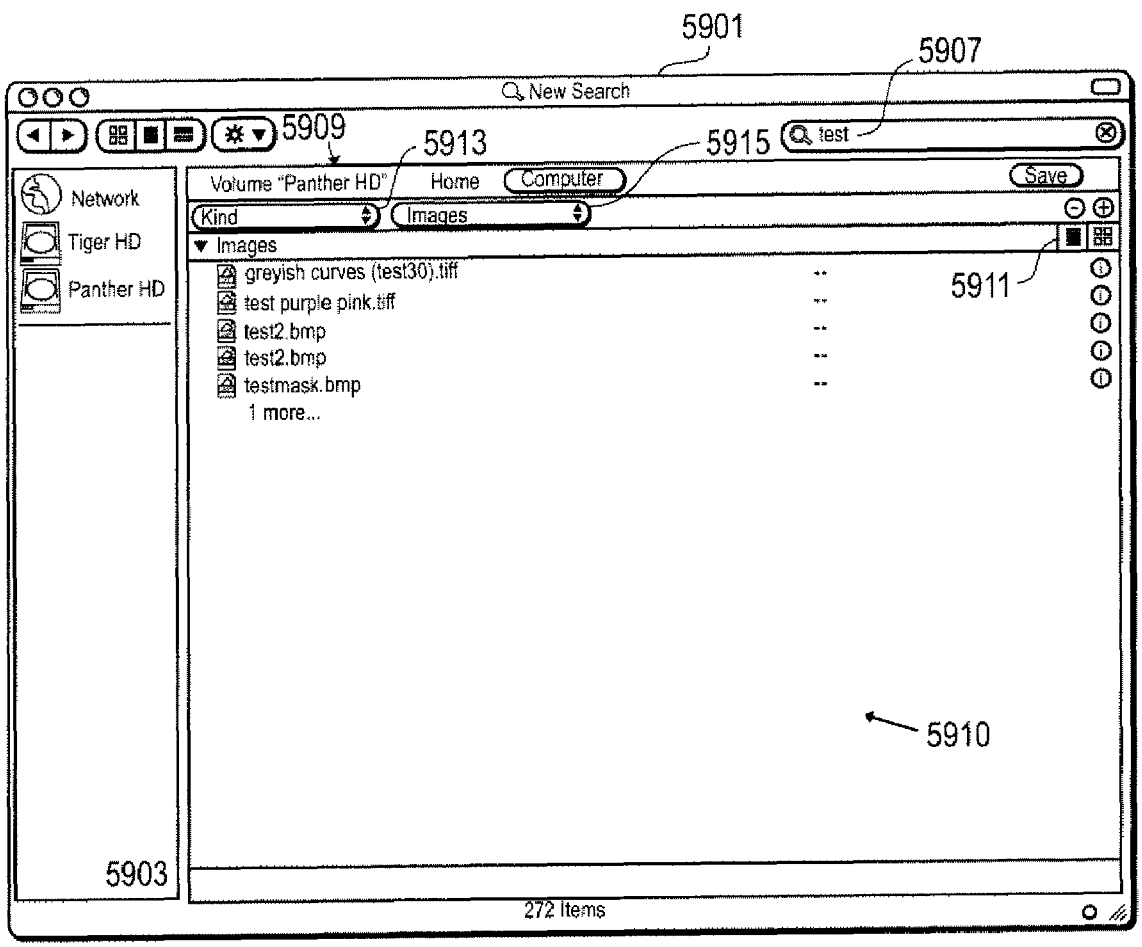
Figure 61:
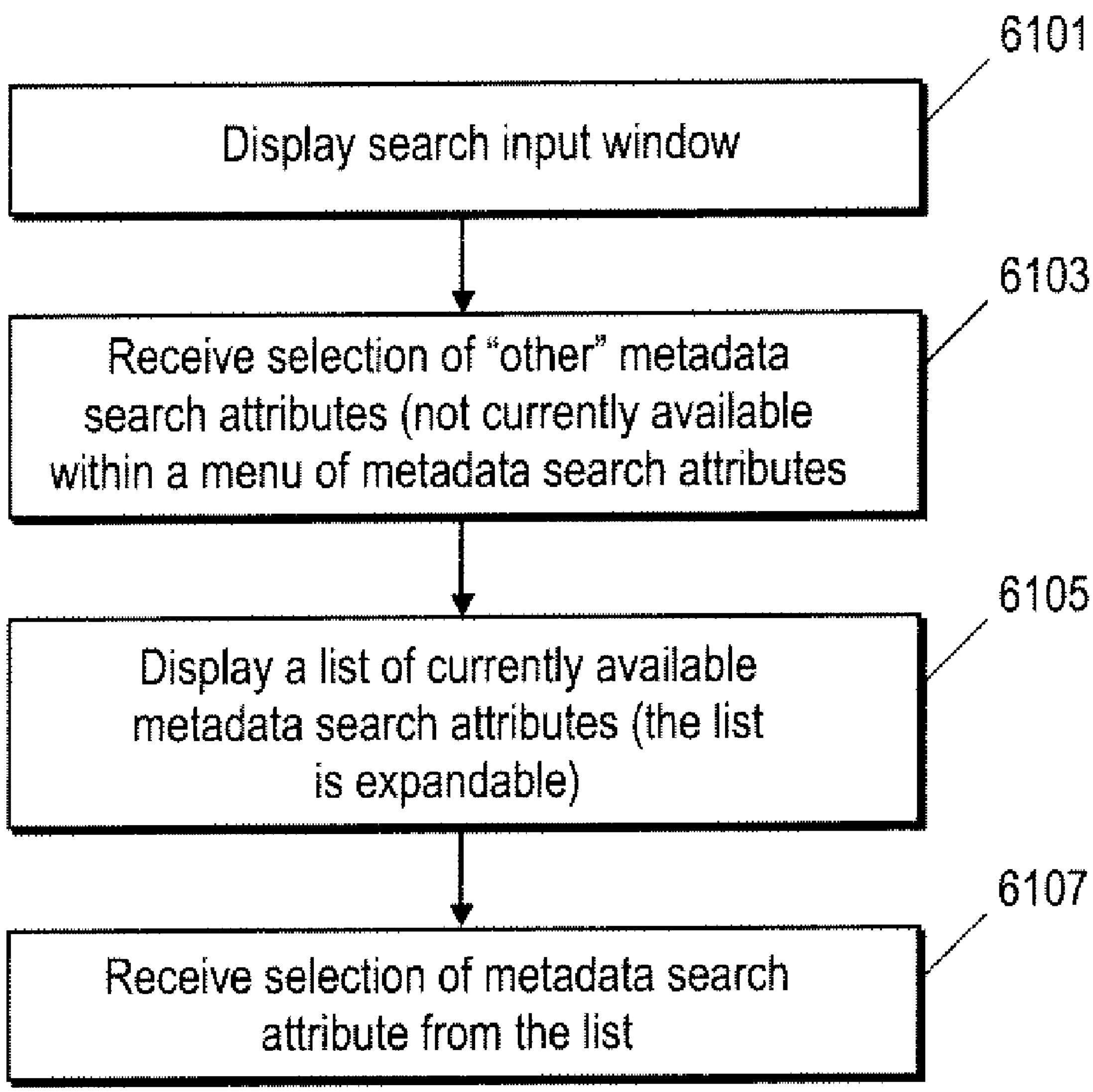
FIG. 61 is a flowchart which illustrates an exemplary method for selecting search options, where one of those options allows for the selection of metadata search attributes from an expandable list of such attributes.

FIGS. 59 and 60 show a particular embodiment in which search results are displayed within a Finder window, such as the Finder windows which appear in the Macintosh OS 10.3 operating system. These Finder windows typically include a side bar region, such as side bar region 5903 and a volume region 5905. The window 5901 also includes a location slice which specifies a location of the current view, such as the current view indicator 5909 and which allows for the selection of a different location. A text entry field 5907 is also provided in the upper portion of the window 5909, thereby allowing the user to enter text to be used as a search input query. A + button 5911 may be used to add additional search parameters to the search query. For example, if the + button 5911 is activated, this will cause the display of an additional slice shown in FIG. 60 which has been defined by the pull down menus 5913 and 5915 to specify a search for all documents of the image type. The result of any such search is displayed within the main display portion 5910.

Figure 62:
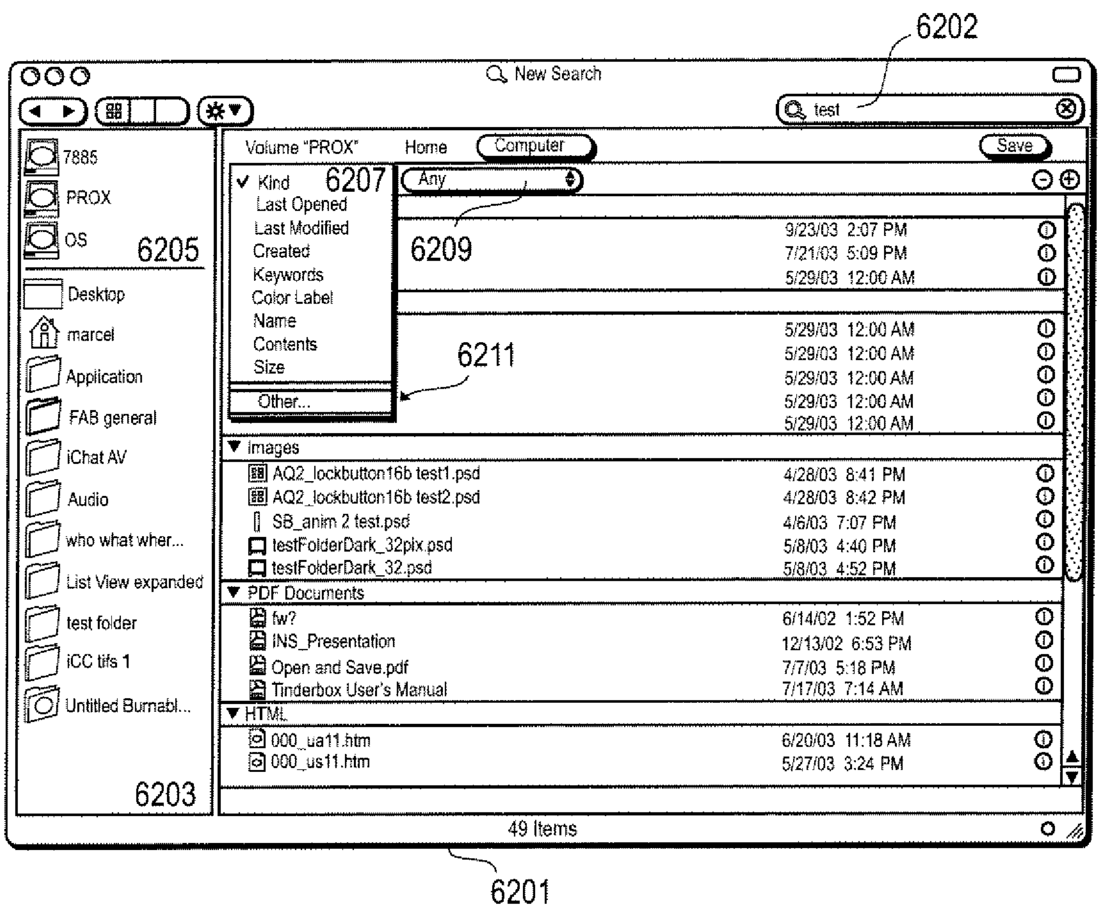
FIGS. 62, 63 and 64 illustrate an exemplary user interface for implementing a method such as that shown in FIG. 61.
Figure 63:
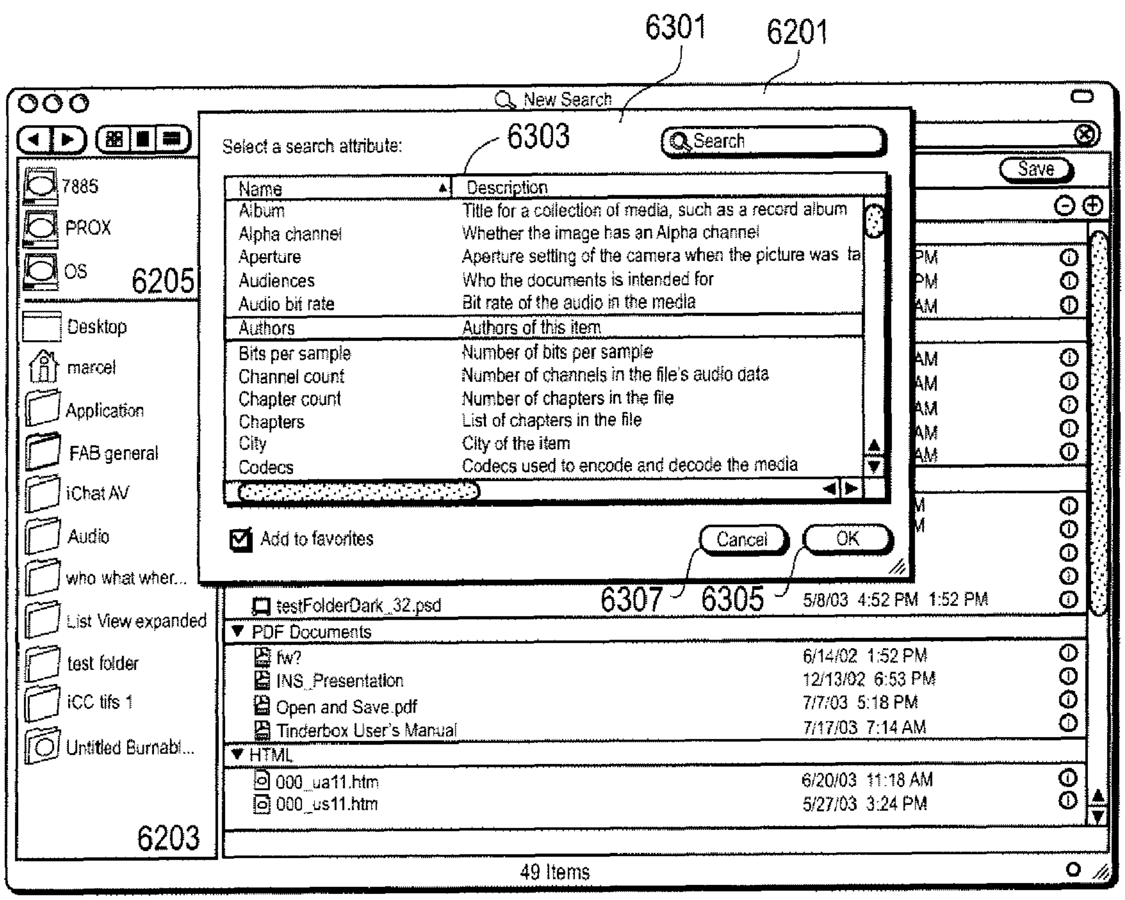
Figure 64:
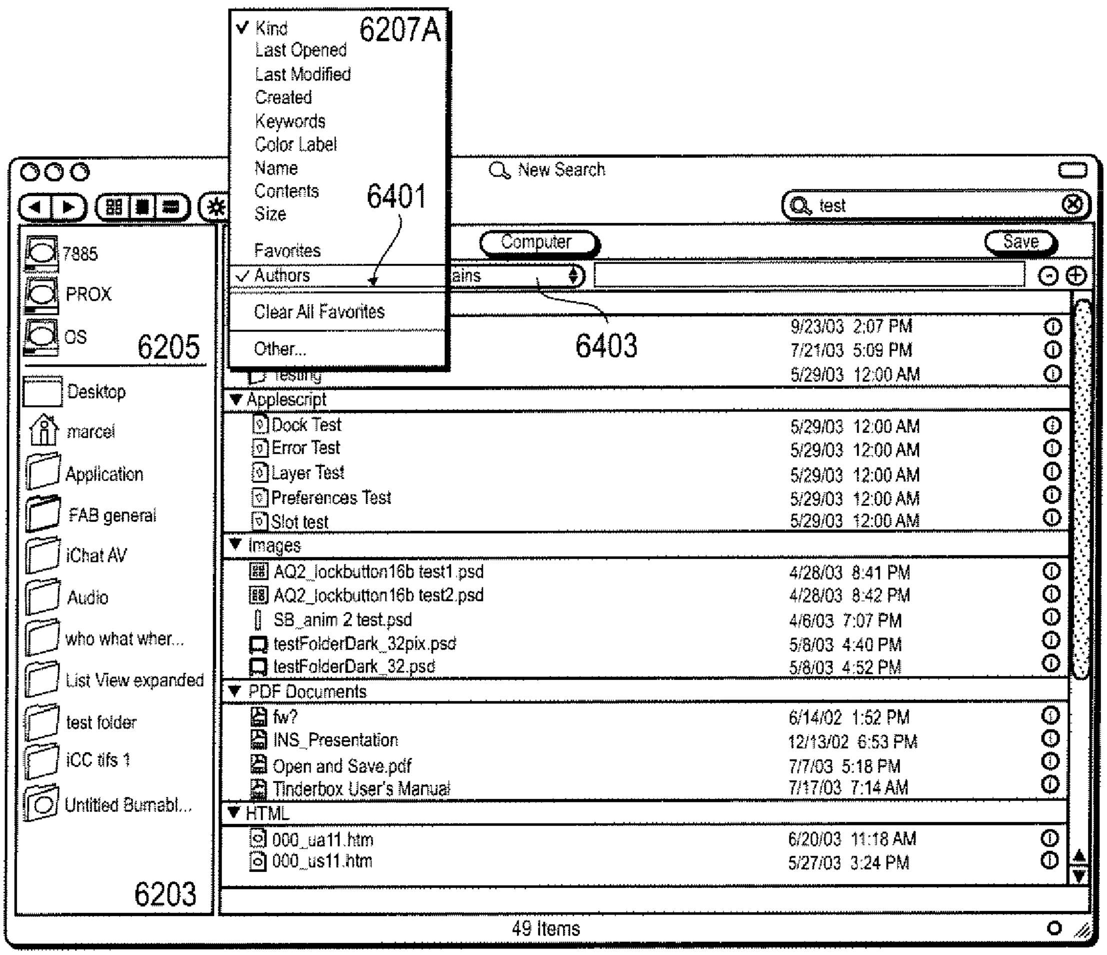

There are many different types of files which presently exist (e.g. word processing files, spreadsheet files, presentation files, email files, html files, PDF files, various types of image files, etc.). As a result, there are many different types of data which can exist as metadata for any one type of file. This can be seen from the large table shown herein which gives an example of metadata for certain types of files. Furthermore, through changes in file types, the creation of new types of software applications, and the creation of importers to input data from a file into a metadata database, it is apparent that the types of metadata can expand in the future. Thus, a list of metadata attributes should be expandable, and in certain embodiments of the present invention, it is expandable. It may be made expandable through the use of an interface which allows for the selection of "other" metadata or search attributes. FIGS. 61, 62, 63, and 64 give one example of a method for picking metadata search attributes from an expandable list of a plurality of metadata search attributes. This expandable list may be achieved automatically by adding new importers or file sniffers which are designed to import metadata from new types of files into a metadata database and which add the metadata search attributes into a list used by the user interface of the metadata search software. The exemplary method shown in FIG. 61 begins in operation 6101 in which a search input window is displayed. FIGS. 62 and 64 show an exemplary search input window. The window 6201 includes a side bar 6203 and a volume region 6205 and also includes a text entry field 6202 into which text may be entered to cause a search to be performed based on the entered text. In addition, through the use of pull down menus, such as menus 6207 and 6207*a* and 6209, the user may specify search input parameters. The menu 6207 may be activated to reveal a list of various search attributes, such as kind, last opened, last modified, created, key words, color label, name, etc. as shown in the menu 6207. In addition, the search attributes or inputs provided by menus 6207 includes the "other" option 6211. If the user selects this option, as in operation 6103 of FIG. 61, then a list of available search attributes is displayed as panel 6301 as shown in FIG. 63. This list will typically include all available search attributes currently supported by the system, such as those attributes provided by importers which have been described herein as well as other potential mechanisms for obtaining the metadata from a file. The user may select the particular attribute (e.g. "author" attribute) as the "other" attribute and then select the "ok" button 6305 to cause the attribute to be added into the menu 6207, forming the menu 6207*a*. The menu 6207*a* now includes the authors option 6401 which the user can select. Then the user can select from the pull down menu 6403 from a list of available authors or type in into the adjacent text entry field an author name to cause a search, in the case of the window of FIG. 64, for all documents which include the word "test" and which are authored by a particular author. By being able to add additional metadata search attributes into the list 6303, the system has an expandable list of metadata search attributes. This allows for an open-ended solution for future file types as well as future importers.

Figure 65:
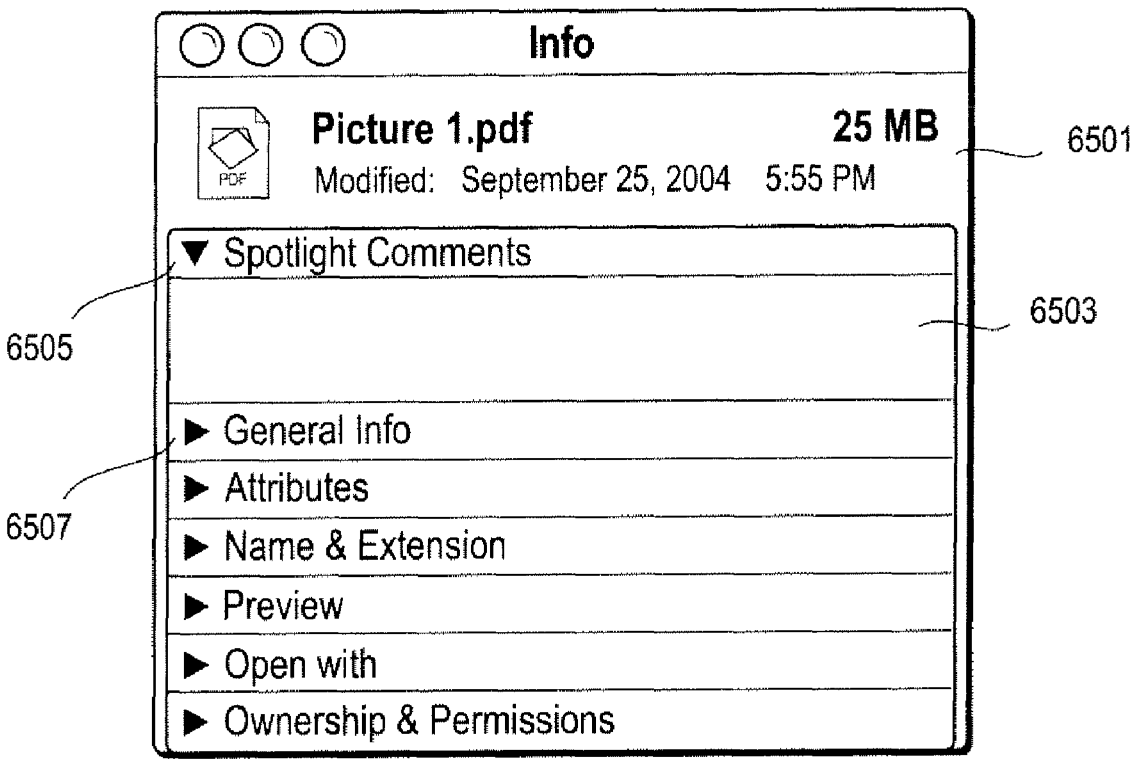
FIGS. 65 and 66 show an exemplary user interface for displaying information about a particular file.
Figure 66:
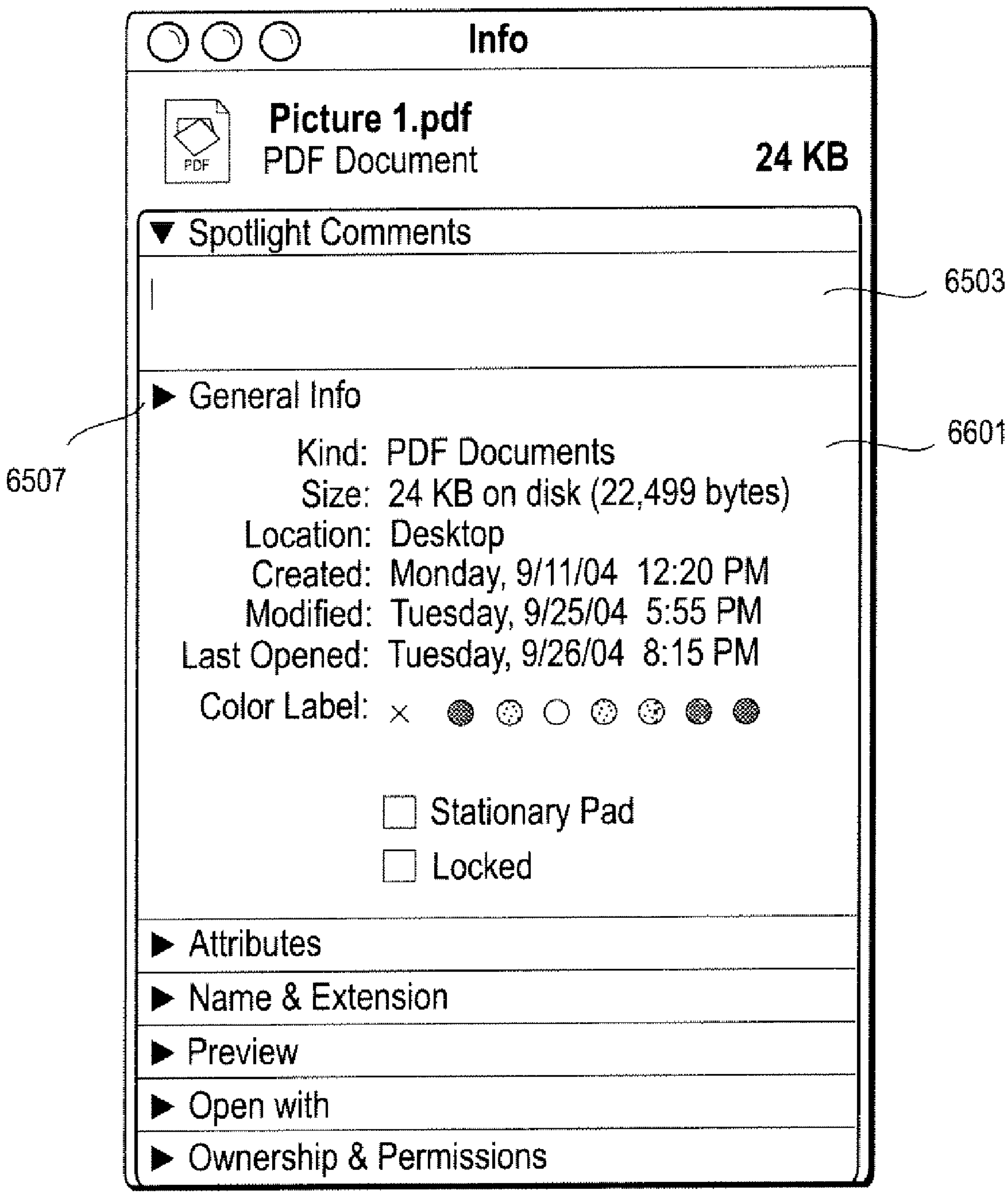

FIGS. 65 and 66 show another aspect of certain embodiments described herein. In these embodiments, it is possible to obtain information about a particular file. This information may be displayed within a window such as the window 6501 or the window 6502 shown in FIG. 66. In one embodiment, these windows may be displayed by selecting the particular file and then activating a command (e.g. "Get Info" or "Show Properties") to obtain more information or properties about the file. The file may be shown in a list view or an icon view and may be selected while in those views and then a command to obtain information or show properties about the document may then be selected and executed. In an alternative embodiment, a button, which when activated displays these windows (e.g. as in FIG. 65 or 66), may be placed at the rightmost column of a multiple column view, such as the column view available within a Finder window of the Panther operating system (Macintosh OS 10.3). An example of this column view is shown in FIG. 26. When a user file is selected in column view, the rightmost column normally contains basic information about the file and may contain a thumbnail preview or other type of preview of the file. Activating the toggle button 6507 will reveal general information, such as the information 6601 shown in FIG. 66. In addition, both windows shown in FIGS. 65 and 66 include the ability to enter comments which are saved into either the index database or the metadata database for that particular document. In this way, a user can obtain information about a particular file and then enter additional comments into the comment field 6503 which are then used by the metadata processing systems described herein.

An optional privacy feature may be included with one or more of the various embodiments described herein. This privacy feature, if enabled, causes the system to determine that a user has stopped inputting search queries after a period of time (e.g. after N minutes which may be 5 minutes, etc.), and if the user has stopped, the system stops updating (e.g. as in FIG. 29) the search results and may also remove the search results window from the display area. Thus, after a period of time the search query and the results of the search will be removed from the display in order to protect the privacy of the user. In an alternative embodiment, the search query and the results of the search are removed from the display (e.g. the windows containing this information are closed) but the updating of the search results occurs in the background (without being displayed), and this updated information may be retrieved by re-opening the pertinent windows.

At least certain embodiments of the various inventions allow for the searching of system preference or system setting or system configuration files or data structures through the use of a searching utility. For example, a system wide searching utility may be used to search for a system preference or system setting or system configuration file or data structure by entering the name or a synonym of the system preference or system setting or system configuration file or data structure. Metadata and/or content of the system preference or system setting or system configuration file or data structure may be searched by the searching utility and cause the system preference or system setting or system configuration file or data structure to be retrieved as one of the search results and then opened from the list of search results. In this exemplary manner, the search utility can open a particular system preference or system setting or system configuration file or data structure through a search process.

At least certain embodiments of the various embodiments provide intelligent mail boxes in email software. In one exemplary embodiment, the email software includes "in boxes" or folders which contain new or received email and these folders or "in boxes" (or mail boxes) may be configured to act as smart folders to automatically search through incoming email and segregate the email based on the saved search queries associated with each of the email in boxes which act in a manner which is similar to the way smart folders act. Also see U.S. Pat. No. 6,243,724 in connection with this type of email box. The email software may be configured to allow multiple folders, each of which or at least one of which may be defined as having a saved search query which is automatically used to search through newly received emails and, if any of the emails match the search query, the email is moved to the folder or "in box" (or the email is copied and the copy is moved to the folder). Thus, these folders automatically move emails from a general in box to folders or specific "in boxes" which are specified by a search query.

In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A method comprising:

creating a first graphical representation of a first search query based at least in part on metadata attributes;

creating, by a data processing system, a second graphical representation of a second search query based at least in part on metadata attributes, wherein the second graphical representation has a predetermined hierarchical relationship to the first graphical representation and wherein files retrieved by the first search query and the second search query provide a first hierarchical view of items stored in a system and a file management system on the system provides a second hierarchical view based on file directory locations of items on the system and wherein the first hierarchical view is determined at least in part by metadata and wherein the metadata is from a plurality of files having different file types such that the type of metadata for one file type is different than the type of metadata for another file type;

receiving a command to open the first graphical representation and, in response to the command, performing a search of indexed content of a plurality of files using the first search query;

displaying results of the search of indexed content in a search window, wherein as new files, which match the first search query, are created, a representation of the new files is automatically displayed in the results in the search window without having to close and re-open the search window and without having to manually refresh the search window.

2. A method as in claim 1 wherein the first graphical representation is one of a folder and a subdirectory and the second graphical representation is one of a folder and a subdirectory.

3. A method as in claim 1 wherein modifying the first search query automatically modifies the second search query.

4. A machine readable storage medium storing executable instructions which when executed by a system cause the system to perform a method comprising:

creating a first graphical representation of a first search query based at least in part on metadata attributes;

creating a second graphical representation of a second search query based at least in part on metadata attributes, wherein the second graphical representation has a predetermined hierarchical relationship to the first graphical representation and wherein files retrieved by the first search query and the second search query provide a first hierarchical view of items stored in a system and a file management system on the system provides a second hierarchical view based on file directory locations of items on the system and wherein the first hierarchical view is determined at least in part by metadata and wherein the metadata is from a plurality of files having different file types such that the type of metadata for one file type is different than the type of metadata for another file type;

receiving a command to open the first graphical representation and, in response to the command, performing a search of indexed content of a plurality of files using the first search query;

displaying results of the search of indexed content in a search window, wherein as new files, which match the first search query, are created, a representation of the new files is automatically displayed in the results in the search window without having to close and re-open the search window and without having to manually refresh the search window.

5. The machine readable storage medium as in claim 4 wherein the first graphical representation is one of a folder and a subdirectory and the second graphical representation is one of a folder and a subdirectory.

6. The machine readable storage medium as in claim 4 wherein modifying the first search query automatically modifies the second search query.

7. A data processing system comprising:

means for creating a first graphical representation of a first search query based at least in part on metadata attributes;

means for creating, by a hardware device, a second graphical representation of a second search query based at least in part on metadata attributes, wherein the second graphical representation has a predetermined hierarchical relationship to the first graphical representation and wherein files retrieved by the first search query and the second search query provide a first hierarchical view of items stored in a system and a file management system on the system provides a second hierarchical view based on file directory locations of items on the system and wherein the first hierarchical view is determined at least in part by metadata and wherein the metadata is from a plurality of files having different file types such that the type of metadata for one file type is different than the type of metadata for another file type;

means for receiving a command to open the first graphical representation and, in response to the command, performing a search of indexed content of a plurality of files using the first search query;

means for displaying results of the search of indexed content in a search window, wherein as new files, which match the first search query, are created, a representation of the new files is automatically displayed in the results in the search window without having to close and re-open the search window and without having to manually refresh the search window.

8. A data processing system as in claim 7 wherein the first graphical representation is one of a folder and a subdirectory and the second graphical representation is one of a folder and a subdirectory.

9. A data processing system as in claim 7 wherein modifying the first search query automatically modifies the second search query.

* * * * *

UNITED STATES PATENT AND TRADEMARK OFFICE

CERTIFICATE OF CORRECTION

PATENT NO. : 7,774,326 B2
APPLICATION NO. : 11/112305
DATED : August 10, 2010
INVENTOR(S) : Yan Arrouye et al.

It is certified that error appears in the above-identified patent and that said Letters Patent is hereby corrected as shown below:

On Title page 3, item (56); in column 2, under “Other Publications”, line 22, delete “XP01057584” and insert -- XP010517584 --, therefor.

On Sheet 54 of 90, Reference numeral 2907, in Fig. 29, line 3, delete “(SO” and insert -- SO --, therefor.

On Sheet 72 of 90, Reference numeral 4807, in Fig. 48, line 2, after “within application” delete “application”.

In column 1, line 16, delete “Modem” and insert -- Modern --, therefor.

In column 1, line 29, delete “Modem” and insert -- Modern --, therefor.

In column 23, line 12, delete “B I” and insert -- B1. --, therefor.

In column 28, line 67, delete “112” and insert -- 1112 --, therefor.

Signed and Sealed this
Twenty-ninth Day of November, 2011

David J. Kappos
*Director of the United States Patent and Trademark Office*